(12) United States Patent
Bartfai-Walcott et al.

(10) Patent No.: US 12,061,930 B2
(45) Date of Patent: Aug. 13, 2024

(54) SOFTWARE DEFINED SILICON FEATURE LICENSING

(71) Applicant: Intel Corporation, Santa Clara, CA (US)

(72) Inventors: Katalin Klara Bartfai-Walcott, El Dorado Hills, CA (US); Mark Baldwin, Hillsboro, OR (US); Arkadiusz Berent, Tuchom (PL); Bartosz Gotowalski, Gdansk (PL); Vasuki Chilukuri, Hillsboro, OR (US); Vasudevan Srinivasan, Portland, OR (US); Justyna Chilczuk, Gdansk (PL); Vinila Rose, Bangalore (IN); Mariusz Oriol, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 511 days.

(21) Appl. No.: 17/033,200

(22) Filed: Sep. 25, 2020

(65) Prior Publication Data

US 2021/0012445 A1    Jan. 14, 2021

Related U.S. Application Data

(60) Provisional application No. 63/049,016, filed on Jul. 7, 2020, provisional application No. 62/937,032, filed
(Continued)

(51) Int. Cl.
*G06Q 10/10* (2023.01)
*G06F 9/50* (2006.01)
(Continued)

(52) U.S. Cl.
CPC .......... *G06F 9/5027* (2013.01); *G06F 21/105* (2013.01); *G06F 21/72* (2013.01);
(Continued)

(58) Field of Classification Search
CPC .. G06F 21/105; G06Q 10/10; G06Q 30/0609; G06Q 50/184; G06Q 30/0185;
(Continued)

(56) References Cited

U.S. PATENT DOCUMENTS

| 7,315,826 B1 | 1/2008 | Guheen et al. |
| 7,493,477 B2 | 2/2009 | Velhal et al. |

(Continued)

FOREIGN PATENT DOCUMENTS

| CN | 114341917 | 4/2022 |
| DE | 112020004561 | 10/2022 |

(Continued)

OTHER PUBLICATIONS

International Searching Authority, "International Preliminary Report on Patentability," mailed in connection with International Patent Application No. PCT/US2020/052847, on Mar. 15, 2022, 7 pages.

(Continued)

*Primary Examiner* — John W Hayes
*Assistant Examiner* — Zehra Raza
(74) *Attorney, Agent, or Firm* — Hanley, Flight and Zimmerman, LLC

(57) ABSTRACT

Methods, apparatus, systems and articles of manufacture (e.g., physical storage media) to implement software defined silicon feature licensing are disclosed. Example licensor systems disclosed herein includes a third party verifier to verify one or more credentials included in a request to become an authorized delegated licensor, the request received from a third party. Disclosed example licensor systems also include a feature identifier to identify a feature of a silicon structure which the third party is to be granted the authority to license. Disclosed example licensor systems further include a configuration installation code generator to generate feature configuration installation code, the feature (Continued)

configuration installation code to be used by the third party to generate at least a portion of the license, the portion of the license to be used by a licensee to configure the silicon structure to access the licensed feature, and contents of the feature configuration installation code encrypted to prevent access by the authorized delegated licensor.

20 Claims, 49 Drawing Sheets

Related U.S. Application Data on Nov. 18, 2019, provisional application No. 62/907,353, filed on Sep. 27, 2019.

(51) Int. Cl.
| | |
|---|---|
| *G06F 21/10* | (2013.01) |
| *G06F 21/72* | (2013.01) |
| *G06F 21/73* | (2013.01) |
| *G06Q 20/12* | (2012.01) |
| *G06Q 30/018* | (2023.01) |
| *G06Q 30/0601* | (2023.01) |
| *G06Q 50/04* | (2012.01) |
| *G06Q 50/18* | (2012.01) |
| *H04L 9/08* | (2006.01) |
| *H04L 9/32* | (2006.01) |

(52) U.S. Cl.
CPC ............ *G06F 21/73* (2013.01); *G06Q 10/10* (2013.01); *G06Q 20/1235* (2013.01); *G06Q 20/127* (2013.01); *G06Q 30/0609* (2013.01); *G06Q 50/184* (2013.01); *H04L 9/0861* (2013.01); *H04L 9/321* (2013.01); *H04L 9/3263* (2013.01); *H04L 9/3268* (2013.01); *G05B 2219/2205* (2013.01); *G05B 2219/25395* (2013.01); *G05B 2219/33088* (2013.01); *G06F 21/1011* (2023.08); *G06F 2209/501* (2013.01); *G06F 2209/504* (2013.01); *G06F 2209/506* (2013.01); *G06F 2221/2149* (2013.01); *G06Q 30/0185* (2013.01); *G06Q 50/04* (2013.01); *G06Q 2220/18* (2013.01); *H04L 9/3278* (2013.01)

(58) Field of Classification Search
CPC .. G06Q 50/04; G06Q 2220/18; H04L 9/0861; H04L 9/321; H04L 9/3268
See application file for complete search history.

(56) References Cited

U.S. PATENT DOCUMENTS

| | | | |
|---|---|---|---|
| 7,681,245 B2 | 3/2010 | Walker et al. | |
| 7,814,366 B2 | 10/2010 | Apparao et al. | |
| 7,895,124 B2* | 2/2011 | Baratti | G06F 21/10 |
| | | | 705/57 |
| 8,055,822 B2 | 11/2011 | Bernstein et al. | |
| 8,082,547 B1 | 12/2011 | Herington et al. | |
| 8,194,569 B2 | 6/2012 | Shorty et al. | |
| 8,224,750 B1 | 7/2012 | Bennett et al. | |
| 9,032,482 B2 | 5/2015 | Kondou et al. | |
| 9,104,894 B2 | 8/2015 | Brown et al. | |
| 9,280,338 B1 | 3/2016 | Stickle et al. | |
| 9,411,395 B2 | 8/2016 | Rosenzweig et al. | |
| 9,513,968 B1 | 12/2016 | Fiske et al. | |
| 9,652,612 B2 | 5/2017 | Brech et al. | |
| 10,031,993 B1 | 7/2018 | Poornachandran et al. | |
| 10,361,864 B2 | 7/2019 | Glendinning | |
| 11,218,322 B2 | 1/2022 | Ghetie et al. | |
| 11,573,830 B2 | 2/2023 | Bartfai-Walcott et al. | |
| 11,579,897 B2 | 2/2023 | Bartfai-Walcott et al. | |
| 11,599,368 B2 | 3/2023 | Bartfai-Walcott et al. | |
| 2003/0112123 A1 | 6/2003 | Hom et al. | |
| 2004/0044631 A1 | 3/2004 | Walker et al. | |
| 2004/0221193 A1 | 11/2004 | Armstrong et al. | |
| 2005/0289072 A1 | 12/2005 | Sabharwal | |
| 2006/0168372 A1 | 7/2006 | Smith, IV et al. | |
| 2006/0212677 A1 | 9/2006 | Fossum | |
| 2007/0188351 A1 | 8/2007 | Brown et al. | |
| 2009/0323107 A1 | 12/2009 | Maeda | |
| 2010/0100565 A1* | 4/2010 | Adachi | G06F 21/105 |
| | | | 707/E17.014 |
| 2011/0154348 A1 | 6/2011 | Elnozahy et al. | |
| 2011/0191832 A1 | 8/2011 | Davis et al. | |
| 2011/0197077 A1* | 8/2011 | Chan | G06F 21/10 |
| | | | 713/189 |
| 2013/0089004 A1 | 4/2013 | David et al. | |
| 2013/0111033 A1 | 5/2013 | Mao et al. | |
| 2013/0145431 A1 | 6/2013 | Kruglick | |
| 2014/0013153 A1 | 1/2014 | Chittigala et al. | |
| 2014/0044265 A1* | 2/2014 | Kocher | G06F 21/71 |
| | | | 380/277 |
| 2014/0068792 A1 | 3/2014 | Kondou et al. | |
| 2014/0317422 A1 | 10/2014 | Rosenzweig et al. | |
| 2014/0359350 A1 | 12/2014 | Plank et al. | |
| 2016/0142890 A1 | 5/2016 | Drozdovskyy et al. | |
| 2016/0259923 A1 | 9/2016 | Papa et al. | |
| 2017/0041793 A1 | 2/2017 | Lee et al. | |
| 2017/0206352 A1 | 7/2017 | Brech et al. | |
| 2017/0357784 A1 | 12/2017 | Duda et al. | |
| 2018/0109537 A1 | 4/2018 | Schmidt et al. | |
| 2018/0145836 A1 | 5/2018 | Saur et al. | |
| 2018/0219841 A1 | 8/2018 | Nadler et al. | |
| 2018/0260538 A1* | 9/2018 | Peza Ramirez | H04L 9/3297 |
| 2018/0336342 A1 | 11/2018 | Narendra Trivedi et al. | |
| 2019/0245707 A1 | 8/2019 | Coombes et al. | |
| 2020/0034171 A1 | 1/2020 | Kommula et al. | |
| 2020/0153645 A1 | 5/2020 | Sutton et al. | |
| 2020/0160340 A1 | 5/2020 | Walters et al. | |
| 2020/0310872 A1 | 10/2020 | Jambur Sathyanarayana et al. | |
| 2021/0011741 A1 | 1/2021 | Bartfai-Walcott et al. | |
| 2021/0012357 A1 | 1/2021 | Bartfai-Walcott et al. | |
| 2021/0117515 A1 | 4/2021 | Bartfai-Walcott et al. | |
| 2021/0334101 A1 | 10/2021 | Palermo et al. | |
| 2022/0092154 A1 | 3/2022 | Bartfai-Walcott et al. | |
| 2022/0100823 A1 | 3/2022 | Bartfai-Walcott et al. | |

FOREIGN PATENT DOCUMENTS

| | | |
|---|---|---|
| WO | 2021062242 | 4/2021 |
| WO | 2021062243 | 4/2021 |
| WO | 2022240905 | 11/2022 |

OTHER PUBLICATIONS

International Searching Authority, "International Preliminary Report on Patentability," mailed in connection with International Patent Application No. PCT/US2020/052848, on Mar. 15, 2022, 6 pages.

United States Patent and Trademark Office "Notice of Allowance" mailed in connection with U.S. Appl. No. 17/442,541, on May 6, 2022, 10 pages.

United States Patent and Trademark Office "Notice of Allowance" mailed in connection with U.S. Appl. No. 17/442,041, on Jun. 23, 2022, 11 pages.

Amelino et al. "An IP Core Remote Anonymoust Activation Protocol", IEEE 2016, published Nov. 3, 2016, pp. 258-268.

Amelino et al. "A proposal for the secure activation and licensing of FPGA IP cores", ITASEC17, 2017, pp. 29-37.

Kepa et al. "IP protection in partially reconfigurable FPGAs", IEEE 2009, 2009, pp. 403-409.

Maes et al. "A Pay-per-User Licensing Scheme for Hardware IP Cores in Recent SRAM-Based FPGAs", IEEE 2011, 2012, pp. 98-108.

United States Patent and Trademark Office "Notice of Allowance" mailed in connection with U.S. Appl. No. 17/033,267, on Jul. 6, 2022, 10 pages.

(56) References Cited

OTHER PUBLICATIONS

United States Patent and Trademark Office "Notice of Allowability" mailed in connection with U.S. Appl. No. 17/442,041, on Jul. 13, 2022, 3 pages.
International Searching Authority "Partial International Search" mailed in connection with PCT Application No. PCT/US2022/028632, 14 pages.
Anonymous: "Trusted execution environment", Wikipedia, Apr. 29, 2021, pp. 1-7.
Chen, B. et al. "Cloud Licensing model for .NET software protection", Computer Science & Education (ICCSE), IEEE, Jul. 14, 2012, pp. 1069-1074.
International Searching Authority, "International Search Report," mailed in connection with International Patent Application No. PCT/US2020/052847, on Mar. 3, 2021, 4 pages.
International Searching Authority, "Written Opinion," mailed in connection with International Patent Application No. PCT/US2020/052847, on Mar. 3, 2021, 6 pages.
International Searching Authority, "International Search Report," mailed in connection with International Patent Application No. PCT/US2020/052848, on Mar. 22, 2021, 4 pages.
International Searching Authority, "Written Opinion," mailed in connection with International Patent Application No. PCT/US2020/052848, on Mar. 22, 2021, 6 pages.
United States Patent and Trademark Office, "Restriction Requirement," mailed in connection with U.S. Appl. No. 17/033,252, on Sep. 21, 2022, 5 pages.
United States Patent and Trademark Office, "Notice of Allowance," mailed in connection with U.S. Appl. No. 17/033,267, on Oct. 11, 2022, 5 pages.
United States Patent and Trademark Office, "Notice of Allowance," mailed in connection with U.S. Appl. No. 17/442,541, on Sep. 21, 2022, 10 pages.
United States Patent and Trademark Office, "Notice of Allowance," mailed in connection with U.S. Appl. No. 17/442,041, on Oct. 12, 2022, 11 pages.
International Searching Authority, "International Search Report and Written Opinion," mailed in connection with International Patent Application No. PCT/US2022/028632, on Oct. 21, 2022, 22 pages.
United States Patent and Trademark Office, "Notice of Allowance," mailed in connection with U.S. Appl. No. 17/442,041, on Jul. 13, 2022, 3 pages.
United States Patent and Trademark Office, "Notice of Allowance," mailed in connection with U.S. Appl. No. 17/442,041, on Nov. 23, 2022, 3 pages.
United States Patent and Trademark Office, "Notice of Allowance," mailed in connection with U.S. Appl. No. 17/442,041, on Nov. 2, 2022, 3 pages.
United States Patent and Trademark Office, "Restriction Requirement," mailed in connection with U.S. Appl. No. 17/033,267, on Feb. 15, 2022, 10 pages.
United States Patent and Trademark Office, "Non-Final Office Action," mailed in connection with U.S. Appl. No. 17/033,252, on Dec. 16, 2022, 10 pages.
United States Patent and Trademark Office, "Final Office Action", issued in connection with U.S. Appl. No. 17/033,252, on Jun. 14, 2023, 15 pages.
United States Patent and Trademark Office, "Requirement for Restriction / Election," issued in connection with U.S. Appl. No. 17/133,876, mailed on Aug. 31, 2023, 6 pages.
United States Patent and Trademark Office, "Non-Final Office Action," issued in connection with U.S. Appl. No. 18/092,163, mailed on Sep. 14, 2023, 10 pages.
Patent Cooperation Treaty, "International Preliminary Report on Patentability," mailed in connection with International Patent Application No. PCT/US2022/028632, on Nov. 14, 2023, 12 pages.
Netherlands Patent Office, "Search Report," issued in connection with Dutch Patent Application No. 2031835, dated Jul. 24, 2023, 18 pages.
European Patent Office, "Extended European Search Report," issued in connection with European Patent Application No. 20868873.9, dated Sep. 6, 2023, 7 pages.
United States Patent and Trademark Office, "Notice of Allowance and Fee(s) Due," issued in connection with U.S. Appl. No. 18/092,163, dated Jan. 29, 2024, 5 pages.
United States Patent and Trademark Office, "Notice of Allowance and Fee(s) Due," issued in connection with U.S. Appl. No. 17/133,876, dated Jan. 8, 2024, 8 pages.

* cited by examiner

SOFTWARE DEFINED SILICON FEATURE LICENSING

RELATED APPLICATION(S)

This patent claims the benefit of U.S. Provisional Application Ser. No. 62/907,353, which is titled "SOFTWARE DEFINED SILICON IMPLEMENTATION AND MANAGEMENT," and which was filed on Sep. 27, 2019. This patent also claims the benefit of U.S. Provisional Application Ser. No. 62/937,032, which is titled "SOFTWARE DEFINED SILICON IMPLEMENTATION AND MANAGEMENT," and which was filed on Nov. 18, 2019. This patent further claims the benefit of U.S. Provisional Application Ser. No. 63/049,016, which is titled "SOFTWARE DEFINED SILICON IMPLEMENTATION AND MANAGEMENT," and which was filed on Jul. 7, 2020. Priority to U.S. Provisional Application Ser. No. 62/907,353, U.S. Provisional Application Ser. No. 62/937,032 and U.S. Provisional Application Ser. No. 63/049,016 is claimed. U.S. Provisional Application Ser. No. 62/907,353, U.S. Provisional Application Ser. No. 62/937,032 and U.S. Provisional Application Ser. No. 63/049,016 are hereby incorporated by reference herein in their respective entireties.

FIELD OF THE DISCLOSURE

This disclosure relates generally to semiconductor devices and, more particularly, to implementation and management of software defined silicon products.

BACKGROUND

In today's marketplace, semiconductor device manufacturers ship semiconductor devices, such as microprocessors, with hardware and firmware features fixed, or locked, at the factory. Even if additional, dormant hardware and/or firmware features are included in the shipped semiconductor devices, such dormant features are unable to be activated after the semiconductor devices leave the factory. To gain access to one or more of those dormant features, a customer would need to order, and a manufacturer would need to ship, new versions of the semiconductor devices that have the desired dormant feature(s) activated at the factory. To further complicate matters, the manufacturer may need to predefine and manage numerous different stock keeping units (SKUs) to track the various combinations of different features that are able to be activated on its semiconductor devices, even if some of those combinations are never realized.

Figure 1:
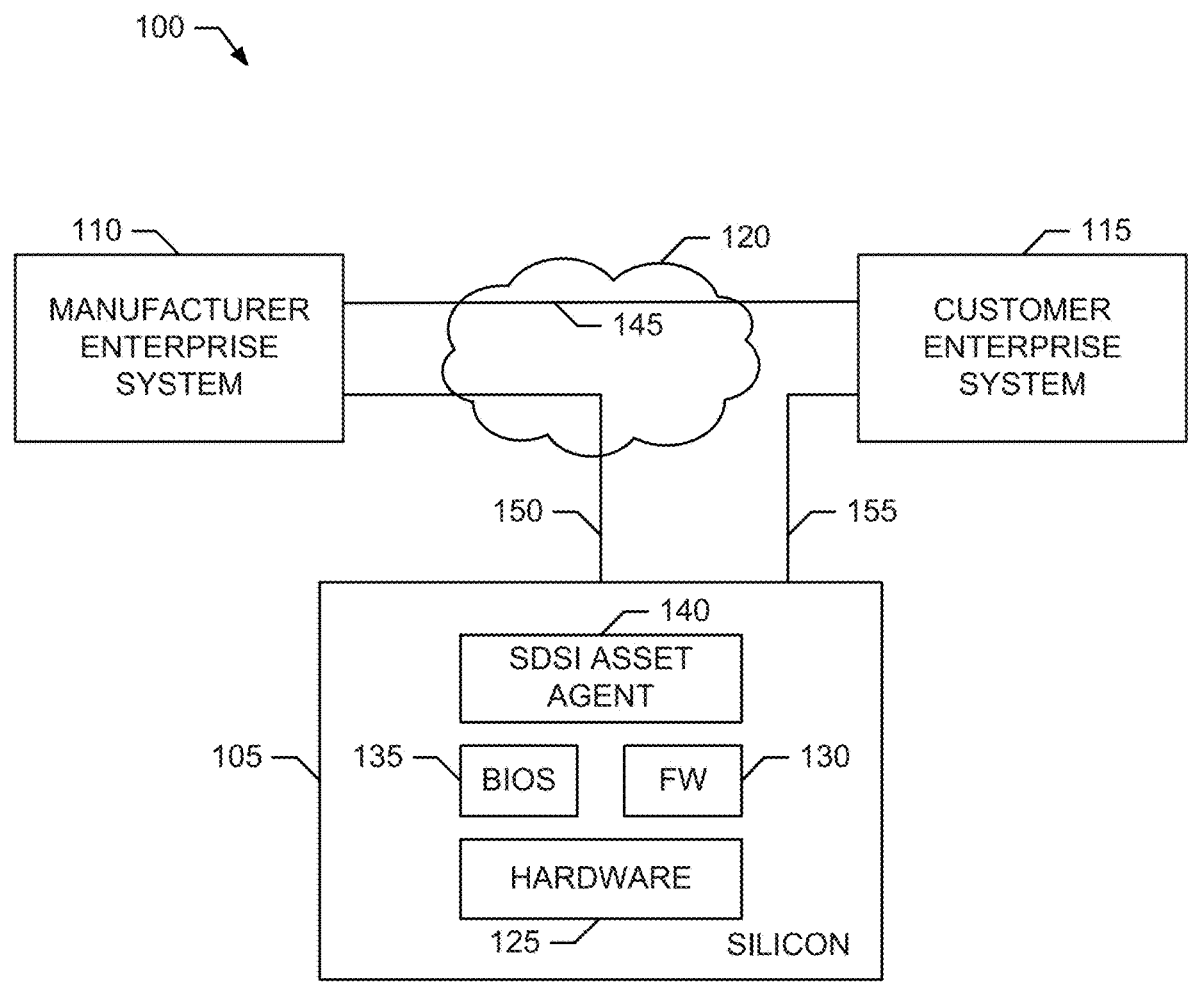
FIG. 1 is a block diagram of an example system to implement and manage software defined silicon products in accordance with teachings of this disclosure.

The figures are not to scale. In general, the same reference numbers will be used throughout the drawing(s) and accompanying written description to refer to the same or like parts, elements, etc. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Software Defined Silicon Architecture

Methods, apparatus, systems and articles of manufacture (e.g., physical storage media) to implement and manage software defined silicon products, also referred to as silicon assets, are disclosed herein. Examples of silicon products include any type of semiconductor device, such as, computer processors, central processing unit(s) (CPUs), semiconductor chips, silicon hardware devices, etc., as well as circuit boards and/or systems employing such silicon products, etc. Software Defined Silicon (SDSi) as disclosed herein, which is also referred to as Software Defined Intelligent Silicon (SDISi), enables a hardware agnostic activation and entitlement management solution, which can realize additional market and monetization opportunities for silicon products. For example, silicon products can be released to the market with additional, dormant processing capacity and/or features (e.g., to support unexpected market shifts, future competitive pressures, etc.) SDSi provides a solution for customers to access those features and for the platform manufacturer to recover trapped revenue in shipped products post-sale.

As mentioned above, semiconductor device manufacturers currently ship semiconductor devices, such as microprocessors, with hardware and firmware features fixed, or locked, at the factory. For example, a semiconductor device manufacturer may implement a semiconductor device with one-time fuses that are activated, or blown, to disable some features at the factory, leaving those feature dormant and unusable in the shipped semiconductor device. Thus, even if additional, dormant hardware and/or firmware features are included in the shipped semiconductor devices, such dormant features are unable to be activated after the semiconductor devices leave the factory when such one-time fuse implementations are employed. To gain access to one or more of those dormant features, a customer would need to order, and a manufacturer would need to ship, new versions of the semiconductor devices that have the desired dormant feature(s) activated at the factory. To further complicate matters, the manufacturer may need to predefine and manage a numerous different stock keeping units (SKUs) to track the various combinations of different features that are able to be activated on its semiconductor devices, even if some of those combinations are never realized.

In contrast, SDSi provides a solution that enables activation, deactivation and management of silicon product features after the product has left the manufacturer's facility and control. Thus, for silicon product manufacturers, SDSi provides a monetization opportunity and an access to new routes to market. For example, SDSi enables manufacturers to capture additional revenue via one-time activation, on-demand activation and/or recurring subscription models that extend feature activation and entitlement management onto the customer premises, with the potential for income and profits beyond the initial product sale. Additionally or alternatively, SDSi enables manufacturers to take advantage of economies of scale by reducing the number of different silicon product versions that need to be manufactured. For example, through the use of SDSi, manufacturers can implement one version of a silicon product with a baseline set of features activated, and can then activate other dormant features as requested and purchased by customers for their particular applications. For customers, SDSi enables effective management of capital expenditures and operating expenditures through silicon-enabled intra-scalability and elasticity. For example, SDSi can streamline a customer's inventory by reducing the number of different silicon product versions that need to be stocked to support different applications.

SDSi systems, as disclosed herein, also enable efficient SKU management by providing the ability to activate SKUs permanently, semi-permanently and/or via capacity-on-demand, and to provide SKU assignments on a per-customer basis. SDSi systems, as disclosed herein, enable permanent or dynamic activation of dormant features (also referred to as "dark assets") at a customer's premises without the need for a return merchandise authorization (RMA). In some examples, SDSI systems, as disclosed herein, also provide failure recovery solutions by activating dormant features to replace failed features on the silicon product.

These and other example methods, apparatus, systems and articles of manufacture (e.g., physical storage media) to implement and manage SDSi products are disclosed in greater detail below.

Protection Against Misuse of Software Defined Silicon

As noted above, SDSi systems as disclosed herein enable the activation and/or deactivation of features on an asset at a time after the initial distribution (e.g., sale) of the asset. However, by enabling adjustments of features available on the asset when it is no longer physically at the initial owner (e.g., the manufacturer), opportunities for misuse arise. For example, a bad actor may attempt to activate and/or deactivate functionality later in the asset's lifecycle without having the appropriate permissions to do so. Also, a manufacturer may sell an asset with a specific subset of features enabled, having tested the asset with only this specific subset of features enabled. The manufacturer may intend for the end-user of the asset to utilize this same subset of features. For example, the manufacturer may provide warranty coverage associated with the asset under the condition that a specified set of features remain activated or deactivated. In some examples, features available on an asset may correspond to specific payments made, or payments being made (i.e., using a subscription model) by customers. In these cases, de-activation of these features may result in the manufacturer needing to issue a refund. In some cases, the manufacturer may want to prevent de-activation of features after the transfer of ownership of the asset. Adjustments of features (e.g., activations, deactivations, etc.) that are not compliant with rules determined by the manufacturer can result in product malfunctions, financial loss to the manufacturer, misuse of the asset, etc.

Further, since SDSi features are enabled based on licenses, there is potential for misuse of a license at an unintended time, or by an unintended asset. A customer may request activation of a feature, and then decide to request a refund, without utilizing the license received to activate the feature. This customer may then utilize the license later to activate the feature, despite having been issued a refund for the unused activation request. A bad actor may additionally or alternatively transfer a license to another asset, thereby enabling or disabling a feature by using a license on an unintended asset.

Example techniques disclosed herein prevent or limit the ability for licenses to be used in violations of rules set by the manufacturer. For example, example techniques disclosed herein can prevent subsequent deactivation of features that were active at the time of the last sale. Example techniques disclosed herein enable a manufacturer to determine a state of an asset (e.g., a set of features active on the asset, a set of capabilities of the asset, etc.) and determine whether a license should be granted based on the state, a current owner of the asset, a completion certificate for a prior license activation, an authentication key, and/or one or more entitlement rules set by the manufacturer. Some example techniques disclosed herein provide for ownership tracking of the asset throughout its lifecycle, as well as tracking of the state of the asset. Example apparatus, methods, systems, and articles of manufacture (e.g., physical storage media) disclosed herein enable intelligent decision making when responding to entitlement requests, and ultimately when granting access to adjustments of SDSi features.

Example apparatus, methods, systems, and articles of manufacture (e.g., physical storage media) disclosed herein prevent unintended re-use or delayed use of licenses by tracking a license identifier and a version number associated with the silicon asset. Example techniques disclosed herein thereby limit the application of a license to its intended asset and an intended time period (e.g., prior to requesting a refund for the feature to be activated by the license, prior to making another feature adjustment to the asset, etc.).

Example apparatus, methods, systems, and articles of manufacture (e.g., physical storage media) disclosed herein reliably ensure licenses are utilized on intended target assets by implementing one or more hardware and/or entropy-based identifiers. Some example techniques disclosed herein utilize entropy-based identifiers on the asset to prevent the transfer of a license to another asset which will have its own unique entropy-based identifier. In some such examples, the manufacturer is aware of the specific entropy-based identifier for a given asset, and can ensure that when the license is applied to activate or deactivate a feature, the asset on which the license is to be executed has the correct entropy-based identifier.

These and other example methods, apparatus, systems, and articles of manufacture (e.g., physical storage media) to implement and manage the protection against misuse of SDSi products are disclosed in greater detail below.

Software Defined Silicon Architecture

Turning to the figures, a block diagram of an example system 100 to implement and manage SDSi products in accordance with teachings of this disclosure is illustrated in FIG. 1. The example SDSi system 100 of FIG. 1 includes an example silicon product 105, such as an example semiconductor device 105 or any other silicon asset 105, that implement SDSi features as disclosed herein. Thus, the silicon product 105 of the illustrated example is referred to herein as an SDSi product 105, such as an SDSi semiconductor device 105 or SDSi silicon asset 105. The system 100 also includes an example manufacturer enterprise system 110 and an example customer enterprise system 115 to manage the SDSi product 105. In the illustrated example of FIG. 1, at least some aspects of the manufacturer enterprise system 110 are implemented as cloud services in an example cloud platform 120.

The example manufacturer enterprise system 110 can be implemented by any number(s) and/or type(s) of computing devices, servers, data centers, etc. In some examples, the manufacturer enterprise system 110 is implemented by a processor platform, such as the example processor platform 3500 of FIG. 35. Likewise, the example customer enterprise system 115 can be implemented by any number(s) and/or type(s) of computing devices, servers, data centers, etc. In some examples, the customer enterprise system 115 is implemented by a processor platform, such as the example processor platform 3600 of FIG. 36. The example cloud platform 120 can be implemented by any number(s) and/or type(s), such as Amazon Web Services (AWS®), Microsoft's Azure® Cloud, etc. In some examples, the cloud platform 120 is implemented by one or more edge clouds as described below in connection with FIGS. 46-48. Aspects of the manufacturer enterprise system 110, the customer enterprise system 115 and the cloud platform 120 are described in further detail below.

In the illustrated example of FIG. 1, the SDSi product 105 is an SDSi semiconductor device 105 that includes example hardware circuitry 125 that is configurable under the disclosed SDSi framework to provide one or more features. For example, such features can include a configurable number of processor cores, a configurable clock rate from a set of possible clock rates, a configurable cache topology from a set of possible cache topologies, configurable coprocessors, configurable memory tiering, etc. As such, the hardware circuitry 125 can include one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs), field programmable logic device(s) (FPLD(s)), etc., or any combination thereof. The SDSi semiconductor device 105 of FIG. 1 also includes example firmware 130 and an example basic input/output system (BIOS) 135 to, among other things, provide access to the hardware circuitry 125. In some examples, the firmware 130 and/or the BIOS 135 additionally or alternatively implement features that are configurable under the disclosed SDSi framework. The SDSi semiconductor device 105 of FIG. 1 further includes an example SDSi asset agent 140 to configure (e.g., activate, deactivate, etc.) the SDSi features provided by the hardware circuitry 125 (and/or the firmware 130 and/or the BIOS 135), confirm such configuration and operation of the SDSi features, report telemetry data associated with operation of the SDSi semiconductor device 105, etc. Aspects of the SDSi asset agent 140 are described in further detail below.

The system 100 allows a customer, such as an original equipment manufacturer (OEM) of computers, tablets, mobile phones, other electronic devices, etc., to purchase the SDSi semiconductor device 105 from a silicon manufacturer and later configure (e.g., activate, deactivate, etc.) one or more SDSi features of the SDSi semiconductor device 105 after it has left the silicon manufacturer's factory. In some examples, the system 100 allows the customer (OEM) to configure (e.g., activate, deactivate, etc.) the SDSi feature(s) of the SDSi semiconductor device 105 at the customer's facility (e.g., during manufacture of a product including the SDSi semiconductor device 105) or even downstream after customer's product containing the SDSi semiconductor device 105 has been purchased by a third party (e.g., a reseller, a consumer, etc.)

By way of example, consider an example implementation in which the semiconductor device 105 includes up to eight (8) processor cores. Previously, the number of cores activated on the semiconductor device 105 would be fixed, or locked, at the manufacturer's factory. Thus, if a customer wanted the semiconductor device 105 to have two (2) active cores, the customer would contract with the manufacturer to purchase the semiconductor device 105 with 2 active cores, and the manufacturer would ship the semiconductor device 105 with 2 cores activated, and identify the shipped device with a SKU indicating that 2 cores were active. However, the number of active cores (e.g., 2 in this example) could not be changed after the semiconductor device 105 left the manufacturer's factory. Thus, if the customer later determined that 4 (or 8) active cores were needed for its products, the customer would have to contract with the manufacturer to purchase new versions of the semiconductor device 105 with 4 (or 8) active cores, and the manufacturer would ship the new versions of the semiconductor device 105 with 4 (or 8) cores activated, and identify the shipped device with a different SKU indicating that 4 (or 8) cores were active. In such examples, the customer and/or the manufacturer may be left with excess inventory of the semiconductor device 105 with the 2-core configuration, which can incur economic losses, resource losses, etc.

In contrast, assume the number of processor cores activated on the semiconductor device 105 is an SDSi feature that can be configured in the example system 100 in accordance with teachings of this disclosure. In such an example, the customer could contract with the manufacturer to purchase the SDSi semiconductor device 105 with 2 active cores, and the manufacturer would ship the SDSi semiconductor device 105 with 2 cores activated, and identify the shipped device with a SKU indicating that 2 cores were active. After the device is shipped, if the customer determines that it would prefer that 4 cores were active, the customer enterprise system 115 can contact the manufacturer enterprise system 110 via a cloud service implemented by the cloud platform 120 (represented by the line labeled 145 in FIG. 1) to request activation of 2 additional cores. Assuming the request is valid, the manufacturer enterprise system 110 generates a license (also referred to as a license key) to activate the 2 additional cores, and sends the license to the customer enterprise system 115 via the cloud service implemented by the cloud platform 120 (represented by the line labeled 145 in FIG. 1) to confirm the grant of an entitlement to activate the 2 additional cores. The customer enterprise system 115 then sends the license (or license key) to the SDSi asset agent 140 of the SDSi semiconductor device 105 (via a network as represented by represented by the line labeled 155 in FIG. 1) to cause activation of 2 additional cores provided by the hardware circuitry 125 of the SDSi semiconductor device 105. In the illustrated example, the SDSi asset agent 140 reports a certificate back to the manufacturer enterprise system 110 (e.g., via an appropriate cloud service implemented by the cloud platform 120, as represented by the line labeled 150 in FIG. 1) to confirm activation of the 2 cores. In some examples, the SDSi asset agent 140 also reports the certificate back to the customer enterprise system 115 (e.g., via the network as represented by the line labeled 155 in FIG. 1) to confirm activation of the 2 cores. In some examples, the SDSi asset agent 140 also reports telemetry data associated with operation of the SDSi semiconductor device 105 to the manufacturer enterprise system 110 (e.g., via the appropriate cloud service implemented by the cloud platform 120, as represented by the line labeled 150 in FIG. 1) and/or the customer enterprise system 115 (e.g., via the network as represented by the line labeled 155 in FIG. 1). After successful activation is confirmed, the manufacturer then invoices the customer (e.g., via the manufacturer enterprise system 110 and the customer enterprise system 115) for the newly activated features (e.g., 2 additional cores). In some examples, the manufacturer enterprise system 110 and/or the customer enterprise system 115 determine a new SKU (e.g., a soft SKU) to identify the same SDSi semiconductor device 105 but with the new feature configuration (e.g., 4 cores instead of 2 cores).

If the customer later determines that it would prefer that 8 cores were active, the customer enterprise system 115 can contact the manufacturer enterprise system 110 via the cloud service implemented by the cloud platform 120 (represented by the line labeled 145 in FIG. 1) to request activation of the remaining 4 additional cores. Assuming the request is valid, the manufacturer enterprise system 110 generates another license (or license key) to activate the 4 additional cores, and sends the license to the customer enterprise system 115 via the cloud service implemented by the cloud platform 120 (represented by the line labeled 145 in FIG. 1) to confirm the grant of an entitlement to activate the 4 remaining cores. The customer enterprise system 115 then sends license (or license key) to the SDSi asset agent 140 of the SDSi semiconductor device 105 (e.g., via the network as represented by the line labeled 155 in FIG. 1) to cause activation of the 4 remaining cores provided by the hardware circuitry 125 of the SDSi semiconductor device 105. In the illustrated example, the SDSi asset agent 140 reports a certificate back to the manufacturer enterprise system 110 (e.g., via the appropriate cloud service implemented by the cloud platform 120, as represented by the line labeled 150 in FIG. 1) to confirm activation of the 4 remaining cores. In some examples, the SDSi asset agent 140 also reports the certificate back to the customer enterprise system 115 (e.g., via the network as represented by the line labeled 155 in FIG. 1) to confirm activation of the 4 remaining cores. In some examples, the SDSi asset agent 140 reports telemetry data associated with operation of the SDSi semiconductor device 105 to the manufacturer enterprise system 110 (e.g., via the appropriate cloud service implemented by the cloud platform 120, as represented by the line labeled 150 in FIG. 1) and/or the customer enterprise system 115 (e.g., via the network as represented by the line labeled 155 in FIG. 1). After successful activation is confirmed, the manufacturer then invoices the customer (e.g., via the manufacturer enterprise system 110 and the customer enterprise system 115) for the newly activate features (e.g., the 4 additional cores). In some examples, the manufacturer enterprise system 110 and/or the customer enterprise system 115 determine yet another new SKU (e.g., a soft SKU) to identify the same SDSi semiconductor device 105 but with the new feature configuration (e.g., 8 cores instead of 4 cores).

In the illustrated examples of FIG. 1, the communications between the manufacturer enterprise system 110 and the customer enterprise system 115, between the manufacturer enterprise system 110 and the SDSi asset agent 140 of the SDSi semiconductor device 105, and between the SDSi asset agent 140 of the SDSi semiconductor device 105 and the customer enterprise system 115 can be implemented by one or more networks. For example, such networks can include the Internet, one or more wireless (cellular, satellite, etc.) service provider networks, one or more wired (e.g., cable, digital subscriber line, optical fiber, etc.) networks, one or more communication links, busses, etc.

In some examples, the SDSi semiconductor device 105 is included in or otherwise implements an example edge node, edge server, etc., included in or otherwise implementing one or more edge clouds. In some examples, the SDSi semiconductor device 105 is included in or otherwise implements an appliance computing device. In some examples, the manufacturer enterprise system 110 is implemented by one or more edge node, edge server, etc., included in or otherwise implementing one or more edge clouds. In some examples, the manufacturer enterprise system 110 is implemented by one or more appliance computing devices. In some examples, the customer enterprise system 115 is implemented by one or more edge node, edge server, etc., included in or otherwise implementing one or more edge clouds. In some examples, the customer enterprise system 115 is implemented by one or more appliance computing devices. Examples of such edge nodes, edge servers, edge clouds and appliance computing devices are described in further detail below in connection with FIGS. 46-48. Furthermore, in some examples, such edge nodes, edge servers, edge clouds and appliance computing devices may themselves be implemented by SDSi semiconductor devices capable of being configured/managed in accordance with the teachings of this disclosure.

In some examples, the manufacturer enterprise system 110 communicates with multiple customer enterprise systems 115 and/or multiple SDSi semiconductor devices 105 via the cloud platform 120. In some examples, the manufacturer enterprise system 110 communicates with multiple customer enterprise systems 115 and/or multiple SDSi semiconductor device(s) 105 via the cloud platform 120 through one or more edge servers/nodes. In either such example, the customer enterprise system(s) 115 and/or SDSi semiconductor device(s) 105 can themselves correspond to one or more edge nodes, edge servers, edge clouds and appliance computing devices, etc.

In some examples, the manufacturer enterprise system 110 may delegate SDSi license generation and management capabilities to one or more remote edge nodes, edge servers, edge clouds, appliance computing devices, etc., located within a customer's network domain. For example, such remote edge nodes, edge servers, edge clouds, appliance computing devices, etc., may be included in the customer enterprise system 115. In some such examples, the manufacturer enterprise system 110 can delegate to such remote edge nodes, edge servers, edge clouds, appliance computing devices, etc., a full ability to perform SDSi license generation and management associated with the customer's SDSi semiconductor devices 105 provided the remote edge nodes, edge servers, edge clouds, appliance computing devices, etc., are able to communicate with manufacturer enterprise system 110. However, in some examples, if communication with the manufacturer enterprise system 110 is disrupted, the remote edge nodes, edge servers, edge clouds, appliance computing devices may have just a limited ability to perform SDSi license generation and management associated with the customer's SDSi semiconductor devices 105. For example, such limited ability may restrict the delegated SDSi license generation and management to supporting failure recovery associated with the SDSi semiconductor devices 105. Such failure recovery may be limited to generating and providing licenses to configure SDSi features of a client's SDSi semiconductor device 105 to compensate for failure of one or more components of the SDSi semiconductor device 105 (e.g., to maintain a previously contracted quality of service).

Figure 2:
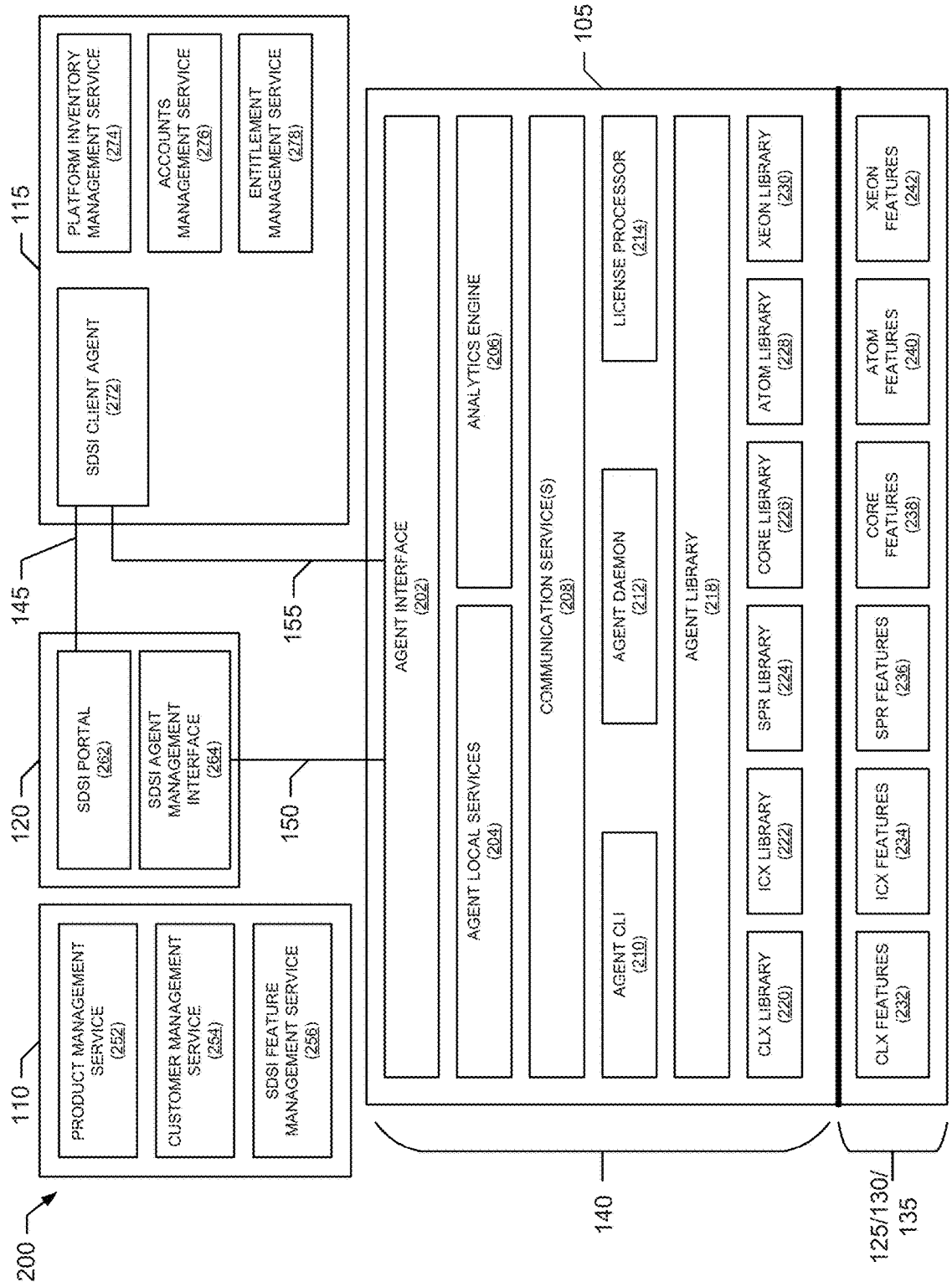
FIG. 2 is a block diagram illustrating example implementations of an example software defined silicon agent, an example manufacturer enterprise system and an example customer enterprise system included in the example system of FIG. 1.

A block diagram of an example system 200 that illustrates example implementations of the SDSi asset agent 140 of the SDSi silicon product 105, the manufacturer enterprise system 110 and the customer enterprise system 115 included in the example system 100 of FIG. 1 is illustrated in FIG. 2. The example SDSi asset agent 140 of FIG. 2 includes an example agent interface 202, example agent local services 204, an example analytics engine 206, example communication services 208, an example agent command line interface (CLI) 210, an example agent daemon 212, an example license processor 214, and an example agent library 218. The example SDSi asset agent 140 of FIG. 2 also includes example feature libraries 220-230 corresponding to respective example feature sets 232-242 implemented by the hardware circuitry 125, firmware 130 and/or BIOS 135 of the SDSi semiconductor device 105. The example manufacturer enterprise system 110 of FIG. 2 includes an example product management service 252, an example customer management service 254, and an example SDSi feature management service 256. The example manufacturer enterprise system 110 of FIG. 2 also implements an example SDSi portal 262 and an example SDSi agent management interface 264 as cloud services in the cloud platform 120. The example customer enterprise system 115 of FIG. 2 includes an example SDSi client agent 272, an example platform inventory management service 274, an example accounts management service 276 and an example entitlement management service 278.

In the illustrated example of FIG. 2, the agent interface 202 implements an interface to process messages sent between the SDSi asset agent 140 and the manufacturer enterprise system 110, and between the SDSi asset agent 140 and the customer enterprise system 115. The SDSi asset agent 140 of the illustrated example includes the agent local services 204 to implement any local services used to execute the SDSi asset agent 140 on the semiconductor device 105. The SDSi asset agent 140 of the illustrated example includes the analytics engine 206 to generate telemetry data associated with operation of the semiconductor device 105. Accordingly, the analytics engine 206 is an example of means for reporting telemetry data associated with operation of the semiconductor device 105. The communication services 208 provided in the SDSi asset agent 140 of the illustrated example include a local communication service to enable the SDSi asset agent 140 to communicate locally with the other elements of the semiconductor device 105 and/or a product platform including the semiconductor device 105. The communication services 208 also include a remote communication service to enable the SDSi asset agent 140 to communicate remotely with the SDSi agent management interface 264 of the manufacturer enterprise system 110 and the SDSi client agent 272 of the customer enterprise system 115. The SDSi asset agent 140 of the illustrated example includes the agent CLI 210 to process commands entered locally to the semiconductor device 105 via a command line interface. The SDSi asset agent 140 of the illustrated example includes the license processor 214 to process license(s) received from the customer enterprise system 115 to configure (e.g., activate, deactivate, etc.) one or more SDSi features included in the feature sets 232-242 implemented by the hardware circuitry 125, firmware 130 and/or BIOS 135 of the SDSi semiconductor device 105. Accordingly, the license processor 214 is an example of means for activating or deactivating at least one feature of the semiconductor device 105 based on a license received via a network from a remote enterprise system. The SDSi asset agent 140 of the illustrated example includes the agent daemon 212 to securely execute the elements of the SDSi asset agent 140. For example, the agent daemon 212 can execute one or more of the agent interface 202, the agent local services 204, the analytics engine 206, the communication services 208, the agent CLI 210 and/or the license processor 214 in a protected environment, such as a trusted execution environment (TEE), implemented by the semiconductor device 105. The SDSi asset agent 140 of the illustrated example includes the agent library 218 to provide, among other things, hardware-agnostic application programming interfaces (APIs) to be used by the license processor 214 to invoke the respective, hardware-specific feature libraries 220-230 to configure (e.g., activate, deactivate, etc.), based on the received license data, one or more features in the corresponding example features sets 232-242 implemented by the hardware circuitry 125, firmware 130 and/or BIOS 135 of the SDSi semiconductor device 105. Accordingly, the hardware circuitry 125, firmware 130 and/or BIOS 135 are examples of means for providing SDSi features in the SDSi semiconductor device 105. In some examples, the agent library 218 and/or the hardware-specific feature libraries 220-230 also operate in a protected environment, such as a TEE, implemented by the semiconductor device 105. Further details concerning the elements of the SDSi asset agent 140 of FIG. 2 are described below.

In the illustrated example of FIG. 2, the manufacturer enterprise system 110 includes the example product management service 252 to manage the inventory, pricing, etc., of the products manufactured by the manufacturer of the SDSi semiconductor device 105. The manufacturer enterprise system 110 of the illustrated example includes the customer management service 254 to manage customer accounts, billing, reconciliation, etc., for the manufacturer of the SDSi semiconductor device 105. The manufacturer enterprise system 110 of the illustrated example includes the SDSi feature management service 256 to manage the configuration of SDSi feature(s) implemented by the silicon products manufactured by the manufacturer of the SDSi semiconductor device 105. The manufacturer enterprise system 110 of the illustrated example implements the SDSi portal 262 to communicate (e.g., via a network) with the customer enterprise system 115. The manufacturer enterprise system 110 of the illustrated example implements the SDSi agent management interface 264 to communicate (e.g., via a network) with the SDSi asset agent 140 of the SDSi semiconductor device 105. Further details concerning the elements of the manufacturer enterprise system 110 of FIG. 2 are described below.

In the illustrated example of FIG. 2, the customer enterprise system 115 includes the SDSi client agent 272 to communicate (e.g., via a network) with the manufacturer enterprise system 110 and the SDSi asset agent 140 of the SDSi semiconductor device 105. The customer enterprise system 115 of the illustrated example includes the platform inventory management service 274 to manage the platforms offered by the customer (OEM), such as platforms that include the SDSi semiconductor device 105. The customer enterprise system 115 of the illustrated example includes the accounts management service 276 to manage accounts, billings, reconciliations, etc., the customer has with manufacturers, downstream customers, etc., such as the manufacturer of the SDSi semiconductor device 105. The customer enterprise system 115 of the illustrated example includes the entitlement management service 278 to manage licenses granted by manufacturers of SDSi products, such as the manufacturer of the SDSi semiconductor device 105, to configure (e.g., activate, deactivate, etc.) SDSi features implemented by those products. Further details concerning the elements of the customer enterprise system 115 of FIG. 2 are described below.

Figure 3:
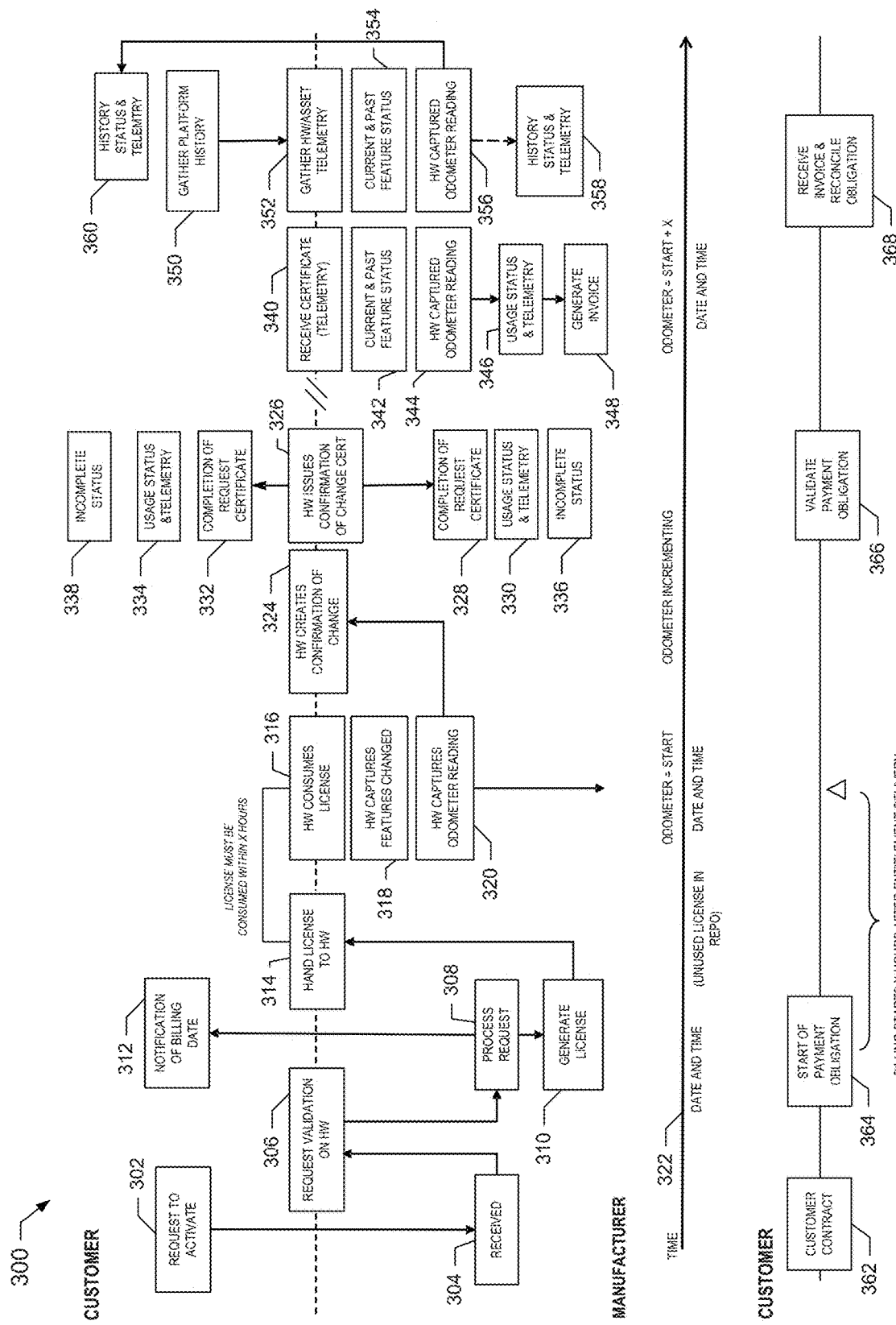
FIG. 3 illustrates an example software defined silicon management lifecycle implemented by the example systems of FIGS. 1 and/or 2.

An example SDSi management lifecycle 300 capable of being implemented by the example systems 100 and/or 200 of FIGS. 1-2 is illustrated in FIG. 3. The lifecycle 300 is described from the perspective of activating or deactivating an SDSI feature provided by the SDSi semiconductor device 105, but also can be applied to any type of configuration change of an SDSI feature provided by the SDSi semiconductor device 105. The lifecycle 300 begins at block 302 at which the SDSi client agent 272 of the customer enterprise system 115 sends a request to the SDSi portal 262 of the manufacturer enterprise system 110 to activate (or deactivate) an SDSI feature provided by the SDSi semiconductor device 105. Accordingly, the SDSi portal 262 is an example of means for receiving a request to activate or deactivate a feature provided by the semiconductor device 105. For example, the customer may access a customer management record for the SDSi semiconductor device 105 maintained by the platform inventory management service 274, and modify the customer management record to invoke the SDSi client agent 272 to send the request. Accordingly, the SDSi client agent 272 is an example of means for sending a request to activate or deactivate an SDSi feature provided by the semiconductor device 105. At block 304, the SDSi portal 262 of the manufacturer enterprise system 110 receives the request sent by the SDSi client agent 272 of the customer enterprise system 115 to activate (or deactivate) the SDSI feature provided by the SDSi semiconductor device 105. At block 306, the SDSi agent management interface 264 sends a query to the SDSi asset agent 140 to confirm that the SDSi semiconductor device 105 supports the SDSi feature to be activated (or deactivated). For example, the SDSi feature management service 256 may process the customer request received via the SDSi portal 262 and invoke the SDSi agent management interface 264 to send the query. The agent interface 202 of the SDSi asset agent 140 receives the query and invokes the license processor 214 to generate a response. The license processor 214 analyzes the configuration of the hardware circuitry 125, the firmware 130 and/or the BIOS 135 of the semiconductor device 105, generates feature support verification information indicating whether the queried feature is supported by the semiconductor device 105, and reports, via the agent interface 202, a response including the feature support verification information to the SDSi agent management interface 264. In some examples, rather than querying the SDSi asset agent 140 of the SDSi semiconductor device 105, the SDSi agent management interface 264 accesses one or more databases and/or other data structures (e.g., based on device identifier and/or SKU information included in the feature request) that store specification/configuration data for the SDSi semiconductor device 105 to confirm whether the SDSi semiconductor device 105 supports the requested feature.

At block 308 of the lifecycle 300, the SDSi agent management interface 264 receives the query response from the SDSi asset agent 140 (or from the queries database(s) and/or data structure(s)), which is processed by the SDSi feature management service 256. If the response indicates the SDSi feature of interest is supported by the SDSi semiconductor device 105, at block 310 the SDSi feature management service 256 generates a license to activate (or deactivate) the SDSi feature as requested. Accordingly, the SDSi feature management service 256 is an example of means for generating a license to be processed by the semiconductor device 105 to activate or deactivate an SDSi feature. Also, at block 312, the SDSi feature management service 256 causes the license to be sent via the SDSi portal 262 to the SDSi client agent 272 of the customer enterprise system 115. Accordingly, the SDSi client agent 272 is an example of means for receive a license from an enterprise management system to authorize activation or deactivation of an SDSi feature provided by the semiconductor device 105 In the illustrated example, the license generated at block 310 is associated with a license key and/or license data that specifies, for example, an identifier of the semiconductor device 105, the SDSi feature to be activated (or deactivated), terms of the activation (or deactivation), such as whether this is a one-time feature activation (deactivation) or renewable activation subject to a subscription, a valid start window (e.g., X hours, where X is a numerical value, or some other duration) for invoking the license to activate (or deactivate) the SDSI feature, etc. At this point in the lifecycle 300, the license generated at block 310 is treated as an unused license to activate (or deactivate) the SDSi feature, which is stored in a repository at the customer enterprise system 115 until the customer triggers use of the license to activate (or deactivate) the requested feature. For example, the SDSi feature management service 256 of the manufacturer enterprise system 110 can update a manufacturer management record maintained by the manufacturer for the semiconductor device 105 to include the license and/or license data generated at block 310, Likewise, the entitlement management service 278 of the customer enterprise system 115 can update the customer management record maintained by the customer for the semiconductor device 105 to indicate receipt of the license along with the license details. Accordingly, the entitlement management service 278 is an example of means for updating a management record associated with the semiconductor device 105 based on a license. In some such examples, the entitlement management service 278 can be invoked by the customer to update the customer management record to trigger operation of the license to activate (or deactivate) the SDSi feature, which cause the SDSi client agent 272 of the customer enterprise system 115 to transmit (e.g., download) the license via the network 155 to the SDSi asset agent 140 of the semiconductor device 105.

For example, upon receipt of a request at the SDSi client agent 272 to invoke the license, at block 314 the SDSi client agent 272 sends the license to the SDSi asset agent 140. Accordingly, the SDSi client agent 272 is an example of means for sending a license to the semiconductor device 105. The license is received by the agent interface 202, which at block 316 invokes the license processor 214. At block 316, the license processor 214 processes the license data to identify the feature to be activated (or deactivated), and activates (or deactivates) the feature in accordance with the license data. For example, if the feature is a configurable number of processor cores, and the semiconductor device 105 was initialized to have a first number of the processor cores active (e.g., 2 of 8 cores are active) with remaining ones of the processor cores dormant (e.g., 6 of 8 cores are dormant), the license data may specify that a second number of dormant processor cores (e.g., 4 of the 6 dormant cores) are to be activated (e.g., in response to a request from the customer enterprise system 115 to activate the second number of dormant cores). The license data may also identify which of the dormant cores are to be activated. In such an example, the license processor 214 invokes the agent library 218 to activate the dormant cores specified in the license data. As another example, the SDSi asset agent 140 may later receive a second license from the SDSi client agent 272 of the customer enterprise system 115 that specifies a third number of the active processor cores (e.g., 2 of the 6 active cores) that are to be deactivated (e.g., with the second license being generated by the manufacturer enterprise system 110 in response to a request from the customer enterprise system 115 to deactivate the third number of active cores). The second license data may also identify which of the active cores are to be deactivated. In such an example, the license processor 214 invokes the agent library 218 to deactivate the active cores specified in the license data. In some examples, the license processor 214 may limit the number of cores able to be deactivated to not be greater the second number of dormant cores that were activated based on prior received license data. As yet another example, if the feature is a configurable clock rate, and the semiconductor device was initialized to activate a first clock rate from a set of possible clock rates, the license generated by the manufacturer enterprise system 110 and downloaded via the SDSi client agent 272 of the customer enterprise system 115 may identify a second clock rate different from the first clock rate that is to be activated (e.g., in response to a request from the customer enterprise system 115 to activate the second clock rate). In such an example, the license processor 214 invokes the agent library 218 to activate the second clock rate identified in the license data.

In some examples, a single license can configure multiple features across different feature categories. For example, a single license may include first license data to activate one or more additional cores, and second license to modify and/or otherwise adjust a clock rate of one or more cores. In such an example, the adjusted clock rate may be applied to one or more previously activated cores and/or one(s) of the one or more additional cores to be activated in response to the license processor 214 processing the license. Additionally or alternatively, in some examples, a single license can activate one or more features, and also deactivate one or more other features.

At block 318 of the lifecycle 300, the analytics engine 206 of the SDSi asset agent 140 logs the SDSi feature activation (or deactivation) performed on the semiconductor device 105. At block 320, the analytics engine 206 captures an odometer reading representative of a present, local time maintained by the circuitry 125 (in combination with the firmware 135 and/or BIOS 140) of the semiconductor device 105. For example, the circuitry 125 may utilize a counter, timer or other mechanism to implement an odometer to track the passage of time locally at the semiconductor device 105 (which is represented by the directed line 322 in FIG. 3). At block 320, the analytics engine 206 captures a value of the odometer to act as a timestamp of when the requested feature was activated (or deactivated). At block 324, the analytics engine 206 generates a certificate to confirm the successful activation (or deactivation) of the requested SDSi feature. In the illustrated example, the certificate includes telemetry data associated with operation of the semiconductor device 105 and generated by the analytics engine 206 in response to activation (or deactivation) of the requested SDSi feature. In some examples, the telemetry data includes an indication of whether the feature activation (or deactivation) was a success, a status of the SDSi feature affected by the activation (or deactivation) (e.g., such as the presently configured number of cores that are active, the presently active clock rate, etc.), a first odometer reading (e.g., first timestamp) indicating when the feature activation (or deactivation) occurred, a second odometer reading (e.g., a second timestamp) indicating whether the certificate was generated, etc.

At block 326 of the lifecycle 300, the analytics engine 206 reports, via the agent interface 202, the certificate with the telemetry data in response to the activation (or deactivation) of the SDSi feature based on the received license data. In the illustrated example, the analytics engine 206 reports the certificate with the telemetry data to both the manufacturer enterprise system 110 and the customer enterprise system 115. For example, at block 328, the example SDSi agent management interface 264 of the manufacturer enterprise system 110 receives the certificate, and at block 330 provides it to the SDSi feature management service 256 of the manufacturer enterprise system 110. Accordingly, the SDSi agent management interface 264 is an example of means for receiving a certificate from the semiconductor device 105 to confirm successful activation or deactivation of an SDSi feature. The SDSi feature management service 256 processes the certificate and included telemetry data to log the successful feature activation (or deactivation). Similarly, at block 332, the SDSi client agent 272 of the customer enterprise system 115 receives the certificate and at block 334 provides it to the entitlement management service 278 of the customer enterprise system 115. The entitlement management service 278 processes the certificate and included telemetry data to log the successful feature activation (or deactivation). In the illustrated example, at this point in the lifecycle 300, the status of the feature activation (or deactivation) may be considered incomplete until verified by a subsequent certificate from the SDSi asset agent 140 (see blocks 336 and 338).

At block 340 of the lifecycle 300, the SDSi agent management interface 264 of the manufacturer enterprise system 110 receives a subsequent certificate with updated telemetry data from the SDSi asset agent 140. At block 342, the subsequent certificate is provided to the SDSi feature management service 256 of the manufacturer enterprise system 110. The SDSi feature management service 256 processes the certificate to obtain the updated telemetry data, and also obtains the prior telemetry data included in the previous certificate. At block 344, the SDSi feature management service 256 accesses the odometer readings included in the telemetry data. At block 346, the SDSi feature management service 256 compares the telemetry data and odometer reading to confirm the successful activation (or deactivation) (or, more generally, the successful configuration change) of the SDSi feature of interest. Accordingly, the SDSi feature management service 256 is an example of means for validating the successful activation or deactivation of an SDSi feature based on telemetry data. At block 348, the customer management service 254 of the manufacturer enterprise system 110 generates an invoice for the successful activation (or deactivation) of the SDSi feature of interest, and sends it to the customer enterprise system 115 via the SDSi portal 262 for processing by the accounts management service 276. In some examples, assuming the semiconductor device 105 is associated with a present SKU (e.g., a first SKU), after the requested SDSi feature is activated (or deactivated), the product management service 252 of the manufacturer enterprise system 110 generates a new SKU (e.g., a second SKU) and updates the manufacturer management record maintained for the semiconductor device 105 to associate the new SKU (second SKU) with the semiconductor device 105. Accordingly, the product management service 252 is an example of means for updating a management record to associate a second SKU with the semiconductor device 105 after an SDSi feature is activated or deactivated. Additionally or alternatively, in some examples, assuming the semiconductor device 105 is associated with a present SKU (e.g., a first SKU), after the requested SDSi feature is activated (or deactivated), the platform inventory management service 274 of the customer enterprise system 115 generates a new SKU (e.g., a second SKU) and updates the customer management record maintained for the semiconductor device 105 to associate the new SKU (second SKU) with the semiconductor device 105. Accordingly, the platform inventory management service 274 is an example of means for updating a management record to associate a second SKU with the semiconductor device 105 after an SDSi feature is activated or deactivated.

At block 350 of the lifecycle 300, the entitlement management service 278 of the customer enterprise system 115 generates a request for status of the semiconductor device 105, and sends the request via the SDSi client agent 272 to the SDSi asset agent 140. Additionally or alternatively, the SDSi feature management service 256 of the manufacturer enterprise system 110 could generate the request for status of the semiconductor device 105, and send the request via the SDSi agent management interface 264 to the SDSi asset agent 140. In either case, at block 352, the agent interface 202 receives the request and invokes the analytics engine 206 to generate a certificate in response to the request. In the illustrated example, the certificate includes updated telemetry data associated with operation of the semiconductor device 105 generated by the analytics engine 206 in response to the request. The updated telemetry data is timestamped with a local time corresponding to an odometer reading captured in response to the request. At blocks 354 and 356, the SDSi agent management interface 264 receives the requested certificate with the updated telemetry data from the SDSi asset agent 140 and provides it to the SDSi feature management service 256 of the manufacturer enterprise system 110. The SDSi feature management service 256 obtains the updated telemetry data, and also obtains the prior telemetry data for the semiconductor device 105, and further accesses the odometer readings included in the telemetry data. At block 356, the example SDSi feature management service 256 updates a history of the operational status of the semiconductor device 105 and uses the telemetry data to determine whether the semiconductor device 105 is operating properly.

Similarly, at block 360 of the lifecycle 300, the SDSi client agent 272 receives the requested certificate with the updated telemetry data from the SDSi asset agent 140 and provides it to the entitlement management service 278 of the customer enterprise system 115. The entitlement management service 278 obtains the updated telemetry data, and also obtains any prior telemetry data for the semiconductor device 105, and further accesses the odometer readings included in the telemetry data. The entitlement management service 278 then updates a history of the operational status of the semiconductor device 105 and uses the telemetry data to determine whether the semiconductor device 105 is operating properly. In some examples, the accounts management service 276 of the customer enterprise system 115 updates, based on receipt of the certificate, the customer management record associated with the semiconductor device 105 to confirm establishment or conclusion of a payment obligation with the manufacturer of the semiconductor device 105, such as the payment obligation associated with the invoice received from the manufacturer enterprise system 110 at block 348. Accordingly, the accounts management service 276 is an example of means for updating a management record, based on a certificate, to confirm establishment or conclusion of a payment obligation with a manufacturer of the semiconductor device 105.

As illustrated in the example lifecycle 300 of FIG. 3, the request to activate (or deactivate) the SDSI feature sent by the customer enterprise system 115 at block 302 and received by the manufacturer enterprise system 110 at block 304 can initiate a contract between the customer and the manufacturer. Later, the sending of the license to the customer enterprise system 115 at block 312 can be a trigger to start a payment obligation (see block 364). In some examples, the start of the payment obligation can be delayed until the feature is activated (or deactivated) in the semiconductor device 105 based on the license at block 316. Later, the reporting at block 326 of the certificate in response to the activation (or deactivation) of the SDSi feature in the semiconductor device 105 can validate the payment obligation (see block 366). Later, the generation and receipt of the invoice at block 348 can trigger reconciliation of the payment obligation (see block 368).

The licenses generated by the manufacturer enterprise system 110 to activate (or deactivate) SDSi features in the semiconductor device 105 can support one-time activation, on-demand activation and/or recurring subscription models.

For example, the license may include license data to instruct the license processor 214 of the SDSi asset agent 140 executing in the semiconductor device 105 to perform a one-time activation (or deactivation) of one or more features identified by the license data. In some examples, to support on-demand activation and/or recurring subscription models, the license generated by the manufacturer enterprise system 110 can include license data that instructs the license processor 214 to activate (or deactivate) the specified SDSi feature(s) in accordance with an express permit or an express deny control mechanism. For example, under an express permit control mechanism, the license processor 214 causes an SDSi feature that is activated based on the license to be deactivated upon expiration of a time period (e.g., tracked by a counter, clock, or other mechanism) unless an express permit control signal is received from the manufacturer enterprise system 110 (e.g., via the SDSi agent management interface 264) before the time period expires. Conversely, under an express deny control mechanism, the license processor 214 causes an SDSi feature that is activated based on the license to be remain active unless an express deny control signal is received from the manufacturer enterprise system 110 (e.g., via the SDSi agent management interface 264). In such an example, receipt of the express deny control signal causes the license processor 214 to deny access to the activated feature, such as, by deactivating the feature.

In some examples, the license processor 214 of the SDSi asset agent 140 executing in the semiconductor device 105 activates and deactivates SDSI features through the use of reprogrammable soft fuse(s), register(s), logic gate(s), etc. For example, such reprogrammable soft fuse(s), register(s), logic gate(s), etc., can be connected to control lines of the hardware blocks included in the hardware circuitry 125 of the semiconductor device 105 to implement the SDSi features, connected to control inputs read by the firmware 130 and/or BIOS 135 to enable/disable the SDSi features, etc. The license processor 214 can set and/or reset ones of the reprogrammable soft fuse(s), values of the register(s), input(s) of the logic gate(s), etc., to activate/deactivate different SDSi features of the semiconductor device 105.

In some examples, the license processor 214 writes received license(s) and/or the license data included therein to a protected license memory region of the semiconductor device 105. In some examples, the license data is encrypted and the license processor 214 decrypts the license data before writing it to the protected license memory region of the semiconductor device 105. In some such examples, SDSi feature activation/deactivation responsive to a received license does not occur until the semiconductor device 105 reboots (e.g., via a soft reset, a hard reset, etc.) and the license data in the protected license memory region is read upon start-up. In some examples, the license processor 214 sets one or more particular locations of the protected license memory region to activate one or more SDSi features, and erases or overwrites the license data contained in those location(s) of the protected license memory region to deactivate those SDSi feature(s). For example, to deactivate a given SDSi feature, the license processor 214 may write random or otherwise garbage data to the location(s) associated with that feature in the protected license memory region, and rely on an error checking capability of the semiconductor device 105 that causes the given SDSi feature to remain disabled in response to such random or otherwise garbage data.

In some examples, the location(s) of the protected license memory region for deactivated SDSi feature(s) is(are) not erased or overwritten. Rather, in some such examples, to deactivate an SDSi feature, a deactivation license is appended to the list of licenses already stored in the protected license memory region for that SDSi feature. The newly received deactivation license in such an example overrides the actions of previously received licenses for that SDSi feature. In that way, the history of SDSi configuration operations (activations and deactivations) performed on the SDSi feature are stored by the semiconductor device 105 in the order the SDSi licenses were applied. In some examples, this information could be read by the customer.

Figure 4:
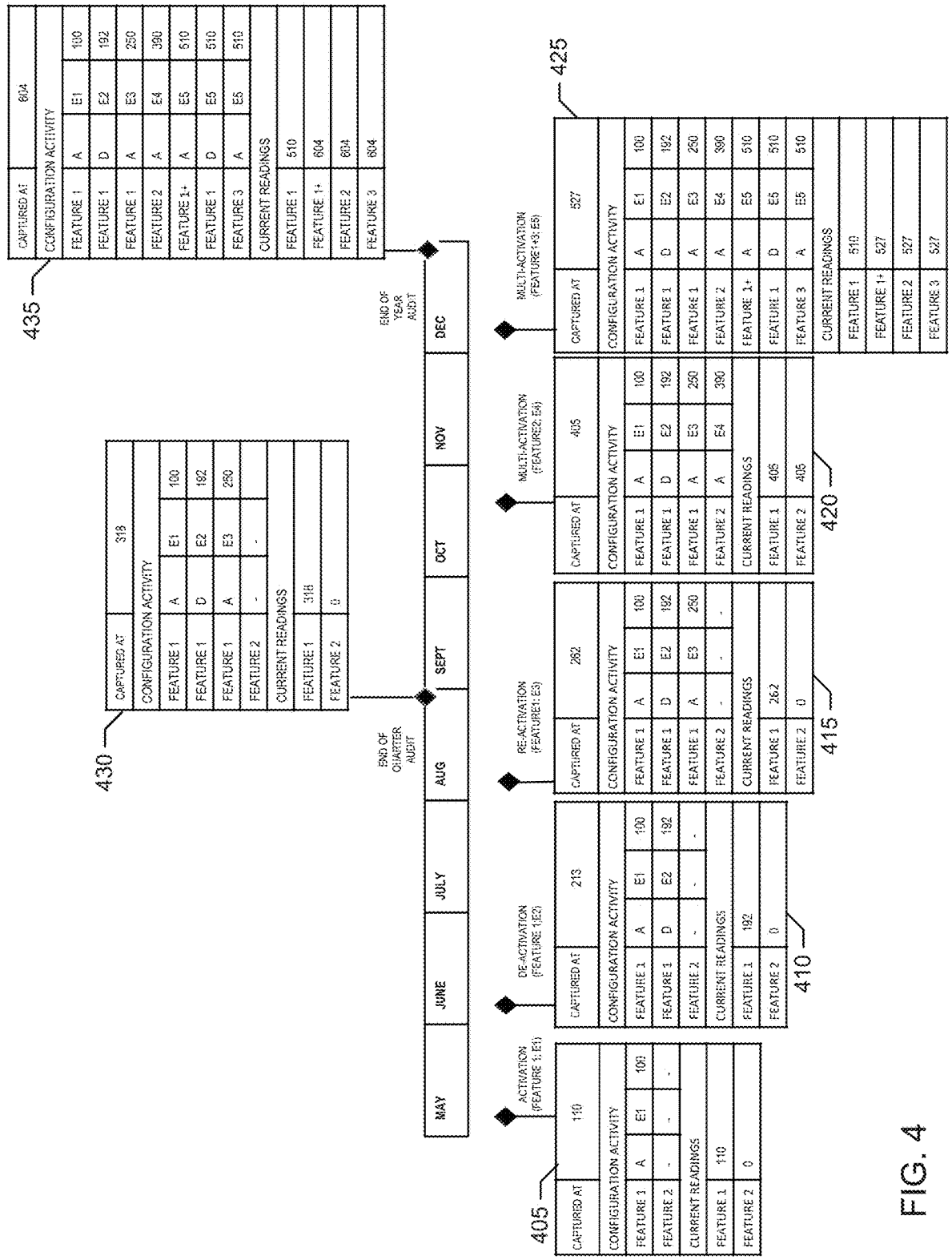
FIG. 4 illustrates example certificates utilized in the example systems of FIGS. 1 and/or 2 to implement the example lifecycle of FIG. 4.

Example certificates utilized in the example systems 100 and/or 200 of FIGS. 1-2 to implement the example lifecycle 300 of FIG. 3 are illustrated in FIG. 4. In the illustrated example of FIG. 4, the SDSi asset agent 140 associated with the semiconductor device 105 generates and reports a first example certificate 405 to the manufacturer enterprise system 110 and/or the customer enterprise system 115 in response to a first event (labeled "E1" in FIG. 4). The first event corresponds to activation of a first SDSi feature of the semiconductor device 105 (labeled "Feature 1" in FIG. 4). In the illustrated example, the first certificate 405 identifies the first SDSi feature ("Feature 1") and includes telemetry data. The telemetry data of the first certificate 405 indicates an activated status (labeled "A" in FIG. 4) for the first SDSi feature ("Feature 1"), and includes a first timestamp (e.g., first odometer reading) having a value of "100," which represents a local time at which the first SDSi feature ("Feature 1") was activated in the semiconductor device 105. The telemetry data of the first certificate 405 also indicates that another available SDSi feature (labeled "Feature 2" in FIG. 4) is dormant. The telemetry data of the first certificate 405 further includes a second timestamp (e.g., second odometer reading) having a value of "110," which represents a local time at which the first certificate 405 was generated.

In the illustrated example of FIG. 4, the SDSi asset agent 140 associated with the semiconductor device 105 generates and reports a second example certificate 410 to the manufacturer enterprise system 110 and/or the customer enterprise system 115 in response to a second event (labeled "E2" in FIG. 4). The second event corresponds to deactivation of the first SDSi feature of the semiconductor device 105 (labeled "Feature 1" in FIG. 4). In the illustrated example, the second certificate 410 identifies the first SDSi feature ("Feature 1") and includes updated telemetry data (in addition to the telemetry data included in the first certificate 405). The updated telemetry data of the second certificate 410 indicates a deactivated status (labeled "D" in FIG. 4) for the first SDSi feature ("Feature 1"), and includes a third timestamp (e.g., third odometer reading) having a value of "192," which represents a local time at which the first SDSi feature ("Feature 1") was deactivated in the semiconductor device 105. The updated telemetry data of the second certificate 410 also indicates that another available SDSi feature (labeled "Feature 2" in FIG. 4) is still dormant. The updated telemetry data of the second certificate 410 further includes a fourth timestamp (e.g., fourth odometer reading) having a value of "213," which represents a local time at which the second certificate 410 was generated.

In the illustrated example of FIG. 4, the SDSi asset agent 140 associated with the semiconductor device 105 generates and reports a third example certificate 415 to the manufacturer enterprise system 110 and/or the customer enterprise system 115 in response to a third event (labeled "E3" in FIG. 4). The third event corresponds to re-activation of the first SDSi feature of the semiconductor device 105 (labeled "Feature 1" in FIG. 4). In the illustrated example, the third certificate 415 identifies the first SDSi feature ("Feature 1") and includes updated telemetry data (in addition to the telemetry data included in the prior certificates 405 and 410). The updated telemetry data of the third certificate 415 indicates an activated status (labeled "A" in FIG. 4) for the first SDSi feature ("Feature 1"), and includes a fifth timestamp (e.g., fifth odometer reading) having a value of "250," which represents a local time at which the first SDSi feature ("Feature 1") was re-activated in the semiconductor device 105. The updated telemetry data of the third certificate 415 also indicates that another available SDSi feature (labeled "Feature 2" in FIG. 4) is still dormant. The updated telemetry data of the third certificate 415 further includes a sixth timestamp (e.g., sixth odometer reading) having a value of "262," which represents a local time at which the third certificate 415 was generated.

In the illustrated example of FIG. 4, the SDSi asset agent 140 associated with the semiconductor device 105 generates and reports a fourth example certificate 420 to the manufacturer enterprise system 110 and/or the customer enterprise system 115 in response to a fourth event (labeled "E4" in FIG. 4). The fourth event corresponds to activation of a second SDSi feature of the semiconductor device 105 (labeled "Feature 2" in FIG. 4). In the illustrated example, the fourth certificate 420 identifies the second SDSi feature ("Feature 2") and includes updated telemetry data (in addition to the telemetry data included in the prior certificates 405-415). The updated telemetry data of the fourth certificate 420 indicates an activated status (labeled "A" in FIG. 4) for the second SDSi feature ("Feature 2"), and includes a seventh timestamp (e.g., seventh odometer reading) having a value of "390," which represents a local time at which the second SDSi feature ("Feature 2") was activated in the semiconductor device 105. The updated telemetry data of the fourth certificate 420 further includes an eighth timestamp (e.g., eighth odometer reading) having a value of "405," which represents a local time at which the fourth certificate 420 was generated.

In the illustrated example of FIG. 4, the SDSi asset agent 140 associated with the semiconductor device 105 generates and reports a fifth example certificate 425 to the manufacturer enterprise system 110 and/or the customer enterprise system 115 in response to a fifth event (labeled "E5" in FIG. 4). The fifth event corresponds to modification of the first SDSi feature (labeled "Feature 1+" in FIG. 4), and activation of a third SDSi feature of the semiconductor device 105 (labeled "Feature 3" in FIG. 4). In the illustrated example, the fifth certificate 425 identifies the modified first SDSi feature ("Feature 1+") and the third SDSi feature ("Feature 3"), and includes updated telemetry data (in addition to the telemetry data included in the prior certificates 405-420). The updated telemetry data of the fifth certificate 425 indicates an activated status (labeled "A" in FIG. 4) for the modified first SDSi feature ("Feature 1+"), a de-activated status (labeled "D" in FIG. 4) for the prior version of the first SDSi feature ("Feature 1"), and an activated status (labeled "A" in FIG. 4) for the third SDSi feature ("Feature 3). The updated telemetry data includes a ninth timestamp (e.g., ninth odometer reading) having a value of "510," which represents a local time at which the modified first SDSi feature ("Feature 1+") was activated, the prior version of the first SDSi feature ("Feature 1") was deactivated, and the third SDSi feature ("Feature 3") was activated in the semiconductor device 105. The updated telemetry data of the fifth certificate 425 further includes a tenth timestamp (e.g., tenth odometer reading) having a value of "527," which represents a local time at which the fifth certificate 425 was generated.

In the illustrated example of FIG. 4, the SDSi asset agent 140 associated with the semiconductor device 105 generates and reports a sixth example certificate 430 to the manufacturer enterprise system 110 and/or the customer enterprise system 115 in response to a first status request from the manufacturer enterprise system 110 and/or the customer enterprise system 115. In the illustrated example, the sixth certificate 430 identifies the status history of the SDSi features provided by the semiconductor device 105. For example, the sixth certificate 430 includes status and corresponding telemetry data to log the activation and de-activation events for the first SDSi feature ("Feature 1") that occurred up to the time of the status request. The telemetry data of the sixth certificate 430 further includes a timestamp (e.g., odometer reading) having a value of "318," which represents a local time at which the sixth certificate 430 was generated.

In the illustrated example of FIG. 4, the SDSi asset agent 140 associated with the semiconductor device 105 generates and reports a seventh example certificate 435 to the manufacturer enterprise system 110 and/or the customer enterprise system 115 in response to a second status request from the manufacturer enterprise system 110 and/or the customer enterprise system 115. In the illustrated example, the seventh certificate 435 identifies the status history of the SDSi features provided by the semiconductor device 105. For example, the seventh certificate 435 includes status and corresponding telemetry data to log the activation and de-activation events for the first SDSi feature ("Feature 1"), the modified first feature (Feature 1+"), the second feature (Feature 2") and the third feature (Feature 3") that occurred up to the time of the status request. The telemetry data of the seventh certificate 435 further includes a timestamp (e.g., odometer reading) having a value of "604," which represents a local time at which the seventh certificate 435 was generated.

Figure 5:
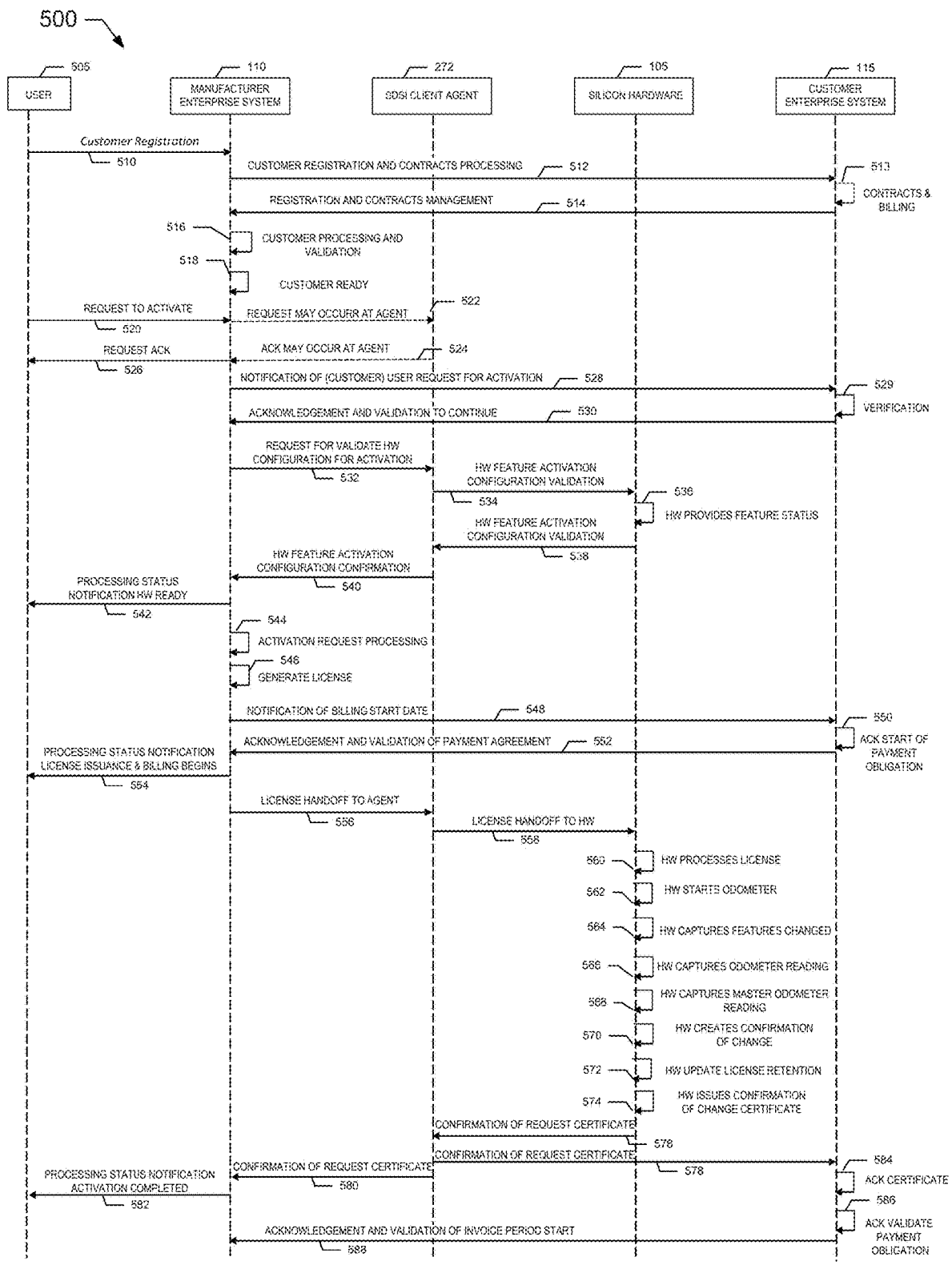
FIG. 5 illustrates an example process flow performed by the example systems of FIGS. 1 and/or 2 to enable initial feature activation in an example software defined silicon product.

An example process flow 500 performed by the example systems 100 and/or 200 of FIGS. 1-2 to enable initial feature activation in the SDSi product 105 is illustrated in FIG. 5. The process flow 500 of the illustrated example begins with an example user 505 associated with a customer requesting registration of the customer for access to SDSi capabilities offered by a manufacturer of the SDSi product 105 (line 510). The manufacturer enterprise system 110 then engages with the customer enterprise system 115 to on-board the customer (lines 512-518). The manufacturer enterprise system 110 then receives a request to activate an SDSi feature of the SDSi product 105 and acknowledges the request (lines 520-526). As shown in the illustrated example, the feature activation request can be received from a source (e.g., computer device) separate from the customer enterprise system 115 or from the SDSi client agent 272 of the customer enterprise system 115. In the illustrated example, the manufacturer enterprise system 110 further confirms with the customer enterprise system 115 that the SDSi feature activation request is valid (lines 528-530).

Assuming the SDSi feature activation request is valid, the manufacturer enterprise system 110 queries the SDSi product 105 to determine whether the requested SDSi feature to be activated is supported by the SDSi product 105 (lines 532-542). In the illustrated example, the manufacturer enterprise system 110 sends the query to the SDSi client agent 272 of the customer enterprise system 115, which queries the SDSi product 105 for the status of the requested SDSi feature and returns a response to the manufacturer enterprise system 110. However, in other examples, the manufacturer enterprise system 110 queries the SDSi product 105 without involving the SDSi client agent 272 or, more generally, the customer enterprise system 115. For example, the SDSi agent management interface 264 of the manufacturer enterprise system 110 may send a query to the SDSi product 105 for the status of the requested SDSi feature and receive a response from the SDSi product 105.

Assuming the requested SDSi feature is supported, the manufacturer enterprise system 110 generates a license to activate the requested SDSi feature in the SDSi product 105 (lines 544-546). The manufacturer enterprise system 110 also communicates with the customer enterprise system 115 to establish billing terms and other contractual obligations associated with activation of the requested SDSi feature (lines 548-554). The manufacturer enterprise system 110 then sends the generated license to the SDSi client agent 272 of the customer enterprise system 115 (line 556). Sometime later (e.g., when the customer is ready for the requested feature to be activated), the SDSi client agent 272 sends the license to the SDSi asset agent 140 of the SDSi product 105 (line 558). The SDSi asset agent 140 invokes the license processor 214 to process the received license to activate the requested SDSi feature (line 560). The license processor 214 invokes the analytics engine 206 to capture one or more odometer readings (lines 562-568), and then creates a confirmation certificate to confirm activation of the requested feature (lines 570-574).

The SDSi asset agent 140 of the SDSi product 105 then reports the confirmation certificate to the manufacturer enterprise system 110 and the customer enterprise system 115 (e.g., via the SDSi client agent 272 in the illustrated example) (lines 576-580. The manufacturer enterprise system 110 and the customer enterprise system 115 process the received confirmation certificate, and the customer enterprise system 115 validates the start of a payment obligation responsive to activation of the requested SDSi feature (lines 582-588).

Figure 6:
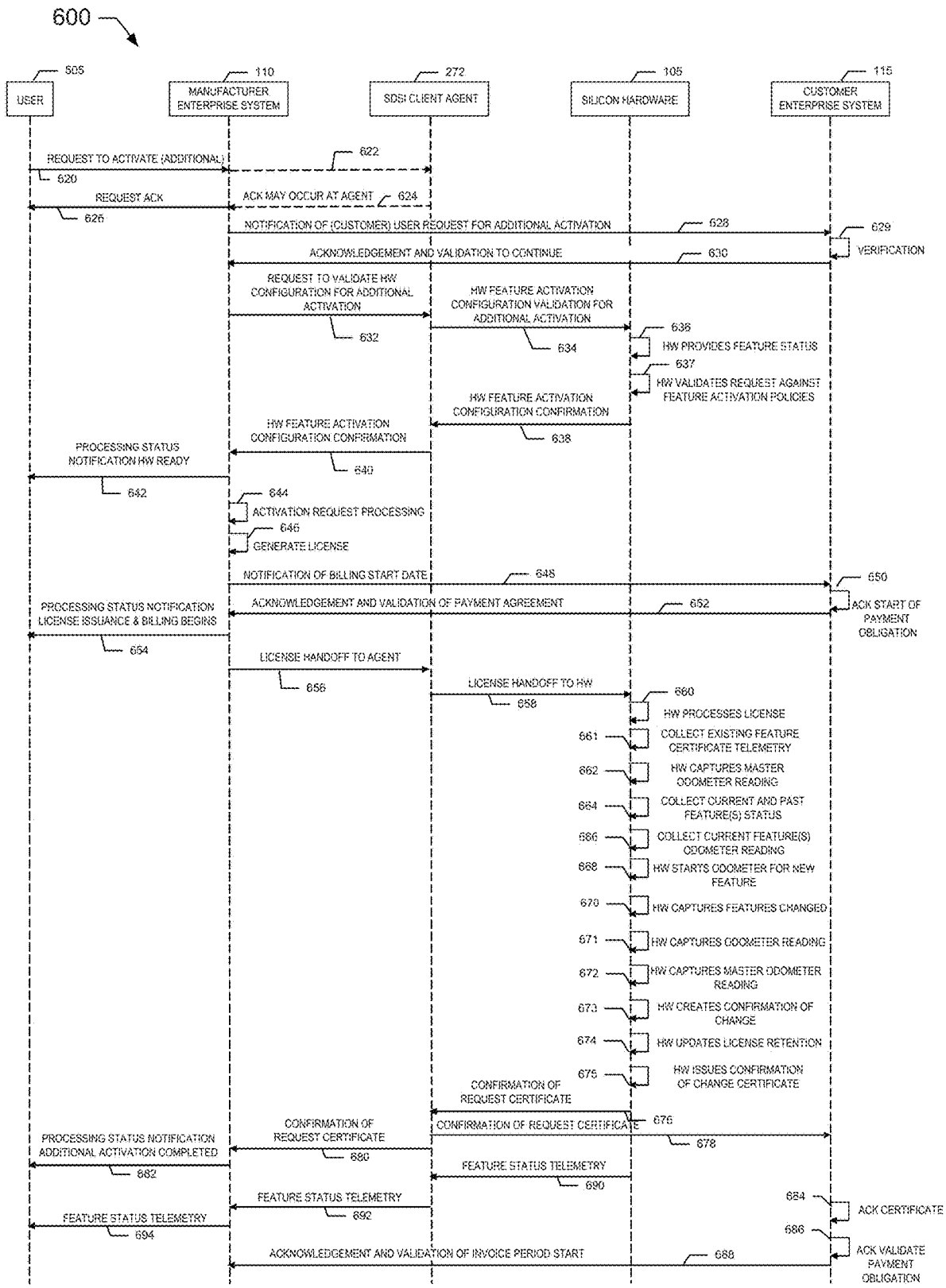
FIG. 6 illustrates an example process flow performed by the example systems of FIGS. 1 and/or 2 to enable additional feature activation in an example software defined silicon product.

An example process flow 600 performed by the example systems 100 and/or 200 of FIGS. 1-2 to enable additional feature activation in the SDSi product 105 is illustrated in FIG. 6. The process flow 600 of the illustrated example begins with the manufacturer enterprise system 110 receiving a request from the user 505 to activate an additional SDSi feature of the SDSi product 105 and acknowledging the request (lines 620-626). As shown in the illustrated example, the additional feature activation request can be received from a source (e.g., computer device) separate from the customer enterprise system 115 or from the SDSi client agent 272 of the customer enterprise system 115. In the illustrated example, the manufacturer enterprise system 110 further confirms with the customer enterprise system 115 that the additional SDSi feature activation request is valid (lines 628-630).

Assuming the additional SDSi feature activation request is valid, the manufacturer enterprise system 110 queries the SDSi product 105 to determine whether the additional requested SDSi feature to be activated is supported by the SDSi product 105 (lines 632-642). In the illustrated example, the manufacturer enterprise system 110 sends the query to the SDSi client agent 272 of the customer enterprise system 115, which queries the SDSi product 105 for the status of the requested SDSi feature and returns a response to the manufacturer enterprise system 110. However, in other examples, the manufacturer enterprise system 110 queries the SDSi product 105 without involving the SDSi client agent 272 or, more generally, the customer enterprise system 115. For example, the SDSi agent management interface 264 of the manufacturer enterprise system 110 may send a query to the SDSi product 105 for the status of the requested SDSi feature and receive a response from the SDSi product 105. In the illustrated example, in addition to checking whether the requested feature is supported, the SDSi product 105 also validates the activation request against other policies (line 637). For example, such policies may confirm that the additional SDSi feature to be activated will not conflict with an earlier SDSi feature that was activated.

Assuming the requested additional SDSi feature is supported, the manufacturer enterprise system 110 generates a license to activate the additional SDSi feature in the SDSi product 105 (lines 644-646). The manufacturer enterprise system 110 also communicates with the customer enterprise system 115 to establish billing terms and other contractual obligations associated with activation of the additional SDSi feature (lines 648-654). The manufacturer enterprise system 110 then sends the generated license to the SDSi client agent 272 of the customer enterprise system 115 (line 656). Sometime later (e.g., when the customer is ready for the additional feature to be activated), the SDSi client agent 272 sends the license to the SDSi asset agent 140 of the SDSi product 105 (line 658). The SDSi asset agent 140 invokes the license processor 214 to process the received license to activate the requested SDSi feature (line 660). The license processor 214 also invokes the analytics engine 206 to collect telemetry data for the SDSi features of the SDSi product 105 (line 661) and capture one or more odometer readings (lines 662-672), and then creates a confirmation certificate to confirm activation of the requested feature (lines 673-675).

The SDSi asset agent 140 of the SDSi product 105 then reports the confirmation certificate to the manufacturer enterprise system 110 and the customer enterprise system 115 (e.g., via the SDSi client agent 272 in the illustrated example) (lines 676-680. The manufacturer enterprise system 110 and the customer enterprise system 115 process the received confirmation certificate, and the customer enterprise system 115 validates the start of a payment obligation responsive to activation of the requested SDSi feature (lines 682-688). In the illustrated example, the SDSi asset agent 140 of the SDSi product 105 also reports SDSi feature status telemetry (e.g., included in subsequent certificates) to the manufacturer enterprise system 110 (e.g., via the SDSi client agent 272 in the illustrated example) (lines 690-694).

Figure 7:
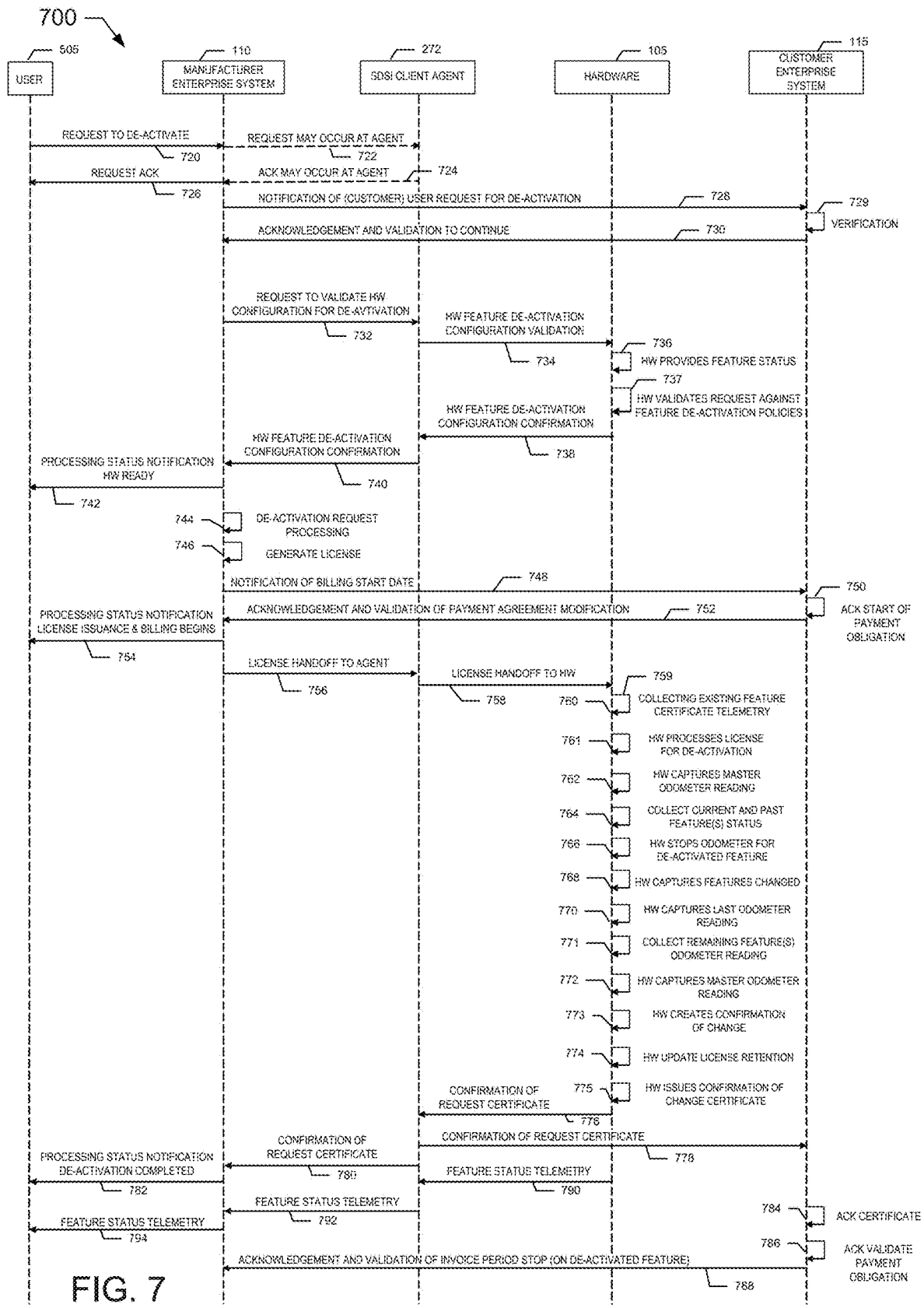
FIG. 7 illustrates an example process flow performed by the example systems of FIGS. 1 and/or 2 to enable feature deactivation in an example software defined silicon product.

An example process flow 700 performed by the example systems 100 and/or 200 of FIGS. 1-2 to enable feature deactivation in the SDSi product 105 is illustrated in FIG. 7. The process flow 700 of the illustrated example begins with the manufacturer enterprise system 110 receiving a request from the user 505 to deactivate an SDSi feature of the SDSi product 105 and acknowledging the request (lines 720-726). As shown in the illustrated example, the feature deactivation request can be received from a source (e.g., computer device) separate from the customer enterprise system 115 or from the SDSi client agent 272 of the customer enterprise system 115. In the illustrated example, the manufacturer enterprise system 110 further confirms with the customer enterprise system 115 that the SDSi feature deactivation request is valid (lines 728-730).

Assuming the SDSi feature deactivation request is valid, the manufacturer enterprise system 110 queries the SDSi product 105 to determine whether the requested SDSi feature to be deactivated is supported by the SDSi product 105

(lines 732-742). In the illustrated example, the manufacturer enterprise system 110 sends the query to the SDSi client agent 272 of the customer enterprise system 115, which queries the SDSi product 105 for the status of the requested SDSi feature and returns a response to the manufacturer enterprise system 110. However, in other examples, the manufacturer enterprise system 110 queries the SDSi product 105 without involving the SDSi client agent 272 or, more generally, the customer enterprise system 115. For example, the SDSi agent management interface 264 of the manufacturer enterprise system 110 may send a query to the SDSi product 105 for the status of the requested SDSi feature and receive a response from the SDSi product 105. In the illustrated example, in addition to checking whether the requested feature is supported, the SDSi product 105 also validates the deactivation request against other policies (line 737). For example, such policies may confirm that the SDSi feature to be deactivated will not cause a conflict with remaining active SDSi features, will not violate a specified base SDSi feature state for SDSi product 105, etc.

Assuming the SDSi feature to be deactivated is supported, the manufacturer enterprise system 110 generates a license to deactivate the SDSi feature in the SDSi product 105 (lines 744-746). The manufacturer enterprise system 110 also communicates with the customer enterprise system 115 to establish billing terms and other contractual obligations associated with deactivation of the SDSi feature (lines 748-754). The manufacturer enterprise system 110 then sends the generated license to the SDSi client agent 272 of the customer enterprise system 115 (line 756). Sometime later (e.g., when the customer is ready for the feature to be deactivated), the SDSi client agent 272 sends the license to the SDSi asset agent 140 of the SDSi product 105 (line 758). The SDSi asset agent 140 invokes the analytics engine 206 to collect telemetry data for the SDSi product 105 before feature deactivation (line 759), and then invokes the license processor 214 to process the received license to deactivate the requested SDSi feature (line 760). The analytics engine 206 also captures one or more odometer readings and collects telemetry data for the remaining active SDSi features of the SDSi product 105 (lines 762-774), which are used by the license processor 214 to create a confirmation certificate to confirm deactivation of the requested feature (lines 775).

The SDSi asset agent 140 of the SDSi product 105 then reports the confirmation certificate to the manufacturer enterprise system 110 and the customer enterprise system 115 (e.g., via the SDSi client agent 272 in the illustrated example) (lines 776-780. The manufacturer enterprise system 110 and the customer enterprise system 115 process the received confirmation certificate, and the customer enterprise system 115 validates the start of a payment obligation responsive to deactivation of the requested SDSi feature (lines 782-788). In the illustrated example, the SDSi asset agent 140 of the SDSi product 105 also reports SDSi feature status telemetry (e.g., included in subsequent certificates) to the manufacturer enterprise system 110 (e.g., via the SDSi client agent 272 in the illustrated example) (lines 790-794).

Figure 8:
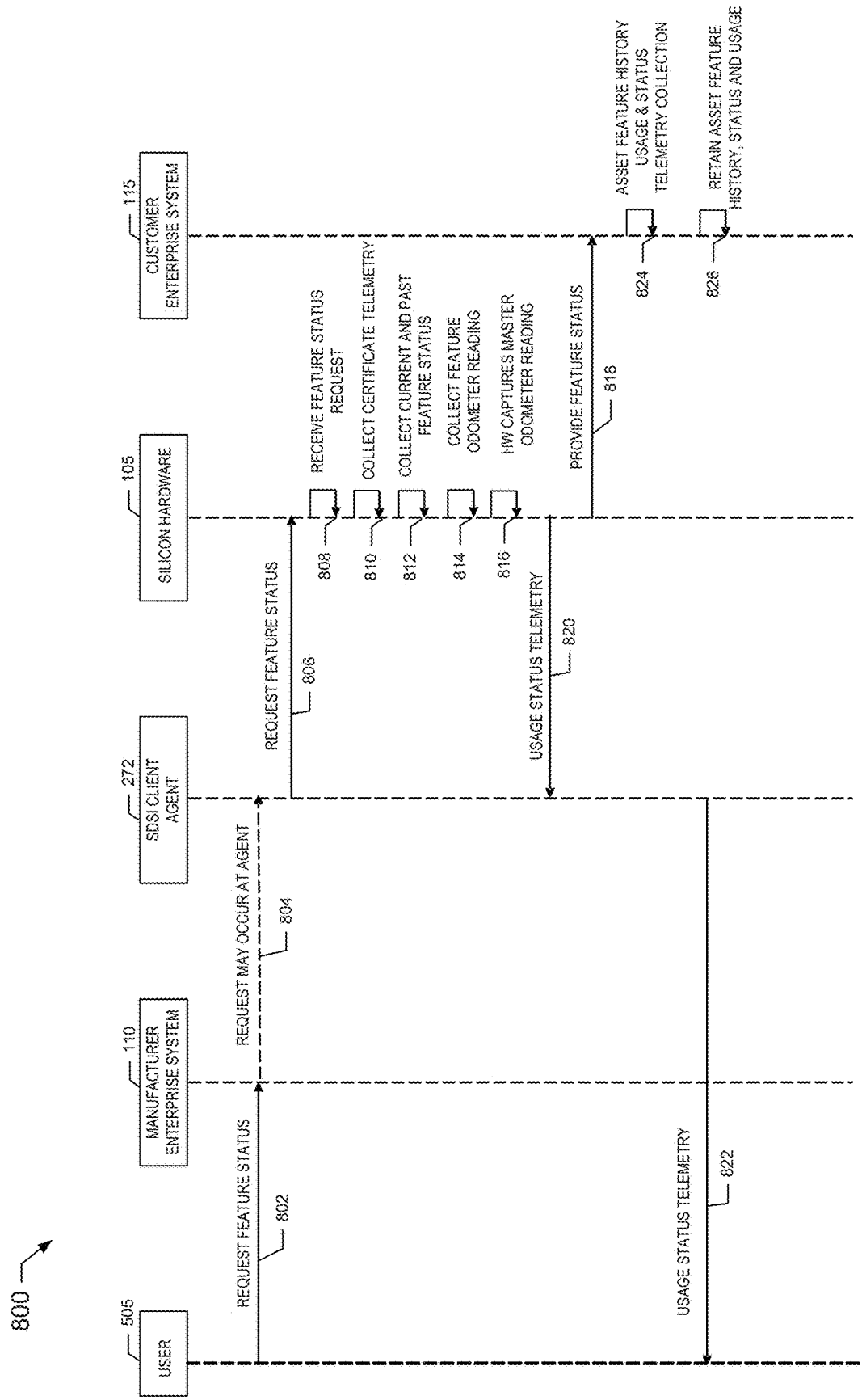
FIG. 8 illustrates an example process flow performed by the example systems of FIGS. 1 and/or 2 to provide customer-initiated feature usage status and billing reconciliation.

An example process flow 800 performed by the example systems 100 and/or 200 of FIGS. 1-2 to provide customer-initiated feature usage status and billing reconciliation is illustrated in FIG. 8. The process flow 800 of the illustrated example begins with the manufacturer enterprise system 110 receiving a request from the user 505 for SDSi feature status of the SDSi product 105 (lines 802-804). As shown in the illustrated example, the additional feature activation request can be received from a source (e.g., computer device) separate from the customer enterprise system 115, or can be received at the SDSi client agent 272 thereby bypassing the manufacturer enterprise system 110. In the illustrated example, the feature status request is received by the SDSi client agent 272, which sends the request to the SDSi asset agent 140 of the SDSi product 105 (line 806). In response to the feature status request, the SDSi asset agent 140 invokes the analytics engine 206 to collect telemetry data, current and past feature status, and odometer readings (lines 808-816). The SDSi asset agent 140 then reports the SDSi feature status of the SDSi product 105 to the customer enterprise system 115 (line 818), and more detailed telemetry status to the manufacturer enterprise system 110 (lines 820-822). In the illustrated example, the customer enterprise system 115 collects the SDSi feature status data from the SDSi product 105 and retains the status to perform feature usage status and billing reconciliation (lines 824-826).

Figure 9:
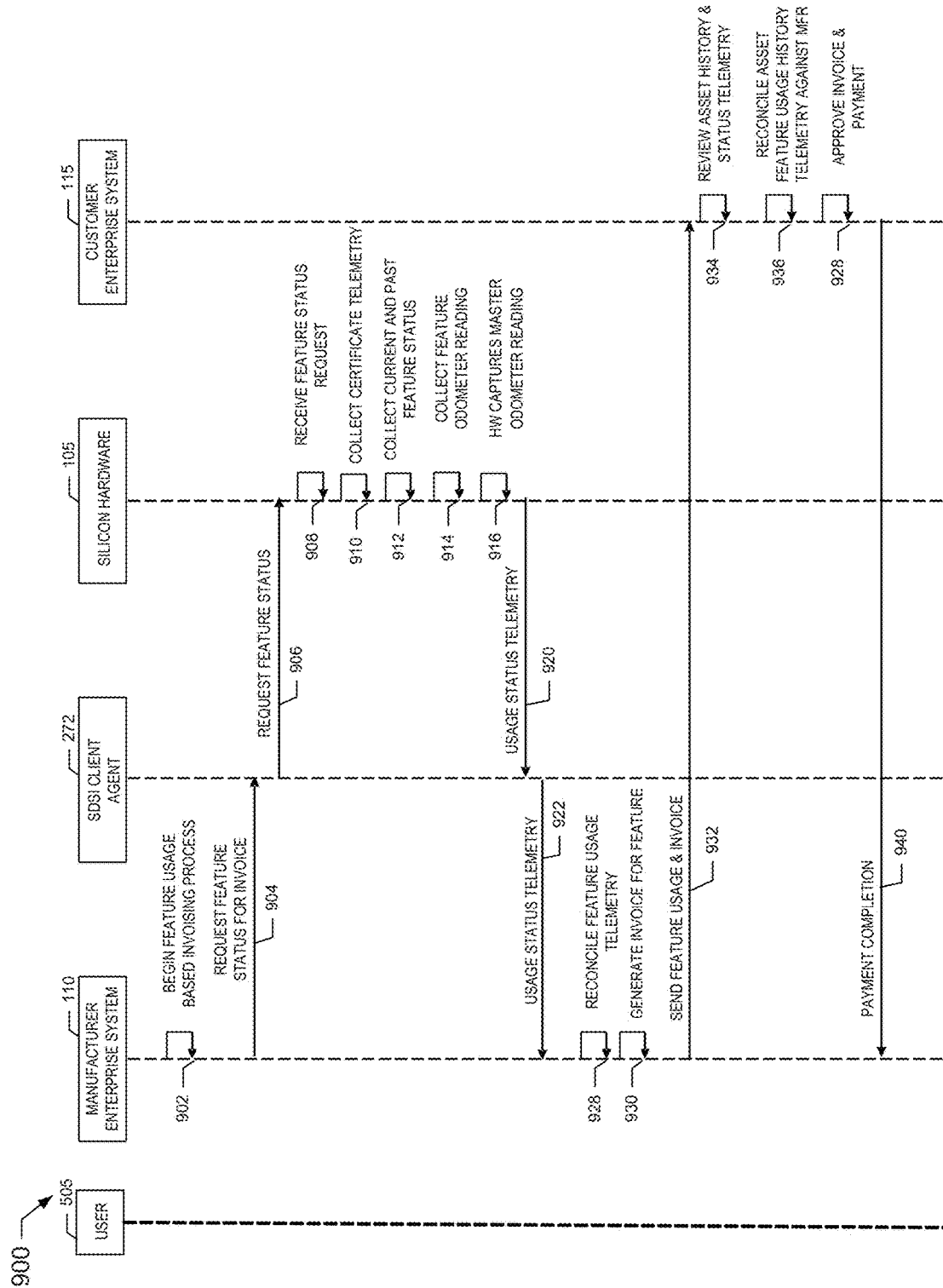
FIG. 9 illustrates an example process flow performed by the example systems of FIGS. 1 and/or 2 to provide manufacturer-initiated feature usage status and billing reconciliation.

An example process flow 900 performed by the example systems 100 and/or 200 of FIGS. 1-2 to provide manufacturer-initiated feature usage status and billing reconciliation is illustrated in FIG. 9. The process flow 900 of the illustrated example begins with the manufacturer enterprise system 110 beginning an invoicing process based on SDSi feature usage associated with the SDSi product 105 (line 902). The manufacturer enterprise system 110 then send a request for SDSi feature status of the SDSi product 105 (line 904). In the illustrated example, the feature status request is received by the SDSi client agent 272, which sends the request to the SDSi asset agent 140 of the SDSi product 105 (line 906). In response to the feature status request, the SDSi asset agent 140 invokes the analytics engine 206 to collect telemetry data, current and past feature status, and odometer readings (lines 908-916). The SDSi asset agent 140 the reports the SDSi feature status and telemetry to the manufacturer enterprise system 110 (lines 920-922). In the illustrated example, the manufacturer enterprise system 110 uses the SDSi feature status data and telemetry from the SDSi product 105 to perform feature usage status and billing, and sends an invoice to the customer enterprise system 115 (lines 928-932). The customer enterprise system 115 then reconciles the invoice against stored SDSI feature status and telemetry for the SDSi product 105, approves payment, and sends payment (or a payment completion record) to the manufacturer enterprise system 110 (lines 934-940).

Although the examples of FIGS. 1-9 are illustrated as including a single SDSi silicon product 105 (SDSi semiconductor device 105), a single manufacturer enterprise system 110 in associated with a single cloud platform 120, and a single customer enterprise system 115, SDSi frameworks and architectures as disclosed herein are not limited thereto. For example, any number(s) and/or type(s) of SDSi silicon products 105 (SDSi semiconductor devices 105) can be configured and managed in the example systems 100 and 200 described above. Additionally or alternatively, any number of manufacturer enterprise systems 110 and/or cloud platforms 120 can be included in the systems 100 and 200 described above to manage respective SDSi silicon products 105 (SDSi semiconductor devices 105) manufactured by different silicon manufacturers. Additionally or alternatively, any number of client enterprise systems 115 can be included in the systems 100 and 200 described above to manage SDSi silicon products 105 (SDSi semiconductor devices 105) purchased by different customers (e.g., OEMs). Also, in some examples, the client enterprise systems 115 can include multiple SDSi client agents 272. For example, the client enterprise systems 115 can configure different SDSi client agents 272 to manage different groups of one or more SDSi products 105.

While example manners of implementing the systems 100 and 200 are illustrated in FIGS. 1-9, one or more of the elements, processes and/or devices illustrated in FIGS. 1-9 may be combined, divided, re-arranged, omitted, eliminated and/or implemented in any other way. Further, the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example SDSi client agent 272, the example platform inventory management service 274, the example accounts management service 276, the example entitlement management service 278 and/or, more generally, the systems 100 and/or 200 of FIGS. 1-9 may be implemented by hardware, software, firmware and/or any combination of hardware, software and/or firmware. Thus, for example, any of the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example SDSi client agent 272, the example platform inventory management service 274, the example accounts management service 276, the example entitlement management service 278 and/or, more generally, the systems 100 and/or 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example systems 100 and/or 200, the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example SDSi client agent 272, the example platform inventory management service 274, the example accounts management service 276 and/or the example entitlement management service 278 is/are hereby expressly defined to include a non-transitory computer readable storage device or storage disk such as a memory, a digital versatile disk (DVD), a compact disk (CD), a Blu-ray disk, etc. including the software and/or firmware. Further still, the example systems 100 and/or 200 may include one or more elements, processes and/or devices in addition to, or instead of, those illustrated in FIGS. 1-9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Protection Against Misuse of Software Defined Silicon

Figure 10:
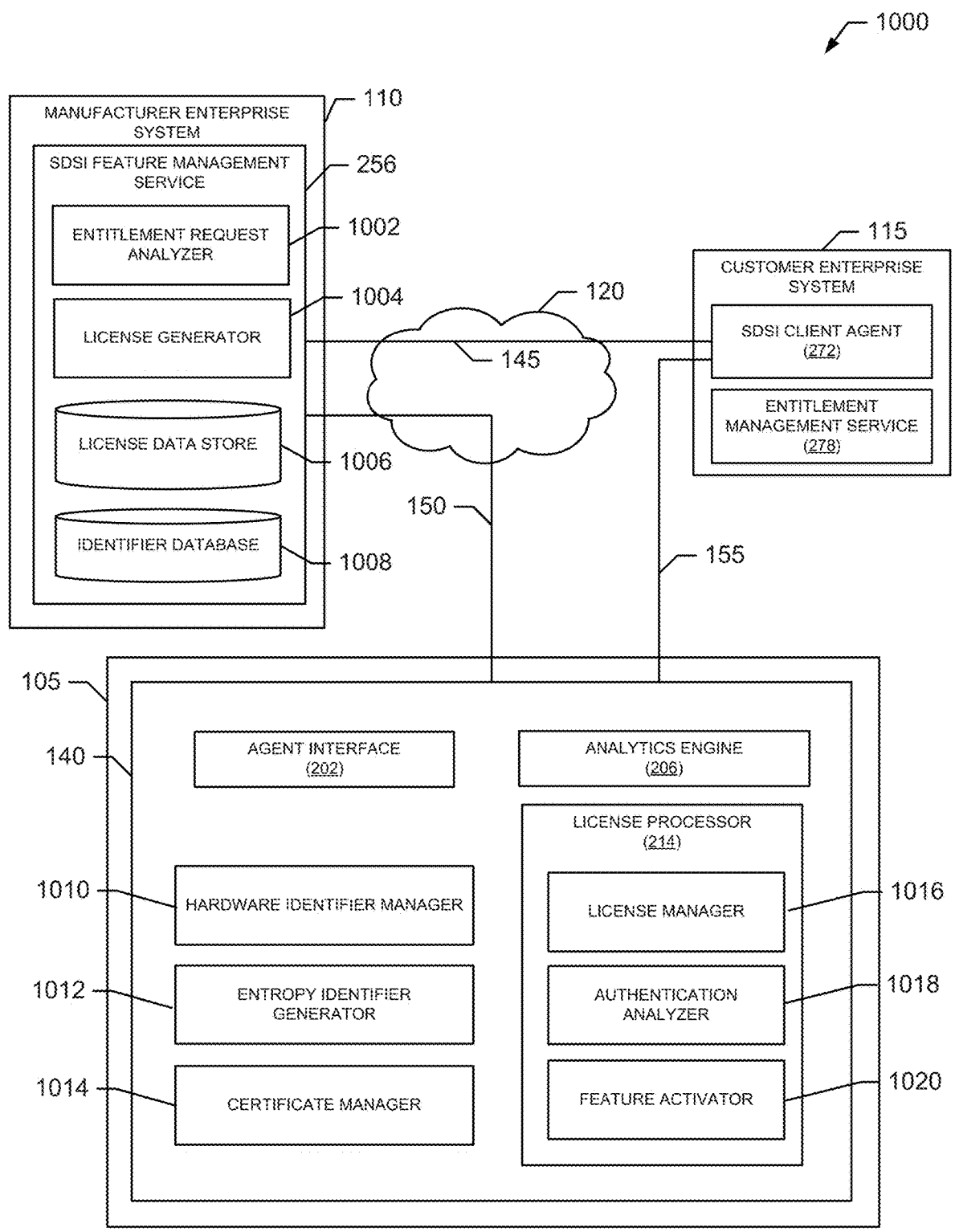
FIG. 10 is a block diagram of an example system to implement protection against misuse of software-defined silicon in accordance with teachings of this disclosure.

FIG. 10 is a block diagram 1000 of an example system to implement protection against misuse of software-defined silicon in accordance with teachings of this disclosure. The block diagram 1000 of FIG. 10 includes the example semiconductor device 105, the example manufacturer enterprise system 110, the example customer enterprise system 115, the example cloud platform 120, the example SDSi asset agent 140, and the example connections 145, 150, and 155 of FIGS. 1 and 2.

In the illustrated example of FIG. 10, the example SDSi feature management service 256 of the example manufacturer enterprise system 110 includes an example entitlement request analyzer 1002, an example license generator 1004, an example license data store 1006, and an example identifier database 1008. Further, in the illustrated example of FIG. 10, the example SDSi asset agent 140 includes an example hardware identifier manager 1010, an example entropy identifier generator 1012, and an example certificate manager 1014. In the illustrated example of FIG. 10, the example license processor 214 includes an example license manager 1016, an example authentication analyzer 1018, and an example feature activator 1020.

The example entitlement request analyzer 1002 of the illustrated example of FIG. 10 processes entitlement requests to determine whether one or more license(s) should be granted for feature adjustments. As used herein, entitlement requests refer to requests to activate, deactivate, etc., SDSi features of an asset, such as the semiconductor device 105. In some examples, an entitlement refers to an authorization to activate, deactivate, etc., one or more SDSi features of an asset, and a license refers to data and/or other things that cause activation, deactivation, etc., on the asset of the one or more SDSi features for which an entitlement has been granted. For example, the entitlement request analyzer 1002 can process an entitlement request received from the customer enterprise system 115 via the cloud platform 120. If the entitlement request analyzer 1002 determines that the entitlement request should be granted, the entitlement request analyzer 1002 can cause the license generator 1004 to generate a license to communicate to the customer enterprise system 115. If the entitlement request analyzer 1002 determines that the entitlement request should not be granted (e.g., based on the entitlement request not adhering to an entitlement rule, based on a state of the asset, etc.), the entitlement request analyzer 1002 can communicate a rejection of the entitlement request to the customer enterprise system 115. In some examples, the entitlement request analyzer 1002 may communicate (e.g., directly, via the network, etc.) a response to the SDSi asset agent 140.

In some examples, in response to receiving an entitlement request, the entitlement request analyzer 1002 determines a state of the asset for which a feature entitlement is being requested. As used herein, a state refers to a set of features and/or capabilities of an asset. In some examples, the entitlement request analyzer 1002 determines a base state for the asset. As used herein, a base state is an initial configuration for the asset when it is received by a customer (e.g., when ownership was last transferred). For example, the customer enterprise system 115 can request an entitlement for a feature to be activated or deactivated on the semiconductor device 105. The entitlement request analyzer 1002, in response to receiving the entitlement request, can determine the identity of the semiconductor device associated with the request (the semiconductor device 105 in the illustrated example of FIG. 10), and retrieve a base state for the semiconductor device.

In some examples, the entitlement request analyzer 1002 determines the base state of the semiconductor device 105 based on base state information stored in the license data store 1006. In some examples, the entitlement request analyzer 1002 determines a customer identity associated with the entitlement request. For example, the entitlement request analyzer 1002 can determine the customer identity based on an address (e.g., an Internet Protocol (IP) address) associated with the entitlement request and/or based on a credential associated with the entitlement request. In some examples, the entitlement request analyzer 1002 can determine whether the customer making the entitlement request is different from a customer that made a prior entitlement request. In some examples, the entitlement request analyzer 1002 determines the identity of a customer making an entitlement request based on an authentication key (e.g., a cryptographic key). For example, the entitlement request may be signed with a public identification key that belongs to a specific customer. The entitlement request analyzer 1002 can determine the base state of the semiconductor device 105 by looking the base state up using the public key (e.g., in the license data store 1006).

In some examples, the entitlement request analyzer 1002 sets (e.g., updates, stores, etc.) the base state for the semiconductor device 105. The entitlement request analyzer 1002 can store the base state along with an identifier corresponding to the semiconductor device 105 in the license data store 1006 and/or any other storage location accessible to the entitlement request analyzer 1002. For example, in response to receiving an entitlement request from a customer different than the customer associated with the prior entitlement request for the semiconductor device 105, the entitlement request analyzer 1002 can determine that a transfer of ownership has occurred, and set the base state based on the currently active features of the semiconductor device 105. In some examples, the entitlement request analyzer 1002 sets the base state for the semiconductor device 105 based on a completion certificate. In some such examples, the completion certificate is received at the manufacturing enterprise system 110 after execution of a license. In some examples, the completion certificate is received at the entitlement request analyzer 1002 along with a new entitlement request. A completion certificate (also referred to herein as a status certificate and/or certificate of completion) indicates the current state of the semiconductor device 105, such as which features are active, and which licenses have been executed (e.g., to enable/disable features).

The entitlement request analyzer 1002 analyzes the entitlement request in view of one or more rules. For example, if the manufacturer wishes to avoid deactivation of already activated features by subsequent owners of the semiconductor device 105, the entitlement request analyzer 1002 can reject entitlement requests that request deactivation of features that were enabled in the most recent base state. In some examples, the entitlement request analyzer 1002 can determine whether a customer has paid a specific fee (e.g., a recurring subscription fee, a one-time fee) associated with access to a feature and thereby determine whether to issue a license for the feature. In some examples, the entitlement request analyzer 1002 may be able to approve entitlement requests for features based on other features which are enabled (e.g., as represented in the base state) and/or based on a customer status (e.g., a subscriber status, a customer level, etc.). For example, some features may be sub-features of others, indicating that entitlements for these features can be granted if the master feature with which they are associated is already activated in the base state. In some examples, in addition to or alternatively to communicating with the license generator 1004 to generate a license when an entitlement is approved, the entitlement request analyzer 1002 may communicate with other components of the manufacturer enterprise system 110 to cause other changes to occur when an entitlement is approved. For example, a financial charge may be scheduled to enable the manufacturer to receive a payment for the feature that is being activated in response to the entitlement request.

The example license generator 1004 of the illustrated example of FIG. 10 generates license corresponding to activation or deactivation of features on the semiconductor device 105. In some examples, the license generator 1004 communicates licenses via the cloud network 120 to the semiconductor device 105. In some examples, the license generator 1004 communicates licenses to the customer enterprise system 115 to thereafter be provided to the semiconductor device 105. In some examples, the license is passed via proxy entities corresponding to the source of the entitlement request. For example, if a first enterprise system sent an entitlement request to a second enterprise system which then forwarded it to the manufacturer, the license may similarly be traversed through the proxy (e.g., sent to the second enterprise system and then to the first enterprise system). In some such examples, the license generator 1004 can use asymmetric cryptography to sign the license such that only the intended recipient can execute the license and enable the features. For example, the license generator 1004 may encrypt the license with a public key provided with the entitlement request. In some such examples, the semiconductor device 105 then utilizes the private key to decrypt the license and allow execution of the license.

In some examples, the example license generator 1004 of the illustrated example of FIG. 10 appends one or more identifiers along with the license communicated to the semiconductor device 105 to ensure that the license is executed on the intended asset. For example, the license generator 1004 can access one or more hardware identifiers from the identifier database 1008. The identifiers may be hardware based (e.g., based on fuses of the semiconductor device 105, based on physical characteristics of the hardware of the semiconductor device 105, etc.) and/or entropy-based (e.g., based on a physically-unclonable function, based on ambient noise, based on quantum noise, etc.).

The example license data store 1006 of the illustrated example of FIG. 10 stores information corresponding to licenses that can be, or have been, issued to semiconductor devices or other silicon assets, such as the semiconductor device 105. In some examples, the license data store 1006 includes one or more logs including historical data regarding licenses that have been executed on semiconductor devices. For example, the license data store 1006 can list licenses that have been executed, features that are activated, the most recent and/or any prior base states, or any other information that can be utilized by the entitlement request analyzer 1002 and/or the license generator 1004 to make entitlement decisions and/or to generate licenses. In some examples, the license data store 1006 and/or the identifier database 1008 may be implemented as a single database. For example, the hardware identifiers and/or entropy-based identifiers can be stored in association with base state information, feature activation/deactivation information, rule information, and/or other information useful for making entitlement decisions and generating licenses. In some examples, the entitlement request analyzer 1002 updates the base state of the semiconductor device 105 upon detecting a change in ownership by updating the base state associated with an identifier of the semiconductor device 105 in the license data store 1006.

The example identifier database 1008 of the illustrated example of FIG. 10 stores identification information corresponding to semiconductor devices (such as the semiconductor device 105). In some examples, the identification information may be a hardware identifier (e.g., associated with a fuse or other physical component on the semiconductor device 105). In some examples, the identification information stored in the identifier database 1008 may include a serial number, a SKU number, and/or any other unique identifier of the semiconductor device 105. In some examples, the identifier database 1008 includes entropy-based hardware identifiers that are generated while the semiconductor device 105 is still possessed by the manufacturer enterprise system 110. For example, at a time prior to sale of the semiconductor device 105 by the manufacturer, the entropy identifier generator 1012 can generate an identifier based on a physically unclonable function (PUF), based on ambient noise, analog noise, and/or any other repeatable source of entropy, and transmit the identifier to be stored in the license data store 1006 of the manufacturer enterprise system 110. In such examples, the entropy-based identifier can be utilized to reliably identify the semiconductor device 105 since the entropy-based identifier cannot be generated by any other device (it is a unique and unclonable identifier).

The example hardware identifier manager 1010 of the illustrated example of FIG. 10 stores and/or accesses a hardware identifier specific to the semiconductor device 105. For example, the hardware identifier manager 1010 may include one or more fuses which are unique to the semiconductor device 105. In some such examples, by reading values associated with the one or more fuses, a unique hardware identifier can be determined. In some examples, the hardware identifier manager 1010 determines the hardware identifier of the semiconductor device 105 based on one or more other physical aspects of the semiconductor device 105 (e.g., a characteristic of the circuitry, a physically unclonable function, internal CPU FLASH etc.). The hardware identifier manager 1010 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory, etc.). The hardware identifier manager 1010 can additionally or alternatively be implemented by one or more double data rate (DDR) memories, such as DDR, DD11, DD12, mobile DDR (mDDR), etc. The hardware identifier manager 1010 can additionally or alternatively be implemented by one or more mass storage devices such as hard disk drive(s), compact disk drive(s) digital versatile disk drive(s), etc. While, in the illustrated example, the hardware identifier manager 1010 is illustrated as a single database, the hardware identifier manager 1010 can be implemented by any number and/or type(s) of databases. Furthermore, the data stored in the hardware identifier manager 1010 can be in any data format such as, for example, binary data, comma delimited data, tab delimited data, structured query language (SQL) structures, etc.

The example entropy identifier generator 1012 of the illustrated example of FIG. 10 generates an entropy-based identifier for the semiconductor device 105. In some examples, the entropy-based identifier is generated using a PUF such that the output of the PUF uniquely corresponds to the semiconductor 105. For example, a PUF can provide a unique output based on unique manufacturing characteristics of the semiconductor device 105, such that another semiconductor device cannot replicate the same output as the semiconductor device 105. In some examples, the entropy-based identifier may be based on an ambient noise level on the semiconductor device 105. In some examples, the unique output of the PUF is passed through a hash function or a key derivation function (KDF) to obtain an additional unique value as an additional level of protection. The entropy-based identifier output by the entropy identifier generator 1012 can be shared without concern for privacy, as the unique generation characteristics of this identifier make it immune to replication by bad actors. Thus, entitlement requests can be transmitted with the entropy-based value without the need for additional protection to prevent other semiconductor devices from replicating the semiconductor device 105 of the illustrated example and attempting to utilize a license intended for the semiconductor device 105 of the illustrated example. In some examples, the entropy-based identifier generated by the entropy identifier generator 3912 is stored in association with (e.g., in combination with) the hardware identifier generated by the hardware identifier manager 1010. In some examples, the entropy identifier generator 1012 communicates the entropy-based identifier to the manufacturer enterprise system 110 (e.g., to be stored in the identifier database 1008).

The example certificate manager 1016 of the illustrated example of FIG. 10 stores and/or accesses completion certificates associated with execution of licenses by the license processor 214 of the semiconductor device 105, as described above. For example, the certificate manager may include data storage to store completion certificates generated by the license processor 214. In some examples, the certificate manager 1014 generates completion certificates in response to the license processor 214 executing a license. In some examples, the customer enterprise system 115 accesses certificates managed by the certificate manager 1014 to communicate the certificates to the manufacturer enterprise system 110. For example, the customer enterprise system 115 may communicate the latest completion certificate to the manufacturer enterprise system 110 to enable determination of the base state for the semiconductor device 105. Completion certificates may include features active on the semiconductor device 105, event logs pertaining to changes of features on the semiconductor device 105, and/or usage logs pertaining to usage of features on the semiconductor device 105. In some examples, the feature activator 1020 generates completion certificates and communicates them to the certificate manager.

The example license manager 1016 of the illustrated example of FIG. 10 accesses licenses to be executed on the semiconductor device 105. For example, the license manager 1016 can receive licenses provided by the license generator 1004 to the customer enterprise system 115. For example, the license manager 1016 can receives a license from the SDSi client agent 272 of the customer enterprise system 115, as described above. In some examples, the license manager 1016 includes storage to store a license for subsequent execution. In some examples, the license manager 1016 can determine whether a license is intended for execution on the semiconductor device 105 by comparing one or more identifiers associated with the license to one or more identifiers of the semiconductor device 105 (e.g., the hardware identifier managed by the hardware identifier manager 1010, the entropy-based identifier generated by the entropy identifier generator 1012, etc.).

In some examples, the license manager 1016 can determine whether a license can be executed on the semiconductor device 105 based on a version number associated with the license. In some such examples, the license manager 1016 further manages a version number associated with the semiconductor device 105 and increments the version number of the asset (e.g., semiconductor device 105) when licenses are executed. Thus, when licenses are generated (e.g., at the license generator 1004), they can include a version number that is higher than the last known version number of the semiconductor device 105. Thus, the license manager 1016 can utilize the version number of the license to ensure that it is a higher version number than that associated with the semiconductor device 105. For example, if a license is requested at a first time, and then stored by the license manager 1016 while other changes are made (e.g., other features are activated/deactivated at the semiconductor device 105), the version number of the semiconductor device 105 may be higher than or equal to the license number and prevent the license from being executed. In some examples, the license manager 1016 stores a list of licenses which have been executed on the semiconductor device 105. In some such examples, the license manager 1016 compares a license identifier of a license to be executed with identifiers on the list of licenses previously executed. If the license has already been executed (the license identifier is found on the list of licenses previously executed), the licenses can be invalidated (e.g., deleted, corrupted, etc.). In some examples, the license manager 1016 communicates invalid license events (e.g., attempts to execute a license that has previously been executed, attempts to execute a license with an outdated version number, etc.) to the manufacturer enterprise system 110.

The authentication analyzer 1018 of the illustrated example of FIG. 10 analyzes authentication information associated with licenses and/or authentication information communicated by the customer enterprise system 115. In some examples, licenses may be signed using an authentication key. For example, asymmetric cryptography can be utilized to sign a license with the private portion of an authentication key specific to a customer, and the public portion of the authentication key can be utilized to verify the signature and execute the license. In some such examples, the authentication analyzer 1018 determines whether a current owner's public key (e.g., a public key provided by the customer enterprise system 115) can be utilized to verify and execute a license. In response to the public key not being able to verify and/or execute the license, the authentication analyzer 1018 can determine it is not intended for execution by the current owner (the owner associated with the customer enterprise system 115). In some examples, the authentication analyzer 1018 stores authentication information (e.g., public authentication keys) corresponding to specific customers. While some examples herein discuss asymmetric cryptography as a means of authentication, any authentication technique may be utilized by the authentication analyzer 1018.

In some examples, the authentication analyzer 1018 may be utilized to sign completion certificates and/or base state information using an authentication key. For example, the authentication analyzer 1018 can sign a completion certificate with an authentication key corresponding to a specific customer, such that when the completion certificate is received by the manufacturer enterprise system 110, base state information can be determined and stored in association with the identity of the customer enterprise system 115 and the identity of the semiconductor device 105. Further, signing of the completion certificate and/or base state information prevents alteration by another entity and clearly enables the customer enterprise system 115 to set the base state prior to transferring ownership to another entity.

The example feature activator 1020 of the illustrated example of FIG. 10 executes one or more license(s) and causes features to be activated and/or deactivated in accordance with the license(s). In some examples, the feature activator 1020 communicates features which have been activated and/or deactivated to the certificate manager 1014 enable generation of a completion certificate. In some examples, the feature activator 1020 generates a completion certificate and communicates the completion certificate to the certificate manager 1014. In some examples, the feature activator 1020 can deactivate features by changing them to an unusable mode or configuration.

Figure 11:
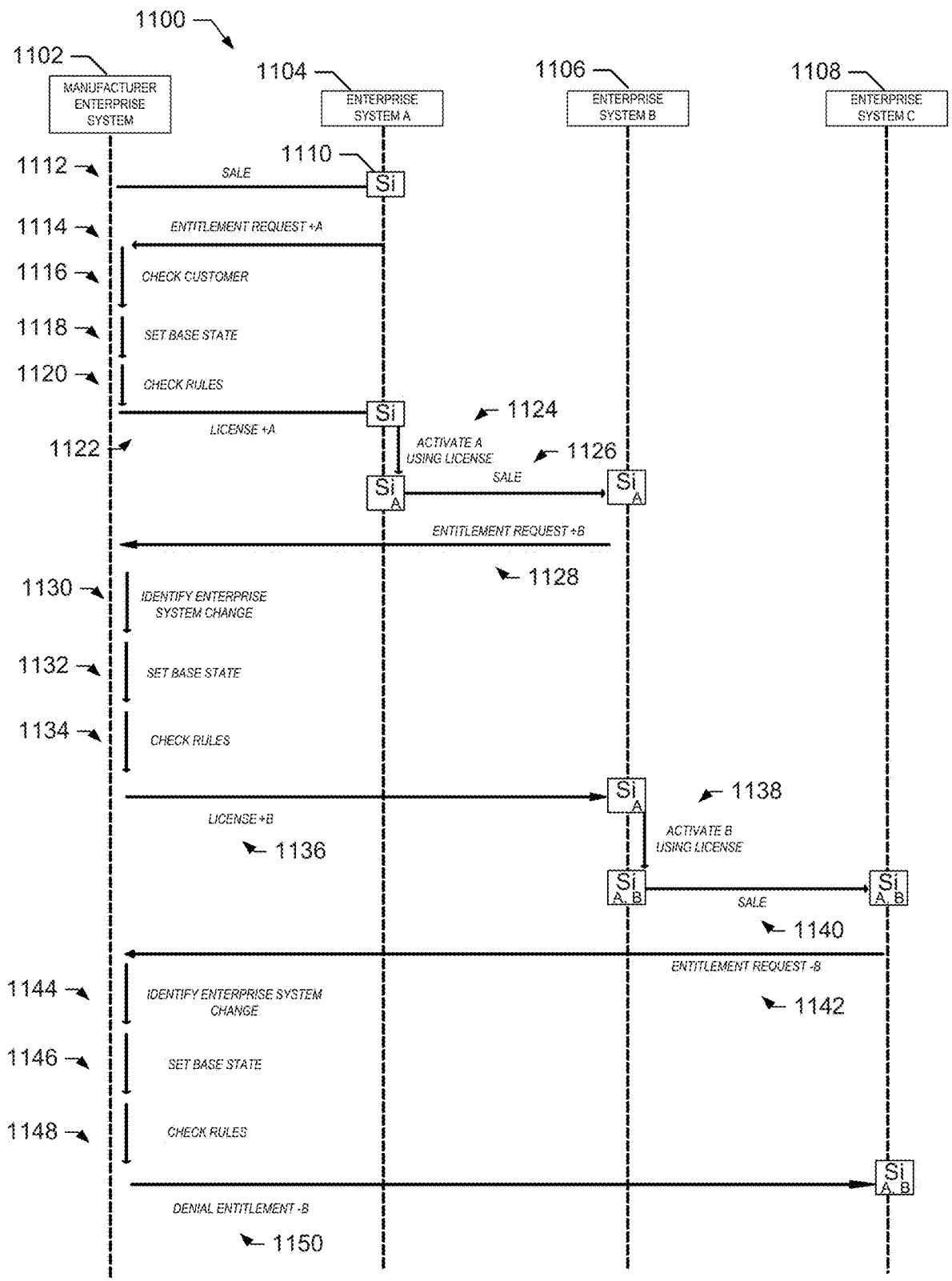
FIG. 11 illustrates a first example process flow performed by the example system of FIG. 10 to process entitlement requests.

FIG. 11 illustrates a first example process flow 1100 performed by the example system 1000 of FIG. 10 to process entitlement requests. The example process flow 1100 illustrates interactions by and between an example manufacturer enterprise system 1102, an example enterprise system A 1104, an example enterprise system B 1106, and an example enterprise system C 1108. The processor flow 1100 further includes an example asset 1110. For example, the manufacturer enterprise system 1102 may be the manufacturer enterprise system 110 of FIG. 10, and the asset 1110 may be the semiconductor device 105. The example enterprise system A 1104, the example enterprise system B 1106 and the example enterprise system C 1108 may correspond to different example instances of the customer enterprise system 115 of FIG. 10.

At operation 1112, the example manufacturer enterprise system 1102 sells the asset 1110 to the enterprise system A 1104. In some examples, ownership may be transferred in another way (e.g., without a sale, via a lease, etc.).

At operation 1114, the example enterprise system A 1104 communicates an entitlement request to activate feature "A" of the asset 1110 to the manufacturer enterprise system 1102. As used throughout the process flow diagrams 1100, 1200, 1300, 1400 of FIGS. 11-14, features are referred to using letters as symbols to represent features for brevity. In some examples, the entitlement management server 278 of FIG. 10 communicates the entitlement request to the manufacturer enterprise system 110 via the SDSi client agent 272 and the cloud platform 120.

At operation 1116, the example manufacturer enterprise system 1102 checks the customer who requested the entitlement request. For example, the manufacturer enterprise system 1102 can determine the identity of the customer associated with the enterprise system A 1104 based on an identifier communicated with the entitlement request, via an authentication key, and/or via other information made accessible to the manufacturer enterprise system 1102. In some examples, the entitlement request analyzer 1002 determines the identity of the customer associated with the enterprise system A 1104.

At operation 1118, the example manufacturer enterprise system 1102 sets the base state for the asset 1110. In some examples, the entitlement request analyzer 1002 sets the base state for the asset 1110.

At operation 1120, the example manufacturer enterprise system 1102 checks rules associated with entitlement requests to determine whether the entitlement request for activation of feature "A" should be granted. In some examples, the entitlement request analyzer 1002 checks rules associated with entitlement requests to determine whether the entitlement request for activation of feature "A" should be granted.

At operation 1122, the example manufacturing enterprise system 1102 generates a license to activate feature "A" and communicates the license to the enterprise system A 1104, which provides the license (e.g., via its SDSi client agent 272) to the asset 1110.

At operation 1124, the example asset 1110 activates feature "A" by executing the license.

At operation 1126, the example enterprise system A 1104 sells and/or transfers ownership of the asset 1110 to the enterprise system B 1106. The enterprise system B 1106 receives the asset with feature "A" activated.

At operation 1128, the example enterprise system B 1106 communicates an entitlement request to activate feature "B" to the manufacturer enterprise system 1102.

At operation 1130, the example manufacturer enterprise system 1102 identifies that the enterprise system which requested the entitlement (enterprise system B 1106) is different from the prior enterprise system which requested an entitlement (enterprise system A 1104). For example, the entitlement request analyzer 1002 may identify the change in enterprise system.

At operation 1132, the example manufacturer enterprise system 1102 sets the base state of the asset in response to identifying the transfer in ownership (in operation 1130). For example, the base state may be stored in the license data store 1006.

At operation 1134, the example manufacturer enterprise system 1102 checks the entitlement request against one or more rules. For example, the entitlement request analyzer 1002 may determine whether the entitlement request attempts to deactivate any features that were previously active in the base state.

At operation 1136, the example manufacturer enterprise system 1102 issues a license to activate feature "B" and communicates the license to the enterprise system B 1106, which provides the license (e.g., via its SDSi client agent 272) to the asset 1110. For example, the license generator 1004 may generate the license.

At operation 1138, the example asset 1110 activates feature "B" using the license. In some examples, the license processor 214 executes the license to activate feature "B."

At operation 1140, ownership of the example asset 1110 is transferred from the enterprise system B 1106 to the enterprise system C 1108.

At operation 1142, the example enterprise system C 1108 issues an entitlement request to deactivate feature "B" and communicates the entitlement request to the manufacturer enterprise system 1102.

At operation 1144, the example manufacturer enterprise system 1102 identifies a change in the enterprise system making the request (enterprise system C 1108) relative to the prior entitlement request handled at the manufacturer enterprise system 1102.

At operation 1146, the example manufacturer enterprise system 1102 sets the base state for the asset 1110. In some examples, the manufacturer enterprise system 1102 sets the base state in response to identifying the change in the enterprise system making the request.

At operation 1148, the example manufacturer enterprise system 1102 checks the entitlement request against one or more rules. For example, the entitlement request analyzer 1002 may determine whether the entitlement request attempts to deactivate any features that were previously active in the base state.

At operation 1150, the example manufacturer enterprise system 1102 denies the entitlement request to deactivate feature "B." For example, the entitlement request analyzer 1002 can determine that the entitlement request would deactivate a feature previously active in the base state and deny the request. The manufacturer enterprise system 1102 communicates the denial of the entitlement request to the enterprise system C 1108.

Figure 12:
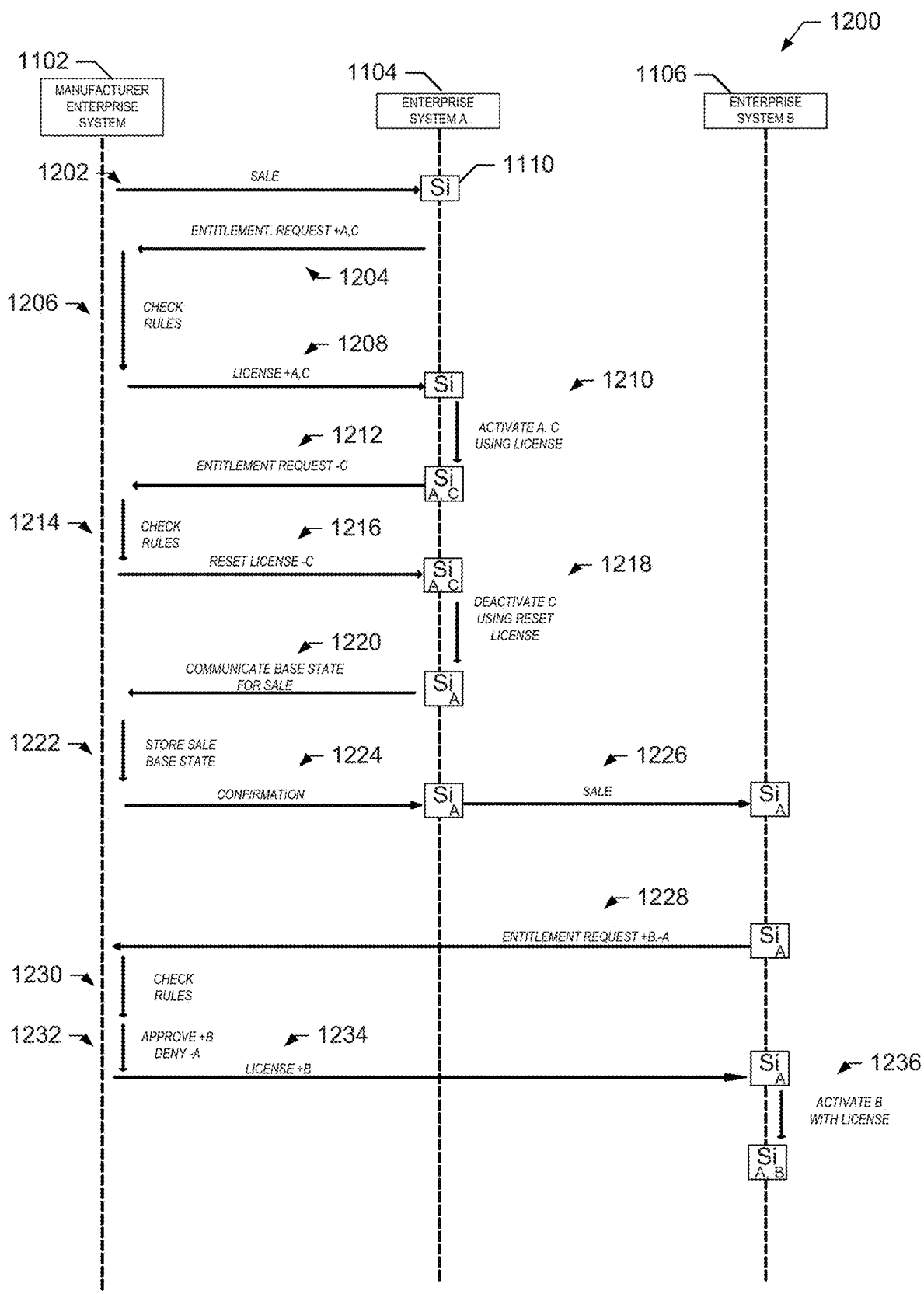
FIG. 12 illustrates a second example process flow performed by the example system of FIG. 10 to process entitlement requests while setting a base state before a time of sale.

FIG. 12 illustrates an example second example process flow 1200 performed by the example system 1000 of FIG. 10 to process entitlement requests while setting a base state before a time of sale. The second process flow 1200 includes the manufacturer enterprise system 1102, the enterprise system A 1104, the enterprise system B 1106, and the asset 1110.

At operation 1202, the example manufacturer enterprise system 1102 transfers ownership of the asset 1110 to the enterprise system A 1104.

At operation 1204, the example enterprise system A 1104 submits an entitlement request for features "A" and "C" to the manufacturer enterprise system 1102.

At operation 1206, the example manufacturer enterprise system 1102 checks the entitlement request against one or more rules. In some examples, the entitlement request analyzer 1002 checks the entitlement request against one or more rules.

At operation 1208, the example manufacturer enterprise system 1102 issues a license for features "A" and "C" and communicates the license to the enterprise system A 1104, which provides the license (e.g., via its SDSi client agent 272) to the asset 1110. In some examples, the license generator 1004 generates and/or communicates the license.

At operation 1210, the example asset 1110 activates features "A" and "C" using the license. For example, the license processor 214 may execute the license and activate features "A" and "C".

At operation 312, the example enterprise system A 1104 submits an entitlement request to deactivate feature "C" to the manufacturer enterprise system 1102.

At operation 314, the example manufacturer enterprise system 1102 checks the entitlement request against one or more rules.

At operation 316, the example manufacturer enterprise system 1102 issues a reset license to the enterprise system A 1104 to deactivate feature "C." In some examples, the license generator 1004 issues the reset license in response to the entitlement request analyzer 1002 confirming the entitlement request does not violate any entitlement request rules.

At operation 318, the example asset deactivates feature "C" using the reset license (e.g., provided to the asset by the SDSi client agent 272 of the enterprise system A 1104). For example, the feature activator 1020 may deactivate feature "C" by disabling the feature.

At operation 320, the example enterprise system A 1104 communicates the base state of the asset 1110 for sale of the asset 1110. For example, the manufacturer enterprise system 1102 may require that prior to transfer of ownership of the asset 1110, the enterprise system A 1104 must communicate the base state which describes to features that will be active on the asset 1110 when ownership is transferred.

At operation 1222, the example manufacturer enterprise system 1102 stores the base state for the asset 1110. For example, the license data store 1006 can store the base state in association with one or more pieces of identifying information for the asset 1110 in order to enable subsequent comparison of the base state with one or more rules when a subsequent entitlement request is received.

At operation 1224, the example manufacturer enterprise system 1102 issues a confirmation that the base state has been stored to the enterprise system A 1104.

At operation 1226, ownership of the example asset 1136 is transferred from the enterprise system A 1104 to the enterprise system B 1106.

At operation 1228, the example enterprise system B 1106 issues an entitlement request for activation of feature "B" and deactivation of feature "A" and communicates the entitlement request to the manufacturer enterprise system 1102.

At operation 1130, the example manufacturer enterprise system 1102 checks the entitlement request against one or more rules.

At operation 1132, the example manufacturer enterprise system 1102 approves the activation of feature "B' but denies the deactivation of feature "A". For example, the entitlement request analyzer 1002 may deny the deactivation of feature "A" due to the feature "A" being active in the last base state of the asset 1110.

At operation 1134, the example manufacturer enterprise system 1102 issues a license to activate feature "B" and communicates the license to the enterprise system B 1106, which provides the license (e.g., via its SDSi client agent 272) to the asset 1110.

At operation 1136, the example asset 1110 activates feature "B' by executing the license.

Figure 13:
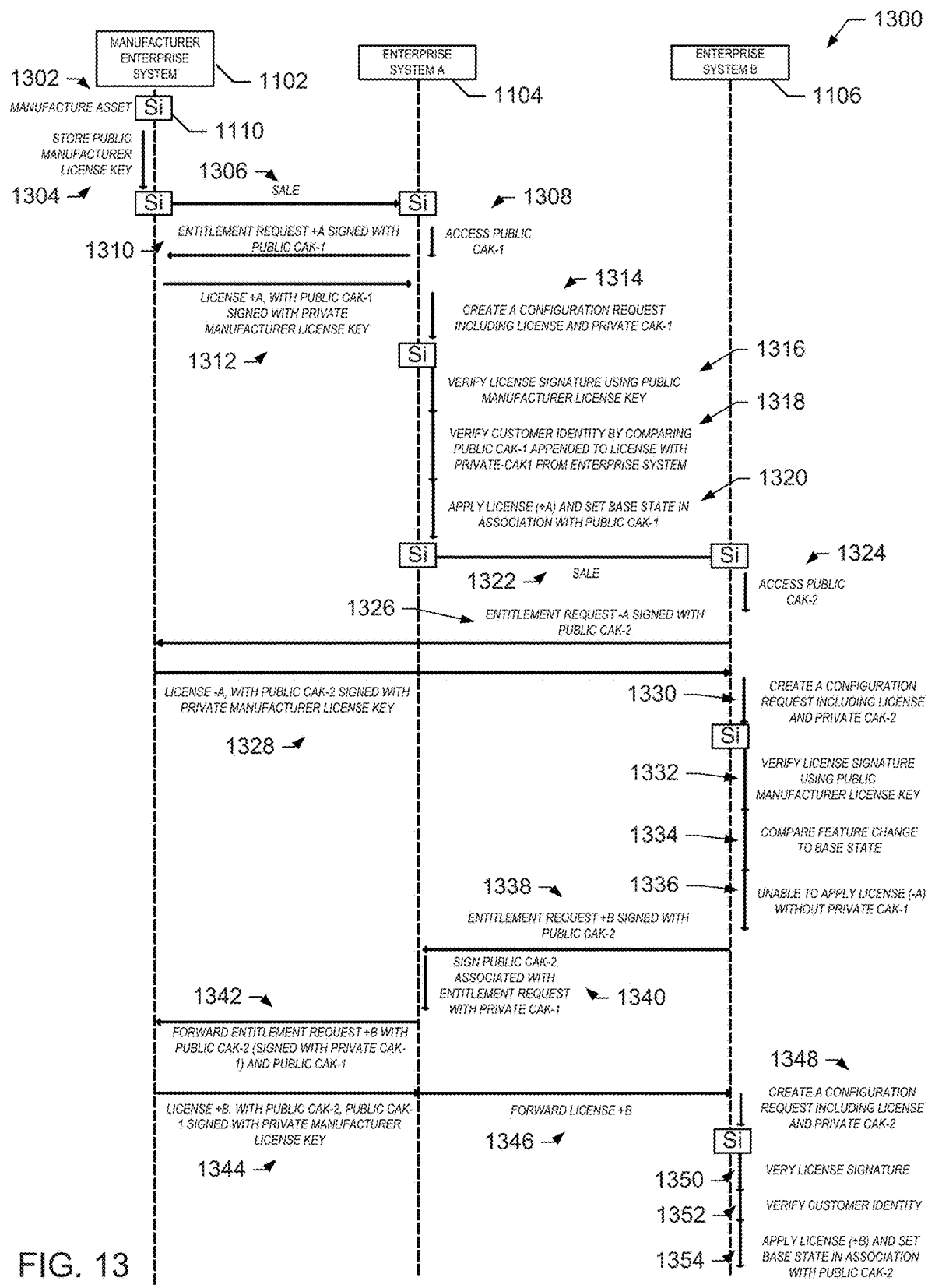
FIG. 13 illustrates a third example process flow performed by the example system of FIG. 10 to process entitlement requests using authentication keys.

FIG. 13 illustrates a third example process flow 1300 performed by the example system 1000 of FIG. 10 to process entitlement requests using authentication keys.

At operation 1302, the example manufacturer enterprise system 1102 manufacture the asset 1110. In some examples, the manufacturer enterprise system 1102 does not itself directly manufacture the asset 1110 but receives the asset from a manufacturer.

At operation 1304, the manufacturer stores the public portion of a manufacturer license key in the asset 1110. By storing this public portion of the manufacturer license key on the asset 1110, the asset 1110 can receive licenses and verify that they were issued by the manufacturer enterprise system 1102, since the manufacturer enterprise system 1102 can issue the license signed with the private portion of the manufacturer license key.

At operation 1306, the example manufacturer enterprise system 1102 transfers ownership of the asset 1110 to the enterprise system A 1104.

At operation 1308, the example enterprise system A 1104 accesses a public customer authentication key, "CAK-1," belonging to the enterprise system A 1104.

At operation 1310, the example enterprise system A 1104 submits an entitlement request for activation of feature "A" (identified in FIG. 13 as "+A") signed with the public customer authentication key, "CAK-1." The enterprise system A 1104 communicates this entitlement request to the manufacturer enterprise system 1102.

At operation 1312, the example enterprise system A 1104 issues a license for activation of feature "A" along with the public "CAK-1" key, signed with the private portion of the manufacturer's license key. The example manufacturer enterprise system 1102 communicates this license to the enterprise system A 1104.

At operation 1314, the example enterprise system A 1104 creates a configuration request including the license and the private portion of the authentication key, "CAK-1." The enterprise system A 1104 communicates the configuration request to the asset 1110.

At operation 1316, the example asset 1110 verifies the license signature using the public manufacturer license key (e.g., the public portion of the manufacturer license key that was stored at the time of manufacture, in operation 1304).

At operation 1318, the example asset 1110 verifies the customer identity by comparing the public authentication key "CAK-1" appended to the license with the private authentication key "CAK-1" included in the configuration request from the enterprise system A 1104.

At operation 1320, the example asset 1110 applies the license to activate feature "A" and sets the base state of the asset in association with the public authentication key "CAK-1." The base state indicates that feature "A" is activated, and by associating this base state with the public authentication key "CAK-1," the base state and its features are bound to the enterprise system A 1104.

At operation 1322, ownership of the example asset 1110 is transferred to the enterprise system B 1106.

At operation 1324, the example enterprise system B 1106 accesses its public authentication key, "CAK-2."

At operation 1326, the example enterprise system B 1106 submits an entitlement request for deactivation of feature "A" signed with the public authentication key "CAK-2." The enterprise system B 1106 communicates the entitlement request for deactivation of feature "A" to the manufacturer enterprise system 1102.

At operation 1328, the example manufacturer enterprise system 1102 issues a license for deactivation of feature "A" with public authentication key "CAK-2" and signed with the private manufacturer license key. In the illustrated process flow 1300 of FIG. 13, the manufacturer enterprise system 1102 does not check the base state of the asset 1110 and does not check one or more rules against the base state prior to issuing the license. In some examples, the manufacturer enterprise system 1102 compares the base state of the asset, features being requested (e.g., for activation or deactivation), the identity of the customer making the request (e.g., based on a customer authentication key), and/or other factors to determine whether to issue the license in response to the entitlement request.

At operation 1330, the example enterprise system B 1106 creates a configuration request including the license and the private authentication key "CAK-2" belonging to the enterprise system B 1106. The example enterprise system B 1106 communicates the configuration request to the asset 1110.

At operation 1332, the example asset 1110 verifies the license signature using the public portion of the manufacturer license key.

At operation 1334, the example asset 1110 compares the feature change (deactivation of feature "A") with the base state of the asset 1110.

At operation 1336, the example asset 1110 determines it is unable to apply the license to deactivate feature "A" without the private portion of "CAK-1," since the base state in which feature "A" was enabled was set by the customer corresponding to the authentication key "CAK-1."

At operation 1338, the example enterprise system B 1106 submits an entitlement request for activation of feature "B" with the public portion of the authentication key "CAK-2." The enterprise system B 1106 submits the entitlement request to the enterprise system A 1104, rather than directly to the manufacturer enterprise system 1102.

At operation 1340, the example enterprise system A 1104 signs the public portion of the authentication key "CAK-2" with the private portion of the authentication key "CAK-1," belonging to the enterprise system A 1104.

At operation 1342, the example enterprise system A 1104 forwards the entitlement request for activation of feature "B" with the public authentication key "CAK-2" (signed with private authentication key "CAK-1") and the public authentication key "CAK-1" to the manufacturer enterprise system 1102.

At operation 1344, the example manufacturer enterprise system 1102 issues a license for activation of feature "B" signed with the private manufacturer license key, along with the public authentication key "CAK-2," and the public authentication key "CAK-1." The manufacturer enterprise system 1102 communicates this license to the enterprise system A 1104.

At operation 1346, the example enterprise system A 1104 forwards the license for activation of feature "B" to the enterprise system B 1106. In some examples, the enterprise system A 1104 is able to identify that the license should be forwarded, and to which entity it should be forwarded, based on (1) the authentication keys that have been provided in association with the license and/or (2) the previous sharing of public authentication keys between the entities.

At operation 1348, the example enterprise system B 1106 creates a configuration request including the license and the private authentication key "CAK-2." The enterprise system B 1106 communicates the license and the authentication key to the asset 1110.

At block 1350, the example asset 1110 verifies the license signature using the public manufacturer license key (e.g., the public portion of the manufacturer license key that was stored at the time of manufacture, in operation 1304).

At block 1352, the example asset 1110 verifies the customer identity by comparing the public authentication key "CAK-2" appended to the license with the private authentication key "CAK-2" included in the configuration request from the enterprise system A 1104.

At operation 1354, the example asset 1110 applies the license to activate feature "B" and sets the base state of the asset in association with the public authentication key "CAK-2." The base state indicates that feature "B" is activated, and by associating this base state with the public authentication key "CAK-2," the base state and its features are associated with the enterprise system B 1106.

Figure 14:
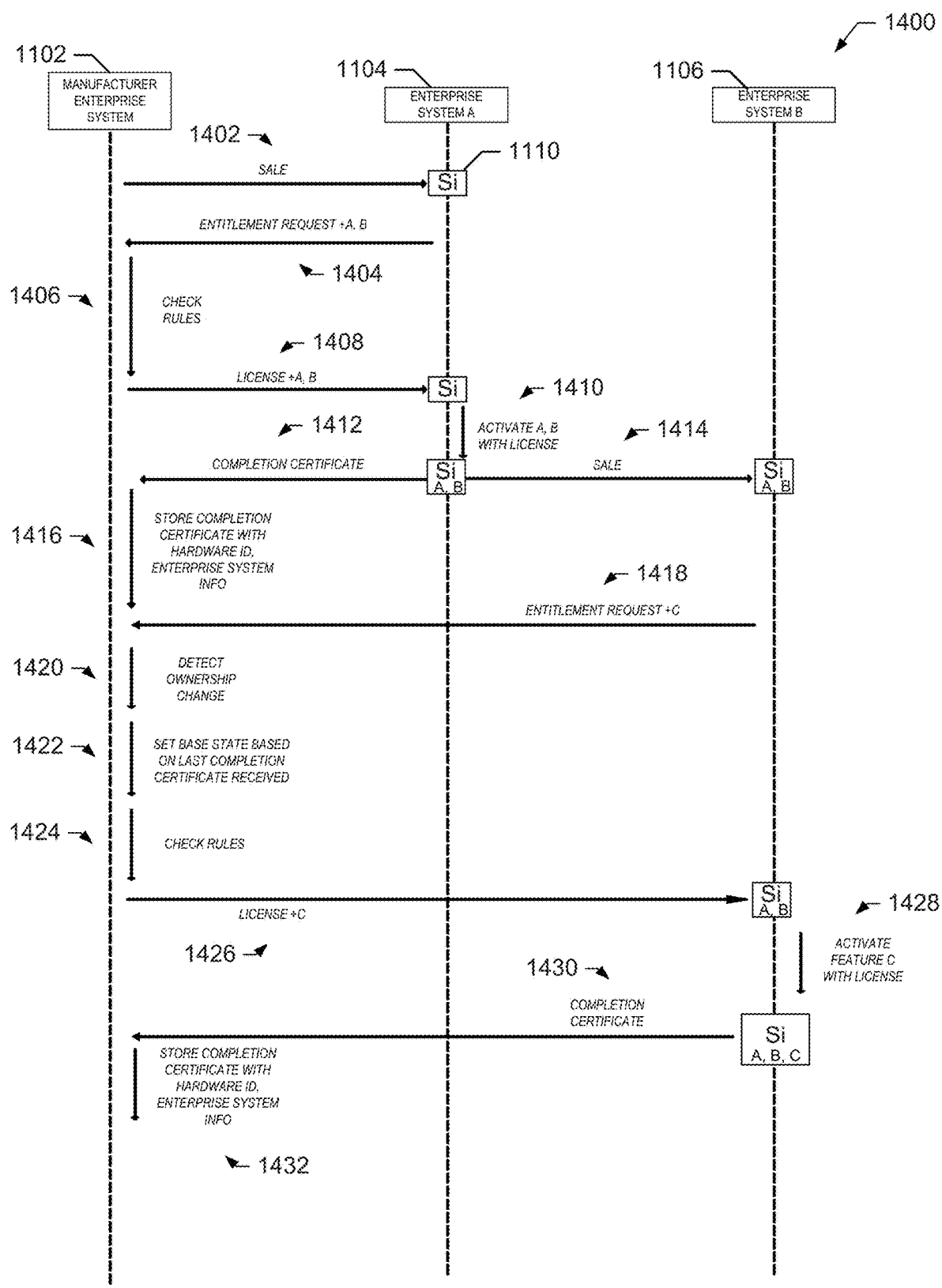
FIG. 14 illustrates a fourth example process flow performed by the example system of FIG. 10 to process entitlement requests using completion certificates.

FIG. 14 illustrates a fourth example process flow 1400 performed by the example system 1000 of FIG. 10 to process entitlement requests using completion certificates.

At operation 1402, the example manufacturer enterprise system 1102 transfers ownership of the asset 1110 to the enterprise system A 1104.

At operation 1404, the example enterprise system A 1104 submits an entitlement request to activate features "A," and "B." The example enterprise system A 1104 communicates the entitlement request to the manufacturer enterprise system 1102.

At operation 1406, the example manufacturer enterprise system 1102 checks rules associated with entitlement requests to determine whether the entitlement request for activation of features "A" and "B" should be granted.

At operation 1408, the example manufacturer enterprise system 1102 issues a license to activate features "A" and "B." The manufacturer enterprise system 1102 communicates the license to the enterprise system A 1104, which provides the license (e.g., via its SDSi client agent 272) to the asset 1110.

At operation 1410, the example asset 1110 activates features "A" and "B" by executing the license.

At operation 1412, the example asset 1110 generates a completion certificate including information describing the activation of features "A" and "B" on the asset 1110. In some examples, the asset 1110 communicates the completion certificate to the enterprise system A 1104. In some examples, the asset 1110 communicates the completion certificate to the manufacturer enterprise system 1102.

At operation 1414, the example enterprise system A 1104 transfers ownership of the asset 1110 to the enterprise system B 1106.

At operation 1416, the example manufacturer enterprise system 1102 stores the completion certificate along with a hardware identifier (corresponding to the asset 1110) and/or enterprise system information (corresponding to the enterprise system A 1104).

At operation 1418, the example enterprise system B 1106 submits an entitlement request to the manufacturer enterprise system 1102 for activation of feature "C."

At operation 1420, the example manufacturer enterprise system 1102 detects an ownership change based on identification information provided with the entitlement request for activation of feature "C."

At operation 1422, the example manufacturer enterprise system 1102 sets the base state based on the last completion certificate received. For example, the license data store 1006 can utilize the completion certificate previously received (e.g., at operation 1412) to determine which features are active on the asset and store a base state for the asset in response to detecting a change in ownership (e.g., at operation 1420).

At operation 1424, the example manufacturer enterprise system 1102 checks the entitlement request against one or more rules.

At operation 1426, the example manufacturer enterprise system 1102 generates a license to activate feature "C." The example manufacturer enterprise system 1102 communicates the license to the enterprise system B 1106, which provides the license (e.g., via its SDSi client agent 272) to the asset 1110.

At operation 1428, the asset 1110 activates feature "C" by executing the license.

At operation 1430, the example enterprise system B 1106 generates a completion certificate corresponding to activation of feature "C," and communicates the completion certificate to the manufacturer enterprise system 1102.

At operation 1432, the example manufacturer enterprise system 1102 stores the completion certificate along with a hardware identifier (corresponding to the asset 1110) and/or enterprise system information (corresponding to the enterprise system A 1104).

While example manners of implementing the example manufacturing enterprise system 110 and the example SDSi asset agent 140 are illustrated in FIGS. 10-14 one or more of the elements, processes and/or devices illustrated in FIGS. 10-14 may be combined, divided, re-arranged, omitted, eliminated and/or implemented in any other way. Further, the example entitlement request analyzer 1002, the example license generator 1004, the example license data store 1006, the example identifier database 1008, the example hardware identifier manager 1010, the example entropy identifier generator 1012, the example certificate manager 1014, the example license manager 1016, the example authentication analyzer 1018, the example feature activator 1020 and/or, more generally, the example manufacturing enterprise system 110 and the example SDSi asset agent 140 of FIG. 10 may be implemented by hardware, software, firmware and/or any combination of hardware, software and/or firmware. Thus, for example, any of the example entitlement request analyzer 1002, the example license generator 1004, the example license data store 1006, the example identifier database 1008, the example hardware identifier manager 1010, the example entropy identifier generator 1012, the example certificate manager 1014, the example license manager 1016, the example authentication analyzer 1018, the example feature activator 1020 and/or, more generally, the example manufacturing enterprise system 110 and the example SDSi asset agent 140 of FIG. 10 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example entitlement request analyzer 1002, the example license generator 1004, the example license data store 1006, the example identifier database 1008, the example hardware identifier manager 1010, the example entropy identifier generator 1012, the example certificate manager 1014, the example license manager 1016, the example authentication analyzer 1018, and/or the example feature activator 1020 is/are hereby expressly defined to include a non-transitory computer readable storage device or storage disk such as a memory, a digital versatile disk (DVD), a compact disk (CD), a Blu-ray disk, etc. including the software and/or firmware. Further still, the example manufacturing enterprise system 110 and the example SDSi asset agent 140 may include one or more elements, processes and/or devices in addition to, or instead of, those illustrated in FIG. 10, and/or may include more than one of any or all of the illustrated elements, processes and devices.

Delegated SDSi Feature Licensing System

Figure 15:
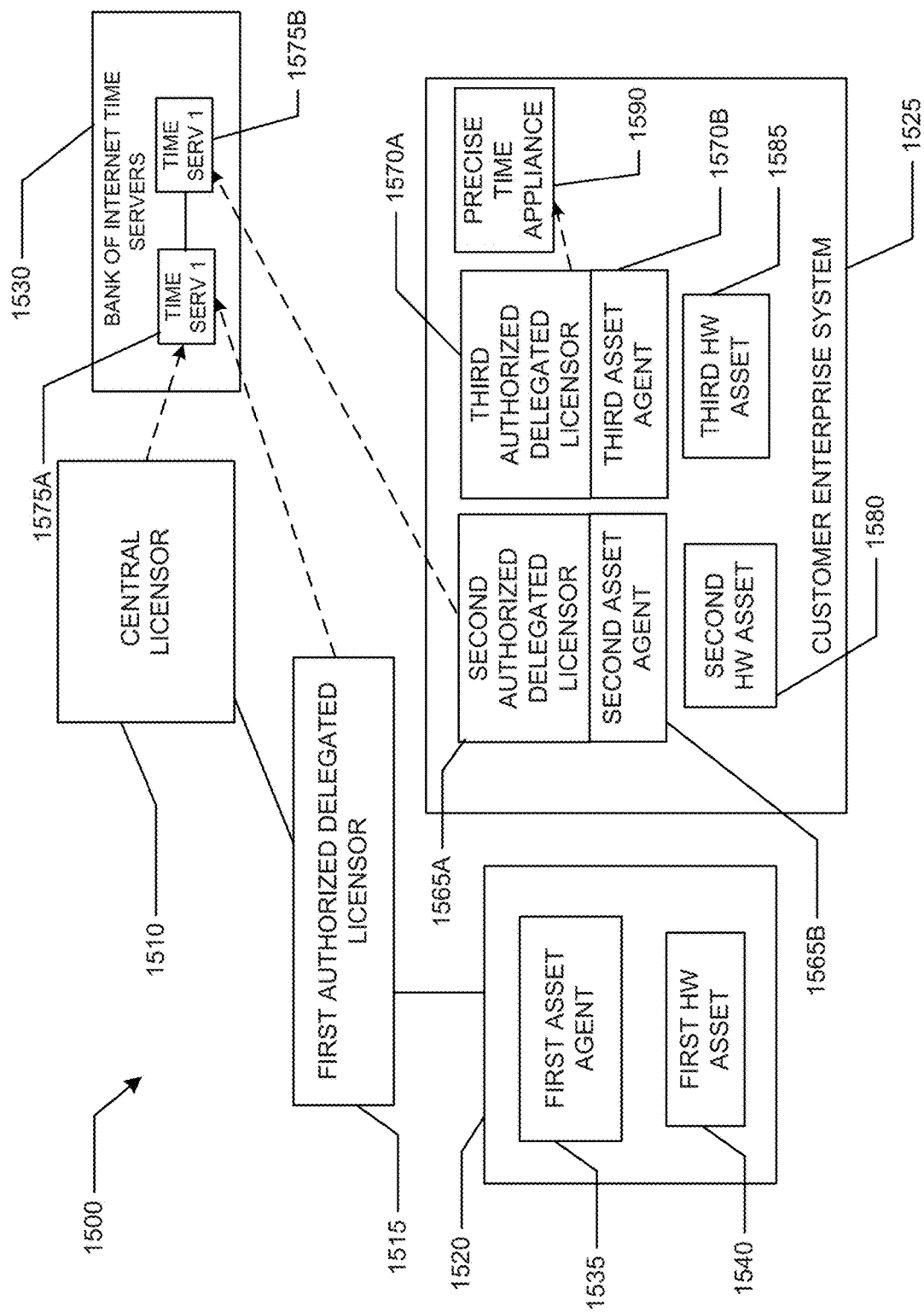
FIG. 15 is a block diagram of an example system to authorized delegated licensors to grant licenses on behalf of a manufacturer of a silicon structure in accordance with teachings of this disclosure.

A block diagram of an example SDSi delegated licensing system 1500 is illustrated in FIG. 15 and includes an example central licensor 1510, a first example authorized delegated licensor 1515, an example SDSi product 1520, an example customer enterprise system 1525, and an example bank of internet time servers 1530 having example first and second time servers (Time Serv 1 1575A, and Time Serv 1 1575B). In some examples, the SDSi product 1520 includes an example first asset agent 1535, and an example first hardware asset 1540. In some examples, the customer processing site 1525 can include example second, and third authorized delegated licensors 1565A, 1570A associated with example second and third asset agents 1565B, 1570B, and further associated with example second and third hardware assets 1580, 1585. The customer enterprise system 1525 further includes a precise time appliance 1590.

In some examples, the example central licensor system 1500 operates to delegate, to third parties, an ability to issue SDSi licenses for SDSi products. In the example central licensor system 1500, such third parties are associated with the example first authorized delegated licensor 1515, the example second authorized delegated licensor 1565A, and/or the example third authorized delegated licensor 1570A. In some examples, the central licensor 1510 undertakes one or more tasks to determine which third parties are to be granted status as an authorized delegated licensor as disclosed further below. And, in some examples, any licenses generated by any of the first authorized delegated licensor 1515, the second authorized delegated licensor 1565, the third authorized delegated licensor 1570, etc. include a sequence number based on a timestamp collected from the bank of internet time servers 1530 or the example precise time appliance 1590. As further described below, the sequence numbers are used to ensure that a most recently issued license concerning a feature of an asset is applied instead of an outdated/expired license concerning the same feature (e.g., enabling the feature, or replacing the feature or disabling the feature) of the same asset. By using a timestamp to generate a sequence number and using the sequence numbers to identify a license, an asset manager can license a feature to a hardware asset even while the asset agent is not coupled to the internet. This is made possible because, after internet (or other network communication) is restored, the license having the sequence number can be sent to the manufacturer enterprise system 110 (along with other granted licenses) and used by the manufacturer to determine whether the license is the most recently granted and therefore valid or whether the license is, instead, invalid.

Figure 16:
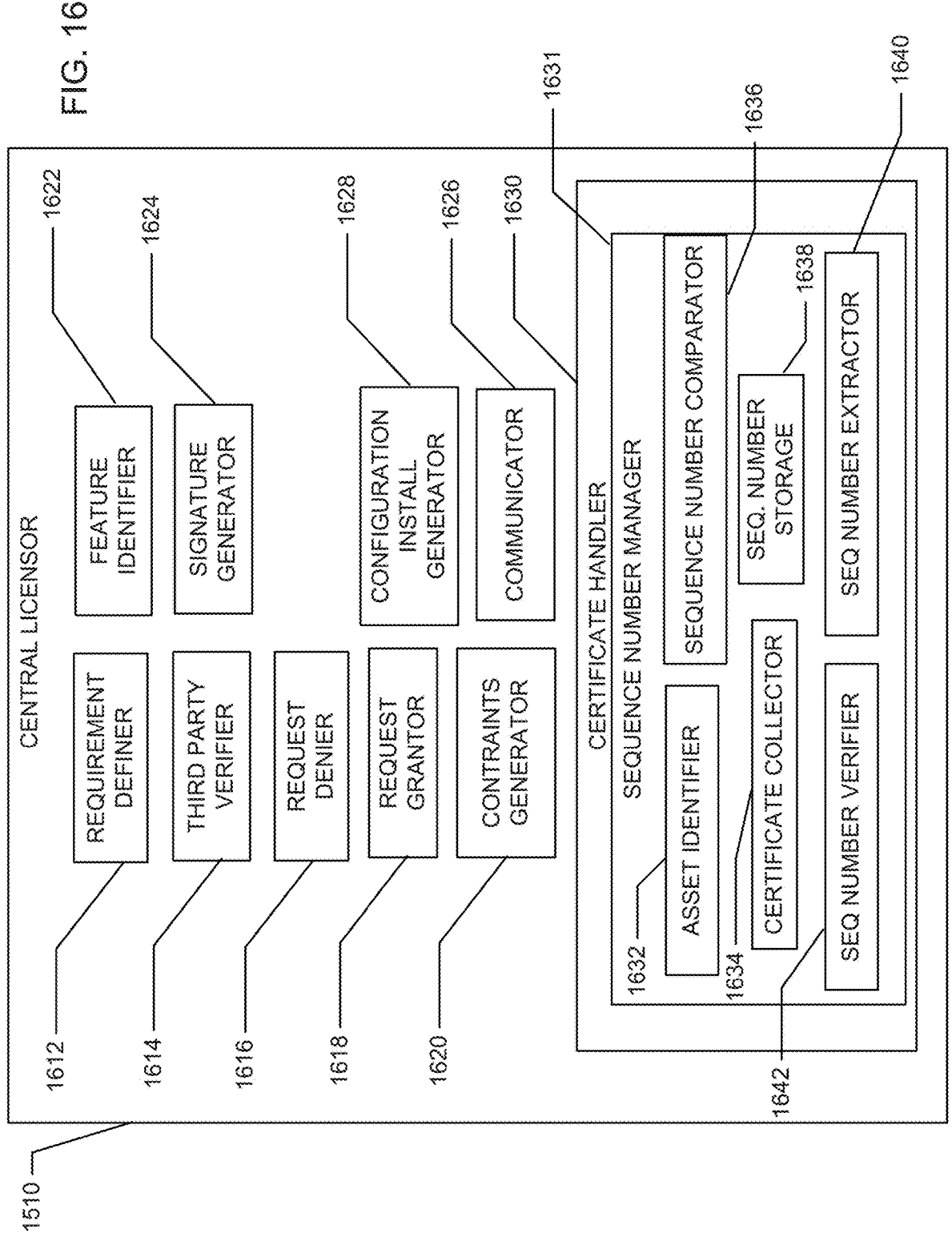
FIG. 16 is a block diagram illustrating an example central licensor of an example manufacturer enterprise system that is delegate the ability to grant licenses to features of the silicon structure on behalf of the manufacturer.

A block diagram of the example central licensor 1510 of FIG. 15 implemented to delegate licensing of SDSi product features in accordance with the teachings of this disclosure is illustrated in FIG. 16. In some examples, the central licensor 1510 includes an example requirement definer 1612, an example third party verifier 1614, an example request denier 1616, an example request grantor 1618, an example constraints generator 1620, an example feature identifier 1622, an example signature generator 1624, an example communicator 1626, an example configuration installation generator 1628, and an example certificate processor 1630. In some examples, the certificate processor 1630 includes an example sequence number manager 1631, an example asset identifier 1632, an example certificate collector 1634, an example sequence number comparator 1636, an example storage 1638, an example sequence number extractor 1640, and an example sequence number verifier 1642. In some examples, the central licensor 1510 can be implemented in the SDSi feature management system 256 (FIG. 1) of the example manufacturer enterprise system 110 (FIG. 1). Also, or instead, the central licensor system 1510 (or components thereof) can be implemented in a separate processor platform or product in communication with the example customer enterprise system 115 (FIG. 1) and/or in communication with the example first example asset agent 1535, the second example asset agent 1565B, and/or the third example asset agent 1570B of FIG. 15.

In some examples, the example requirement definer 1612 of the example central licensor 1510 defines requirements to be satisfied by any third party seeking to obtain authorized delegated licensor status. When a request from a third party to obtain such status is received, the example third party verifier 1614 determines whether the third party has credentials that satisfy the requirements defined by the requirement definer 1612. In some examples, the third party supplies such credentials in or with the request for licensor status and/or via a separate communication. In some examples, the third party credentials are already known to the example central licensor 1510 as being associated with purchasers of one or more SDSi products, for example. When the third party verifier 1614 determines that the defined requirements are satisfied, the example request grantor 1618 notifies the third party that the request has been granted. When the third party verifier 1614 determines that the requirements are not satisfied, the example request denier 1616 notifies the third party that the request has been denied.

In some examples, when authorized delegated licensor status is granted to a third party, the example constraints generator 1620 generates one or more constraints that can be used to restrict (or otherwise define/limit) the types of licenses that can granted, the SDSi products for which a license may be granted, the duration of any granted licenses, a geographic area within which an asset is to reside before a license is granted, etc. In some examples, the example feature identifier 1622 identifies one or more specific features that can be granted by the authorized delegated licensors (ADL(s)) (e.g., of the first, second and/or third ADLs 1515, 1565A, 1570A) or by specific ones of the first, second and/or third ADLs 1515, 1565A, 1570A.

In some examples, the example signature generator 1624 generates a script or code to be used by any of the example first, second and/or third ADLs 1515, 1565A, 1570A when granting a license. In some examples, a unique signature code/script is generated for each third party granted authorized licensor status. The generated example signature code/script is supplied to the first, second and/or third ADLs 1515, 1565A, 1570A associated with the request for authorized license status that is currently being processed. As described further below, the generated signature script/code is used to sign any licenses granted by the unique ones of the first, second and/or third ADLs 1515, 1565A, 1570A (of a third party(ies)).

In some examples, the example configuration installation generator 1628 of the example central licensor 1510 generates script/code that, when executed by a hardware asset, (e.g., any of the first, second, and/or third hardware assets 1540, 1580, 1585) will, in some examples, enable or disable (or perform any other function with respect to) a feature of the hardware asset executing the script/code. To ensure that the configuration installation script/code remains secure from access by the ADL (e.g., any of the first, second, and/or third hardware assets 1540, 1580, 1585), the configuration installation script/code can be encrypted by the configuration installation generator 1628 (FIG. 2) in a manner such that the hardware asset can decrypt the configuration installation script/code but the ADL lacks decryption information needed to access the script/code.

In some examples, information to be used by the third party granted status as an ADL is provided to the third party by the example communicator 1626. In some examples, such information can include information identifying features for which the third party granted status as an ADL can issue licenses, the unique signature script/code to be used by the ADL when issuing a license, the configuration installation information by which a feature can be enable, disabled, etc., and information identifying the constraints/limits governing the licensing activities of the newly granted ADL (e.g., any of the example first, second and/or third ADLs 1515, 1565A, 1570A).

In some examples, the example certificate handler 1630 of the example central licensor 1510 receives a certificate from a consumer of a license (e.g., the customer enterprise system 115 of FIG. 1). In some such examples, the certificate handler 1630 can include any components needed to examine information included in the certificate and can use such information to determine whether any action should be taken in response to the information included in the certificate (e.g., whether the license associated with the certificate is valid, whether the license should be revoked, whether a cost for the license is to be billed to the consumer, etc.) In some examples, the incoming certificate includes an example sequence number. In some such examples, the example sequence number manager 1631 performs one or more tasks to ensure the sequence number is associated with a valid license, a valid licensor, etc. In some example, the example certificate collector 1634 collects the incoming certificate and the example sequence number extractor 1640 extracts the sequence number of the license associated with the incoming certificate. The example asset identifier 1632 uses information in the certificate to determine one or more of the hardware assets that consumed the license associated with the incoming certificate, the identity of the consumer (e.g., the third party) of the license, whether the license of the certificate was issued by an ADL, etc. In some such examples, some or all of the information may be encoded or otherwise included in the sequence number of the certificate. In some examples, the information may be stored as a separate field of the certificate and not included in the sequence number. Using the identity of the hardware asset (or any of the other information included in the certificate) that consumed the license, the asset identifier 1632 accesses the sequence number storage 1638 to determine a preceding, most recently granted license consumed by the hardware asset and a feature effected by the license to determine a sequence number associated with the preceding, most recently granted license consumed by the same hardware asset for the same feature. The example sequence number comparator 1636 compares the example sequence number associated with the certificate currently being handled by the certificate handler 1630 to the sequence number associated with the preceding, most recently granted license consumed by the same hardware asset for the same feature. When the sequence number comparator 1636 determines the example sequence number verifier was issued more recently than the license most recently issued, the sequence number verifier 1642 notifies other components of the certificate handler that the license associated with the certificate was validly issued so that the certificate can be handled by other components of the certificate handler in the manner described above. When the sequence number comparator 1636 determines the example sequence number verifier 1642 was not issued more recently than the previously issued license, the license is deemed invalid and the certificate handler and the sequence number verifier notifies other components of the certificate handler 1630 that the license associated with the certificate was outdated/expired/invalid so that the license associated with the certificate can be revoked or other appropriate action can be taken.

Figure 17:
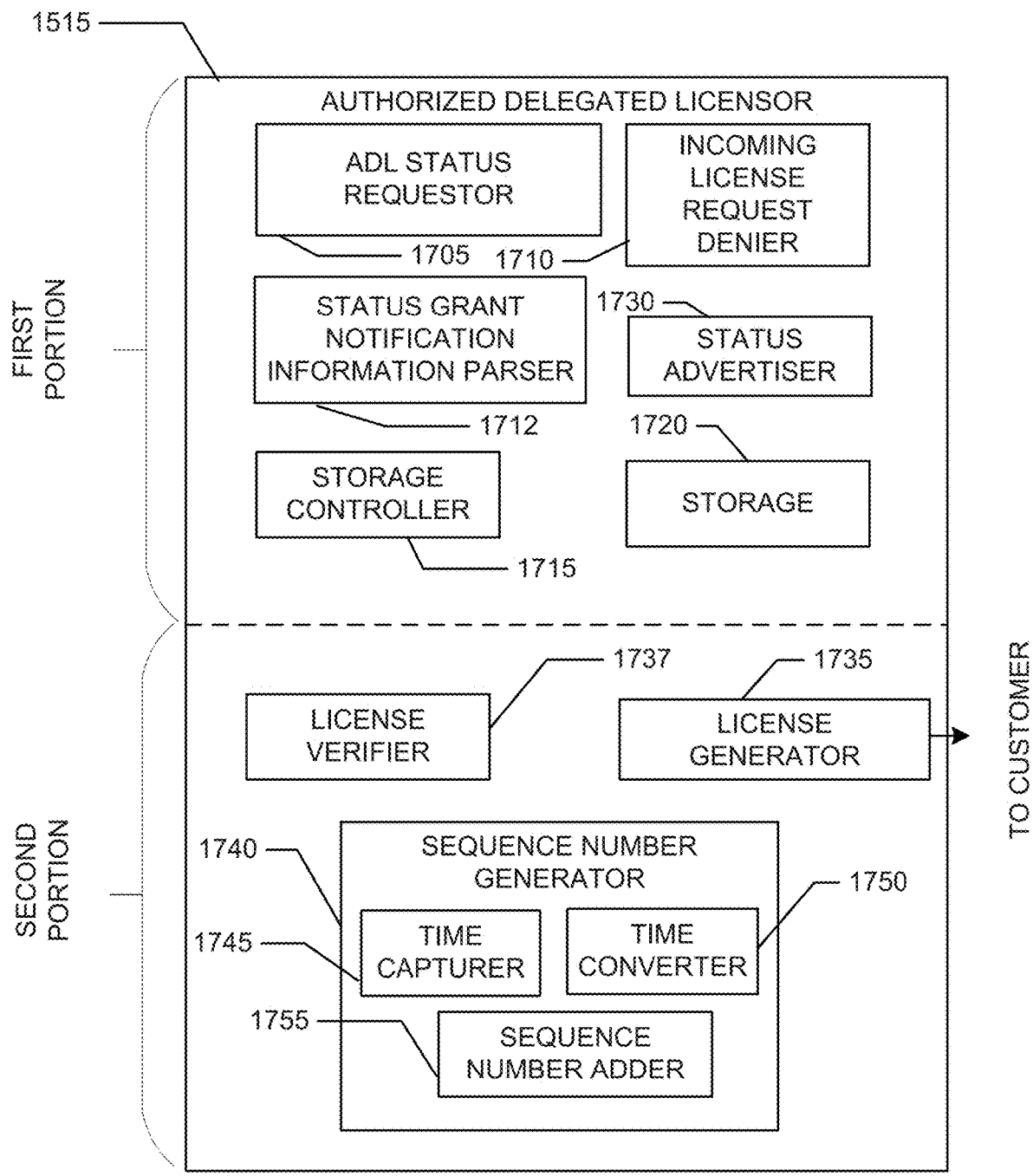
FIG. 17 illustrates an authorized delegated licensor that can be given the ability to grant licenses on behalf of the central licensor of FIG. 16.

FIG. 17 is a block diagram of the example first ADL 1515 of FIG. 15 implemented to delegate licensing of SDSi product features in accordance with the teachings of this disclosure. In some examples, the ADL 1515 includes an example first portion that performs requests to achieve status as an ADL, and an example second portion that manages incoming license requests (assuming ADL status has been achieved/granted). In some examples, the first portion of the ADL 1515 includes an example ADL status requestor 1705, an example incoming license request denier 1710, an example status grant notification information parser 1712, an example storage controller 1715, an example storage 1720, an example decryptor 1725, and an example status advertiser 1730. In some examples, the second portion includes an example license generator 1735, an example license verifier 1737, and an example sequence number generator 1740 having an example time capturer 1745, an example time converter 1750, and an example sequence number adder 1755. In some examples, the ADL 1515 can be implemented in the SDSi client asset agent 140 of the example manufacturer enterprise system 110 (FIG. 1). Also, or instead, the ADL 1515 (or components thereof) can be implemented in a separate processor platform or product of a third party and in communication with the example customer enterprise system 115 (FIG. 1) and/or the example asset agent 140 of FIG. 1.

In some examples, the example ADL status requestor 1705 of the first portion generates a request to become an ADL (e.g., to have status as an ADL). The request can include information about the third party associated with the ADL 1515 including the information described with respect to FIG. 2. The request is communicated to the example central licensor 1510 (FIG. 15 and FIG. 16). The central licensor 1510 processes the request in the example manner described above with respect to FIG. 16. Assuming the request is denied, the example ADL status requestor 1705 receives a denial, and the ADL status requestor 1705 notifies the example incoming license request denier 1710. As a result, any incoming requests for a license received from any customer (e.g., the customer enterprise system 115 (FIG. 1) are denied (on the basis that the ADL 1515 is not, in fact, authorized to grant such licenses).

Assuming the request is granted, the example ADL status requestor 1705 relays a grant notification to the example status grant notification information parser 1712 of the example second portion. The example grant notification is received, for example, from the central licensor 1510 and indicates that status as an ADL has been granted/achieved. The grant notification received by the status grant notification information parser 1712 can include (or is followed by a communication that includes) information to be used by the second portion of the ADL 1515 to grant (or deny) licenses. In some examples, the information received in connection with the grant notification is parsed by the status grant notification information parser 1712. The information can be parsed to identify information included in the notification such as a set of example constraints, a set of example feature identifiers, first example script/code that can be used to generate a license signature that is unique to the ADL 1515, second example script/code that is encrypted and that can be used to enable/disable a feature(s) of a hardware agent associated with a license request received from a customer in the future, etc. In some examples, the grant notification is cryptographically signed (certified) by the central licensor 1510 so that the hardware asset can verify that the notification come from a legitimate source (e.g., the central licensor 1510) (instead of a spoof by a rogue ADL).

The example storage controller 1715 causes the parsed information to be stored in the example storage 1720 for use by the example license generator 1735 when generating (or denying) a license in response to a customer request for a license. An example advertiser 1730 notifies specific ones of the identified customers (or any customers), for example, to which the ADL 1515 has the ability and authority to grant feature licenses (e.g., has been granted authorized licensor status).

In some examples, when a request for a license is received at the ADL 1515 from a customer (e.g., the customer enterprise system 115 of FIG. 1), the example license verifier 1737 compares the information included in the license request (e.g., the feature for which a license is requested, information about the customer requesting the license, information about where the hardware asset of the customer is geographically located, etc.), to information stored in the example storage 1720 (e.g., constraints stored in the storage 1720, feature identities stored in the storage 1720, a geographical region stored in the storage, etc.). Based, as least in part, on the comparison, the license verifier 1737 determines whether the license request violates any constraints, whether the feature for which the license is requested is among the features that the ADL 1515 is permitted to license, whether a grant of the license will violate any technology export laws based on geography, etc. In some examples, the criteria/conditions in the storage 1720 are not satisfied and the license verifier 1737 communicates to the customer making the license request that the request is denied. The license verifier 1737 can also communicate information identifying violated constraints or any other reasons the license request is denied. In some examples, the license verifier 1737 verifies the credentials of the customer (using, for example signatures) and, if applicable, a sequence number associated with the requested license.

When the criteria/conditions in the example storage 1720 are satisfied (e.g., none of the constraints are violated, the customer requesting the license is within an acceptable geographical region, the feature for which the license is being requested is among the features identified as being licensable, the customer is among a list of customers to whom the example ADL 1515 can grant a license, etc.), the example license verifier 1737 grants the license and notifies the example license generator 1735. The license generator can then proceed to generate the license and communicate the license to the example customer (e.g., the customer enterprise system 115 of FIG. 1). In some examples, when generating the license, the license generator 1735 can activate the example sequence number generator 1740. In response to the activation, the example time capturer 1745 of the sequence number generator 1740 captures a time at which the license is generated. The example time converter 1750 converts the captured time to a sequence number and the example sequence number adder 1755 causes the license generator 1735 to add the sequence number to the license to be generated. As described in further detail above, in some examples, a certificate generated when the license is activated/consumed includes the unique sequence number. In some such examples, the example central licensor 1510 (FIG. 15) can use the sequence number (and information included in the certificate concerning the license) to verify that the license associated with the certificate is the most recently recorded license for that feature and for the hardware asset that consumed the license as described above.

Figure 18:
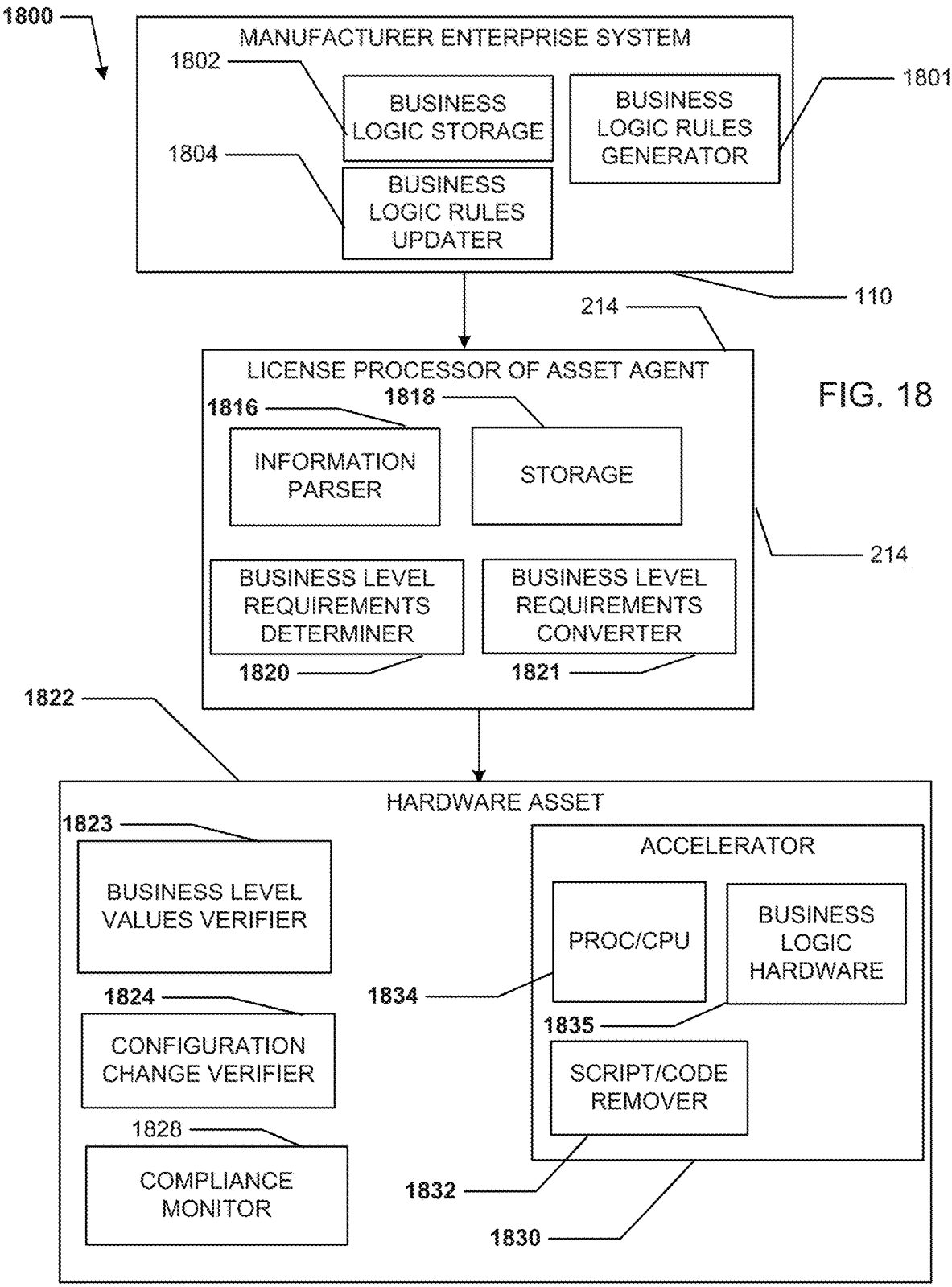
FIG. 18 illustrates an example system by which business rules can be hardcoded into the silicon structure.

FIG. 18 is a block diagram of an example system 1800 to implement an example portion of the example manufacturer enterprise system 110 (FIG. 1), an example portion of the example license processor 214 (FIG. 2) of the example asset agent 140 (FIG. 1 and FIG. 2), and an example portion 1822 of the hardware asset (e.g., the second hardware asset 1580)

in accordance with the teachings of this disclosure. In some examples, the system 1800 enables the changing of business logic rules that are to be applied to a license granted to a hardware asset. In some examples, the example system 1800 permits the altering of business logic in a hardware asset that, in the past, would be hardcoded and, thus, static and unmodifiable. The system 1800 of FIG. 18 permits such rules to be changed in accordance with the teachings of this disclosure.

Referring still to FIG. 18, in some examples, the example manufacturer enterprise system 110 includes an example business logic rules generator 1801, an example business logic rules storage 1802, and an example business logic rules updater 1804. In some examples, the example manufacturer enterprise system 110 can be implemented as an ADL. In some examples, the example license processor 214 of the example asset agent 140 includes an example information parser 1816, an example storage 1818, an example business level requirements determiner 1820, and an example business level requirements converter 1821. In some examples, an example hardware asset 1822 (which can be used to implement any of the example first, second and/or third hardware assets 1540, 1565B, 1570B (FIG. 15)) associated with any of the example first, second and/or the third asset agents 1535, 1565B, 1570B of FIG. 15 includes an example business level values verifier 1823, an example configuration change verifier 1824, an example compliance monitor 1828, and an example accelerator 1830 having an example script/code remover 1832, and an example CPU 1834, and example business logic hardware 1835. In some examples, the hardware asset may contain the CPU 1834 as illustrated. In some examples, the hardware asset may itself be a CPU (e.g., can be a physical device apart from any main CPU cores that execute user's programs and that include multiple additional modules/subsystems capable of executing non-user code/firmware). Such modules can be used to manage the CPU (for example, power mgmt, capabilities, etc.). In some examples, one of such modules may be used to execute the script/code.

In some examples, the example business logic storage 1802 of the example manufacturer enterprise system 110 stores business logic that includes example business logic rules. Such rules can include any of various types of rules including, in some examples, permitted durations of licenses permitted for various features, permitted export rules identifying geographical regions for which license are not permitted, a number of times a license can be granted to particular (or any customers) for one or more hardware assets, penalties for noncompliance, a maximum frequency at which features can be changed, feature(s) that, when activated, can only be activated in connection with other features, parties to which licenses are to be granted, etc. In some examples, the example rules of the business logic are entered by an administrator of the manufacturer enterprise system 110 and stored in the example business logic storage 1802. In some examples, the business logic (also referred to herein as business logic rules) can be generated or augmented using machine learning and stored in the example business logic storage 1802. As the business logic changes, the example business logic updater 1804 modifies the business logic stored in the business logic storage 1802 as needed to reflect the updated business logic.

In some examples, the business logic is received or from the example manufacturer enterprise system 110 (FIG. 1) or from elsewhere (e.g., the example customer enterprise), at the example license processor 214 of the asset agent 140 associated with the example hardware asset 1822 that is to incorporate the business logic. In some examples, the business logic received at the license processor 214 can be included with terms of a license to be consumed by the hardware asset or with any other information transmitted via any other communications. The example information parser 1816 of the example license processor 214 parses the business logic from any other information that may be included in the communication and stores the business logic in the example storage 1818. In some examples, the example business level requirements determiner 1820 accesses the business logic stored in the storage 1818 and determines, based on the business logic, business level requirements to be satisfied by the hardware asset when consuming a license. Provided the business level requirements are satisfied, in some examples, the example business level requirements determiner 1820 supplies the business level requirements to the example business level requirements converter 1821. The business level requirements converter 1821 converts the business level requirements to values that are interpretable by a CPU (e.g., a CPU associated with the hardware asset). In some examples, converting the values can include translating, concatenating, re-interpreting, etc., the requirements into actionable functions that are understandable and executable by a processor/CPU. The business level values are supplied to the hardware asset 1822.

In some examples, the example business level values verifier 1823 of the example hardware asset 1822 verifies that the business level values are from an authorized source. In some such examples, the business level values verifier 1823 may verify a signature included with the business level values. In some examples, the business level values verifier 1823 can perform any other tasks needed to verify the authenticity of the received business level values. Once verified, the business level values are supplied to the example configuration change verifier 1824. The configuration change verifier 1824 determines/verifies that the business level values are to affect the business level logic aspect of the hardware asset 1822 instead of (or in addition to) a feature change. In some examples, the configuration change verifier 1824, after determining/verifying that the changes are to affect the business logic of the hardware asset 1822, supplies the business level values to the example processor 1834 of the example accelerator 1830. In some examples, the processor/CPU 1834 executes the values in a manner that causes the business rules associated with the business logic to be hardcoded into the business logic hardware 1835 of the hardware asset 1822. In addition, after the process/CPU 1834 has processed the business level values, the example script/code remover 1832, causes the code executed to incorporate the business logic into the hardware asset to be removed. By removing the code, the limited space available in the hardware asset 1822 is preserved to accommodate business level logic changes that may be made in the future. In some examples, the example compliance monitor 1828 monitors the operation of the example hardware asset based on the business logic rules and can generate notifications to the asset agent for transmission to the manufacturer when noncompliance with the business logic rules is detected.

While example manners of implementing the systems 1500 are illustrated in FIGS. 15-18, one or more of the elements, processes and/or devices illustrated in FIGS. 15-18 may be combined, divided, re-arranged, omitted, eliminated and/or implemented in any other way. Further, the example central licensor 1500, the example first ADL 1515, the example SDSi Product 1520, the example customer enterprise system 1525, the example bank of internet time servers 1530, the example first asset agent 1535, the example first hardware asset 1540, the example second ADL 1565A, the example second asset agent 1565B, the third ADL 1570A, the example third asset agent 1570B, the example first time server 1575A, the example second time server 1575B, the example second hardware asset 1580, the example third asset 1585, the example precise time appliance 1590, the example requirement definer 1612, the example third party verifier 1614, the example request denier 1616, the example request grantor 1618, the example constraints generator 1620, the example feature identifier 1622, the example signature generator 1624, the example configuration install generator 1628, the example communicator 1626, the example certificate handler 1630, the example sequence number manager 1631, the example asset identifier 1632, the example certificate collector 1634, the example sequence number comparator 1636, the example sequence number storage 1638 the example sequence number extractor 1640, the example ADL status requestor 1705, the example incoming license denier 1710, the example status grant notification information parser 1712, the example storage controller 1715, the example storage 1720, the example status advertiser 1730, the example license generator 1735, the example license verifier 1737, the example sequence number generator 1740, the example time capturer 1745, the example time converter 1750, the example sequence number adder 1755, the example business logic storage, the example business logic updater 1804, the example information parser 1816, the example storage 1818, the example business level requirements determiner 1820, the example business level requirement converter 1821, the example hardware asset 422, the example business level values verifier 1823, the example configuration change verifier 1824, the example compliance monitor 1828, the example accelerator 1830, the example processor/CPU 1834, the example script/code remover 1832, the example business logic hardware 1835, and/or, more generally, the systems 1500, 1600, 1700 and/or 1800 of FIGS. 15-18 may be implemented by hardware, software, firmware and/or any combination of hardware, software and/or firmware. Thus, for example, any of the example central licensor 1500, the example first ADL 1515, the example SDSi Product 1520, the example customer enterprise system 1525, the example bank of internet time servers 1530, the example first asset agent 1535, the example first hardware asset 1540, the example second ADL 1565A, the example second asset agent 1565B, the example third ADL 1570A, the example third asset agent 1570B, the example first time server 1575A, the example second time server 1575B, the example second hardware asset 1580, the example third asset 1585, the example precise time appliance 1590, the example requirement definer 1612, the example third party verifier 1614, the example request denier 1616, the example request grantor 1618, the example constraints generator 1620, the example feature identifier 1622, the example signature generator 1624, the example configuration install generator 1628, the example communicator 1626, the example certificate handler 1630, the example sequence number manager 1631, the example asset identifier 1632, the example certificate collector 1634, the example sequence number comparator 1636, the example sequence number storage 1638 the example sequence number extractor 1640, the example ADL status requestor 1705, the example incoming license denier 1710, the example status grant notification information parser 1712, the example storage controller 1715, the example storage 1720, the example status advertiser 1730, the example license generator 1735, the example license verifier 1737, the example sequence number generator 1740, the example time capturer 1745, the example time converter 1750, the example sequence number adder 1755, the example business logic storage, the example business logic updater 1804, the example information parser 1816, the example storage 1818, the example business level requirements determiner 1820, the example business level requirement converter 1821, the example hardware asset 1822, the example business level values verifier 1823, the example configuration change verifier 1824, the example compliance monitor 1828, the example accelerator 1830, the example processor/CPU 1834, the example script/code remover 1832, the example business logic hardware 1835, and/or, more generally, the systems 1500, 1600, 1700 and/or 1800 of FIGS. 15-18 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example systems 1500, 1600, 1700 and/or 1800, the example central licensor 1500, the example first ADL 1515, the example SDSi Product 1520, the example customer enterprise system 1525, the example bank of internet time servers 1530, the example first asset agent 1535, the example first hardware asset 1540, the example second ADL 1565A, the example second asset agent 1565B, the example third ADL 1570A, the example third asset agent 1570B, the example first time server 1575A, the example second time server 1575B, the example second hardware asset 1580, the example third asset 1585, the example precise time appliance 1590, the example requirement definer 1612, the example third party verifier 1614, the example request denier 1616, the example request grantor 1618, the example constraints generator 1620, the example feature identifier 1622, the example signature generator 1624, the example configuration install generator 1628, the example communicator 1626, the example certificate handler 1630, the example sequence number manager 1631, the example asset identifier 1632, the example certificate collector 1634, the example sequence number comparator 1636, the example sequence number storage 1638 the example sequence number extractor 1640, the example ADL status requestor 1705, the example incoming license denier 1710, the example status grant notification information parser 1712, the example storage controller 1715, the example storage 1720, the example status advertiser 1730, the example license generator 1735, the example license verifier 1737, the example sequence number generator 1740, the example time capturer 1745, the example time converter 1750, the example sequence number adder 1755, the example business logic storage, the example business logic updater 1804, the example information parser 1816, the example storage 1818, the example business level requirements determiner 1820, the example business level requirement converter 1821, the example hardware asset 422, the example business level values verifier 1823, the example configuration change verifier 1824, the example compliance monitor 1828, the example accelerator 1830, the example processor/CPU 1834, and/or the example business logic hardware 1835, and/or the example script/code remover 1832 is/are hereby expressly defined to include a non-transitory computer readable storage device or storage disk such as a memory, a digital versatile disk (DVD), a compact disk (CD), a Blu-ray disk, etc. including the software and/or firmware. Further still, the example systems 1500, 1600, 1700 and/or 1800 may include one or more elements, processes and/or devices in addition to, or instead of, those illustrated in FIGS. 15-18, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowchart Introduction

Figure 19:
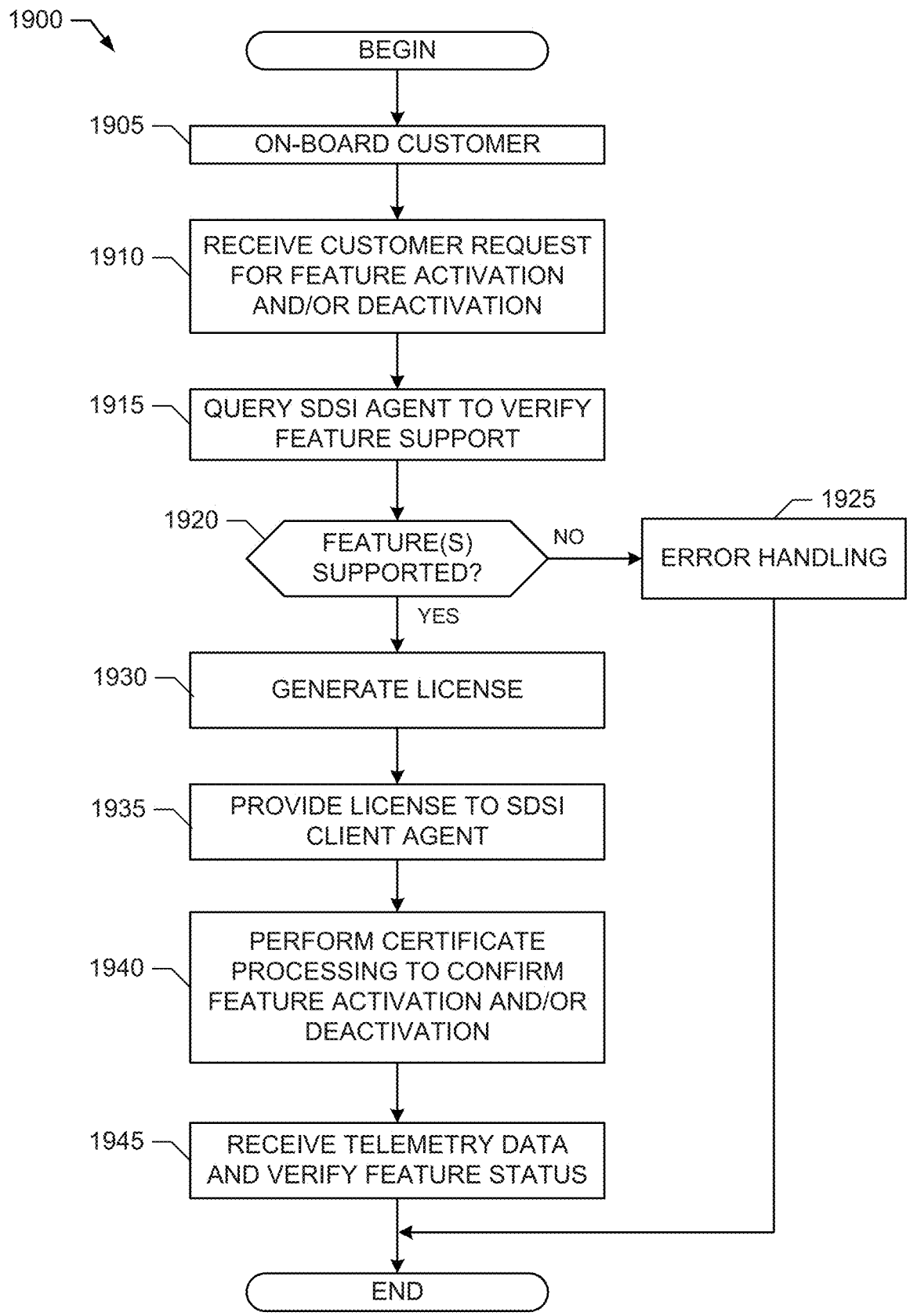
FIG. 19 is a flowchart representative of example computer readable instructions that may be executed to implement the example manufacturer enterprise system of FIGS. 1 and/or 2.
Figure 20:
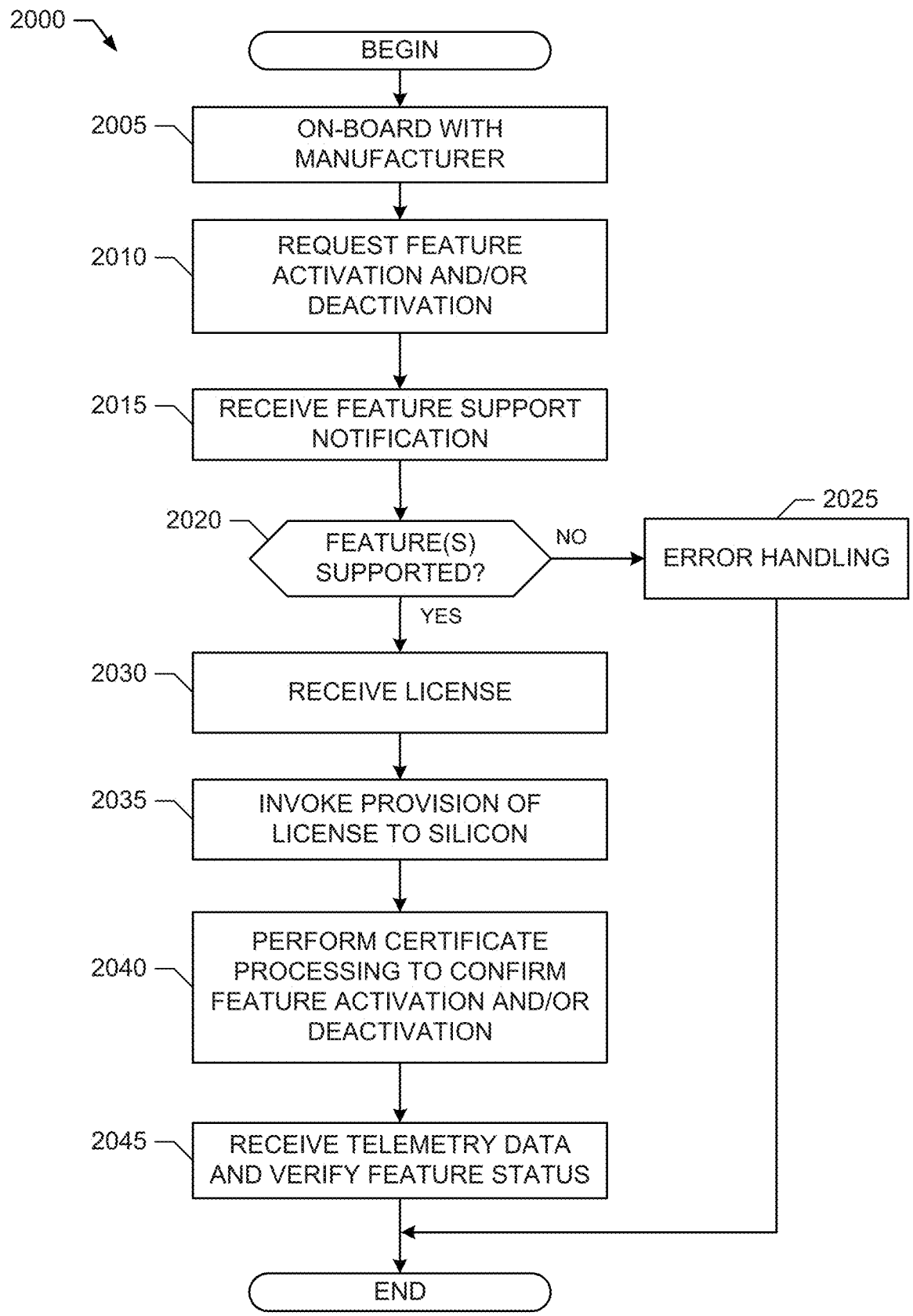
FIG. 20 is a flowchart representative of example computer readable instructions that may be executed to implement the example customer enterprise system of FIGS. 1 and/or 2.
Figure 21:
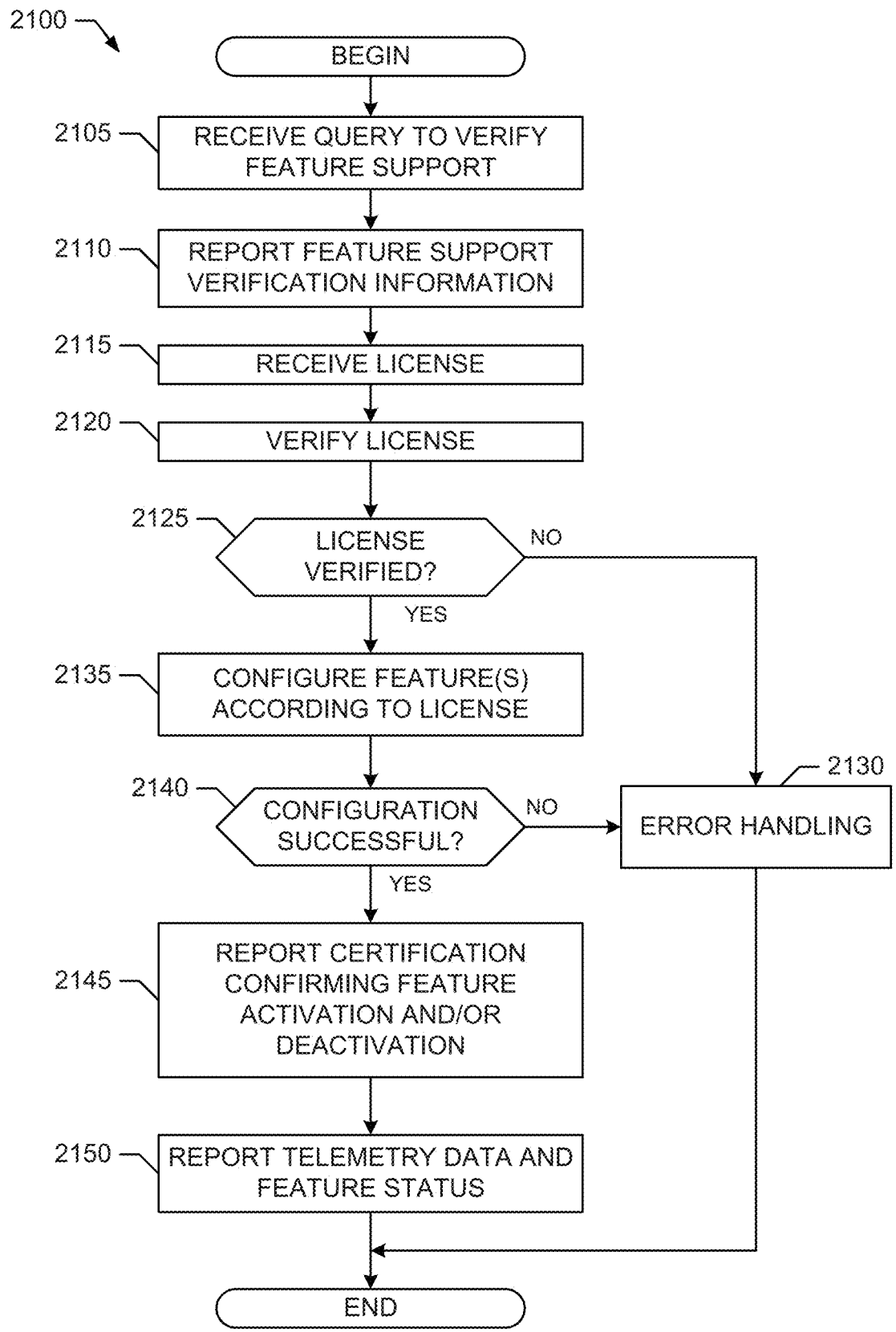
FIG. 21 is a flowchart representative of example computer readable instructions that may be executed to implement the example software defined silicon agent of FIGS. 1 and/or 2.

Flowcharts representative of example hardware logic, machine readable instructions, hardware implemented state machines, and/or any combination thereof for implementing the example systems 100 and/or 200, the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example SDSi client agent 272, the example platform inventory management service 274, the example accounts management service 276 and/or the example entitlement management service 278 are shown in FIGS. 19-21. In these examples, the machine readable instructions may be one or more executable programs or portion(s) of an executable program for execution by a computer processor, such as the processors 3512, 3612 and/or 3712 shown in the example processor platforms 3500, 3600 and/or 3700 discussed below in connection with FIGS. 35-37. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processors 3512, 3612 and/or 3712, but the entire program or programs and/or parts thereof could alternatively be executed by a device other than the processor 3512, 3612 and/or 3712 and/or embodied in firmware or dedicated hardware. Further, although the example program(s) is(are) described with reference to the flowcharts illustrated in FIGS. 19-21, many other methods of implementing the example systems 100 and/or 200, the example silicon product 105 (e.g., the example semiconductor device 105), the example manufacturer enterprise system 110, the example customer enterprise system 115, the example cloud platform 120, the example SDSi asset agent 140, the example agent interface 202, the example agent local services 204, the example analytics engine 206, the example communication services 208, the example agent CLI 210, the example agent daemon 212, the example license processor 214, the example agent library 218, the example feature libraries 220-230, the example product management service 252, the example customer management service 254, the example SDSi feature management service 256, the example SDSi portal 262, the example SDSi agent management interface 264, the example SDSi client agent 272, the example platform inventory management service 274, the example accounts management service 276 and/or the example entitlement management service 278 may alternatively be used. For example, with reference to the flowcharts illustrated in FIGS. 19-21, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 22A:
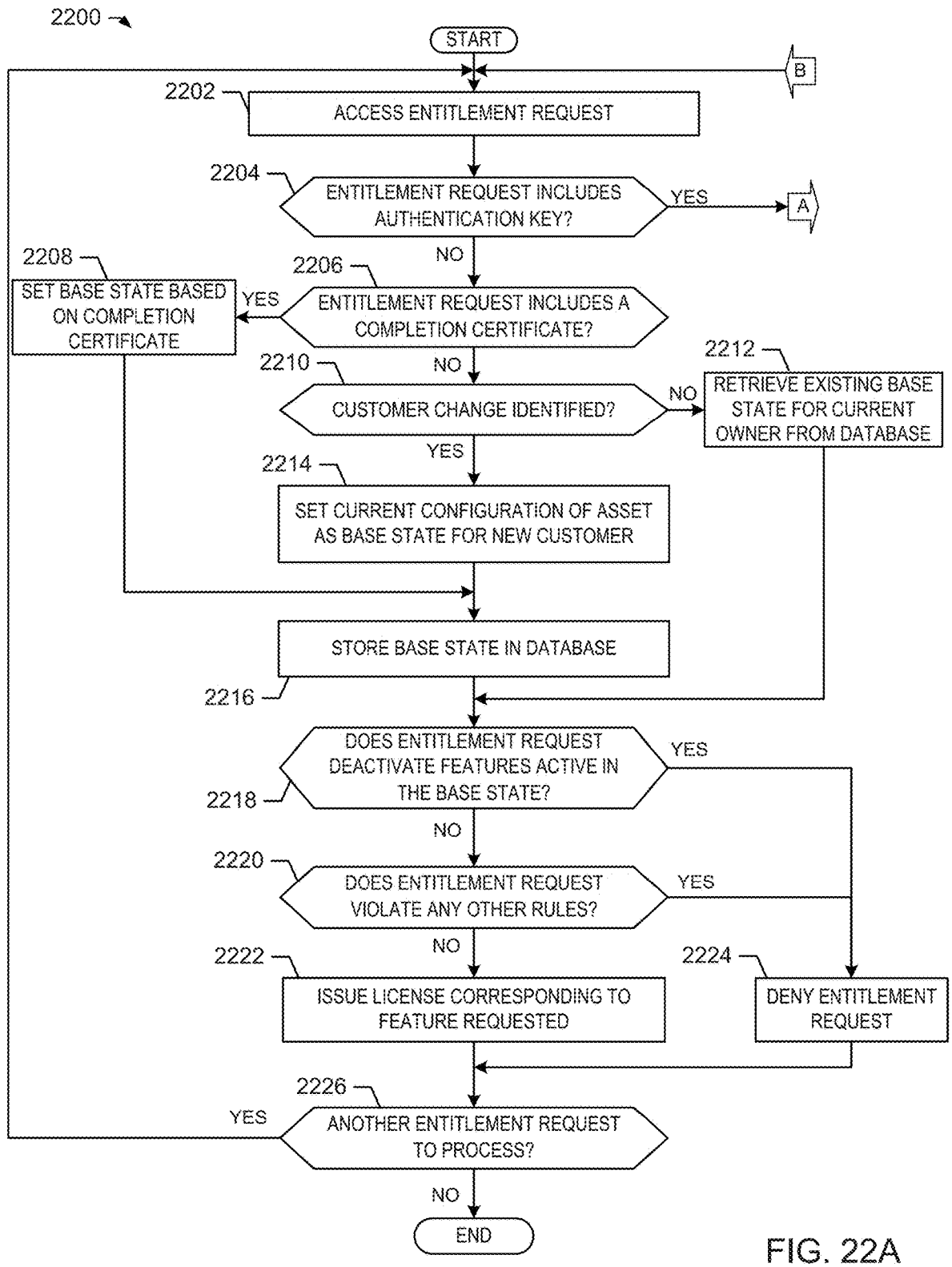
FIGS. 22A-22B are a flowchart representative of example computer readable instructions that may be executed to implement the example manufacturer enterprise system of FIG. 10.
Figure 22B:
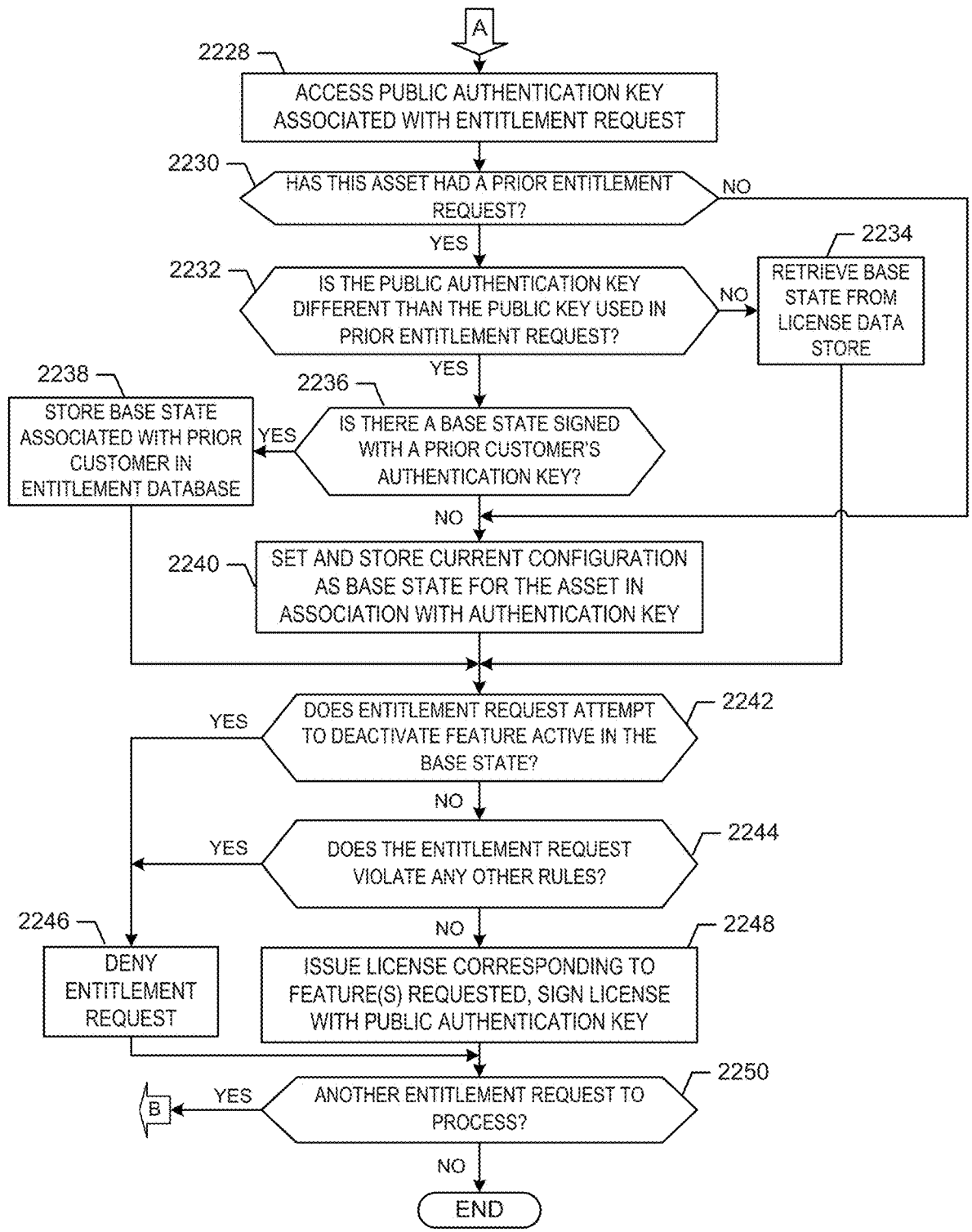
Figure 26:
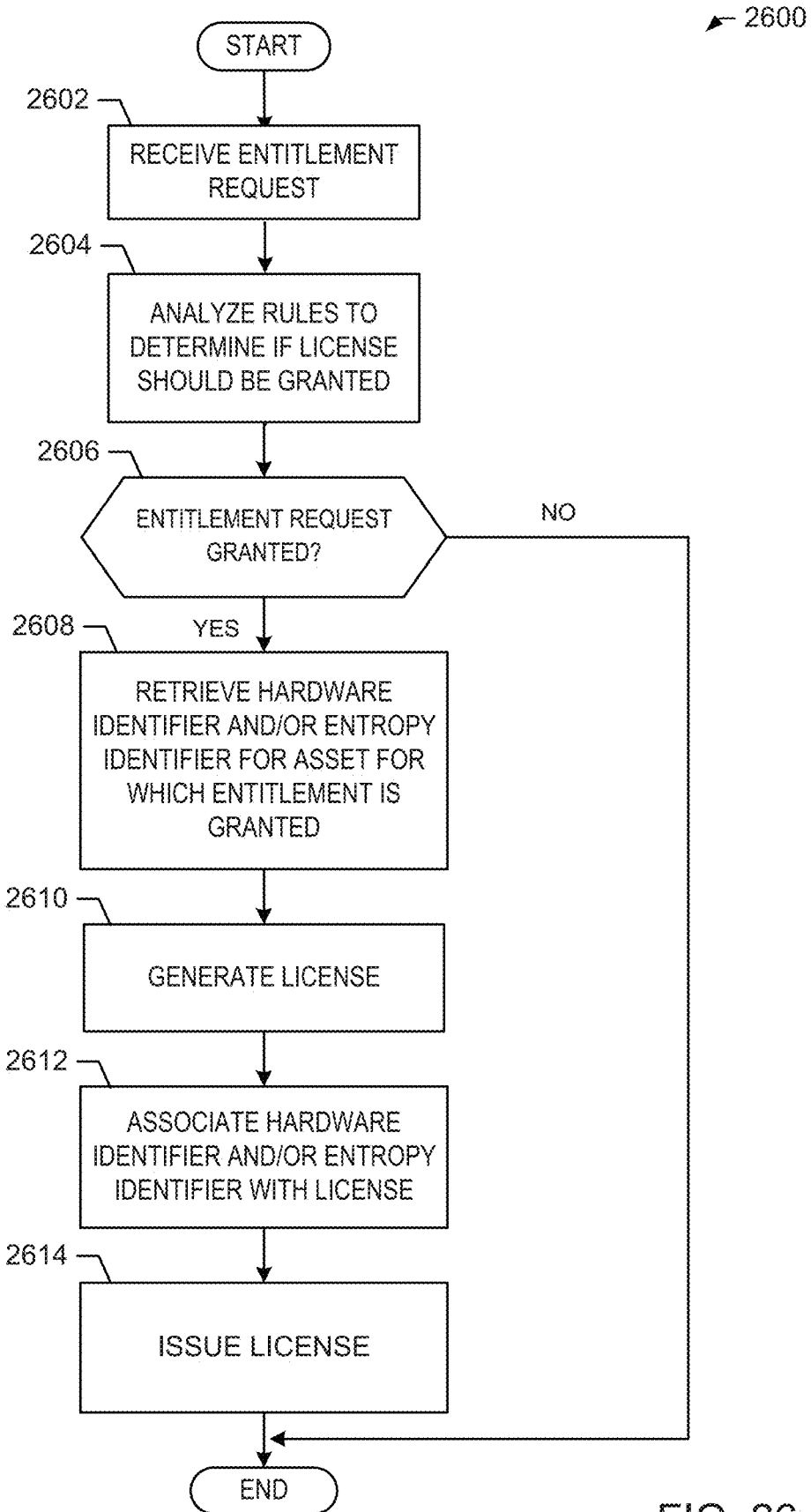
FIG. 26 is a flowchart representative of example computer readable instructions that may be executed to implement license identification protection features of the example manufacturer enterprise system of FIG. 10.

Flowcharts representative of example hardware logic, machine readable instructions, hardware implemented state machines, and/or any combination thereof for implementing the manufacturer enterprise system 110 of FIG. 10 are shown in FIGS. 22A-22B and 26. The machine readable instructions may be one or more executable programs or portion(s) of an executable program for execution by a computer processor such as the processor 3812 shown in the example processor platform 3800 discussed below in connection with FIG. 38. The program may be embodied in software stored on a non-transitory computer readable storage medium such as a CD-ROM, a floppy disk, a hard drive, a DVD, a Blu-ray disk, or a memory associated with the processor 3812, but the entire program and/or parts thereof could alternatively be executed by a device other than the processor 3812 and/or embodied in firmware or dedicated hardware. Further, although the example program is described with reference to the flowcharts illustrated in FIGS. 22A-22B and 26, many other methods of implementing the example manufacturer enterprise system 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 23:
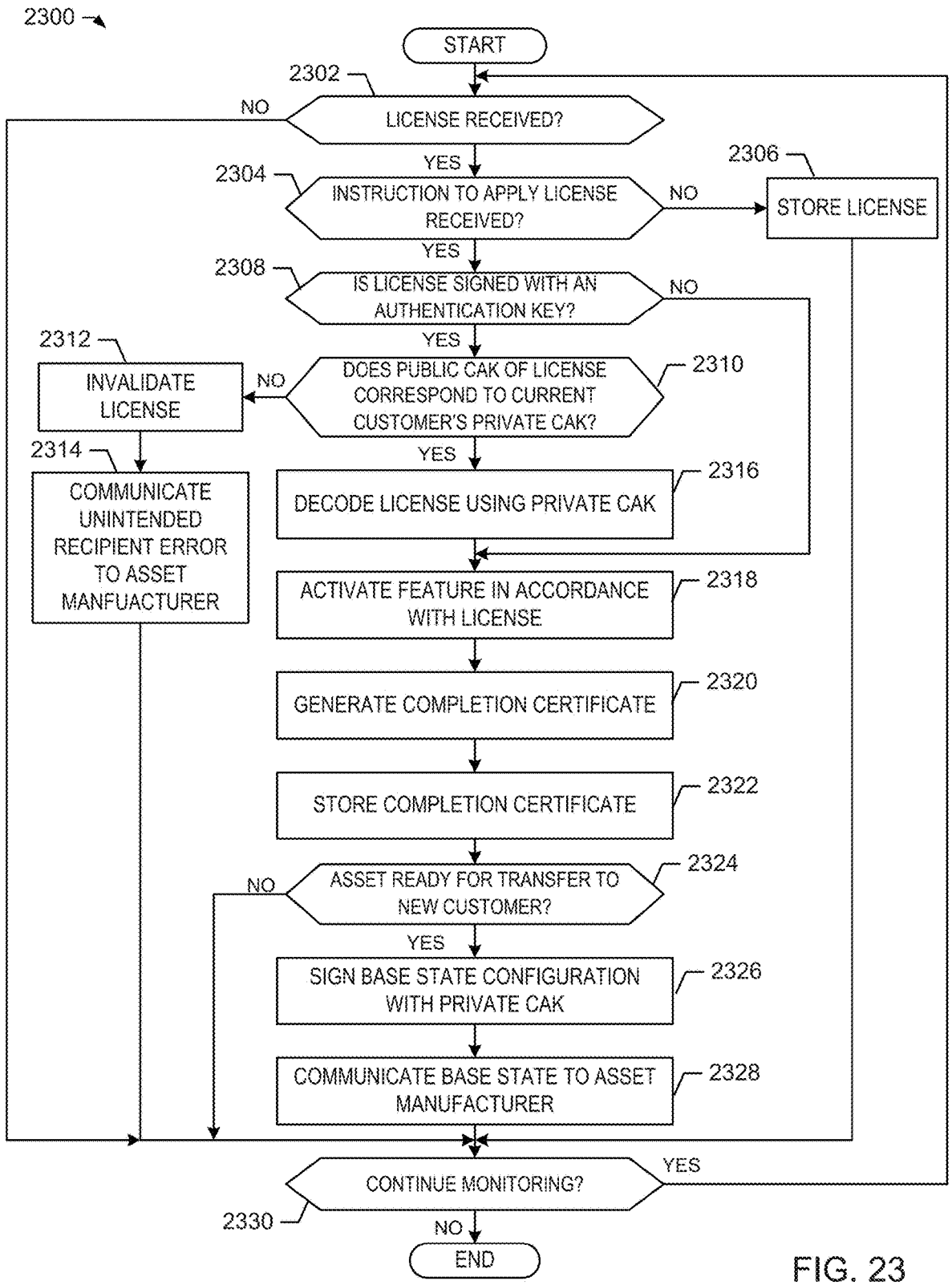
FIG. 23 is a flowchart representative of example computer readable instructions that may be executed to implement the example SDSi asset agent of FIG. 10.
Figure 24:
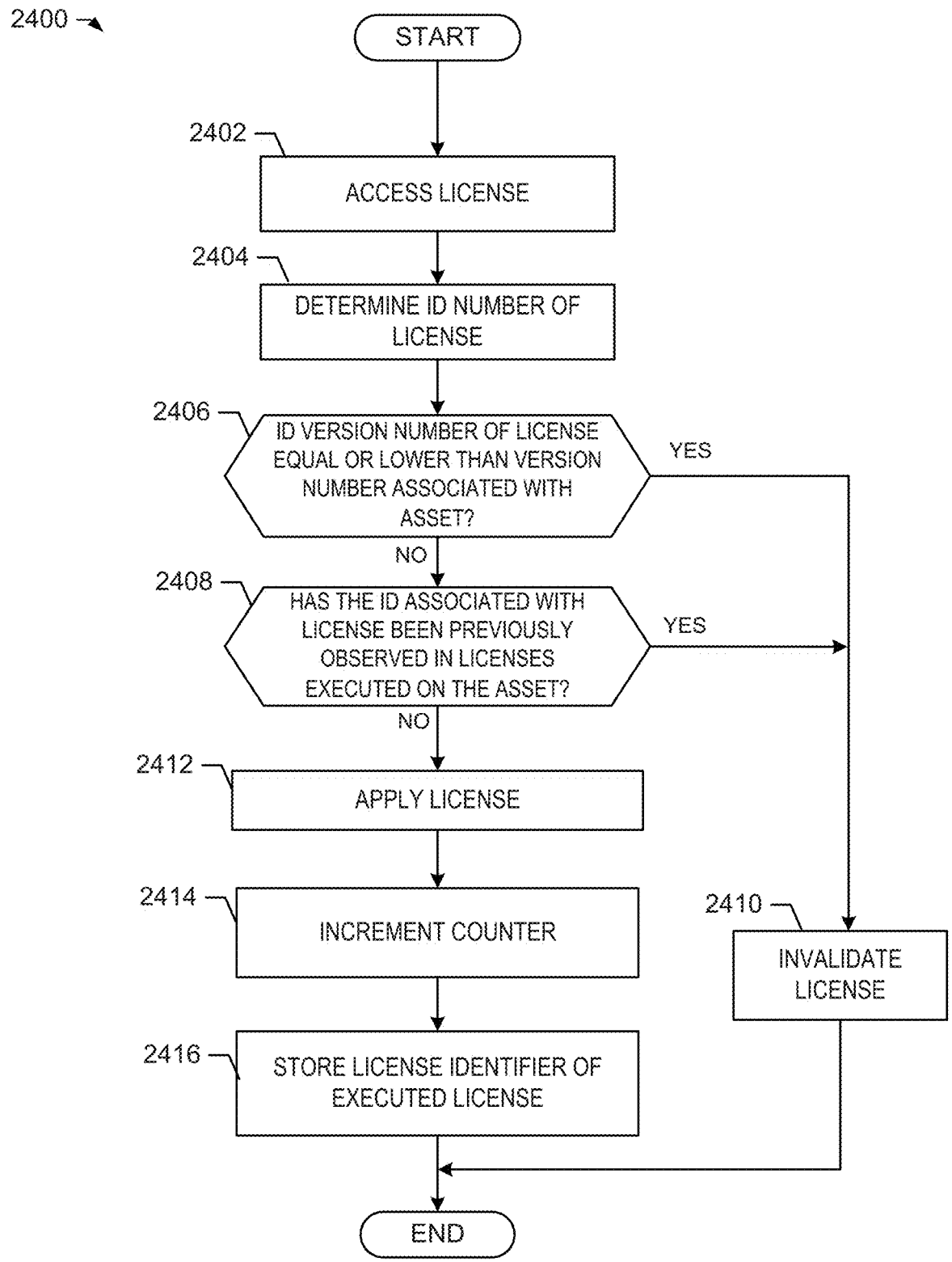
FIG. 24 is a flowchart representative of example computer readable instructions that may be executed to implement license reuse protection features of the example SDSi asset agent of FIG. 10.
Figure 25:
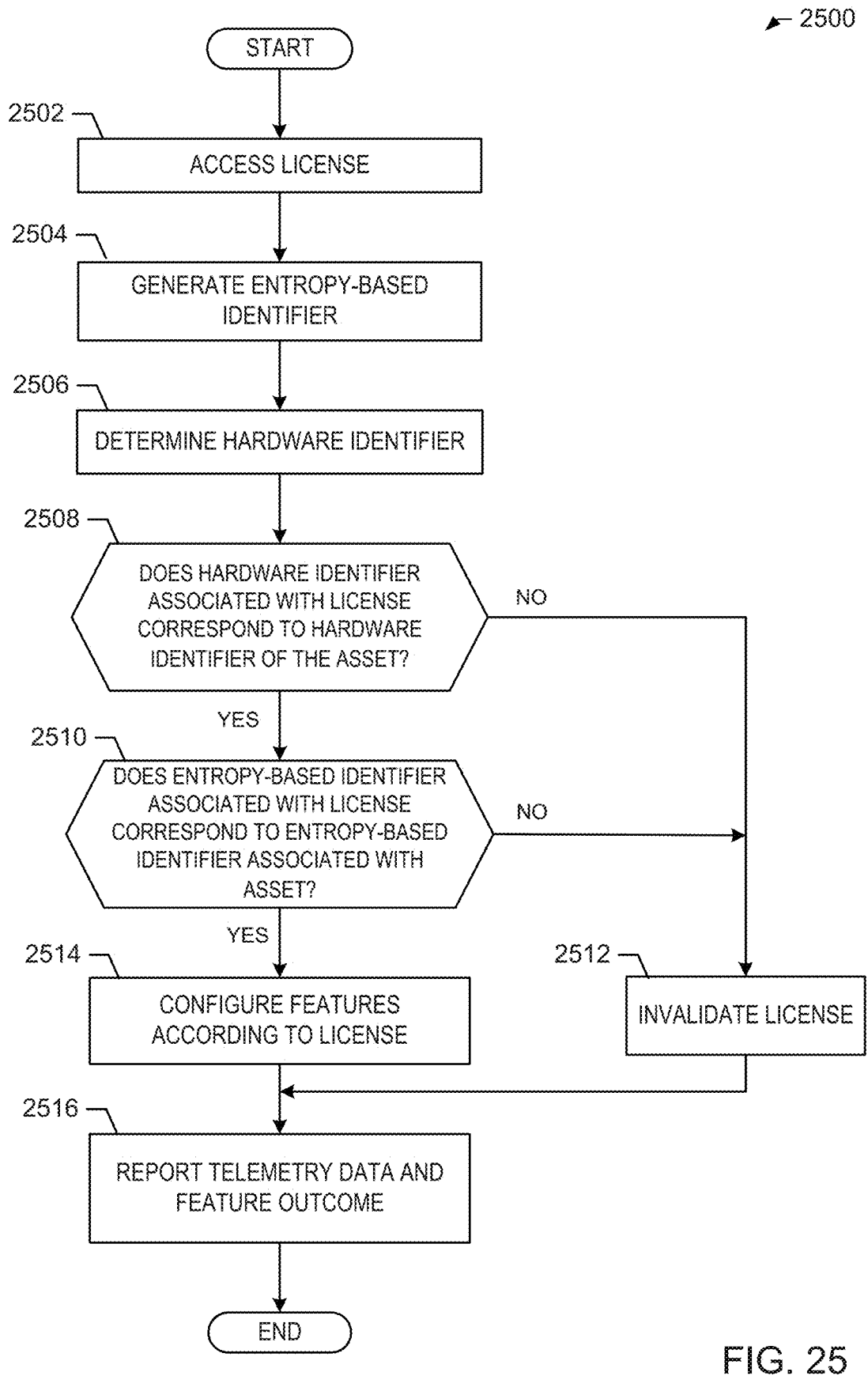
FIG. 25 is a flowchart representative of example computer readable instructions that may be executed to implement license identification protection features of the example SDSi asset agent of FIG. 10.

Flowcharts representative of example hardware logic, machine readable instructions, hardware implemented state machines, and/or any combination thereof for implementing the SDSi asset agent 140 of FIG. 10 are shown in FIGS. 23-25. The machine readable instructions may be one or more executable programs or portion(s) of an executable program for execution by a computer processor such as the processor 3912 shown in the example processor platform 3900 discussed below in connection with FIG. 39. The program may be embodied in software stored on a non-transitory computer readable storage medium such as a CD-ROM, a floppy disk, a hard drive, a DVD, a Blu-ray disk, or a memory associated with the processor 3912, but the entire program and/or parts thereof could alternatively be executed by a device other than the processor 3912 and/or embodied in firmware or dedicated hardware. Further, although the example program is described with reference to the flowcharts illustrated in FIGS. 23-25, many other methods of implementing the example SDSi asset agent 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Flowcharts representative of example hardware logic, machine readable instructions, hardware implemented state machines, and/or any combination thereof for implementing the example systems 1500, 1600, 1700 and/or 1800, the example central licensor 1500, the example first ADL 1515, the example SDSi Product 1520, the example customer enterprise system 1525, the example bank of internet time servers 1530, the example first asset agent 1535, the example first hardware asset 1540, the example second ADL 1565A, the example second asset agent 1565B, the example third ADL 1570A, the example third asset agent 1570B, the example first time server 1575A, the example second time server 1575B, the example second hardware asset 1580, the example third asset 1585, the example precise time appliance 1590, the example requirement definer 1612, the example third party verifier 1614, the example request denier 1616, the example request grantor 1618, the example constraints generator 1620, the example feature identifier 1622, the example signature generator 1624, the example configuration install generator 1628, the example communicator 1626, the example certificate handler 1630, the example sequence number manager 1631, the example asset identifier 1632, the example certificate collector 1634, the example sequence number comparator 1636, the example sequence number storage 1638 the example sequence number extractor 1640, the example ADL status requestor 1705, the example incoming license denier 1710, the example status grant notification information parser 1712, the example storage controller 1715, the example storage 1720, the example status advertiser 1730, the example license generator 1735, the example license verifier 1737, the example sequence number generator 1740, the example time capturer 1745, the example time converter 1750, the example sequence number adder 1755, the example business logic storage, the example business logic updater 1804, the example information parser 1816, the example storage 1818, the example business level requirements determiner 1820, the example business level requirement converter 1821, the example hardware asset 422, the example business level values verifier 1823, the example configuration change verifier 1824, the example compliance monitor 1828, the example accelerator 1830, the example processor/CPU 1834, the example business logic hardware 1835, and/or the example script/code remover 1832 are shown in FIGS. 27-34. In these examples, the machine readable instructions may be one or more executable programs or portion(s) of an executable program for execution by a computer processor, such as the processors 4012, 4112, 4212, 4312, 4412 shown in the example processor platforms 4000, 4100, 4200, 4300 and/or 4400 discussed below in connection with FIGS. 40-44. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processors 4012, 4112, 4212, 4312, and/or 4412, but the entire program or programs and/or parts thereof could alternatively be executed by a device other than the processor 4012, 4112, 4212, 4312, and/or 4412 and/or embodied in firmware or dedicated hardware. Further, although the example program(s) is(are) described with reference to the flowcharts illustrated in FIGS. 27-34, many other methods of implementing the example systems 1500, 1600, 1700 and/or 1800, the example central licensor 1510, the example first ADL 1515, the example SDSi Product 1520, the example customer enterprise system 1525, the example bank of internet time servers 1530, the example first asset agent 1535, the example first hardware asset 1540, the example second ADL 1565A, the example second asset agent 1565B, the example third ADL 1570A, the example third asset agent 1570B, the example first time server 1575A, the example second time server 1575B, the example second hardware asset 1580, the example third asset 1585, the example precise time appliance 1590, the example requirement definer 1612, the example third party verifier 1614, the example request denier 1616, the example request grantor 1618, the example constraints generator 1620, the example feature identifier 1622, the example signature generator 1624, the example configuration install generator 1628, the example communicator 1626, the example certificate handler 1630, the example sequence number manager 1631, the example asset identifier 1632, the example certificate collector 1634, the example sequence number comparator 1636, the example sequence number storage 1638 the example sequence number extractor 1640, the example ADL status requestor 1705, the example incoming license denier 1710, the example status grant notification information parser 1712, the example storage controller 1715, the example storage 1720, the example status advertiser 1730, the example license generator 1735, the example license verifier 1737, the example sequence number generator 1740, the example time capturer 1745, the example time converter 1750, the example sequence number adder 1755, the example business logic storage, the example business logic updater 1804, the example information parser 1816, the example storage 1818, the example business level requirements determiner 1820, the example business level requirement converter 1821, the example hardware asset 422, the example business level values verifier 1823, the example configuration change verifier 1824, the example compliance monitor 1828, the example accelerator 1830, the example processor/CPU 1834, the example business logic hardware 1835, and/or the example script/code remover 1832 may alternatively be used. For example, with reference to the flowcharts illustrated in FIGS. 27-34, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 19-21, FIGS. 22A-22B, 23-25 and 26, and FIGS. 27-34. may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Software Defined Silicon Architecture

An example program 1900 that may be executed to implement the example manufacturer enterprise system 110 of the example systems 100 and/or 200 of FIGS. 1-2 is illustrated in FIG. 19. The example program 1900 may be executed at predetermined intervals, based on an occurrence of a predetermined event, etc., or any combination thereof. With reference to the preceding figures and associated written descriptions, the example program 1900 of FIG. 19 begins execution at block 1905 at which the customer management service 254 of the manufacturer enterprise system 110 on-boards a customer for access to SDSi capabilities offered by the manufacturer of the SDSi product 105, as described above. For example, the customer management service 254 can exchange information with the customer enterprise system 115 of the customer to on-board the customer prior to or after the customer's purchase of the SDSi product 105.

At block 1910, the SDSi portal 262 of the manufacturer enterprise system 110 receives a request to activate (or deactivate) an SDSi feature of the SDSi product 105, as described above. In the illustrated example, the request is forwarded to the SDSi feature management service 256, which identifies the SDSi product 105 associated with the request and determines whether the request is valid. Assuming the request is valid, at block 1915, the SDSi feature management service 256 initiates a query to determine whether the SDSi feature to be activated (or deactivated) is supported by the SDSi product 105. In some examples, the SDSi feature management service 256 invokes the SDSi agent management interface 264 of the manufacturer enterprise system 110 to send the query directly to the SDSi product 105, as described above, thereby directly querying the SDSi product 105. In some examples, the SDSi feature management service 256 sends the query to the SDSi client agent 272 of the client enterprise system 115, which then sends the query to the SDSi product 105, as described above, thereby indirectly querying the SDSi product 105. In some examples, the SDSi agent management interface 264 queries one or more database and/or other data structure(s) maintained by the manufacturer enterprise system 110 to determine whether the SDSi product 105 supports the SDSi feature to be activated (or deactivated), as described above.

If the requested SDSi feature is not supported by the SDSi product 105 (block 1920), at block 1925 the manufacturer enterprise system 110 performs error handling and denies the request, such as by sending an appropriate communication via the SDSi portal 262 to the customer enterprise system 115. However, if the requested SDSi feature is supported by the SDSi product 105 (block 1920), at block 1930 the SDSi feature management service 256 of the manufacturer enterprise system 110 generates a license to activate (or deactivate) the SDSi feature in response to the customer's request, as described above. At block 1935, the SDSi feature management service 256 causes the license to be sent via the SDSi portal 262 to the SDSi client agent 272 of the customer enterprise system 115, as described above.

Sometime later, at block 1940, the manufacturer enterprise system 110 receives, as described above, a certificate reported by the SDSi product 105 to confirm activation (or deactivation) of the requested SDSi feature, which is processed by the SDSi feature management service 256. In some examples, the certificate is received directly from the SDSi product 105 by the SDSi agent management interface 264 of the manufacturer enterprise system 110. In some examples, the certificate is received indirectly, such as from the SDSi client agent 272 of the client enterprise system 115, which received the certificate form the SDSi product 105. At block 1940, the SDSi feature management service 256 of the manufacturer enterprise system 110 processes the received certificate, as described above, to confirm successful activation (or deactivation) of the requested SDSi feature, and invokes the customer management service 254 to reconcile billing, generate an invoice, etc., which contacts the customer enterprise system 115 accordingly. Thereafter, at block 1945, the SDSi feature management service 256 of the manufacturer enterprise system 110 receives telemetry data reported by the SDSi product 105 (e.g., in one or more certificates), as described above, which is processed at the manufacturer enterprise system 110 to confirm proper operation of the SDSi product 105, reconcile billing, generate further invoice(s), etc.

An example program 2000 that may be executed to implement the example customer enterprise system 115 of the example systems 100 and/or 200 of FIGS. 1-2 is illustrated in FIG. 20. The example program 2000 may be executed at predetermined intervals, based on an occurrence of a predetermined event, etc., or any combination thereof. With reference to the preceding figures and associated written descriptions, the example program 2000 of FIG. 20 begins execution at block 2005 at which the accounts management service 276 of the customer enterprise system 115 on-boards its customer for access to SDSi capabilities offered by a manufacturer of the SDSi product 105, as described above. For example, the accounts management service 276 can exchange information with the manufacturer enterprise system 110 to on-board with the manufacturer prior to or after the customer's purchase of the SDSi product 105.

At block 2010, the SDSi client agent 272 of the client enterprise system 115 sends a request to activate (or deactivate) an SDSi feature of the SDSi product 105, as described above. In the illustrated example, the request is generated by the platform inventory management service 274 or the SDSi client agent 272 of the client enterprise system 115, and is sent by the SDSi client agent 272 to the SDSi portal 262 of the manufacturer enterprise system 110. At block 2015, the SDSi client agent 272 receives a notification from the SDSi portal 262 that indicates whether the requested SDSi feature to be activated (or deactivated) is supported by the SDSi product 105. If the requested SDSi feature is not supported by the SDSi product 105 (block 2020), at block 2025 the customer enterprise system 115 performs error handling and, for example, updates the platform inventory management service 274 to note that the requested SDSi feature is not supported by the SDSi product 105. However, if the requested SDSi feature is supported by the SDSi product 105 (block 2020), at block 2030 the SDSi client agent 272 receives, from the SDSi portal 262, a license to activate (or deactivate) the SDSi feature in response to the customer's request, as described above. In the illustrated example, the license is maintained by the entitlement management service 278 of the customer enterprise system 115 until the customer is ready to invoke the license, as described above.

Sometime later, at block 2035, the entitlement management service 278 determines (e.g., based on customer input) that the license received at block 2030 to activate (or deactivate) the SDSi feature is to be invoked. Thus, the entitlement management service 278 provides the license to the SDSi client agent 272, which sends (e.g., downloads) the license to the SDSi product 105, as described above. Sometime later, at block 2040, the customer enterprise system 115 receives, as described above, a certificate reported by the SDSi product 105 to confirm activation (or deactivation) of the requested SDSi feature. In the illustrated example, the certificate is received directly from the SDSi product 105 by the SDSi client agent 272 of the customer enterprise system 115. At block 2040, the entitlement management service 278 of the customer enterprise system 115 processes the received certificate, as described above, to confirm successful activation (or deactivation) of the requested SDSi feature, and invokes the accounts management service 276 to reconcile billing, authorize payment, etc., which contacts the manufacturer enterprise system 110 accordingly. Thereafter, at block 2045, the SDSi client agent 272 of the customer enterprise system 115 receives feature status data reported by the SDSi product 105 (e.g., in one or more certificates), as described above, which is processed at the entitlement management service 278 and accounts management service 276 to confirm proper operation of the SDSi product 105, reconcile billing, authorize further payment(s), etc.

An example program 2100 that may be executed to implement the example SDSi asset agent 140 of the example systems 100 and/or 200 of FIGS. 1-2 is illustrated in FIG. 21. The example program 2100 may be executed at predetermined intervals, based on an occurrence of a predetermined event, etc., or any combination thereof. With reference to the preceding figures and associated written descriptions, the example program 2100 of FIG. 21 begins execution at block 2105 at which the SDSi asset agent 140 receives a query to confirm whether a particular SDSi feature is supported by the SDSi product 105. For example, the query may be from the SDSi agent management interface 264 of the manufacturer enterprise system 110, the SDSi client agent 272 of the customer enterprise system 115, etc. At block 2110, the SDSi asset agent 140 invokes its license processor 214 to generate a response to the query, as describes above. For example, the license processor 214 analyzes the configuration of the hardware circuitry 125, the firmware 130 and/or the BIOS 135 of the SDSi product 105, and generates feature support verification information indicating whether the queried feature is supported by the SDSi product 105, which is reported by the SDSi asset agent 140 back to the source of the query.

At block 2115, the SDSi asset agent 140 receives a license from the SDSi client agent 272 of the customer enterprise system 115 to activate (or deactivate) an SDSi feature of the SDSi product 105, as described above. At block 2120, the license processor 214 of the SDSi asset agent 140 verifies the license. For example, the license processor 214 may determine the license is verified when the license correctly identifies the SDSi product 105 and/or the feature to be activated (or deactivated), when the license is authentic (e.g., based on a manufacturer signature included with the license, a license sequence number included in the license, etc.), when activation (or deactivation) of the requested SDSi feature will not result in an unsupported or otherwise invalid configuration of the SDSi product 105, etc., or any combination thereof. In some examples, the license processor 214 determines the license is verified if some or all such verification criteria are satisfied, and determines the license is unverified if one or more of such verification criteria are not satisfied.

If the license is determined to be unverified (block 2125), at block 2130 the SDSi asset agent 140 performs error handling to, for example, discard the license and report a certificate to the SDSi client agent 272 that indicates the license could not be invoked. However, if the license is determined to be valid (block 2125), at block 2135 the license processor 214 configures the SDSi product 105 to activate (or deactivate) the SDSi feature in accordance with the license, as described above. If configuration is not successful (block 2140), at block 2130 the SDSi asset agent 140 performs error handling to, for example, discard the license and report a certificate to the SDSi client agent 272 that indicates the configuration of the SDSi product 105 to activate (or deactivate) the requested SDSi feature was unsuccessful.

However, if configuration is successful (block 2140), at block 2145 the license processor 214, in combination with the analytics engine 205, generates a certificate to confirm the successful activation (or deactivation) of the requested SDSi feature, which is reported by the SDSi asset agent 140 to the SDSi client agent 272, as described above. Sometime later (e.g., in response to a request, based on an event, etc.), at block 2150, the SDSi asset agent 140 reports telemetry data and feature status data (e.g., in one or more certificates) to the SDSi client agent 272 of the customer enterprise system 115 and/or to the SDSi agent management interface 264 of the manufacturer enterprise system 110, as described above.

Protection Against Misuse of Software Defined Silicon

Example machine readable instructions 2200 for implementing the manufacturer enterprise system 110 of FIG. 10 and that may be executed to process entitlement requests are illustrated in FIGS. 6A-B. With reference to the preceding figures and associated descriptions, the example machine readable instructions 2200 begin at block 2202 of FIG. 6A. At block 2202, the example SDSi feature management service 256 accesses an entitlement request. In some examples, the entitlement request analyzer 1002 accesses the entitlement request via the cloud platform 120.

At block 2204, the example SDSi feature management service 256 determines whether the entitlement request includes an authentication key. In some examples, the example entitlement request analyzer 1002 determines whether the entitlement request includes an authentication key. In response to the entitlement request including an authentication key, processing transfers to block 2228 of FIG. 22B. Conversely, in response to the entitlement request not including an authentication key, processing transfers to block 2206.

At block 2206, the example SDSi feature management service 256 determines whether the entitlement request includes a completion certificate. In some examples, the entitlement request analyzer 1002 determines whether the entitlement request includes a completion certificate. In response to the entitlement request including a completion certificate, processing transfers to block 2208. Conversely, in response to the entitlement request not including a completion certificate, processing transfers to block 2210.

At block 2208, the example SDSi feature management service 256 sets the base state based on the completion certificate. In some examples, the license data store 1006 stores the base state based on the completion certificate. For example, the license data store 1006 can determine which features were active on the asset based on the completion certificate and store this information as the base state for the asset.

At block 2210, the example SDSi feature management service 256 determines whether a customer change has been identified. In some examples, the entitlement request analyzer 1002 determines whether a customer change has been identified. For example, if a customer identifier associated with the entitlement request is different from a customer identifier on the previous entitlement request, the entitlement request analyzer can determine that the owner of the asset has changed. In response to a customer change being identified, processing transfers to block 2214. Conversely, in response to a customer change not having been identified, processing transfers to block 2212.

At block 2214, the example SDSi feature management service 256 sets the current configuration of the asset as the base state for the new customer. In some examples, the license data store 1006 sets the current configuration of the asset as the base state for the new customer.

At block 2216, the example SDSi feature management service 256 stores the base state in the database. In some examples, the base state is stored in the license data store 1006.

At block 2218, the example SDSi feature management service 256 determines whether the entitlement request deactivates features active in the base state. In some examples, the entitlement request analyzer 1002 determines whether the entitlement request deactivates features active in the base state. In response to the entitlement request deactivating features active in the base state, processing transfers to block 2224. Conversely, in response to the entitlement request not deactivating features active in the base state, processing transfers to block 2220.

At block 2220, the example SDSi feature management service 256 determines whether the entitlement request violates any other rules. In some examples, the entitlement request analyzer 1002 determines whether the entitlement request violates any other rules. In response to the entitlement request violating any other rules, processing transfers to block 2224. Conversely, in response to the entitlement request not violating any other rules, processing transfers to block 2222.

At block 2222, the example SDSi feature management service 256 issues a license corresponding to the feature requested. In some examples, the license generator 1004 generates a license corresponding to the features that have been requested.

At block 2224, the example SDSi feature management service 256 denies the entitlement request. In some examples, the entitlement request analyzer 1002 denies the entitlement request.

At block 2226, the example SDSi feature management service 256 determines whether there is another entitlement request to process. In response to there being another entitlement request to process, processing returns to block 602. Conversely, in response to there not being another entitlement request to process, processing terminates.

At block 2228 of FIG. 22B, the example SDSi feature management service 256 accesses a public authentication key associated with the entitlement request. In some examples, the entitlement request analyzer 1002 accesses the public authentication key associated with the entitlement request. In some examples, a different form of authentication may be accessed in connection with the entitlement request.

At block 2230, the example SDSi feature management service 256 determines if the asset has had a prior entitlement request. In some examples, the license data store 1006 determines whether the asset has had a prior entitlement request. In response to the asset having had a prior entitlement request, processing transfers to block 2232. Conversely, in response to the asset not having had a prior entitlement request, processing transfers to block 2240.

At block 2232, the example SDSi feature management service 256 determines if the public authentication key of the current entitlement is different than the public key used in the prior entitlement request. In some examples, the license data store 1006 determines if the public authentication key of the current entitlement is different than the public key used in the prior entitlement request. In response to the public authentication key being different from the public key used in the prior entitlement request, processing transfers to block 2238. Conversely, in response to the public authentication key being the same as the public key used in the prior entitlement request, processing transfers to block 2234.

At block 2234, the example SDSi feature management service 256 retrieves the base state from the license data store. In some examples, the entitlement request analyzer 1002 retrieves the base state from the license data store 1006.

At block 2236, the example SDSi feature management service 256 determines if the base state is signed with a prior customer's authentication key. In some examples, the license data store 1006 determines if the base state is signed with a prior customer's authentication key. In response to the base state being signed with a prior customer's authentication key, processing transfers to block 2238. Conversely, in response to the base state not being signed with a prior customer's authentication key, processing transfers to block 2240.

At block 2238, the example SDSi feature management service 256 stores the base state associated with the prior customer in the entitlement database. In some examples, the license data store 1006 stores the base state associated with the prior customer in the entitlement database.

At block 2240, the example SDSi feature management service 256 sets and stores the current configuration as the base state for the asset in association with the authentication key. In some examples, the license data store sets and stores the current configuration as the base state for the asset in association with the authentication key.

At block 2242, the example SDSi feature management service 256 determines if the entitlement request attempts to deactivate features active in the base state. In some examples, the entitlement request analyzer 1002 determines if the entitlement request attempts to deactivate features active in the base state. In response to the entitlement request attempting to deactivate features active in the base state, processing transfers to block 2246. Conversely, in response to the entitlement request not attempting to deactivate features active in the base state, processing transfers to block 2244.

At block 2244, the example SDSi feature management service 256 determines whether the entitlement request violates any other rules. In some examples, the entitlement request analyzer 1002 determines whether the entitlement request violates any other rules. In response to the entitlement request violating any other rules, processing transfers to block 2246. Conversely, in response to the entitlement request not violating any other rules, processing transfers to block 2248.

At block 2246, the example SDSi feature management service 256 denies the entitlement request. In some examples, the entitlement request analyzer 1002 denies the entitlement request.

At block 2248, the example SDSi feature management service 256 issues a license corresponding to the feature(s) requested, signing the license with the public authentication key. In some examples, the license generator 1004 issues a license corresponding to the feature(s) requested, signing the license with the public authentication key associated with the customer.

At block 2250, the example SDSi feature management service 256 determines whether there is another entitlement request to process. In response to there being another entitlement request to process, processing transfers to block 602 of FIG. 6A. Conversely, in response to there not being another entitlement request to process, processing terminates.

Example machine readable instructions 2300 for implementing the SDSi asset agent 140 of FIG. 10 are illustrated in FIG. 7. With reference to the preceding figures and associated descriptions, the example machine readable instructions 2300 begin at block 2302. At block 2302, the example SDSi asset agent 140 determines whether a license has been received. In some examples, the license processor 214 determines whether a license has been received. In response to a license having been received, processing transfers to block 2304. Conversely, in response to a license having not been received, processing transfers to block 2330.

At block 2304, the example SDSi asset agent 140 determines whether an instruction to apply a license has been received. In some examples, the license manager 1016 determines whether an instruction to apply a license has been received. In response to an instruction to apply the license having been received, processing transfers to block 2308. Conversely, in response to an instruction to apply the license not having been received, processing transfers to block 2306.

At block 2308, the example SDSi asset agent 140 determines if the license is signed with an authentication key. In some examples, the authentication analyzer 1018 determines if the license is signed with an authentication key. In response to the license being signed with an authentication key, processing transfers to block 2310. Conversely, in response to the license not being signed with an authentication key, processing transfers to block 2318.

At block 2310, the example SDSi asset agent 140 determines whether the public customer authentication key (CAK) of the license corresponds to the current customer's private CAK. In some examples, the authentication analyzer 1018 determines if the public CAK of the license corresponds to the current customer's private CAK. In response to the public CAK of the license corresponding to the current customer's private CAK, processing transfers to block 2316. Conversely, in response to the public CAK of the license not corresponding to the current customer's private CAK, processing transfers to block 2312.

At block 2312, the example SDSi asset agent 140 invalidates the license. In some examples, the license manager 1016 invalidates the license.

At block 2314, the example SDSi asset agent 140 communicates an unintended recipient error to the asset manufacturer. In some examples, the agent interface 202 and/or the authentication analyzer 1018 communicates the unintended recipient error to the asset manufacturer, to inform the manufacturer that an attempt was made to execute a license on an unintended asset.

At block 2316, the example SDSi asset agent 140 decodes the license using a private CAK. In some examples, the authentication analyzer 1016 decodes the license using the private CAK.

At block 2318, the example SDSi asset agent 140 activates feature(s) in accordance with the license. In some examples, the feature activator 1020 activates features in accordance with the license.

At block 2320, the example SDSi asset agent 140 generates a completion certificate. In some examples, the certificate manager 1014 generates a completion certificate.

At block 2322, the example SDSi asset agent 140 stores the completion certificate. In some examples, the certificate manager 1014 stores the completion certificate.

At block 2324, the example SDSi asset agent 140 determines whether the asset is ready for transfer to a new customer. In some examples, the agent interface 202 determines whether the asset is ready for transfer to a new customer. In response to the asset being ready for transfer to a new customer, processing transfers to block 2326. Conversely, in response to the asset not being ready for transfer to a new customer, processing transfers to block 2330.

At block 2326, the example SDSi asset agent 140 signs the base state configuration with a private authentication key. In some examples, the authentication analyzer 1018 signs the base state configuration with the private authentication key.

At block 2328, the example SDSi asset agent 140 communicates the base state to the asset manufacturer. In some examples, the agent interface 202 communicates the base state to the asset manufacturer.

At block 2330, the example SDSi asset agent 140 determines whether to continue monitoring. In response to continuing monitoring, processing transfers to block 702. Conversely, in response to not continuing monitoring, processing terminates.

Example machine readable instructions 2400 for implementing the SDSi asset agent 140 of FIG. 10 to protect against license reuse are illustrated in FIG. 24. With reference to the preceding figures and associated descriptions, the example machine readable instructions 2400 begin at block 2402. At block 2402, the example SDSi asset agent 140 accesses a license. In some examples, the license manager 1016 accesses a license.

At block 2404, the example SDSi asset agent 140 determines an ID number of the license. In some examples, the license manager 1016 determines an ID number of the license.

At block 2406, the example SDSi asset agent 140 determines whether the ID version number is equal or lower than the version number associated with the asset. In some examples, the license manager 1016 compares the ID number of the license with a version number of the asset (e.g., the semiconductor device 105). In some examples, the version number of the asset is provided via the certificate manager 1014. For example, the version number may be incremented by the certificate manager 1014 in response to completion certificates received when licenses are executed. In response to the ID version number of the license being equal to or lower than the version number associated with the asset, processing transfers to block 2410. Conversely, in response to the ID version number of the license not being equal to or lower than the version number associated with the asset, processing transfers to block 2408.

At block 2408, the example SDSi asset agent 140 determines whether the ID associated with the license has been previously observed in licenses executed on the asset. In some examples, the license processor 214 determines whether the ID associated with the license has been previously observed in licenses executed on the asset. In response to the ID associated with the license having been previously observed, processing transfers to block 2410. Conversely, in response to the ID associated with the license not having been previously observed in licenses executed on the asset, processing transfers to block 2412.

At block 2410, the example SDSi asset agent 140 invalidates the license. In some examples, the license processor 214 invalidates the license.

At block 2412, the example SDSi asset agent 140 applies the license. In some examples, the feature activator 1020 executes the license and activates and/or deactivates features on the semiconductor device 105 based on instructions provided in the license.

At block 2414, the example SDSi asset agent 140 increments a counter. In some examples, the license manager 1016 increments a counter associated with the version number of the asset. For example, the counter may be incremented based on a number of licenses executed (e.g., in the case of executing one license, the version number associated with the asset increases by 0.1).

At block 2416, the example SDSi asset agent 140 stores the license identifier of the executed license. In some examples, the license processor 214 and/or the certificate manager 1014 store the license identifier of the executed license.

Example machine readable instructions 2500 for implementing the SDSi asset agent 140 of FIG. 10 to provide license identification protection features are illustrated in FIG. 25. With reference to the preceding figures and associated descriptions, the example machine readable instructions 2500 begin at block 2502. At block 2502, the example SDSi asset agent 140 accesses a license. In some examples, the license manager 1016 accesses a license.

At block 2504, the example SDSi asset agent 140 generates an entropy-based identifier. In some examples, the entropy identifier generator 1012 generates an entropy-based identifier to serve as a unique, non-cloneable identifier for the semiconductor device 105. In some examples, the entropy-based identifier has already been generated and is retrieved from the entropy identifier generator 1012 and/or retrieved from an accessible storage location.

At block 2506, the example SDSi asset agent 140 determines a hardware identifier. In some examples, the hardware identifier manager 1010 determines a hardware identifier. In some examples, the hardware identifier has been previously generated and/or determined and is retrieved from the hardware identifier manager 1010 and/or retrieved from another accessible storage location.

At block 2508, the example SDSi asset agent 140 determines whether the hardware identifier associated with the license corresponds to the hardware identifier of the asset. In some examples, the license manager 1016 determines whether the hardware identifier associated with the license corresponds to the hardware identifier of the asset. In response to the hardware identifier of the license corresponding to the hardware identifier of the asset, processing transfers to block 2510. Conversely, in response to the hardware identifier of the license not corresponding to the hardware identifier of the asset, processing transfers to block 2512.

At block 2510, the example SDSi asset agent 140 determines whether the entropy-based identifier associated with the license corresponds to the entropy-based identifier associated with the asset. In some examples, the license manager 1016 determines whether the entropy-based identifier associated with the license corresponds to the entropy-based identifier associated with the asset. In response to the entropy-based identifier associated with the license corresponding to the entropy-based identifier associated with the asset, processing transfers to block 2514. Conversely, in response to the entropy-based identifier associated with the license not corresponding to the entropy-based identifier associated with the asset, processing transfers to block 2512.

At block 2512, the example SDSi asset agent 140 invalidates the license. In some examples, the license manager 1016 invalidates the license.

At block 2514, the example SDSi asset agent 140 configures features according to the license. In some examples, the feature activator 1020 configures features (e.g., activates features, deactivates features, adjusts parameters of features, etc.) according to the license.

At block 2516, the example SDSi asset agent 140 reports telemetry data and the feature outcome. In some examples, the certificate manager 1014 communicates a completion certificate indicating which features are active on the semiconductor device 105 to the manufacturer enterprise system 110. In some examples, the completion certificate is stored on the manufacturing device 105.

Example machine readable instructions 2600 for implementing the manufacturer enterprise system 110 of FIG. 10 to employ license identification protection features are illustrated in FIG. 25. With reference to the preceding figures and associated descriptions, the example machine readable instructions 1000 begin at block 2602. At block 2602, the example manufacturer enterprise system 110 receives an entitlement request. In some examples, the entitlement request analyzer 1002 receives an entitlement request.

At block 2604, the example manufacturer enterprise system 110 analyzes rules to determine if a license should be granted. In some examples, the entitlement request analyzer 2604 analyzes rules to determine if the license should be granted.

At block 2606, the example manufacturer enterprise system 110 determines whether to grant the entitlement request. In some examples, the entitlement request analyzer 1002 determines whether to grant the entitlement request. In response to granting the entitlement request, processing transfers to block 2608. Conversely, in response to the entitlement request not being granted, processing transfers terminates.

At block 2608, the example manufacturer enterprise system 110 retrieves a hardware identifier and/or an entropy identifier for the asset for which the entitlement is granted. In some examples, the license generator 1004 retrieves the hardware identifier and/or the entropy-based identifier from the identifier database 1008. In some examples, the identifier is provided along with the entitlement request, and the license generator 1004 accesses the one or more identifiers from the entitlement request analyzer 1002.

At block 2610, the example manufacturer enterprise system 110 generates a license. In some examples, the license generator 1004 generates the license.

At block 2612, the example manufacturer enterprise system 110 associates the hardware identifier and/or the entropy identifier with the license. In some examples, the license generator 1004 associates the hardware identifier and/or the entropy-based identifier with the license.

At block 2614, the example manufacturer enterprise system 110 issues the license for the asset. In some examples, the license generator 1004 communicates the license to the customer enterprise system 115 for downloading to the semiconductor device 105.

Delegated SDSi Feature Licensing System

Figure 27:
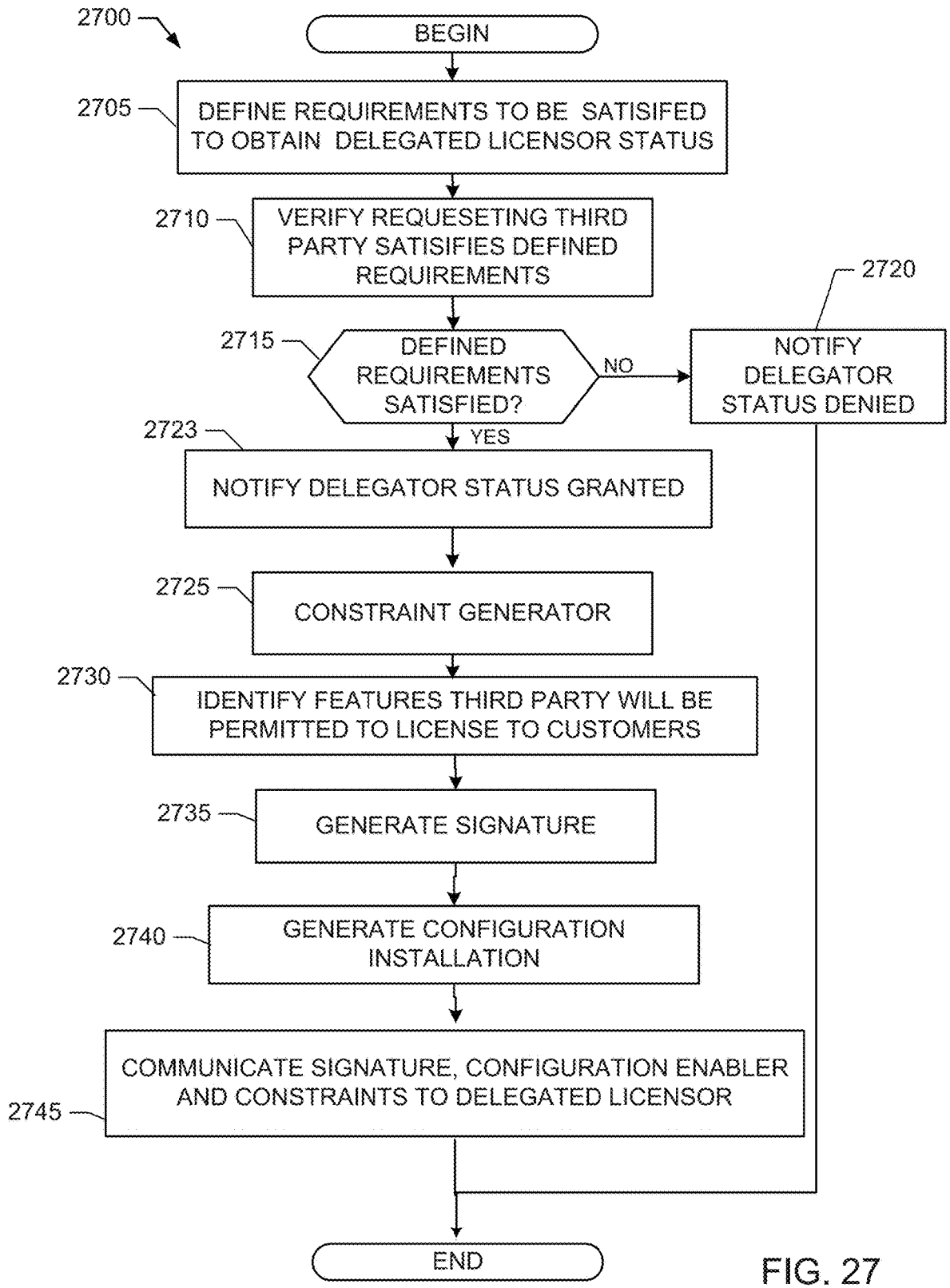
FIG. 27 is flowchart representative of machine readable instructions which may be executed to implement an example license delegating authority of the example central licensor of FIG. 16.

FIG. 27 is a program 2700 that can be executed to implement the example central processor 1510 of FIGS. 15 and 16. The program begins at block 2705 at which the example requirement definer 1612 defines requirements to be satisfied by any third party seeking to obtain ADL status in the manner described above with respect to FIG. 16. When a request from a third party to obtain such status is received, the example third party verifier 1614 attempts to verify that the requesting third party satisfies the defined requirements (block 2710). In some examples, the third party supplies such credentials in or with the request for licensor status and/or via a separate communication. In some examples, the third party credentials are already known to the example central licensor 1510 as being associated with purchasers of one or more SDSi products, for example. When the third party verifier 1614 determines that the defined requirements are satisfied (block 2715), the example request grantor 1618 notifies the third party that the request has been granted (block 2723). When the third party verifier 1614 determines that the requirements are not satisfied (also block 2715), the example request denier 1616 notifies the third party that the request has been denied (block 2720).

In some examples, when ADL status is granted to a third party, the example constraints generator 1620 generates one or more constraints that can be used to restrict (or otherwise define/limit) the types of licenses that can be granted, the SDSi products for which a license may be granted, the duration of any granted licenses, a geographic area within which an asset is to reside before a license is granted, etc. (block 2725). In some examples, the example feature identifier 1622 identifies one or more specific features that can be granted by the ADLs (e.g., of the first, second and/or third ADLs 1515, 1565A, 1570A) or by specific ones of the first, second and/or third ADLs 1515, 1565A, 1570A (block 2730).

In some examples, the example signature generator 1624 generates a script or code to be used by any of the example first, second and/or third ADLs 1515, 1565A, 1570A when granting a license (block 2735) in the manner described above with respect to FIG. 2. The generated signature script/code is used to sign any licenses granted by the unique one of the first, second and/or third ADLs 1515, 1565A, 1570A (of a third party(ies)).

In some examples, the example configuration installation generator 1628 of the example central licensor 1510 generates script/code that, when executed by a hardware asset, (e.g., any of the first, second, and/or third hardware assets 1540, 1580, 1585) will, in some examples, enable or disable (or perform any other function with respect to) a feature of the hardware asset executing the script/code (block 2740). To ensure that the configuration installation script/code remains secure from access by the ADL (e.g., any of the first, second, and/or third hardware assets 1540, 1580, 1585), the configuration installation script/code can be encrypted by the configuration installation generator 1628 in a manner such that the hardware asset can decrypt the configuration installation script/code but the ADL lacks decryption information needed to access the script/code.

In some examples, information to be used by the third party granted status as an ADL is provided to the third party by the example communicator 1626. In some examples, such information can include information identifying features for which the third party granted status as an ADL can issue licenses, the unique signature script/code to be used by the ADL when issuing a license, the configuration installation information by which a feature can be enable, disabled, etc., and information identifying the constraints/limits governing the licensing activities of the newly ADL (e.g., any of the example first, second and/or third ADLs 1515, 1565A 1570A) (block 545). Thereafter the program 2700 ends. In some examples, the program 2700 (or portions thereof) can be repeated as needed process additional incoming requested to obtain ADL status.

Figure 28:
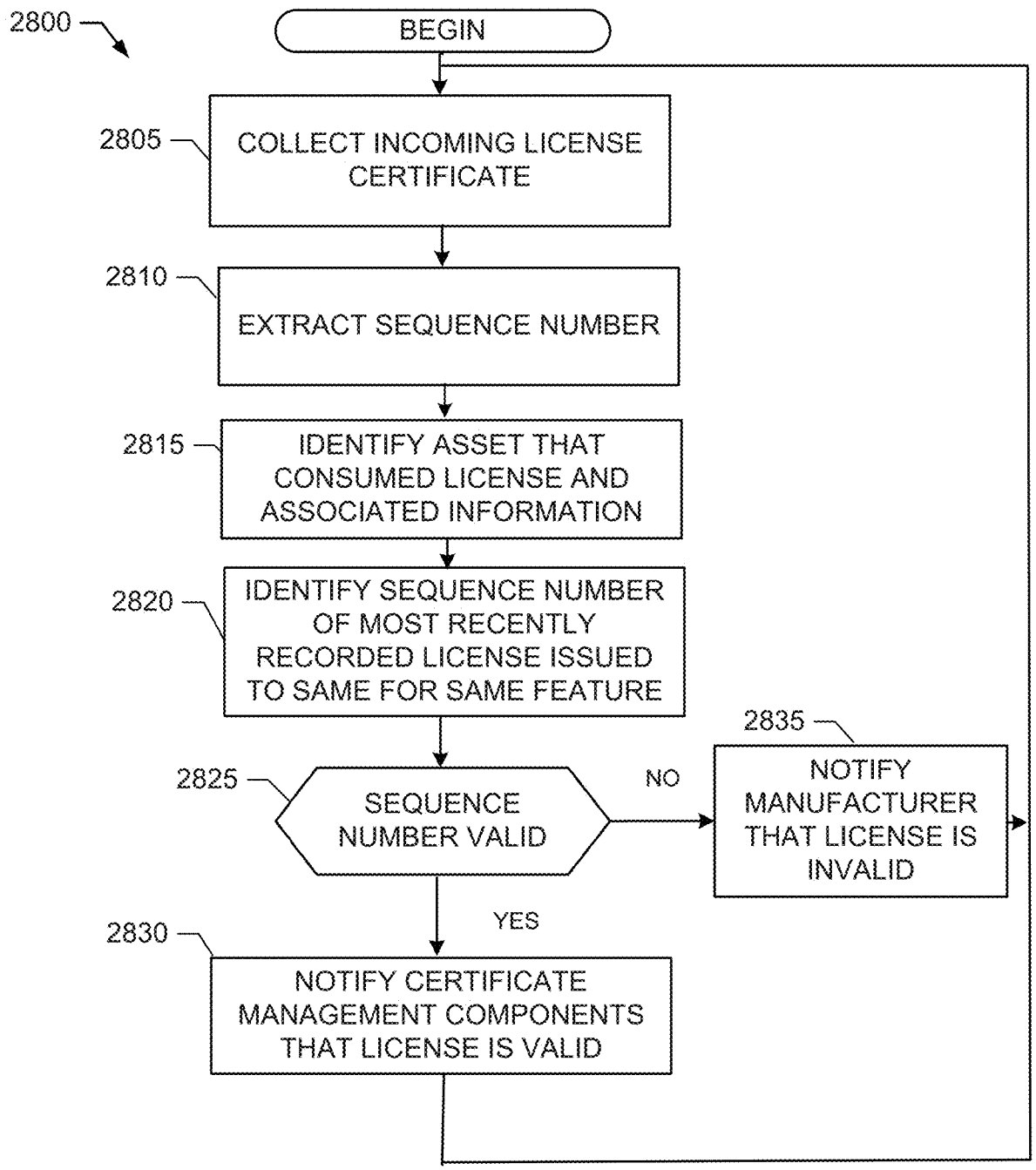
FIG. 28 is a flowchart representative of machine readable instructions which may be executed to implement an example certificate handling feature of the example central licensor of FIG. 16.

Turning now to FIG. 28, FIG. 28 is a program 2800 that can be executed to implement the example certificate handler 1630 (FIG. 2) of the example central processor 1510 (FIG. 15 and FIG. 16). The program 2800 begins at block 2805 at which the example certificate collector 1634 (FIG. 2) collects the incoming certificate. The example sequence number extractor 1640 (FIG. 2) extracts the sequence number of the license associated with the incoming certificate (block 2810). The example asset identifier 1632 (FIG. 2) uses information in the certificate to determine one or more of the hardware asset that consumed the license associated with the incoming certificate, the identity of the consumer (e.g., the third party) of the license, whether the license of the certificate was issued by an ADL, etc. (block 2815). In some such examples, some or all of the information may be encoded or otherwise included in the sequence number of the certificate. Using the identity of the hardware asset (or any of the other information included in the certificate) that consumed the license, the asset identifier 1632 accesses the sequence number storage 1638 to determine a preceding, most recently recorded license consumed by the hardware asset and a feature affected by the license to identify a sequence number associated with the preceding, most recently recorded license consumed by the same hardware asset for the same feature (block 2820). The example sequence number comparator 1636 compares the example sequence number associated with the certificate currently being handled by the certificate handler 1630 to the sequence number associated with the preceding, most recently recorded granted license consumed by the same hardware asset for the same feature (block 2825). When the sequence number comparator 1636 determines the example sequence number verifier 1642 was issued more recently than the license most recently recorded for the same feature and hardware asset, the sequence number verifier 1642 notifies other components of the certificate handler that the license associated with the certificate was validly issued so that the certificate can be handled by other components of the certificate handler in an appropriate manner (block 2830). When the sequence number comparator 1636 determines the example sequence number verifier 1642 was not issued more recently than the previously recorded license, the license is deemed invalid and the certificate handler and the sequence number verifier notifies other components of the certificate handler 1630 that the license associated with the certificate was outdated/expired/invalid (block 2835) so that the license associated with the certificate can be revoked or other appropriate action can be taken. After the certificate handler has been notified of the validity or invalidity of the license associated with the certificate (blocks 2835, 2830), the program 2800 returns to block 2805 and blocks subsequent thereto.

Figure 29:
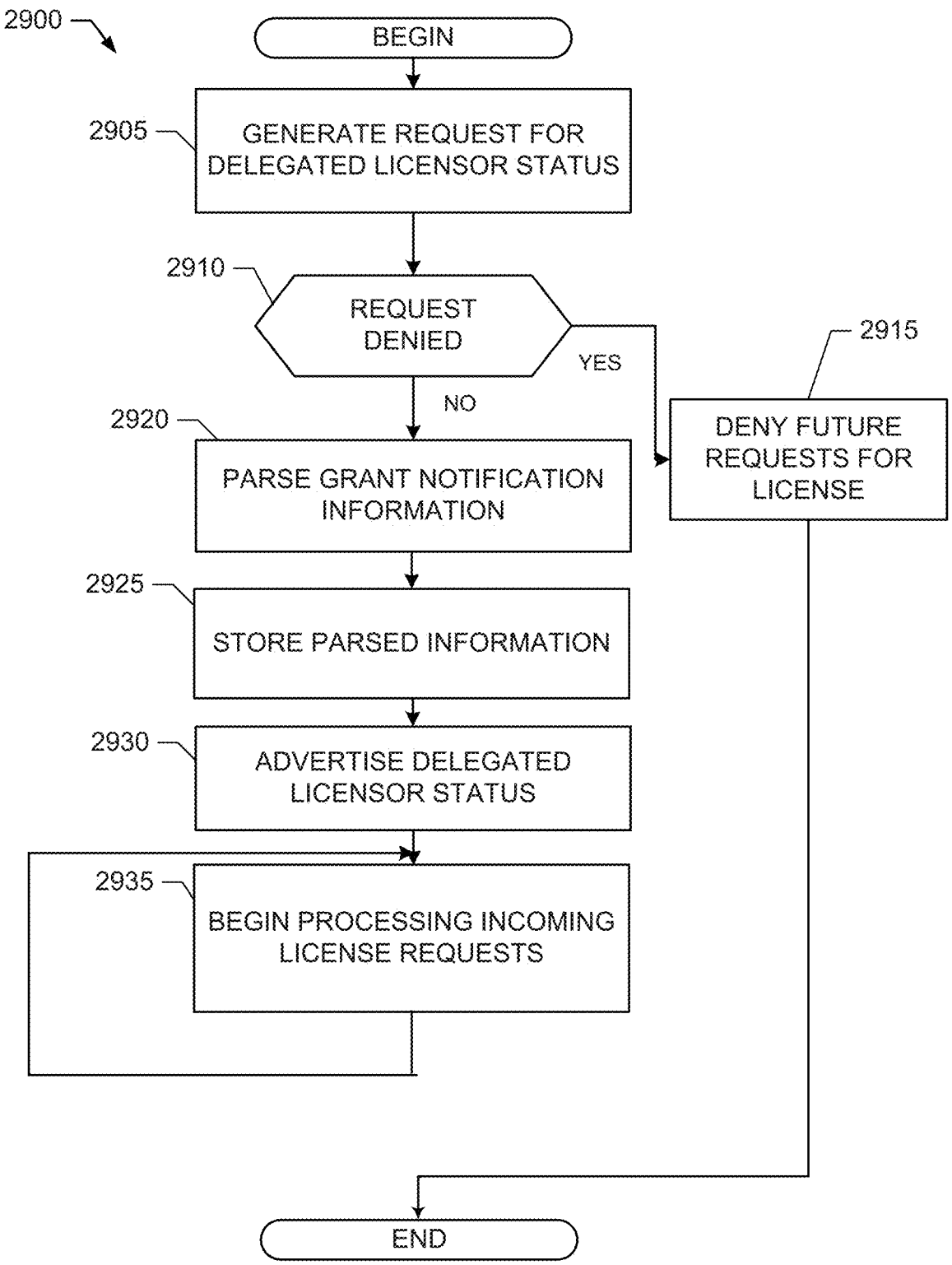
FIG. 29 is a flowchart representative of machine readable instructions which may be executed to implement an example request for authorized delegated licensor status feature of the example authorized delegated licensor of FIG. 17.

The flowchart of FIG. 29 represents a program 700 that can be executed to implement any of the example ADLs 1515, 1565A, 1570A (FIG. 3) of the example central processor 1510 (FIG. 15 and FIG. 16). The program 2900 begins at block 2905 at which the example authorized delegated license status requestor 1705 generates a request to become an ADL. The request can include information about the third party associated with the ADL 1515 including the information described with respect to FIG. 2. The request is communicated to the example central licensor 1510 (FIG. 1 and FIG. 2). The central licensor 1510 processes the request in the example manner disclosed above with respect to FIG. 2. Assuming the request is denied (block 2910), the example delegated license status requestor 1705 receives a denial, and the delegated license status requestor 1705 notifies the requestor that the example incoming license request has been denied (see block 2915). In response, any incoming requests for a license received from any customer (e.g., the customer enterprise system 115 (FIG. 1) are denied (on the basis that the ADL 1515 is not in fact authorized to grant such licenses) (block 2915). Thereafter, in some examples, the program 2900 ends.

Assuming the request is granted, a notification that status as an ADL has been granted is processed by the example status grant notification information parser 1712 (block 2920). The information can be parsed to identify information included in the notification such as a set of example constraints, a set of example feature identifiers, first example script/code that can be used to generate a license signature that is unique to the ADL 1515, second example script/code that is encrypted and that can be used to enable/disable a feature(s) of a hardware agent associated with the request. The example storage controller 1715 causes the parsed information to be stored in the storage (block 2925) for use by the example license generator 1735 when granting a license in response to a customer request for a license. An example advertiser 1730 notifies specific ones of the identified customers, for example, that the ADL 1515 has the ability and authority to grant feature licenses (block 2930). Thereafter, at block 2935, the example ADL can begin (and can continue to) process incoming license requests as permitted by the stored constraints and other information.

Figure 30:
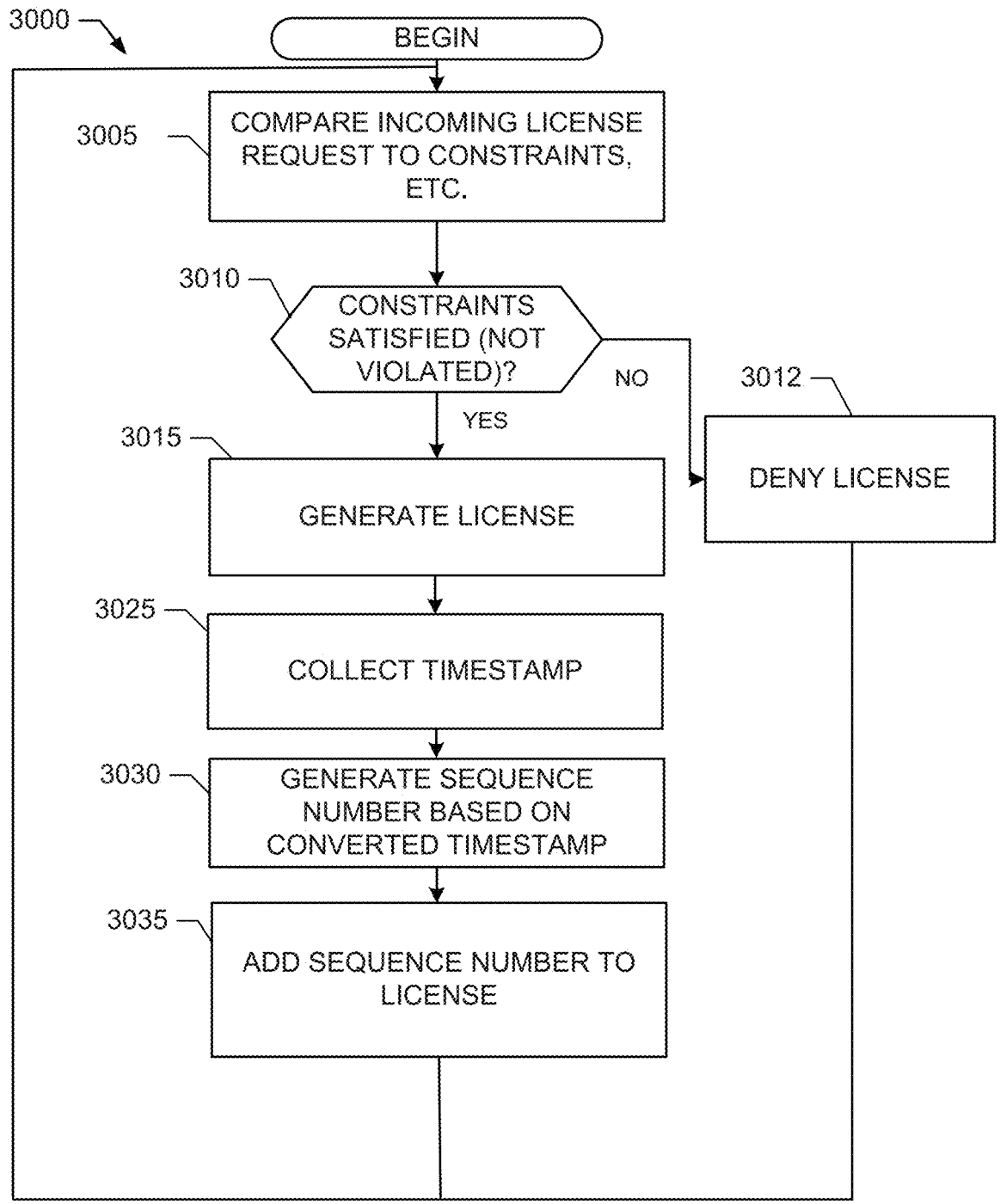
FIG. 30 is a flowchart representative of machine readable instructions which may be executed to implement an example license granting feature of the example authorized delegated licensor of FIG. 17.

The flowchart of FIG. 30 represents a program 800 that can be executed to implement any of the example ADLs 1515, 1565A, 1570A (FIG. 3). The program 800 begins at block 3005 at which the example license verifier 1737 (FIG. 3) compares an incoming license request including, for example, the feature for which a license is requested, information about the customer requesting the license, etc., (block 3005) and determines whether the license request violates any constraints, whether the feature for which the license is requested is among the features that the ADL is permitted to license, etc. (block 3010) When the constraints are violated or the feature is not among the features for which a license may be granted, the license verifier 1737) can communicate to the customer that the request is denied (block 3012) and may further communicate information identifying the violated constraints (or not), or any other reasons the license request is denied (block 3012).

When the constraints are not violated and the feature is among the features for which the ADL 1515 is permitted to grant licenses, the license verifier 1737 can notify the example license generator 1735 which can proceed to generate the license and communicate the license to the example customer (e.g., the customer enterprise system 115 of FIG. 1) (block 3015). In some examples, when generating the license, the license generator 1735 can activate the example sequence number generator 1740. In response, the example time capturer 1745 of the sequence number generator 1740 captures a time at which the license is generated (block 3025). The example time converter 1750 converts the captured time to a sequence number (block 3030) and the example sequence number adder 1755 causes the license generator 1735 to the add the sequence number to the license to be generated (block 3035). As described in further detail above, in some examples, a certificate generated when the license is activated includes the unique sequence number. In some such examples, the example central licensor 1510 can use the sequence number and information included in the certificate concerning the license to verify that the license associated with the certificate is the most recently recorded license for that feature and for the hardware asset that consumed the license as described above. After the sequence number is added to the license the program 3000 can return to the block 3005 and blocks subsequent thereto to continue generating sequence numbers to be added to licenses that have been generated.

Figure 31:
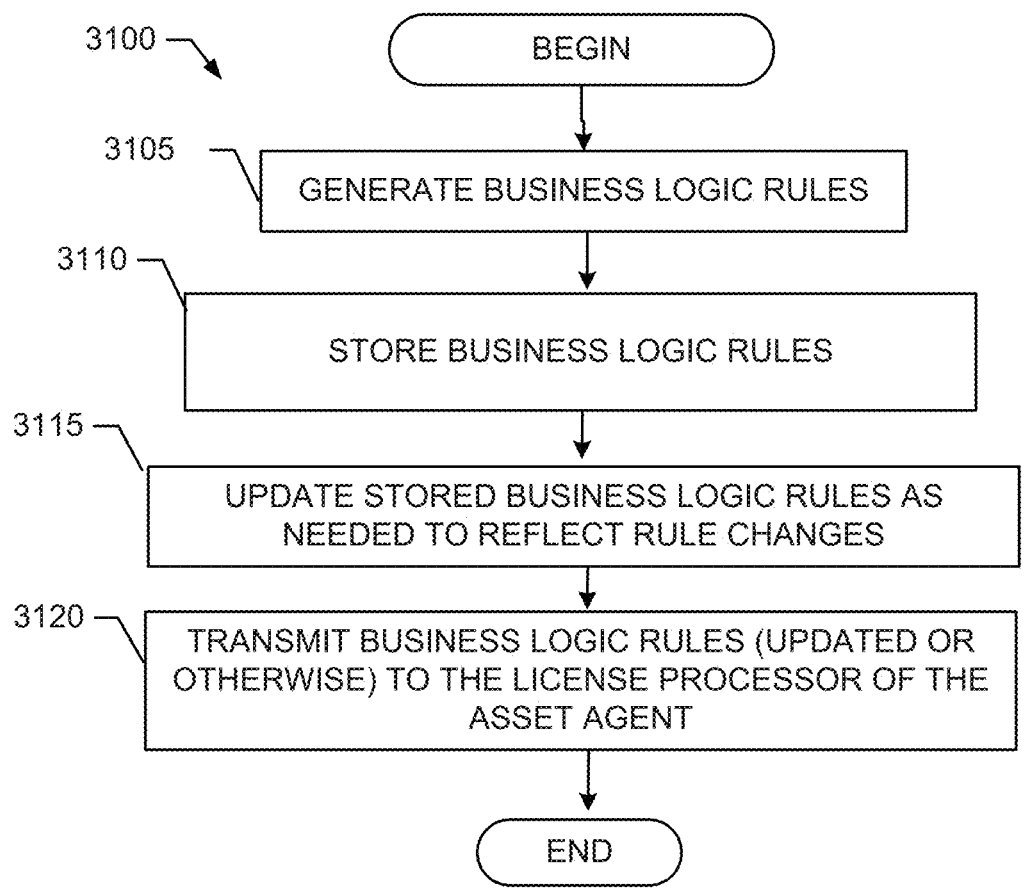
FIG. 31 is a flowchart representative of machine readable instructions which may be executed to implement an example business logic rules generating feature of the example central licensor of FIG. 16.

The flowchart of FIG. 31 represents a program 3100 that can be executed to implement an example portion of the example manufacturer enterprise system 110 (FIG. 1) illustrated in FIG. 18. The program 3100 begins at a block 3105 at which the example business logic rules generator 1801 generates the business logic rules in a business logic script/code format or in any other format. In some examples, the business logic rules are generated using machine learning. In some examples, the business logic rules (or parts thereof) can be entered by an administrator/user. In addition, the business logic rules are stored in the example business logic storage 1802 (block 3110). The example business logic rules updater 1804 can update the business logic rules as needed to reflect changes to the logic rules made by, for example, an administrator or by machine learning techniques as described above with respect to (block 3115). Thereafter, the license containing the business logic rules are transmitted to the example license processor of the example asset agent 214 of FIG. 2 (block 3120). It should be noted that, in some examples, a signature that can be used to verify the authenticity of the source of the business logic rules can be added to the business logic rules the business logic rules, prior to being transmitted to the license processor of the asset agent 214. The program of FIG. 31 (3100) then comes to an end. In some examples, the program 3100 is repeated when new business logic rules are to be generated and/or updated.

Figure 32:
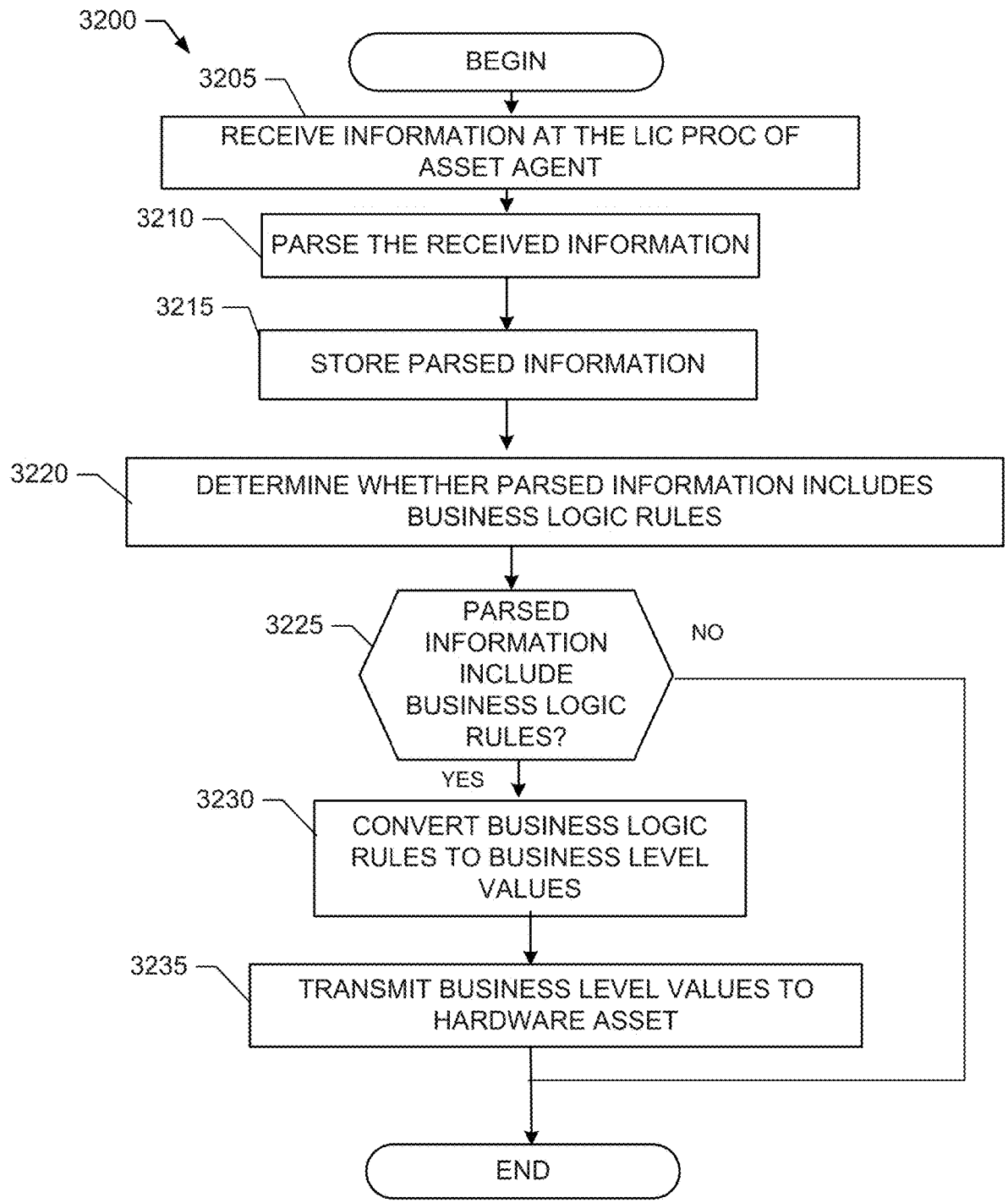
FIG. 32 is a flowchart representative of machine readable instructions which may be executed to implement an example business logic rules handling of the example hardware asset agent of FIG. 18.

The flowchart of FIG. 32 represents a program 3200 that can be executed to implement at least a portion of the license processor of the asset agent 214. In some examples, the example business logic rules are received at the license processor of the asset agent 1812 and are formatted as business logic script/code. In some examples, the business logic rules include a corresponding signature (and can further include a license to enable or disable a feature) (block 3205). Assuming the signature included with the business logic rules is properly verified, the information parser 1816 parses the information received at the license processor of the asset agent (214) to separate the business logic rules from the signature, the license, and/or any other information included with the received communication (block 3210). In some examples, the information parser 1816 can cause the parsed information including the business logic rules script/code (if any are included in the received information) to be placed into the storage 1818 (block 3215) for access, as needed.

In some examples, the business level requirements determiner 1820 determines whether the parsed information includes business level logic rules or instead only includes a feature to be activated or deactivated (block 3220). In some examples, the parsed information does not include business logic rules (block 3225) and the program 3200 ends. In some examples, the business level requirements determiner 1820 determines that the parsed information includes business logic rules (block 3225). In some such examples, the example business level requirements converter 1821 converts the business logic rules script/code into a set of business level values that are interpretable by a Processor/CPU (e.g., a Processor/CPU 1834 of the hardware asset 1822) (block 3230). In some examples, converting the values can include translating, concatenating, re-interpreting, etc., the business level requirements into actionable functions are understandable and executable by the example processor/CPU 1834. Thereafter, the business level values and any other accompanying information is supplied to the hardware asset (block 3235) and the program 3200 ends.

Figure 33:
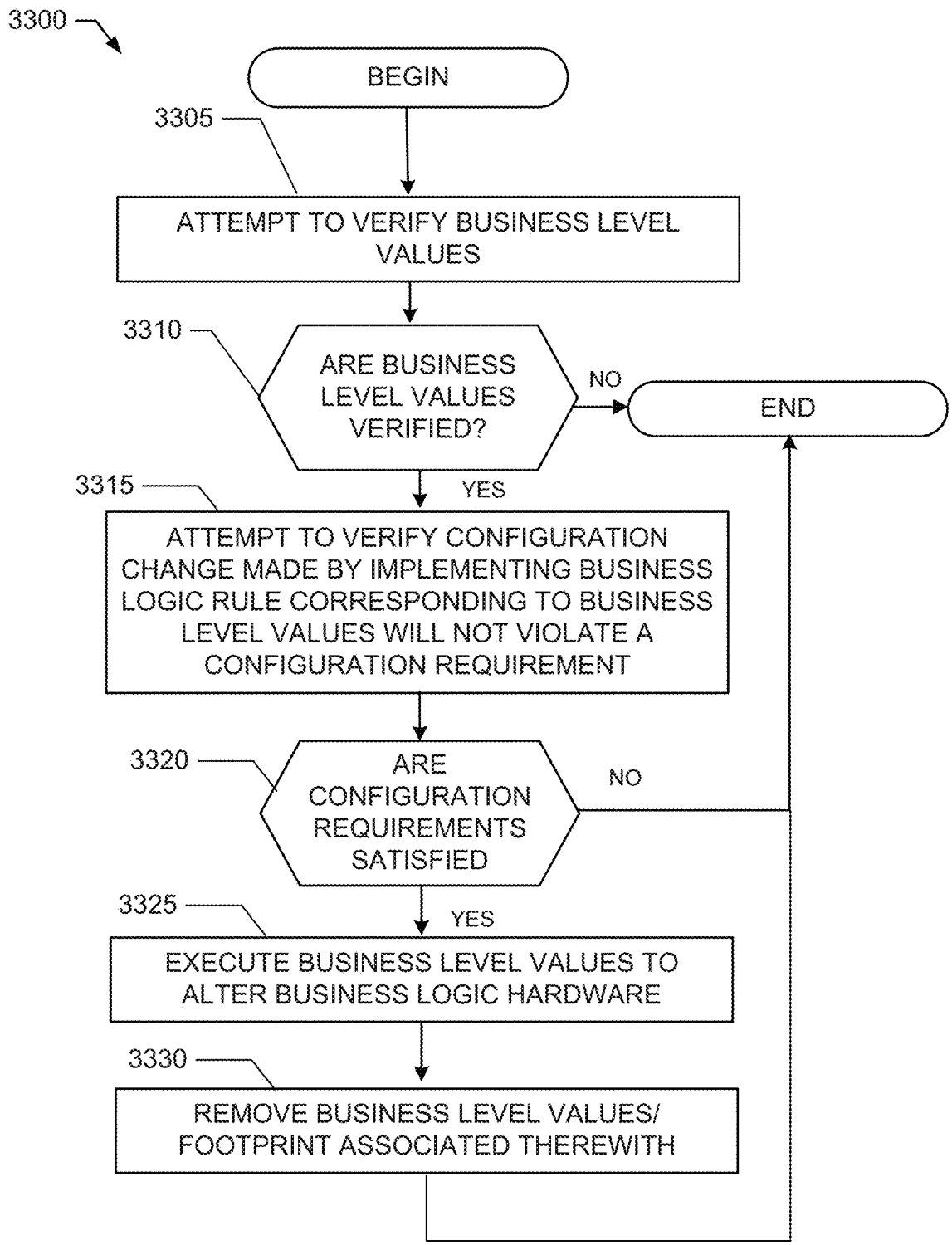
FIG. 33 is a flowchart representative of machine readable instructions which may be executed to implement an example business logic rules handling feature of the example hardware asset of FIG. 18.

The flowchart of FIG. 33 represents a program 3300 that can be executed to implement at least a portion of the hardware asset 1822 of FIG. 18. In some examples, the business level values verifier 1823 attempts to verify that the business level values were supplied by a valid source (which may include authenticating any signatures supplied with the business level values) (block 3305). When the business level values cannot be verified (block 3310), the business logic rules are not hardcoded into the hardware asset (e.g., are not implemented) and the program 3300 ends. When the business level values are verified (block 3310), the configuration change verifier 1824 attempts to verify that the configuration change to be implemented by changing the business logic hardware when the business level values are executed by the processor/CPU 1834 will comply with any configuration requirement(s) that may be particular to the configuration of the hardware asset 1822 (block 3315). In some examples, the configuration change verifier 1824 also attempts to verify that the business level values correspond to a business logic rule change instead of, for example, a feature activation or deactivation (block 3315). When the configuration change verifier 1824 determines that the change that will occur as a result of implementing the business level values associated with the business logic rules will cause the configuration of the hardware asset to violate a configuration requirement (block 3320), the business logic rules represented by the business level values are not implemented, and the program 3300 ends. Likewise, when the configuration change verifier 1824 determines that the change to be affected by the business level values correspond to a feature activation/deactivation and not business logic rules (block 3320), the program 3300 ends.

When the configuration change verifier 1824 successfully verifies that the change that will occur as a result of implementing the business level values (associated with the business logic rules) will not cause the configuration of the hardware asset 1822 to violate a configuration requirement and that the business logic rules do not correspond to feature activation/deactivation (3320), the business level values are operated on by the example processor/CPU 1834 (FIG. 4) to alter/hardcode the business logic hardware 1835 (block 3325). In some such examples, the example business level values are supplied to the processor/CPU 1834 which interprets the business level values in a manner that causes the business logic hardware 1835 to be changed to operate with the new business logic rules in place (block 3325). After the business logic rules have been hardcoded into the business logic hardware, the example script/code remover 1832 removes the script/code/business level values (and/or a footprint thereof) used by the processor/CPU 1743 to thereby make space for future changes to the hardware encoded business logic rules (block 3330). By removing the code, the limited space available in the hardware asset 1822 is not limited by the number of business level logic changes that may be made in the future as space is available to accommodate future such changes. Thereafter, the program 3300 ends. In some examples, the program 3300 can be repeated each time new business logic rules are generated and/or updated.

Figure 34:
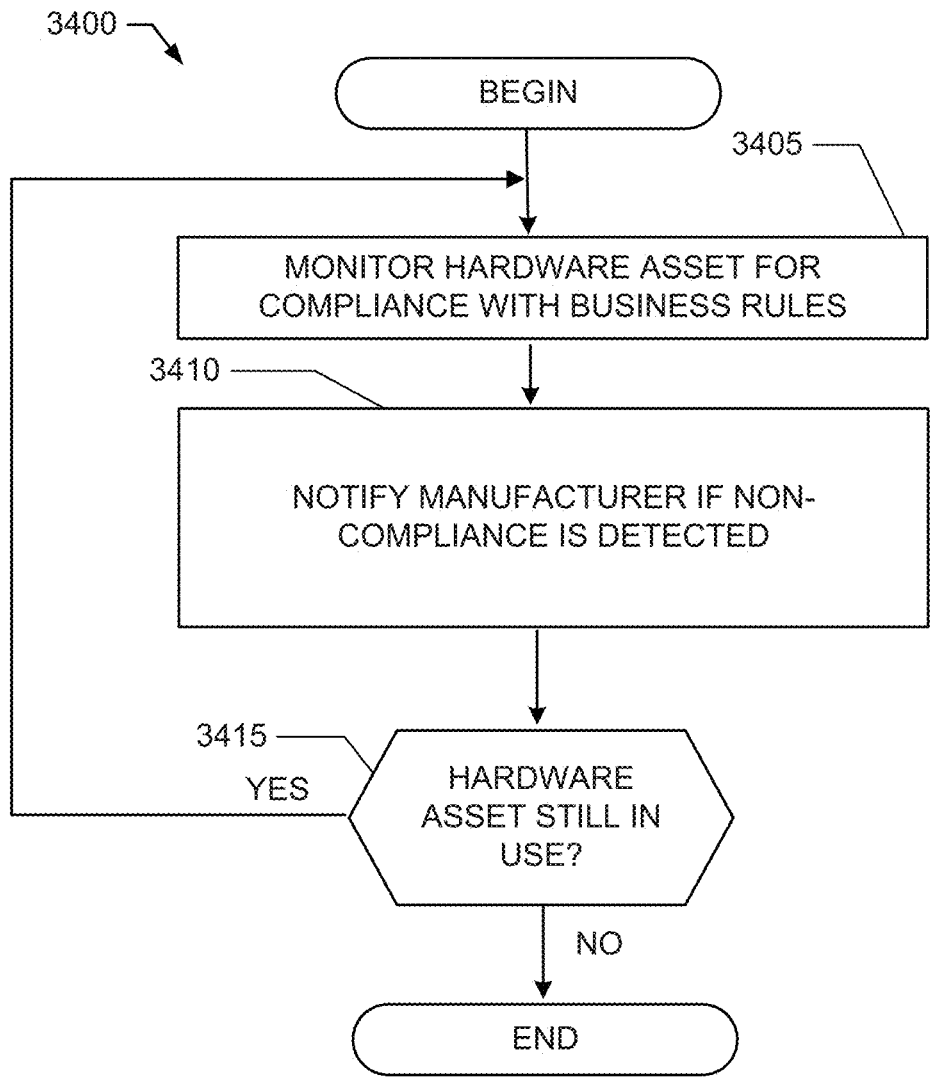
FIG. 34 is a flowchart representative of machine readable instructions which may be executed to implement an example compliance monitoring feature of the example hardware asset of FIG. 18.

The flowchart of FIG. 34 represents a program 3400 that can be executed to implement at least a portion of the hardware asset 1822 of FIG. 18. In some examples, after the business logic rules have been implemented by the hardware asset in the manner described with respect to the program 3300 of FIG. 33, the example compliance monitor 1828 monitors the operation of the example hardware asset 1822 in light of the business logic rules (block 3405). In some examples, the compliance monitor 1828 of FIG. 18 generates notifications to the asset agent 214 (see FIG. 2) for transmission to the manufacturer 110 when noncompliance is detected (block 3410). The program 3400 continues to monitor compliance and report non-compliant operation until the hardware asset is taken out of commission or otherwise retired/replaced (as determined at block 3415) at which time the program 3400 ends.

Processor and Distribution Platforms

Figure 35:
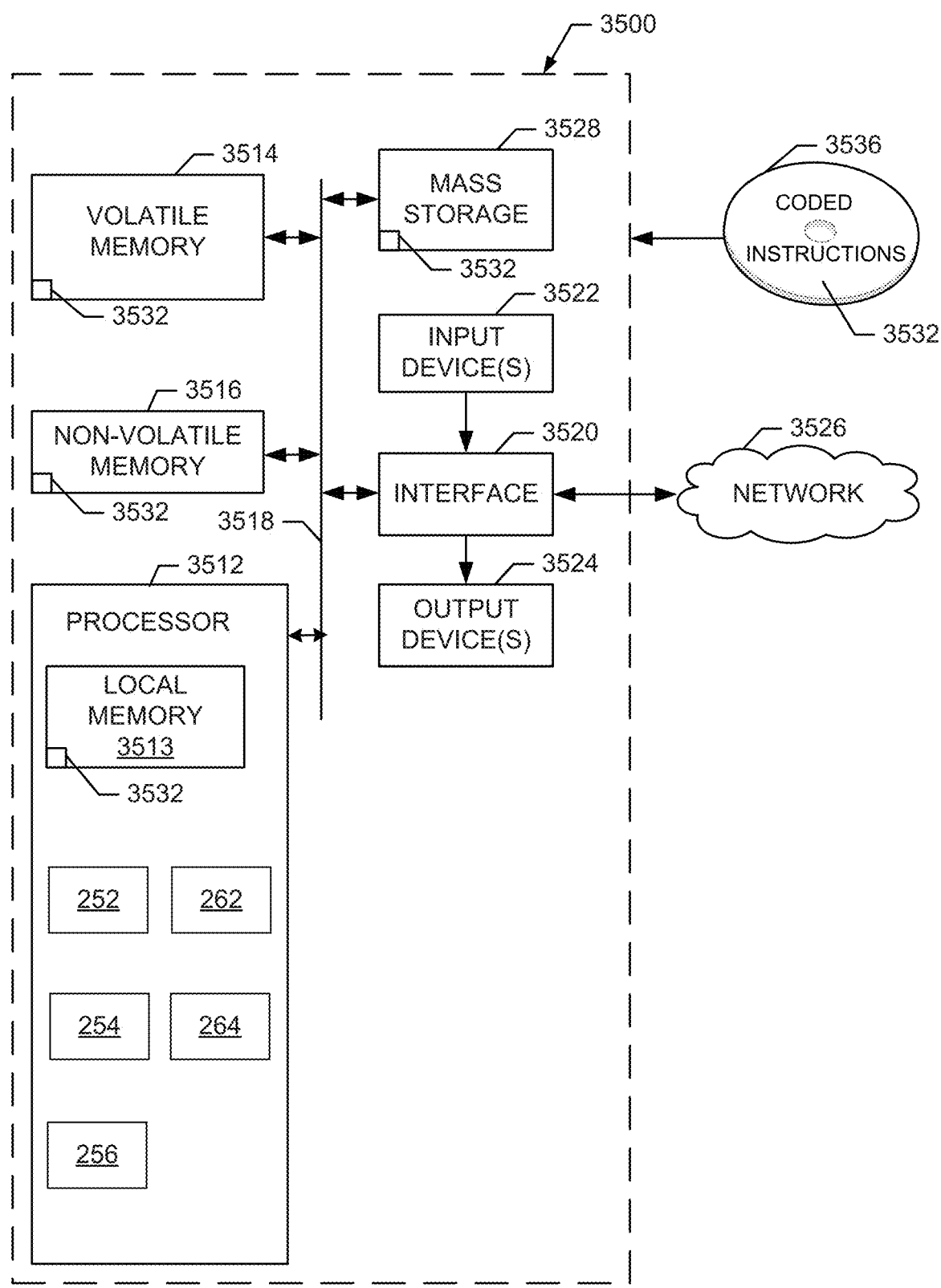
FIG. 35 is a block diagram of an example processor platform structured to execute the example computer readable instructions of FIG. 19 to implement the example manufacturer enterprise system of FIGS. 1 and/or 2.

FIG. 35 is a block diagram of an example processor platform 3500 structured to execute the instructions of FIG. 19 to implement the manufacture enterprise system 110 of FIGS. 1-9. The processor platform 3500 can be, for example, a server, a personal computer, a workstation, a self-learning machine (e.g., a neural network), a mobile device (e.g., a cell phone, a smart phone, a tablet such as an iPad™), or any other type of computing device.

The processor platform 3500 of the illustrated example includes a processor 3512. The processor 3512 of the illustrated example is hardware. For example, the processor 3512 can be implemented by one or more integrated circuits, logic circuits, microprocessors, GPUs, DSPs, or controllers from any desired family or manufacturer. The hardware processor 3512 may be a semiconductor based (e.g., silicon based) device. In this example, the processor 3512 implements one or more of the example product management service 252, the example customer management service 254, the example SDSi feature management service 256, the example SDSi portal 262 and/or the example SDSi agent management interface 264.

The processor 3512 of the illustrated example includes a local memory 3513 (e.g., a cache). The processor 3512 of the illustrated example is in communication with a main memory including a volatile memory 3514 and a non-volatile memory 3516 via a link 3518. The link 3518 may be implemented by a bus, one or more point-to-point connections, etc., or a combination thereof. The volatile memory 3514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 3516 may be implemented by flash memory and/or any other desired type of memory device. Access to the main memory 3514, 3516 is controlled by a memory controller.

The processor platform 3500 of the illustrated example also includes an interface circuit 3520. The interface circuit 3520 may be implemented by any type of interface standard, such as an Ethernet interface, a universal serial bus (USB), a Bluetooth® interface, a near field communication (NFC) interface, and/or a PCI express interface.

In the illustrated example, one or more input devices 3522 are connected to the interface circuit 3520. The input device(s) 3522 permit(s) a user to enter data and/or commands into the processor 3512. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 3500, can allow the user to control the computer system and provide data to the computer using physical gestures, such as, but not limited to, hand or body movements, facial expressions, and face recognition.

One or more output devices 3524 are also connected to the interface circuit 3520 of the illustrated example. The output devices 3524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 3520 of the illustrated example, thus, typically includes a graphics driver card, a graphics driver chip and/or a graphics driver processor.

The interface circuit 3520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 3500 of the illustrated example also includes one or more mass storage devices 3528 for storing software and/or data. Examples of such mass storage devices 3528 include floppy disk drives, hard drive disks, compact disk drives, Blu-ray disk drives, redundant array of independent disks (RAID) systems, and digital versatile disk (DVD) drives.

The machine executable instructions 3532 corresponding to the instructions of FIG. 19 may be stored in the mass storage device 3528, in the volatile memory 3514, in the non-volatile memory 3516, in the local memory 3513 and/or on a removable non-transitory computer readable storage medium, such as a CD or DVD 3536.

Figure 36:
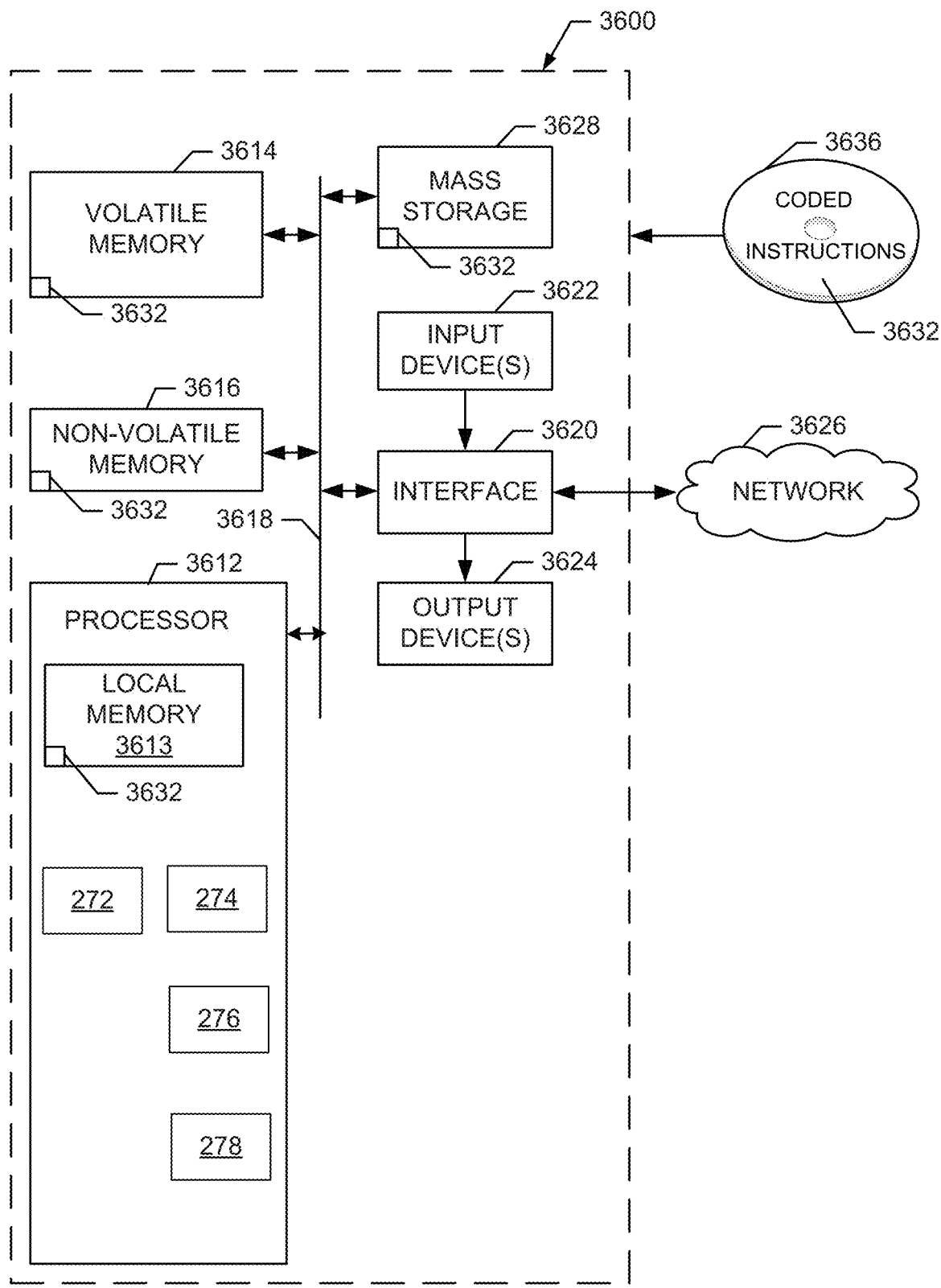
FIG. 36 is a block diagram of an example processor platform structured to execute the example computer readable instructions of FIG. 20 to implement the example customer enterprise system of FIGS. 1 and/or 2.

FIG. 36 is a block diagram of an example processor platform 3600 structured to execute the instructions of FIG. 20 to implement the customer enterprise system 115 of FIGS. 1-9. The processor platform 3600 can be, for example, a server, a personal computer, a workstation, a self-learning machine (e.g., a neural network), a mobile device (e.g., a cell phone, a smart phone, a tablet such as an iPad™) or any other type of computing device.

The processor platform 3600 of the illustrated example includes a processor 3612. The processor 3612 of the illustrated example is hardware. For example, the processor 3612 can be implemented by one or more integrated circuits, logic circuits, microprocessors, GPUs, DSPs, or controllers from any desired family or manufacturer. The hardware processor 3612 may be a semiconductor based (e.g., silicon based) device. In this example, the processor 3612 implements one or more of the example SDSi client agent 272, the example platform inventory management service 274, the example accounts management service 276 and/or the example entitlement management service 278.

The processor 3612 of the illustrated example includes a local memory 3613 (e.g., a cache). The processor 3612 of the illustrated example is in communication with a main memory including a volatile memory 3614 and a non-volatile memory 3616 via a link 3618. The link 3618 may be implemented by a bus, one or more point-to-point connections, etc., or a combination thereof. The volatile memory 3614 may be implemented by SDRAM, DRAM, RDRAM® and/or any other type of random access memory device. The non-volatile memory 3616 may be implemented by flash memory and/or any other desired type of memory device. Access to the main memory 3614, 3616 is controlled by a memory controller.

The processor platform 3600 of the illustrated example also includes an interface circuit 3620. The interface circuit 3620 may be implemented by any type of interface standard, such as an Ethernet interface, a USB, a Bluetooth® interface, an NFC interface, and/or a PCI express interface.

In the illustrated example, one or more input devices 3622 are connected to the interface circuit 3620. The input device(s) 3622 permit(s) a user to enter data and/or commands into the processor 3612. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 3600, can allow the user to control the computer system and provide data to the computer using physical gestures, such as, but not limited to, hand or body movements, facial expressions, and face recognition.

One or more output devices 3624 are also connected to the interface circuit 3620 of the illustrated example. The output devices 3624 can be implemented, for example, by display devices (e.g., an LED, an OLED, an LCD, a CRT display, an IPS display, a touchscreen, etc.), a tactile output device, a printer and/or speakers(s). The interface circuit 3620 of the illustrated example, thus, typically includes a graphics driver card, a graphics driver chip and/or a graphics driver processor.

The interface circuit 3620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3626. The communication can be via, for example, an Ethernet connection, a DSL connection, a telephone line connection, a coaxial cable system, a satellite system, a line-of-site wireless system, a cellular telephone system, etc.

The processor platform 3600 of the illustrated example also includes one or more mass storage devices 3628 for storing software and/or data. Examples of such mass storage devices 3628 include floppy disk drives, hard drive disks, compact disk drives, Blu-ray disk drives, RAID systems, and DVD drives.

The machine executable instructions 3632 corresponding to the instructions of FIG. 20 may be stored in the mass storage device 3628, in the volatile memory 3614, in the non-volatile memory 3616, in the local memory 3613 and/or on a removable non-transitory computer readable storage medium, such as a CD or DVD 3636.

Figure 37:
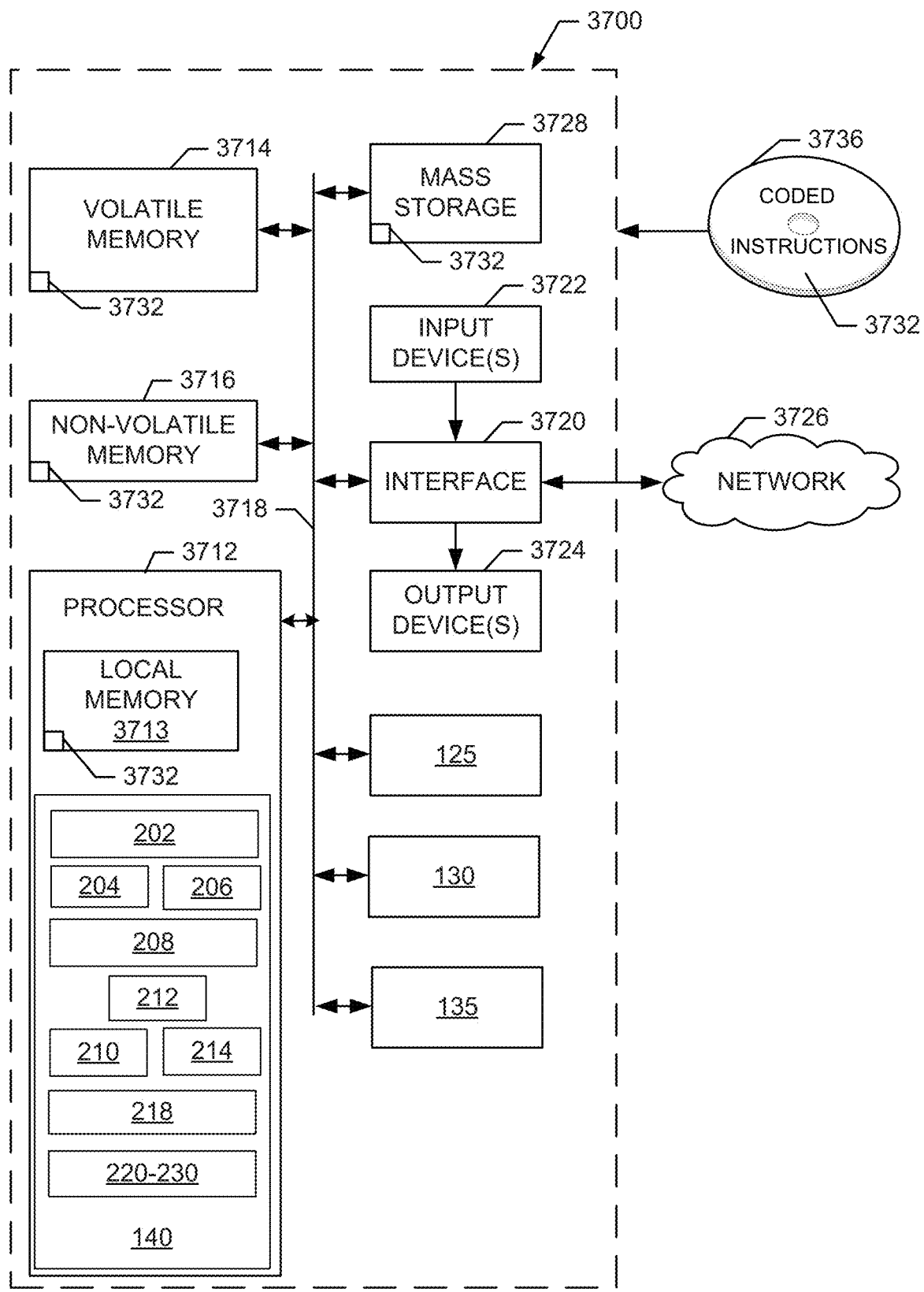
FIG. 37 is a block diagram of an example processor platform structured to execute the example computer readable instructions of FIG. 21 to implement the example software defined silicon agent of FIGS. 1 and/or 2.

FIG. 37 is a block diagram of an example processor platform 3700 structured to execute the instructions of FIG. 35 to implement the SDSi asset agent 140 of FIGS. 1-9. The processor platform 3700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, a headset or other wearable device, or any other type of computing device.

The processor platform 3700 of the illustrated example includes a processor 3712. The processor 3712 of the illustrated example is hardware. For example, the processor 3712 can be implemented by one or more integrated circuits, logic circuits, microprocessors, GPUs, DSPs, or controllers from any desired family or manufacturer. The hardware processor 3712 may be a semiconductor based (e.g., silicon based) device. In this example, the processor 3712 implements one or more of the example agent interface 202, the example agent local services 204, the example analytics engine 206, the example communication services 208, the example agent CLI 210, the example agent daemon 212, the example license processor 214, the example agent library 218 and/or the example feature libraries 220-230.

The processor 3712 of the illustrated example includes a local memory 3713 (e.g., a cache). The processor 3712 of the illustrated example is in communication with a main memory including a volatile memory 3714 and a non-volatile memory 3716 via a link 3718. The link 3718 may be implemented by a bus, one or more point-to-point connections, etc., or a combination thereof. The volatile memory 3714 may be implemented by SDRAM, DRAM, RDRAM® and/or any other type of random access memory device. The non-volatile memory 3716 may be implemented by flash memory and/or any other desired type of memory device. Access to the main memory 3714, 3716 is controlled by a memory controller.

The processor platform 3700 of the illustrated example also includes an interface circuit 3720. The interface circuit 3720 may be implemented by any type of interface standard, such as an Ethernet interface, a USB, a Bluetooth® interface, an NFC interface, and/or a PCI express interface.

In the illustrated example, one or more input devices 3722 are connected to the interface circuit 3720. The input device(s) 3722 permit(s) a user to enter data and/or commands into the processor 3712. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 3700, can allow the user to control the computer system and provide data to the computer using physical gestures, such as, but not limited to, hand or body movements, facial expressions, and face recognition.

One or more output devices 3724 are also connected to the interface circuit 3720 of the illustrated example. The output devices 3724 can be implemented, for example, by display devices (e.g., an LED, an OLED, an LCD, a CRT display, an IPS display, a touchscreen, etc.), a tactile output device, a printer and/or speakers(s). The interface circuit 3720 of the illustrated example, thus, typically includes a graphics driver card, a graphics driver chip and/or a graphics driver processor.

The interface circuit 3720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3726. The communication can be via, for example, an Ethernet connection, a DSL connection, a telephone line connection, a coaxial cable system, a satellite system, a line-of-site wireless system, a cellular telephone system, etc.

The processor platform 3700 of the illustrated example also includes one or more mass storage devices 3728 for storing software and/or data. Examples of such mass storage devices 3728 include floppy disk drives, hard drive disks, compact disk drives, Blu-ray disk drives, RAID systems, and DVD drives.

The machine executable instructions 3732 corresponding to the instructions of FIG. 21 may be stored in the mass storage device 3728, in the volatile memory 3714, in the non-volatile memory 3716, in the local memory 3713 and/or on a removable non-transitory computer readable storage medium, such as a CD or DVD 3736.

Figure 38:
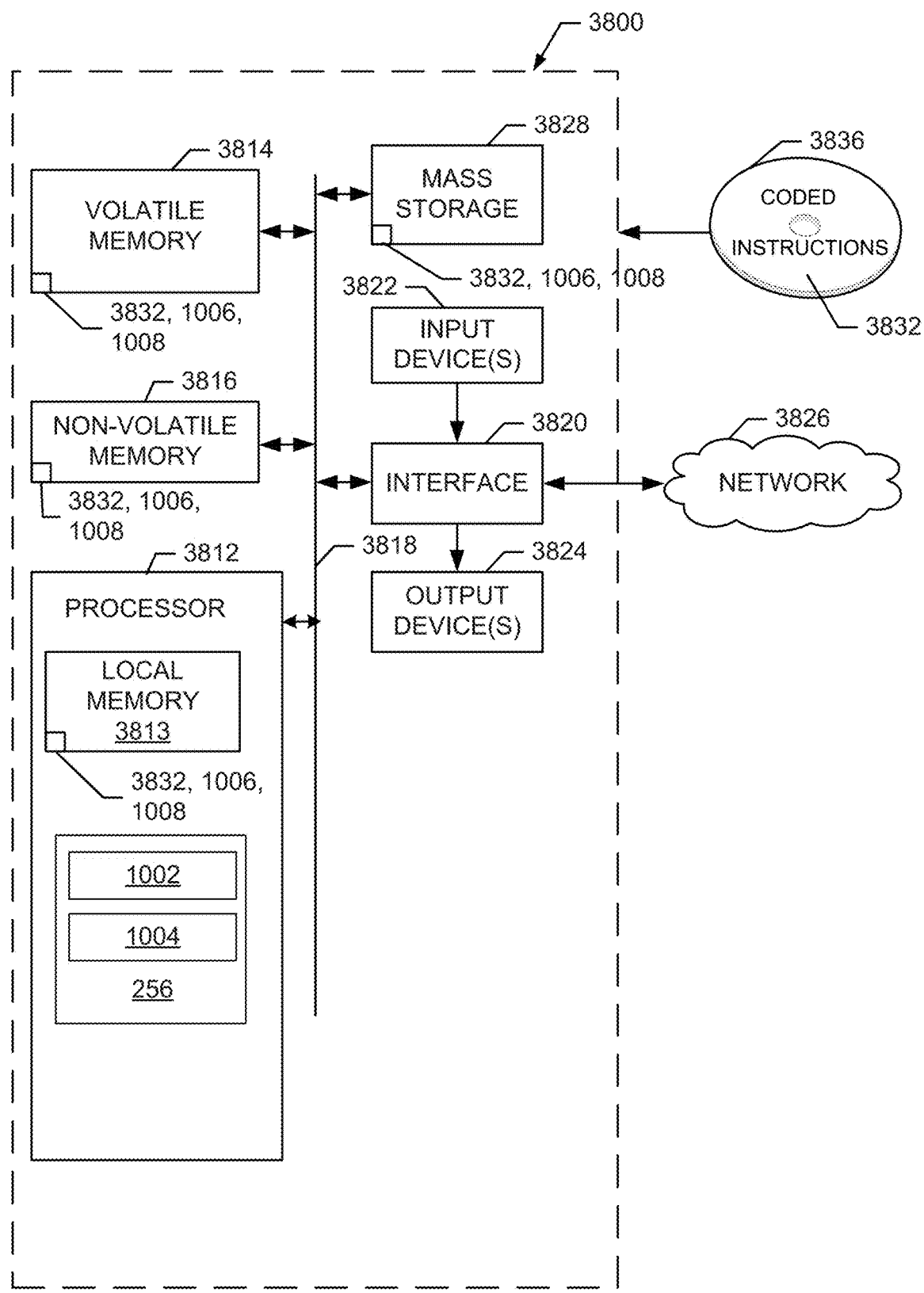
FIG. 38 is a block diagram of an example processor platform structured to execute the example computer readable instructions of FIGS. 22A-22B and 26 to implement the example manufacturer enterprise system of FIG. 10.

FIG. 38 is a block diagram of an example processor platform 3800 structured to execute the instructions of FIGS. 22A-22B and 26 to implement the manufacturer enterprise system 110 of FIG. 10. The processor platform 3800 can be, for example, a server, a personal computer, a workstation, a self-learning machine (e.g., a neural network), a mobile device (e.g., a cell phone, a smart phone, a tablet such as an iPad®), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 3800 of the illustrated example includes a processor 3812. The processor 3812 of the illustrated example is hardware. For example, the processor 3812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example entitlement request analyzer 1002, the example license generator 1004, the example license data store 1006, and the example identifier database 1008.

The processor 3812 of the illustrated example includes a local memory 3813 (e.g., a cache). The processor 3812 of the illustrated example is in communication with a main memory including a volatile memory 3814 and a non-volatile memory 3816 via a bus 3818. The volatile memory 3814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 3816 may be implemented by flash memory and/or any other desired type of memory device. Access to the main memory 3814, 3816 is controlled by a memory controller.

The processor platform 3800 of the illustrated example also includes an interface circuit 3820. The interface circuit 3820 may be implemented by any type of interface standard, such as an Ethernet interface, a universal serial bus (USB), a Bluetooth® interface, a near field communication (NFC) interface, and/or a PCI express interface.

In the illustrated example, one or more input devices 3822 are connected to the interface circuit 3820. The input device(s) 3822 permit(s) a user to enter data and/or commands into the processor 3812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 3824 are also connected to the interface circuit 1120 of the illustrated example. The output devices 3824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 3820 of the illustrated example, thus, typically includes a graphics driver card, a graphics driver chip and/or a graphics driver processor.

The interface circuit 3820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 3800 of the illustrated example also includes one or more mass storage devices 3828 for storing software and/or data. Examples of such mass storage devices 3828 include floppy disk drives, hard drive disks, compact disk drives, Blu-ray disk drives, redundant array of independent disks (RAID) systems, and digital versatile disk (DVD) drives.

The machine executable instructions 3832 of FIGS. 22A-22B and 26 may be stored in the mass storage device 3828, in the volatile memory 3814, in the non-volatile memory 3816, and/or on a removable non-transitory computer readable storage medium such as a CD or DVD 3836.

Figure 39:
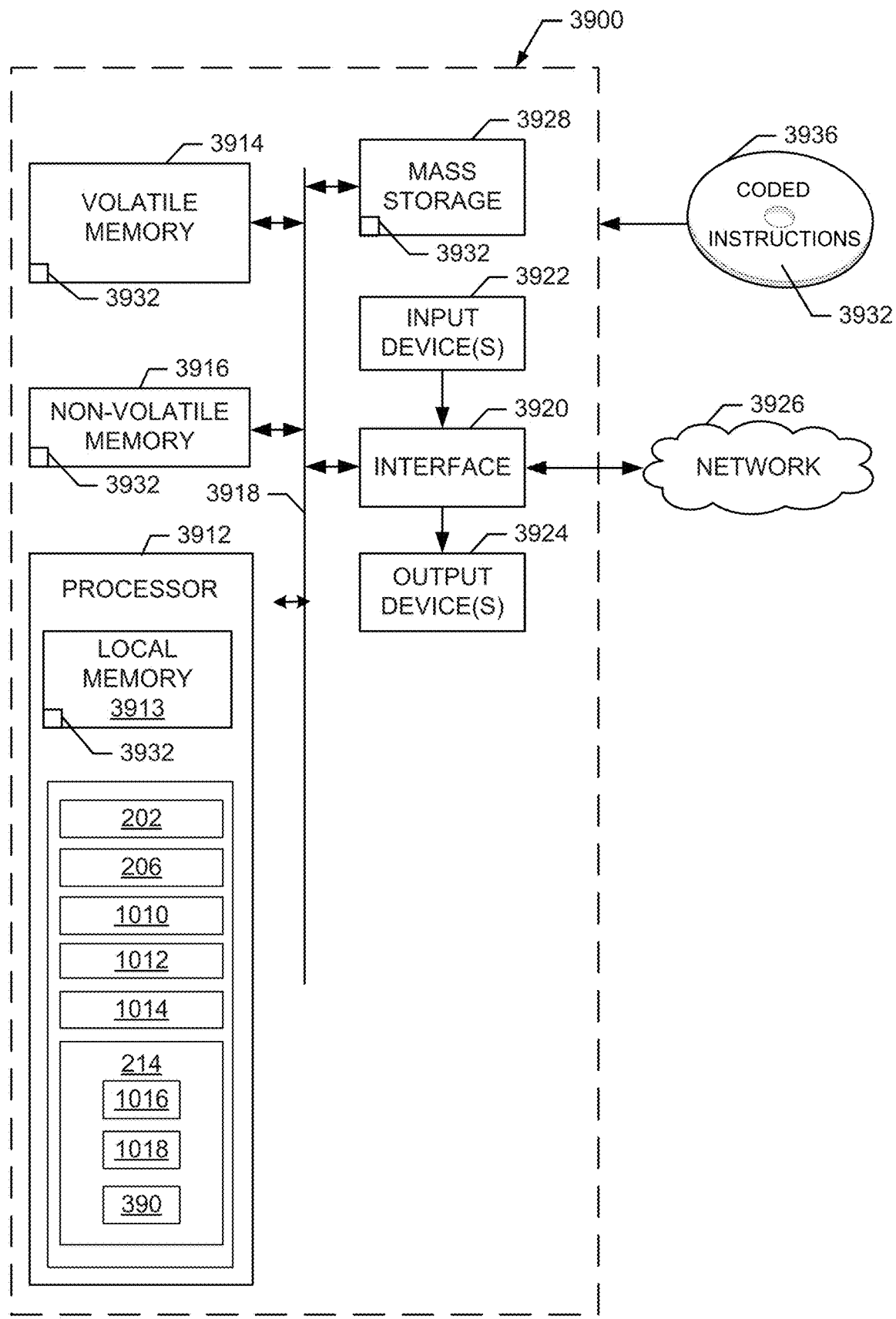
FIG. 39 is a block diagram of an example processor platform structured to execute the example computer readable instructions of FIGS. 23-25 to implement the example SDSi asset agent of FIG. 10.

FIG. 39 is a block 3900 structured to execute the instructions of FIGS. 23-25 to implement the SDSi asset agent 140 of FIG. 10. The processor platform 3900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 3900 of the illustrated example includes a processor 3912. The processor 3912 of the illustrated example is hardware. For example, the processor 3912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example agent interface 202, the example analytics engine 206, the example license processor 214, the example hardware identifier manager 1010, the example entropy identifier generator 1012, the example certificate manager 1014, the example license manager 1016, the example authentication analyzer 1018, and the example feature activator 1020.

The processor 3912 of the illustrated example includes a local memory 3913 (e.g., a cache). The processor 3912 of the illustrated example is in communication with a main memory including a volatile memory 3914 and a non-volatile memory 3916 via a bus 3918. The volatile memory 3914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 3916 may be implemented by flash memory and/or any other desired type of memory device. Access to the main memory 3914, 3916 is controlled by a memory controller.

The processor platform 3900 of the illustrated example also includes an interface circuit 3920. The interface circuit 3920 may be implemented by any type of interface standard, such as an Ethernet interface, a universal serial bus (USB), a Bluetooth® interface, a near field communication (NFC) interface, and/or a PCI express interface.

In the illustrated example, one or more input devices 3922 are connected to the interface circuit 3920. The input device(s) 3922 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 3924 are also connected to the interface circuit 3920 of the illustrated example. The output devices 3924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 3920 of the illustrated example, thus, typically includes a graphics driver card, a graphics driver chip and/or a graphics driver processor.

The interface circuit 3920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 3900 of the illustrated example also includes one or more mass storage devices 3928 for storing software and/or data. Examples of such mass storage devices 3928 include floppy disk drives, hard drive disks, compact disk drives, Blu-ray disk drives, redundant array of independent disks (RAID) systems, and digital versatile disk (DVD) drives.

The machine executable instructions 3932 of FIGS. 23-25 may be stored in the mass storage device 3928, in the volatile memory 3914, in the non-volatile memory 3916, and/or on a removable non-transitory computer readable storage medium such as a CD or DVD 3936.

Figure 40:
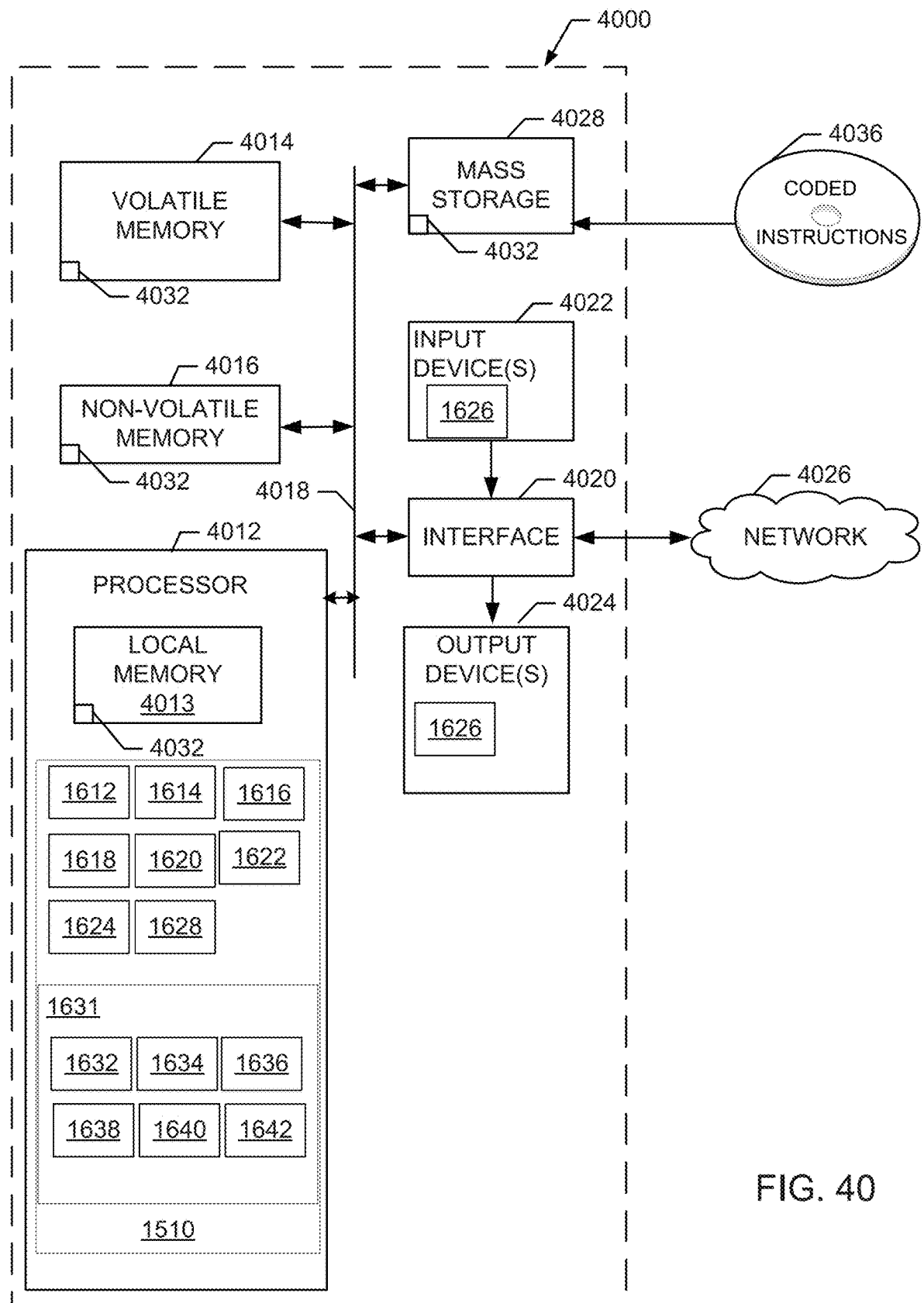
FIG. 40 is a block diagram of an example processor platform structured to execute the example computer readable instructions of FIG. 27 and FIG. 28 to implement the example central licensor of FIGS. 15, and 16.

FIG. 40 is a block diagram of an example processor platform 4000 structured to execute the instructions of FIGS. 27 and 28 to implement the central licensor of FIG. 15 and FIG. 16. The processor platform 4000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 4000 of the illustrated example includes a processor 4012. The processor 4012 of the illustrated example is hardware. For example, the processor 4012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example requirement definer 1612, the example third party verifier 1614, the example request denier 1616, the example request grantor 1618, the example constraints generator 1620, the example feature identifier 1622, the example signature generator 1624, the example configuration installation generator 1628, the example certificate processor 1630 certificate handler 1630, the example sequence number manager 1631, the example asset identifier 1632, the example certificate collector 1634, the example sequence number comparator 1636, the example sequence number extractor 1640, and the example sequence number verifier 1642.

The processor 4012 of the illustrated example includes a local memory 4013 (e.g., a cache). The processor 4012 of the illustrated example is in communication with a main memory including a volatile memory 4014 and a non-volatile memory 4016 via a bus 4018. The volatile memory 4014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 4016 may be implemented by flash memory and/or any other desired type of memory device. Access to the main memory 4014, 4016 is controlled by a memory controller.

The processor platform 4000 of the illustrated example also includes an interface circuit 4020. The interface circuit 4020 may be implemented by any type of interface standard, such as an Ethernet interface, a universal serial bus (USB), a Bluetooth® interface, a near field communication (NFC) interface, and/or a PCI express interface.

In the illustrated example, one or more input devices 4022 are connected to the interface circuit 4020. The input device(s) 4022 permit(s) a user to enter data and/or commands into the processor 4012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 4024 are also connected to the interface circuit 4020 of the illustrated example. The output devices 4024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 4020 of the illustrated example, thus, typically includes a graphics driver card, a graphics driver chip and/or a graphics driver processor.

The interface circuit 4020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 4026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 4000 of the illustrated example also includes one or more mass storage devices 4028 for storing software and/or data. Examples of such mass storage devices 4028 include floppy disk drives, hard drive disks, compact disk drives, Blu-ray disk drives, redundant array of independent disks (RAID) systems, and digital versatile disk (DVD) drives.

The machine executable instructions 4032 of FIGS. 27 and 28 may be stored in the mass storage device 4028, in the volatile memory 4014, in the non-volatile memory 4016, and/or on a removable non-transitory computer readable storage medium such as a CD or DVD.

Figure 41:
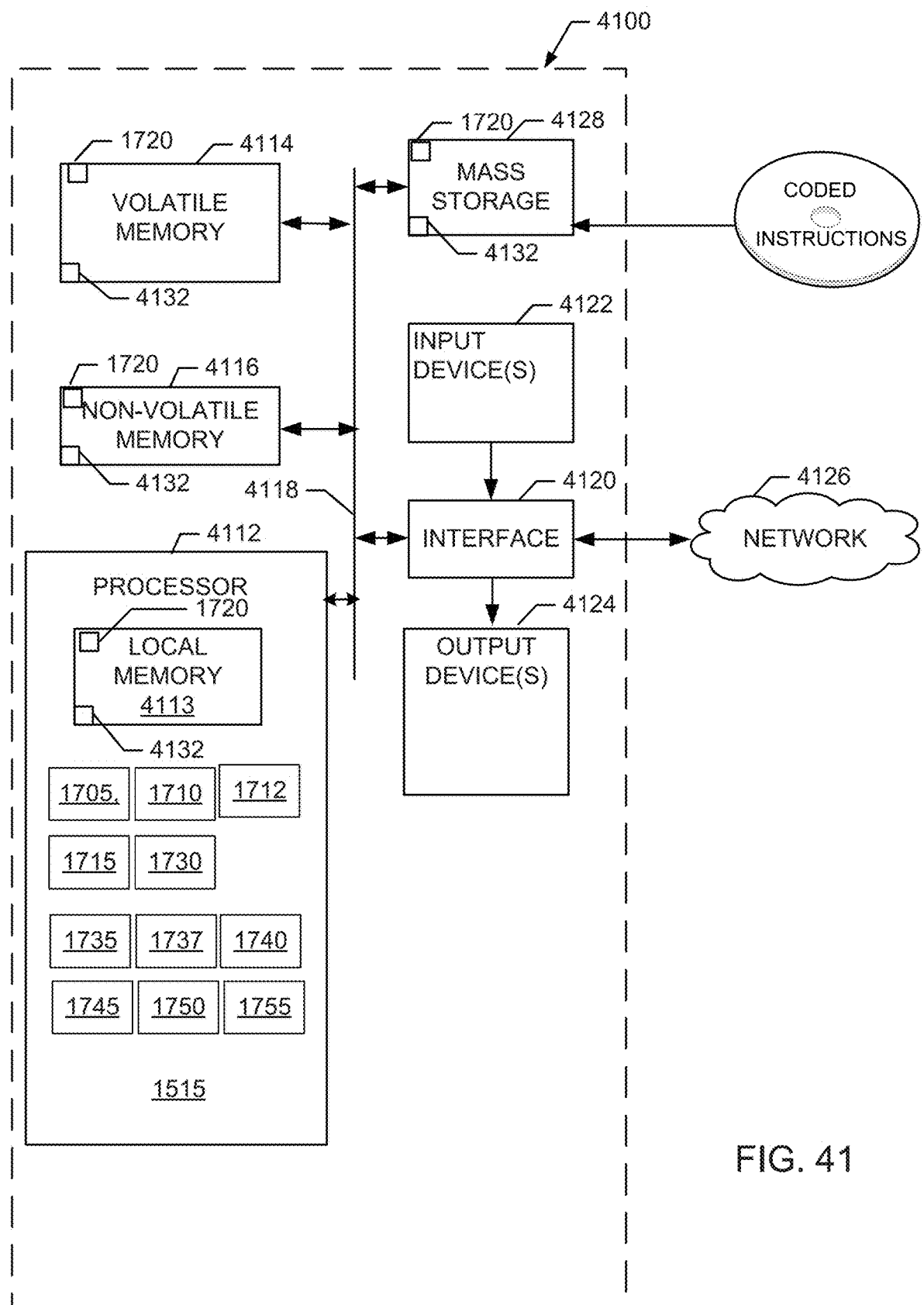
FIG. 41 is a block diagram of an example processor platform structured to execute the example computer readable instructions of FIG. 29 and FIG. 30 to implement the example authorized delegated licensor of FIG. 3.

FIG. 41 is a block diagram of an example processor platform 4100 structured to execute the instructions of FIGS. 29 and 30 to implement the central licensor of FIG. 15 and FIG. 16. The processor platform 4100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 4100 of the illustrated example includes a processor 4112. The processor 4112 of the illustrated example is hardware. For example, the processor 4112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example ADL 1515, the example ADL status requestor 1705, the example incoming license request denier 1710, the example status grant notification information parser 1712, the example storage controller 1715, the example decryptor 1725, and the example status advertiser 1730. In some examples, the second portion includes an example license generator 1735, an example license verifier 1737, and an example sequence number generator 1740 having an example time capturer 1745, an example time converter 1750, and an example sequence number adder 1755.

The processor 4112 of the illustrated example includes a local memory 4113 (e.g., a cache). The processor 4112 of the illustrated example is in communication with a main memory including a volatile memory 4114 and a non-volatile memory 4116 via a bus 4118. The volatile memory 4114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 4116 may be implemented by flash memory and/or any other desired type of memory device. Access to the main memory 4114, 4116 is controlled by a memory controller.

The processor platform 4100 of the illustrated example also includes an interface circuit 4120. The interface circuit 4120 may be implemented by any type of interface standard, such as an Ethernet interface, a universal serial bus (USB), a Bluetooth® interface, a near field communication (NFC) interface, and/or a PCI express interface.

In the illustrated example, one or more input devices 4122 are connected to the interface circuit 4120. The input device(s) 4122 permit(s) a user to enter data and/or commands into the processor 4112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 4124 are also connected to the interface circuit 4120 of the illustrated example. The output devices 4124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 4120 of the illustrated example, thus, typically includes a graphics driver card, a graphics driver chip and/or a graphics driver processor.

The interface circuit 4120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 4126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 4100 of the illustrated example also includes one or more mass storage devices 4128 for storing software and/or data. Examples of such mass storage devices 4128 include floppy disk drives, hard drive disks, compact disk drives, Blu-ray disk drives, redundant array of independent disks (RAID) systems, and digital versatile disk (DVD) drives.

The machine executable instructions 4132 of FIGS. 29 and 30 may be stored in the mass storage device 4128, in the volatile memory 4114, in the non-volatile memory 4116, and/or on a removable non-transitory computer readable storage medium such as a CD or DVD.

Figure 42:
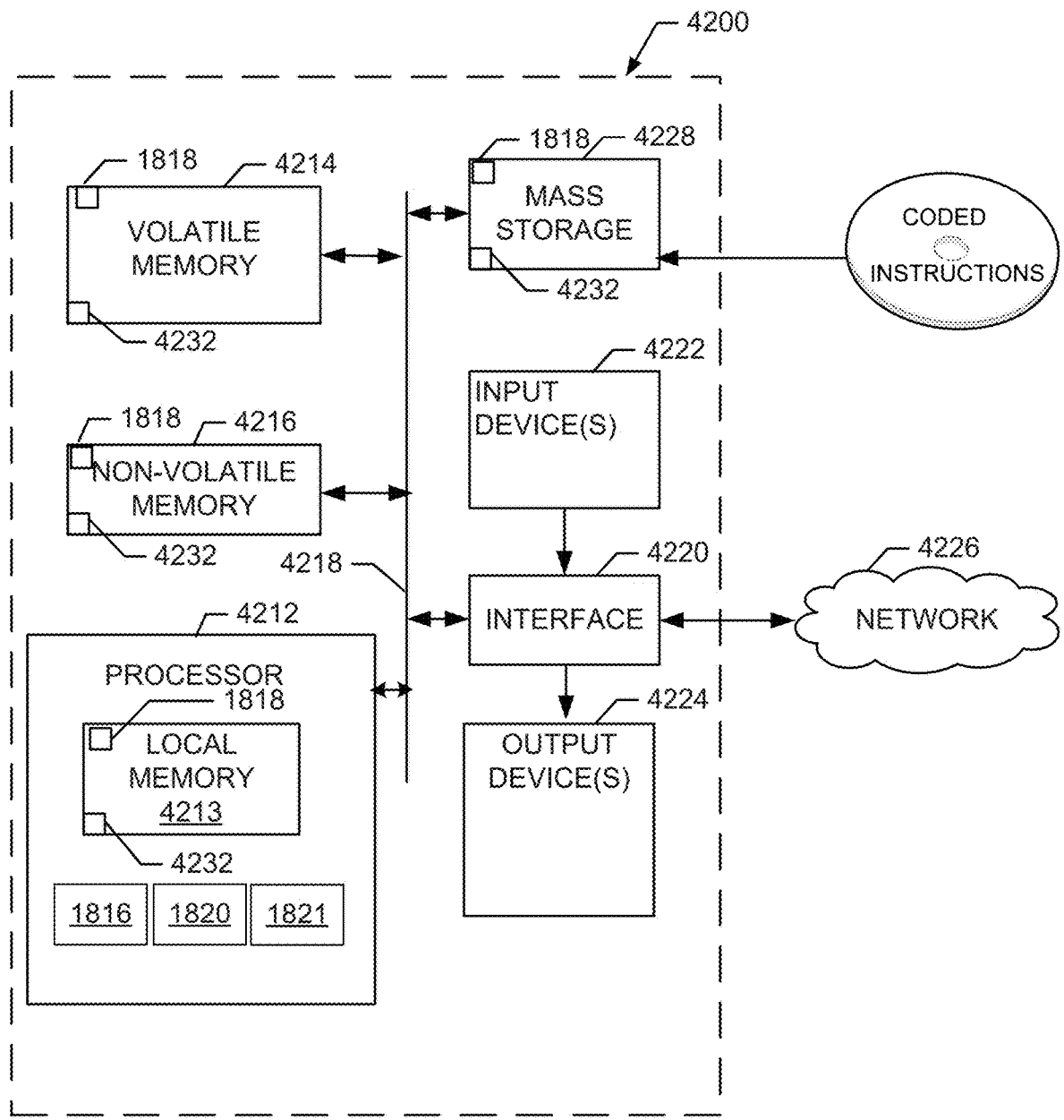
FIG. 42 is a block diagram of an example processor platform structured to execute the example computer readable instructions of FIG. 32 to implement the example hardware asset agent of FIG. 15 and FIG. 18.

FIG. 42 is a block diagram of an example processor platform 4200 structured to execute the instructions of FIGS. 29 and 30 to implement the central licensor of FIG. 15 and FIG. 16. The processor platform 4200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 4200 of the illustrated example includes a processor 4212. The processor 4212 of the illustrated example is hardware. For example, the processor 4212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example information parser 1816, the example business level requirements determiner 1820, and the example business level requirements converter 1821.

The processor 4212 of the illustrated example includes a local memory 4213 (e.g., a cache). The processor 4212 of the illustrated example is in communication with a main memory including a volatile memory 4214 and a non-volatile memory 4216 via a bus 4218. The volatile memory 4214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 4216 may be implemented by flash memory and/or any other desired type of memory device. Access to the main memory 4214, 4216 is controlled by a memory controller.

The processor platform 4200 of the illustrated example also includes an interface circuit 4220. The interface circuit 4220 may be implemented by any type of interface standard, such as an Ethernet interface, a universal serial bus (USB), a Bluetooth® interface, a near field communication (NFC) interface, and/or a PCI express interface.

In the illustrated example, one or more input devices 4222 are connected to the interface circuit 4220. The input device(s) 4222 permit(s) a user to enter data and/or commands into the processor 4212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 4224 are also connected to the interface circuit 4220 of the illustrated example. The output devices 4224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 4220 of the illustrated example, thus, typically includes a graphics driver card, a graphics driver chip and/or a graphics driver processor.

The interface circuit 4220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 4226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 4200 of the illustrated example also includes one or more mass storage devices 4228 for storing software and/or data. Examples of such mass storage devices 4228 include floppy disk drives, hard drive disks, compact disk drives, Blu-ray disk drives, redundant array of independent disks (RAID) systems, and digital versatile disk (DVD) drives.

The machine executable instructions 4232 of FIG. 32 may be stored in the mass storage device 4228, in the volatile memory 4214, in the non-volatile memory 4216, and/or on a removable non-transitory computer readable storage medium such as a CD or DVD.

Figure 43:
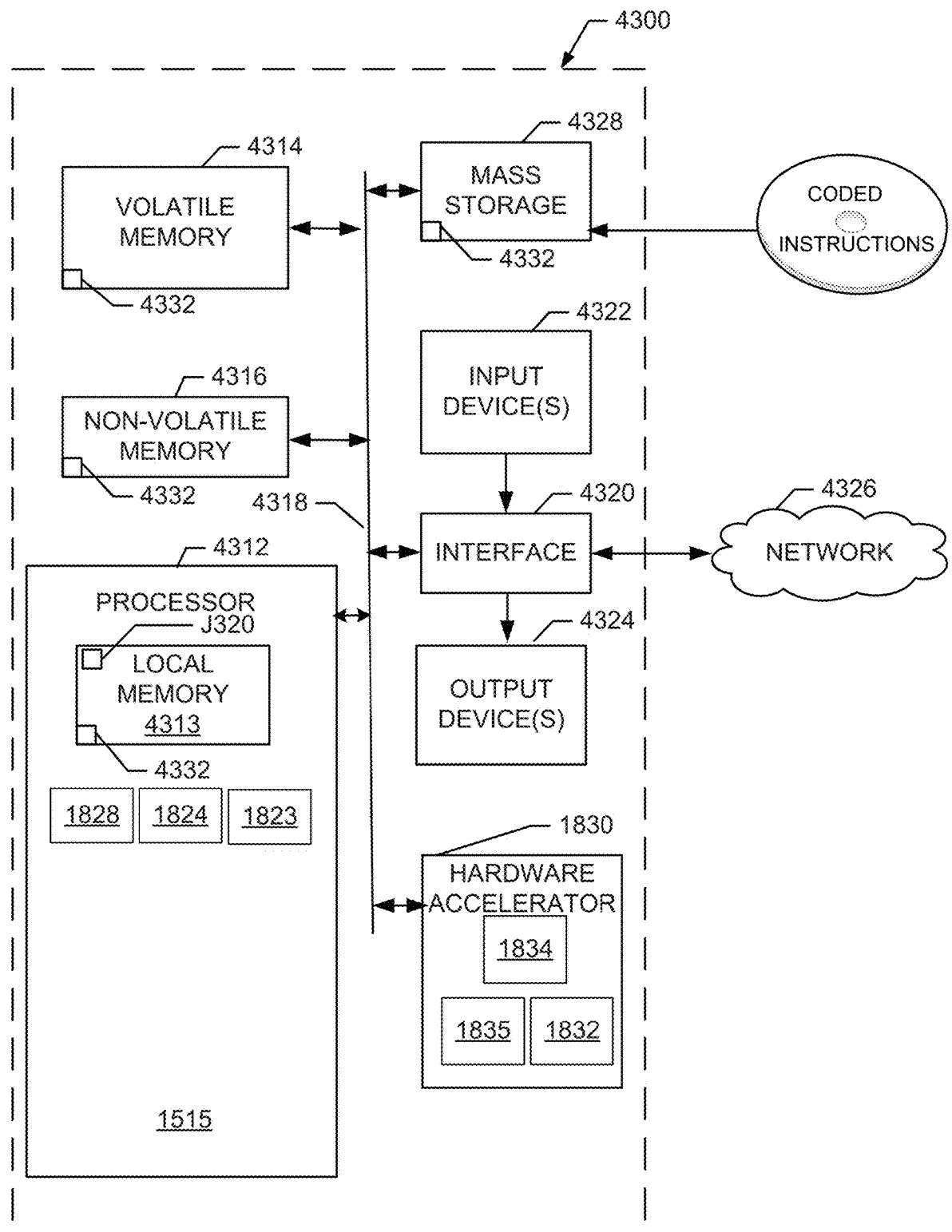
FIG. 43 is a block diagram of an example processor platform structured to execute the example computer readable instructions of FIG. 33 and FIG. 34 to implement the example hardware asset of FIG. 15 and FIG. 18.

FIG. 43 is a block diagram of an example processor platform 4300 structured to execute the instructions of FIGS. 33 and 34 to implement the central licensor of FIG. 15 and FIG. 16. The processor platform 4300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 4300 of the illustrated example includes a processor 4312. The processor 4312 of the illustrated example is hardware. For example, the processor 4312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example business level values verifier 1823, an example configuration change verifier 1824, an example compliance monitor 1828. In this example, the processor platform 4300 also includes the example accelerator 1830 having the example script/code remover 1832, and the example CPU 1834, and example business logic hardware 1835.

The processor 4312 of the illustrated example includes a local memory 4313 (e.g., a cache). The processor 4312 of the illustrated example is in communication with a main memory including a volatile memory 4314 and a non-volatile memory 4316 via a bus 4318. The volatile memory 4314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 4316 may be implemented by flash memory and/or any other desired type of memory device. Access to the main memory 4314, 4316 is controlled by a memory controller.

The processor platform 4300 of the illustrated example also includes an interface circuit 4320. The interface circuit 4320 may be implemented by any type of interface standard, such as an Ethernet interface, a universal serial bus (USB), a Bluetooth® interface, a near field communication (NFC) interface, and/or a PCI express interface.

In the illustrated example, one or more input devices 4322 are connected to the interface circuit 4320. The input device(s) 4322 permit(s) a user to enter data and/or commands into the processor 4312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 4324 are also connected to the interface circuit 4320 of the illustrated example. The output devices 4324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 4320 of the illustrated example, thus, typically includes a graphics driver card, a graphics driver chip and/or a graphics driver processor.

The interface circuit 4320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 4326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 4300 of the illustrated example also includes one or more mass storage devices 4328 for storing software and/or data. Examples of such mass storage devices 4328 include floppy disk drives, hard drive disks, compact disk drives, Blu-ray disk drives, redundant array of independent disks (RAID) systems, and digital versatile disk (DVD) drives.

The machine executable instructions 4332 of FIGS. 33 and 34 may be stored in the mass storage device 4328, in the volatile memory 4314, in the non-volatile memory 4316, and/or on a removable non-transitory computer readable storage medium such as a CD or DVD.

Figure 44:
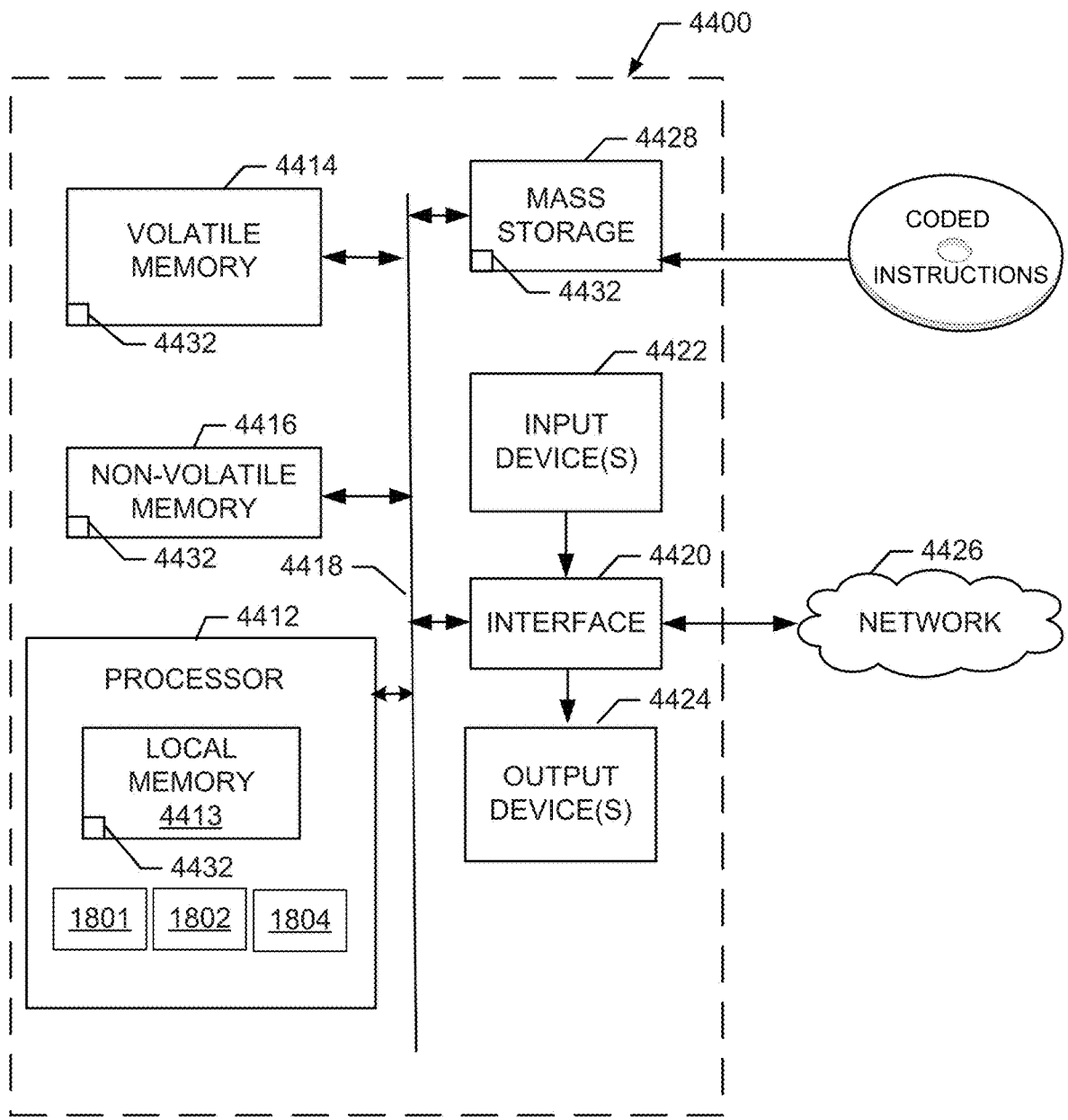
FIG. 44 is a block diagram of an example processor platform structured to execute the example computer readable instructions of FIG. 31 to implement a portion of the example central licensor of FIG. 15, FIG. 16 and FIG. 18.

FIG. 44 is a block diagram of an example processor platform 4400 structured to execute the instructions of FIG. 31 to implement a portion of the central licensor of FIG. 15, FIG. 16, and FIG. 18. The processor platform 4400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 4400 of the illustrated example includes a processor 4412. The processor 4412 of the illustrated example is hardware. For example, the processor 4412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example business logic rules generator 1801, the example business logic rules storage 1802, and the example business logic rules updater 1804.

The processor 4412 of the illustrated example includes a local memory 4413 (e.g., a cache). The processor 4412 of the illustrated example is in communication with a main memory including a volatile memory 4414 and a non-volatile memory 4416 via a bus 4418. The volatile memory 4414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 4416 may be implemented by flash memory and/or any other desired type of memory device. Access to the main memory 4414, 4416 is controlled by a memory controller.

The processor platform 4400 of the illustrated example also includes an interface circuit 4420. The interface circuit 4420 may be implemented by any type of interface standard, such as an Ethernet interface, a universal serial bus (USB), a Bluetooth® interface, a near field communication (NFC) interface, and/or a PCI express interface.

In the illustrated example, one or more input devices 4422 are connected to the interface circuit 4420. The input device(s) 4422 permit(s) a user to enter data and/or commands into the processor 4412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 4424 are also connected to the interface circuit 4420 of the illustrated example. The output devices 4424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 4420 of the illustrated example, thus, typically includes a graphics driver card, a graphics driver chip and/or a graphics driver processor.

The interface circuit 4420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 4426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 4400 of the illustrated example also includes one or more mass storage devices 4428 for storing software and/or data. Examples of such mass storage devices 4428 include floppy disk drives, hard drive disks, compact disk drives, Blu-ray disk drives, redundant array of independent disks (RAID) systems, and digital versatile disk (DVD) drives.

The machine executable instructions 4432 of FIG. 44 may be stored in the mass storage device 4428, in the volatile memory 4414, in the non-volatile memory 4416, and/or on a removable non-transitory computer readable storage medium such as a CD or DVD.

Figure 45:
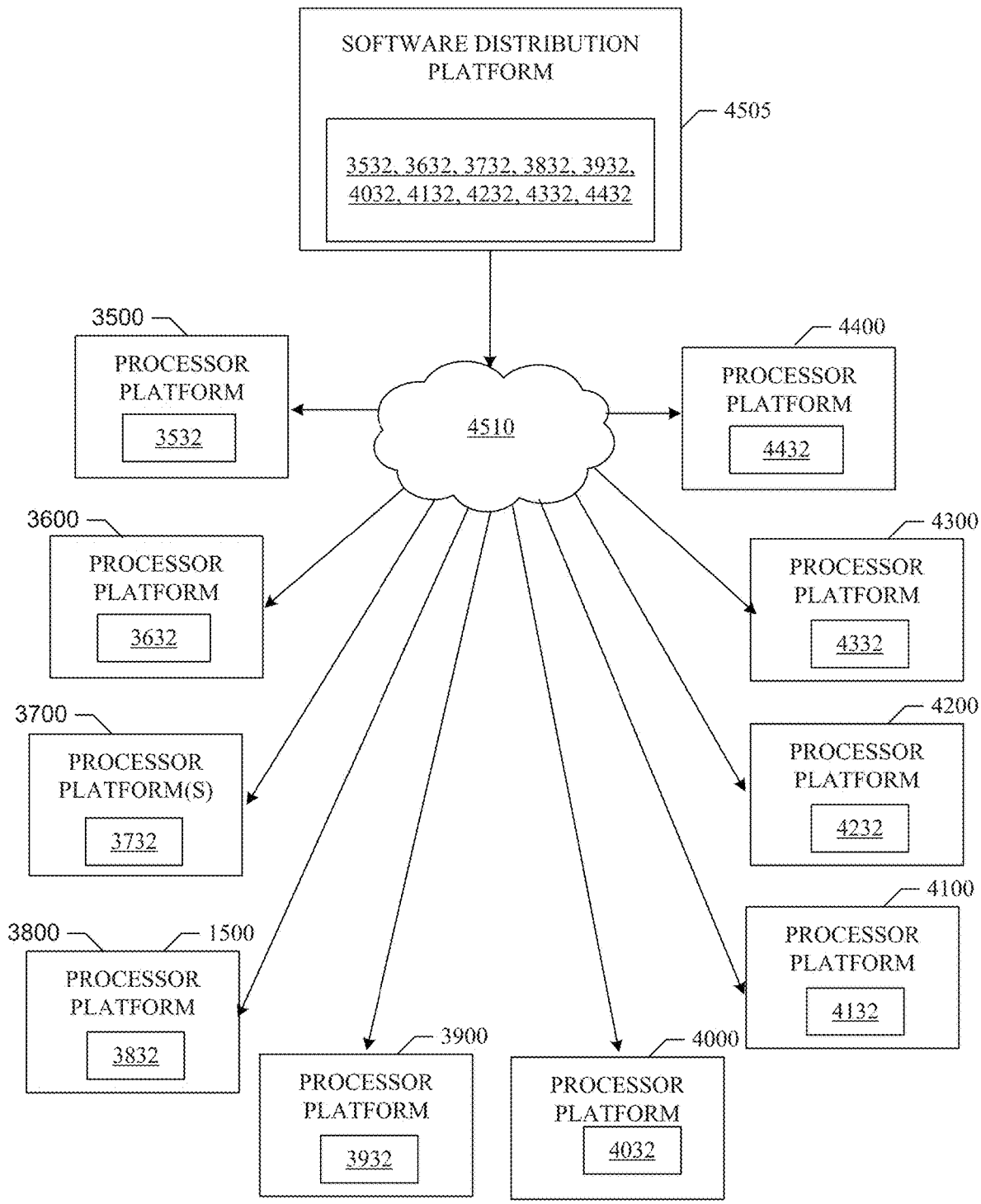
FIG. 45 is a block diagram of an example software distribution platform to distribute software (e.g., software corresponding to the example computer readable instructions of FIGS. 19, 20, 21, 22A-22B, 23, 24, 25, 26, 27, 28, 29, 30, 31, 32, 33 and/or 34) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 4505 to distribute software such as the example computer readable instructions 3532, 3632 and/or 3732 of FIGS. 35-37 and/or the example computer readable instructions 3832 and/or 3932 of FIGS. 38-39 and/or the example computer readable instructions 4032, 4132, 4232, 4332 and/or 4432 of FIGS. 40-44 to third parties is illustrated in FIG. 45. The example software distribution platform 4505 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 3532, 3632 and/or 3732 of FIGS. 35-37 and/or the example computer readable instructions 3832 and/or 3932 of FIGS. 38-39 and/or the example computer readable instructions 4032, 4132, 4232, 4332 and/or 4432 of FIGS. 40-44. The third parties may be consumers, users, retailers, OEMs, etc., who purchase and/or license the software for use and/or re-sale and/or sub-licensing. In the illustrated example, the software distribution platform 4505 includes one or more servers and one or more storage devices. The storage devices store the computer readable instructions 3532, 3632 and/or 3732, which may correspond to the example computer readable instructions 1900, 2000 and/or 2100 of FIGS. 19-21, and/or the computer readable instructions 3832 and/or 3932, which may correspond to the example computer readable instructions 2200, 2300, 2400, 2500 and/or 2600 of FIGS. 22A-22B and 23-26, and/or the example computer readable instructions 4032, 4132, 4232, 4332 and/or 4432, which may correspond to the example computer readable instructions 2700-3400 as described above. The one or more servers of the example software distribution platform 4505 are in communication with a network 4510, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 3832, 3932, 3532, 3632 and/or 3732 from the software distribution platform 4505. For example, the software, which may correspond to the example computer readable instructions 1900, 2000 and/or 2100 of FIGS. 19-21, may be downloaded to the example processor platforms 3500, 3600 and/or 3700, which execute the computer readable instructions 3532, 3632 and/or 3732 to implement the manufacture enterprise system 110, the customer enterprise system 115 and/or the SDSi asset agent 140. As another example, the software, which may correspond to the example computer readable instructions 2200, 2300, 2400, 2500 and/or 2600 of FIGS. 22A-22B and 23-26, may be downloaded to the example processor platforms 3800 and/or 3900, which execute the computer readable instructions 3832 and/or 3932 to implement the manufacture enterprise system 110 and/or the SDSi asset agent 140. In some example, one or more servers of the software distribution platform 4505 periodically offer, transmit, and/or force updates to the software (e.g., the example computer readable instructions 3532, 3632 and/or 3732 of FIGS. 35-37, and/or the example computer readable instructions 3832 and/or 3932 of FIGS. 38-39, and/or the example computer readable instructions 4032, 4132, 4232, 4332 and/or 4432 of FIGS. 40-44) to ensure improvements, patches, updates, etc. are distributed and applied to the software at the end user devices.

Edge Computing

Figure 46:
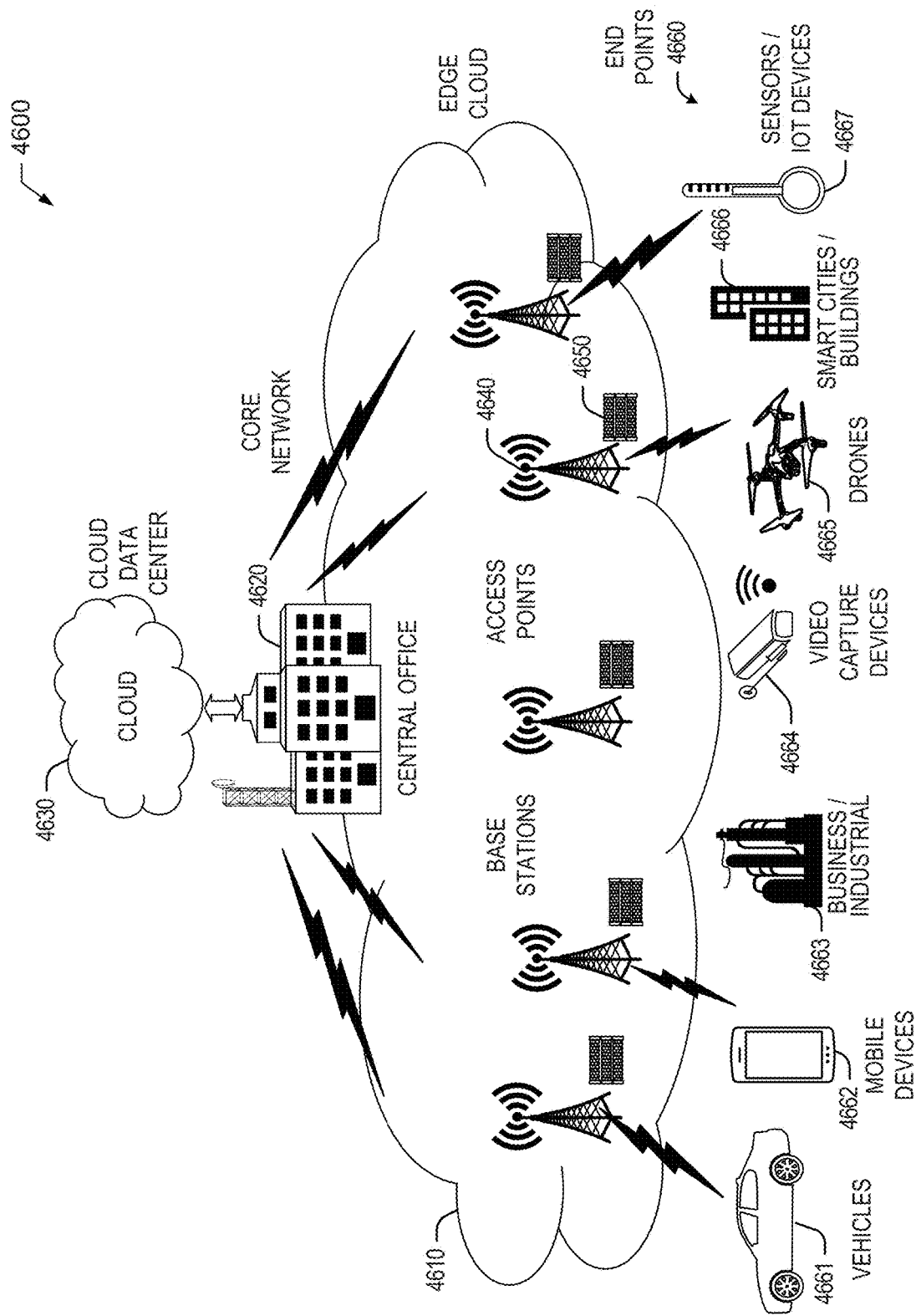
FIG. 46 illustrates an overview of an edge cloud configuration for edge computing.

FIG. 46 is a block diagram 4600 showing an overview of a configuration for edge computing, which includes a layer of processing referred to in many of the following examples as an "edge cloud". As shown, the edge cloud 4610 is co-located at an edge location, such as an access point or base station 4640, a local processing hub 4650, or a central office 4620, and thus may include multiple entities, devices, and equipment instances. The edge cloud 4610 is located much closer to the endpoint (consumer and producer) data sources 4660 (e.g., autonomous vehicles 4661, user equipment 4662, business and industrial equipment 4663, video capture devices 4664, drones 4665, smart cities and building devices 4666, sensors and IoT devices 4667, etc.) than the cloud data center 4630. Compute, memory, and storage resources which are offered at the edges in the edge cloud 4610 are critical to providing ultra-low latency response times for services and functions used by the endpoint data sources 4660 as well as reduce network backhaul traffic from the edge cloud 4610 toward cloud data center 4630 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 47:
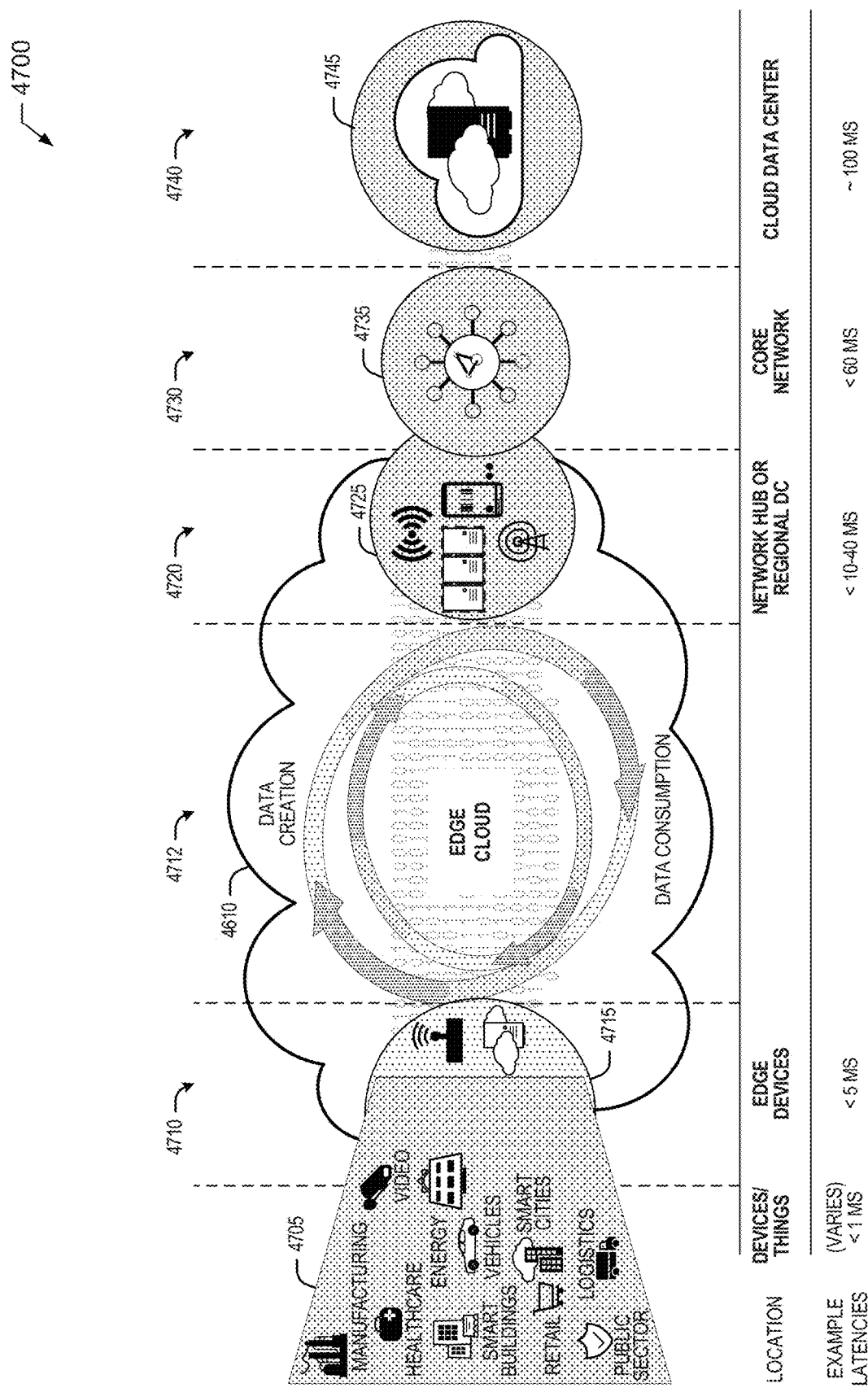
FIG. 47 illustrates operational layers among endpoints, an edge cloud, and cloud computing environments.

FIG. 47 illustrates operational layers among endpoints, an edge cloud, and cloud computing environments. Specifically, FIG. 47 depicts examples of computational use cases 4705, utilizing the edge cloud 4610 among multiple illustrative layers of network computing. The layers begin at an endpoint (devices and things) layer 4700, which accesses the edge cloud 4610 to conduct data creation, analysis, and data consumption activities. The edge cloud 4610 may span multiple network layers, such as an edge devices layer 4710 having gateways, on-premise servers, or network equipment (nodes 4715) located in physically proximate edge systems; a network access layer 4720, encompassing base stations, radio processing units, network hubs, regional data centers (DC), or local network equipment (equipment 4725); and any equipment, devices, or nodes located therebetween (in layer 4712, not illustrated in detail). The network communications within the edge cloud 4610 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 4700, under 5 ms at the edge devices layer 4710, to even between 10 to 40 ms when communicating with nodes at the network access layer 4720. Beyond the edge cloud 4610 are core network 4730 and cloud data center 4740 layers, each with increasing latency (e.g., between 50-60 ms at the core network layer 4730, to 100 or more ms at the cloud data center layer). As a result, operations at a core network data center 4735 or a cloud data center 4745, with latencies of at least 50 to 100 ms or more, will not be able to accomplish many time-critical functions of the use cases 4705. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 4735 or a cloud data center 4745, a central office or content data network may be considered as being located within a "near edge" layer ("near" to the cloud, having high latency values when communicating with the devices and endpoints of the use cases 4705), whereas an access point, base station, on-premise server, or network gateway may be considered as located within a "far edge" layer ("far" from the cloud, having low latency values when communicating with the devices and endpoints of the use cases 4705). It will be understood that other categorizations of a particular network layer as constituting a "close", "local", "near", "middle", or "far" edge may be based on latency, distance, number of network hops, or other measurable characteristics, as measured from a source in any of the network layers 4700-4740.

The various use cases 4705 may access resources under usage pressure from incoming streams, due to multiple services utilizing the edge cloud. To achieve results with low latency, the services executed within the edge cloud 4610 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 4610 may provide the ability to serve and respond to multiple applications of the use cases 4705 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 4610 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 4610 (network layers 4700-4740), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 4610.

As such, the edge cloud 4610 is formed from network components and functional features operated by and within edge gateway nodes, edge aggregation nodes, or other edge compute nodes among network layers 4710-4730. The edge cloud 4610 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 4610 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 4610 may be servers, multi-tenant servers, appliance computing devices, and/or any other type of computing devices. For example, the edge cloud 4610 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The example processor systems of FIGS. 35 to 44 illustrate example hardware for implementing an appliance computing device. The edge cloud 4610 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 48:
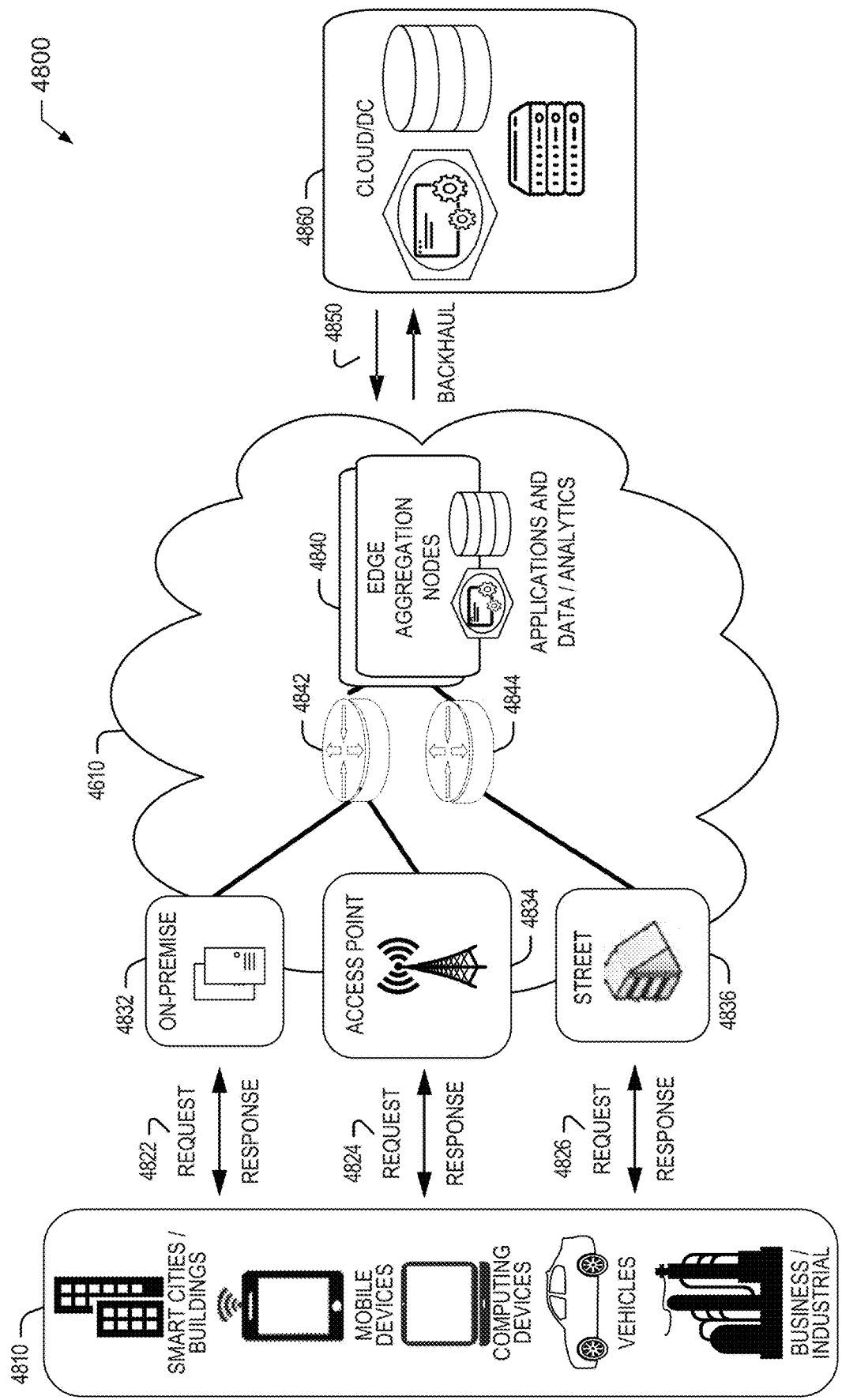
FIG. 48 illustrates an example approach for networking and services in an edge computing system.

In FIG. 48, various client endpoints 4810 (in the form of mobile devices, computers, autonomous vehicles, business computing equipment, industrial processing equipment) exchange requests and responses that are specific to the type of endpoint network aggregation. For instance, client endpoints 4810 may obtain network access via a wired broadband network, by exchanging requests and responses 4822 through an on-premise network system 4832. Some client endpoints 4810, such as mobile computing devices, may obtain network access via a wireless broadband network, by exchanging requests and responses 4824 through an access point (e.g., cellular network tower) 4834. Some client endpoints 4810, such as autonomous vehicles may obtain network access for requests and responses 4826 via a wireless vehicular network through a street-located network system 4836. However, regardless of the type of network access, the TSP may deploy aggregation points 4842, 4844 within the edge cloud 4610 to aggregate traffic and requests. Thus, within the edge cloud 4610, the TSP may deploy various compute and storage resources, such as at edge aggregation nodes 4840, to provide requested content. The edge aggregation nodes 4840 and other systems of the edge cloud 4610 are connected to a cloud or data center 4860, which uses a backhaul network 4850 to fulfill higher-latency requests from a cloud/data center for websites, applications, database servers, etc. Additional or consolidated instances of the edge aggregation nodes 4840 and the aggregation points 4842, 4844, including those deployed on a single server framework, may also be present within the edge cloud 4610 or other areas of the TSP infrastructure.

CONCLUSION

From the foregoing, it will be appreciated that example methods, apparatus and articles of manufacture have been disclosed that enables activation, deactivation and management of silicon product features after the silicon product has left the manufacturer's facility and control. The disclosed methods, apparatus and articles of manufacture improve the efficiency of using a computing device by providing mechanisms to activate dormant features of the silicon product, deactivate active features of the silicon product, perform failure recovery, etc. The disclosed methods, apparatus and articles of manufacture are accordingly directed to one or more improvement(s) in the functioning of a computer.

From the foregoing, it will also be appreciated that example methods, apparatus and articles of manufacture have been disclosed that protect semiconductor devices from feature adjustments that violate the intended configuration of the semiconductor devices. For example, techniques disclosed herein prevent the deactivation of features on a semiconductor device that were active when ownership of the semiconductor device was transferred, thereby preventing changes in hardware configurations that may invalidate warranties, violate financial agreements, and/or compromise safe and predictable operation of the semiconductor device. Example apparatus, methods, and articles of manufacture disclosed herein intelligently track ownership of a semiconductor device using hardware identifiers, entropy-based identifiers, and/or authentication keys to prevent cloning of devices for prohibited hardware and/or software changes. Example apparatus, methods, and articles of manufacture disclosed herein leverage technical characteristics of the semiconductor device to utilize identifiers that are unclonable prevent re-use of licenses that adjust features on semiconductor devices. Example techniques disclosed herein further enable license execution tracking to prevent licenses from being executed at unintended times (e.g., after making other changes on the semiconductor device). The disclosed methods, apparatus and articles of manufacture are accordingly directed to one or more improvement(s) in the functioning of a computer.

Example 1 is a central licensor system to delegate to a third party an ability to license features of a silicon structure, the central licensor system comprising a third party verifier to verify one or more credentials included in a request to become an authorized delegated licensor, the request received from the third party, a feature identifier to identify a feature which the third party is to be granted the authority to license, and a configuration installation code generator to generate feature configuration installation code, the feature configuration installation code to be used by the third party to generate at least a portion of the license, the portion of the license to be used by a licensee to configure the silicon structure to access the licensed feature, and contents of the feature configuration installation code encrypted to prevent access by the authorized delegated licensor.

Example 2 includes the central licensor system of example 1, further including a signature generator to generate a signature to be included with the feature configuration installation code prior to transmission of the feature configuration installation code to the authorized delegated licensor.

Example 3 includes the central licensor system of any one or more of examples 1-2, wherein the central licensor system is associated with a manufacturer of the silicon structure.

Example 4 includes the central licensor system of any one or more of examples 1-3, further including a certificate handler to handle certificates from the authorized delegated licensor, the certificates to indicate a feature has been licensed by the authorized delegated licensor.

Example 5 includes the central licensor system of example 4, wherein the certificate handler includes an asset identifier to a hardware asset that consumed a license to configure the feature, and a sequence number verifier to verify that a first sequence number included with the certificate is greater than a second sequence number corresponding to a previously granted license to configure the feature.

Example 6 includes the central licensor system of example 5, wherein the certificate handler is to instruct the authorized delegated licensor to revoke an issued license when the sequence number verifier is unable to verify that the first sequence number is greater than the second sequence number.

Example 7 is a non-transitory computer readable medium comprising instructions that, when executed, cause at least one processor to at least verify one or more credentials included in a request to become an authorized delegated licensor, the request received from a third party, identify a feature which the third party is to be granted the authority to license, and generate feature configuration installation code, the feature configuration installation code to be used by the third party to generate at least a portion of the license, the portion of the license to be used by a licensee to configure the silicon structure to access the licensed feature, and contents of the feature configuration installation code protected from access by the authorized delegated licensor.

Example 8 includes the non-transitory computer readable medium of example 7, wherein the instructions further cause the at least one processor to generate a signature to be included with the feature configuration installation code prior to transmission of the feature configuration installation code to the authorized delegated licensor, the signature unique to the authorized delegate licensor.

Example 9 includes the non-transitory computer readable medium of any one or more of examples 7-8, wherein the instructions further cause the at least processor to handle certificates from the authorized delegated licensor, the certificates to indicate that the feature has been licensed by the authorized delegated licensor.

Example 10 includes the non-transitory computer readable medium of any one or more of examples 7-9, wherein the instructions cause the at least one processor to handle certificates by identifying, based on an asset identifier, a hardware asset that consumed a license to configure the feature, and verifying a first sequence number included with the certificate is greater than a second sequence number corresponding to a previously granted license to configure the feature.

Example 11 is a method to delegate to a third party an ability to license features of a silicon structure comprising verifying one or more credentials included in a request to become an authorized delegated licensor, the request received from a third party, identifying a feature which the third party is to be granted the authority to license, and generating feature configuration installation code, the feature configuration installation code to be used by the third party to generate at least a portion of the license, the portion of the license to be used by a licensee to configure the silicon structure to access the licensed feature, and contents of the feature configuration installation code protected from access by the authorized delegated licensor.

Example 12 includes the method of example 11, further including generating a signature to be included with the feature configuration installation code prior to transmission of the feature configuration installation code to the authorized delegated licensor.

Example 13 includes the method of any one or more of examples 11-12, further including handling certificates from the authorized delegated licensor, at least one of the certificates to indicate that the feature has been licensed by the authorized delegated licensor.

Example 14 includes the method of any one or more of examples 11-13, further including handling the certificates by identifying, based on a asset identifier, a hardware asset that consumed a license to configure the feature, and verifying a first sequence number included with the at least one of the certificates is greater than a second sequence number corresponding to a previously granted license to configure the feature.

Example 15 includes the method of example 14, further including instructing the authorized delegated licensor to revoke an issued license when the sequence number verifier is unable to verify that the first sequence number is greater than the second sequence number.

Example 16 is a central licensor system to delegate to a third party an ability to license features of a silicon structure, the central licensor system comprising means for verifying credentials, the verification means to verify one or more credentials included in a request to become an authorized delegated licensor, the request received from the third party, means for identifying features, the identification means to identify a feature which the third party is to be granted the authority to license, and means for generating code, the code generation means to generate feature configuration installation code, the feature configuration installation code to be used by the third party to generate at least a portion of the license, the portion of the license to be used by a licensee to configure the silicon structure to access the licensed feature, and contents of the feature configuration installation code encrypted to prevent access by the authorized delegated licensor.

Example 17 includes the central licensor system of example 16, further including means for generating signatures, the signature generation means to generate a signature to be included with the feature configuration installation code prior to transmission of the feature configuration installation code to the authorized delegated licensor.

Example 18 includes the central licensor system of any one or more of examples 16-17, wherein the central licensor system is associated with a manufacturer of the silicon structure.

Example 19 includes the central licensor system of any one or more of examples 16-18, further including means for handling certificates, the handling means to handle certificates from the authorized delegated licensor, the certificates to indicate a feature has been licensed by the authorized delegated licensor.

Example 20 includes the central licensor system of example 19, wherein the handling means includes means for determining assets, the determination means to identify a hardware asset that consumed a license to configure the feature, and means for verifying sequence numbers, the sequence verifying means to verify that a first sequence number included with the certificate is greater than a second sequence number corresponding to a previously granted license to configure the feature.

Example 21 includes the central licensor system of example 20, wherein the handling means is to instruct the authorized delegated licensor to revoke an issued license when the sequence number verifier is unable to verify that the first sequence number is greater than the second sequence number.

Example 22 is a system to license features of a silicon structure on behalf of a central licensor of a silicon structure, the system comprising a requestor to generate, by executing an instruction with at least one processor, a request to become an authorized delegated licensor, a status grant notification information parser to parse information, by executing an instruction from the at least one processor, from the central licensor, the information to identify whether the request is granted and, when the request is granted, the information to identify a silicon feature the authorized delegated licensor is authorized to license, and a status advertiser to advertise, by executing an instruction with the at least one processor, the status of the system as an authorized delegated licensor to purchasers of the silicon structure.

Example 23 includes the system of example 22, wherein the parsed information further includes a first script that can be executed by the authorized delegated licensor to generate a license signature to be included with license granted by the authorized delegated licensor, the license signature unique to the authorized delegated licensor, and a second script that is encrypted, the second script to be transmitted to at least one of an asset agent or a hardware asset for use in at least one of enabling or disabling the feature on the silicon structure, wherein the second script cannot be de-encrypted by the authorized delegated licensor.

Example 24 includes the system of any one or more of examples 21-22, further including a license verifier to verify information included in a license request from a potential licensee, the information to include at least one of a feature identifier identifying a feature for which a license is being requested, an identifier of a customer requesting the license, or a geographical location of the silicon structure for which the license is being requested, based on the information, determine whether a grant of the license will violate any constraints associated with at least one of the silicon structure, the licensee or the delegated licensor, and based on the determinations, at least one of grant or deny the license being requested.

Example 25 includes the system of example 24, further including a license generator to generate a license when the license is to be granted.

Example 26 includes the system of example 25, wherein the constraints include at least one of a constraint on a type of feature permitted to be licensed, a constraint on the customer that is requesting the license, or a constraint based on the geographical location of the silicon structure for which the license is being requested.

Example 27 includes the system of any one or more of examples 22-26, further including a sequence number generator to generate a sequence number to be associated with the license, the sequence number used by the central licensor to verify a validity of the license.

Example 28 includes the system of example 27, wherein the sequence number generator includes a time capturer to capture a local time, a time converter to convert the time to a sequence number, and a sequence number adder to add the sequence number to the license.

Example 29 is a non-transitory computer readable medium comprising instructions that, when executed, cause at least one processor to at least generate a request to become an authorized delegated licensor on behalf of a silicon structure manufacturer, parse status grant notification information from a central licensor, the information to identify whether the request is granted and, when the request is granted, the information to identify a silicon feature the authorized delegated licensor is authorized to license, and advertise a status as an authorized delegated licensor to purchasers of the silicon structure.

Example 30 includes the non-transitory computer readable medium of example 29, wherein the parsed information further includes a first script that can be executed by the authorized delegated licensor to generate a license signature to be included with license granted by the authorized delegated licensor, the license signature unique to the authorized delegated licensor, and a second script that is encrypted, the second script to be transmitted to at least one of an asset agent or a hardware asset for use in at least one of enabling or disabling the feature on the silicon structure, wherein the second script cannot be de-encrypted by the authorized delegated licensor.

Example 31 includes the non-transitory computer readable medium of any one or more of examples 29-30, the instructions further to cause the at least one processor to verify information included in a license request from a potential licensee, the information to include at least one of a feature identifier identifying a feature for which a license is being requested, an identifier of a customer requesting the license, or a geographical location of the silicon structure for which the license is being requested, based on the information, determine whether a grant of the license will violate any constraints associated with at least one of the silicon structure, the licensee or the delegated licensor, and based on the determinations, at least one of grant or deny the license being requested.

Example 32 includes the non-transitory computer readable medium of example 31, wherein the instructions further cause the at least one processor to generate a license when the license being requested is to be granted.

Example 33 includes the non-transitory computer readable medium of example 31, wherein the constraints include at least one of a constraint on a type of feature permitted to be licensed, a constraint on the customer that is requesting the license, or a constraint based on the geographical location of the silicon structure for which the license is being requested.

Example 34 includes the non-transitory computer readable medium of example 31, wherein the instructions further cause the at least one processor to generate a sequence number to be associated with the license to be granted, the sequence number used by the central licensor to verify a validity of the license.

Example 35 includes the non-transitory computer readable medium of any one or more of examples 29-34, wherein the instructions further cause the at least one processor to capture a time, convert the time to a sequence number, and add the sequence number to a license to be granted.

Example 36 is a method to operate as a delegated licensor of licenses for silicon structures, the method comprising generating a request to become an authorized delegated licensor on behalf of a silicon structure manufacturer, parsing status grant notification information from a central licensor, the information to identify whether the request is granted and, when the request is granted, the information to identify a silicon feature that the authorized delegated licensor is authorized to license, and advertising a status as an authorized delegated licensor to purchasers of the silicon structure.

Example 37 includes the method of example 36, wherein the parsed information further includes a first script that can be executed by the authorized delegated licensor to generate a license signature to be included with license granted by the authorized delegated licensor, the license signature unique to the authorized delegated licensor, and a second script that is encrypted, the second script to be transmitted to at least one of an asset agent or a hardware asset for use in at least one of enabling or disabling the feature on the silicon structure, wherein the second script cannot be de-encrypted by the authorized delegated licensor.

Example 38 includes the method of any one or more of examples 36-37, further including verifying information included in a license request from a potential licensee, the information to include at least one of a feature identifier identifying a feature for which a license is being requested, an identifier of a customer requesting the license, or a geographical location of the silicon structure for which the license is being requested, based on the information, determining whether a grant of the license will violate any constraints associated with at least one of the silicon structure, the licensee or the delegated licensor, and based on the determinations, at least one of granting or denying the license being requested.

Example 39 includes the method of example 38, further including generating a license when the license being requested is to be granted.

Example 40 includes the method of example 38, wherein the constraints include at least one of a constraint on a type of feature permitted to be licensed, a constraint on the customer that is requesting the license, or a constraint based on the geographical location of the silicon structure for which the license is being requested.

Example 41 includes the method of example 38, further including generating a sequence number to be associated with the license to be granted, the sequence number used by the central licensor to verify a validity of the license.

Example 42 includes the method of any one or more of examples 36-41, further including capturing a time, converting the time to a sequence number, and adding the sequence number to a license to be granted.

Example 43 is a system to license features of a silicon structure on behalf of a central licensor of a silicon structure, the system comprising means for generating requests, the request generating means to generate, by executing an instruction with at least one processor, a request to become an authorized delegated licensor, means for parsing information, the information parsing means to parse information, by executing an instruction from the at least one processor, from the central licensor, the information to identify whether the request is granted and, when the request is granted, the information to identify a silicon feature the authorized delegated licensor is authorized to license, and means for advertising statuses, the status advertising means to advertise, by executing an instruction with the at least one processor, the status of the system as an authorized delegated licensor to purchasers of the silicon structure.

Example 44 includes the system of example 43, wherein the parsed information further includes a first script that can be executed by the authorized delegated licensor to generate a license signature to be included with license granted by the authorized delegated licensor, the license signature unique to the authorized delegated licensor, and a second script that is encrypted, the second script to be transmitted to at least one of an asset agent or a hardware asset for use in at least one of enabling or disabling the feature on the silicon structure, wherein the second script cannot be de-encrypted by the authorized delegated licensor.

Example 45 includes the system of any one or more of examples 43-44, further including means for verifying licenses, the license verifying means to verify information included in a license request from a potential licensee, the information to include at least one of a feature identifier identifying a feature for which a license is being requested, an identifier of a customer requesting the license, or a geographical location of the silicon structure for which the license is being requested, based on the information, determine whether a grant of the license will violate any constraints associated with at least one of the silicon structure, the licensee or the delegated licensor, and based on the determinations, at least one of grant or deny the license being requested.

Example 46 includes the system of example 45, further including means for generating licenses, the license generating means to generate a license when the license is to be granted.

Example 47 includes the system of example 46, wherein the constraints include at least one of a constraint on a type of feature permitted to be licensed, a constraint on the customer that is requesting the license, or a constraint based on the geographical location of the silicon structure for which the license is being requested.

Example 48 includes the system of any one or more of examples 43-46, further including means for generating sequence numbers, the sequence number generating means to generate a sequence number to be associated with the license, the sequence number used by the central licensor to verify a validity of the license.

Example 49 includes the system of example 48, wherein the sequence number generating means includes means for timing, the timing means to capture a local time, means for conversion, the conversion means to convert the time to a sequence number, and means for summing, the summing means to add the sequence number to the license.

Example 50 is a license processing system, the system comprising an agent to handle, by executing an instruction with at least one processor, information associated with business rules specified by a manufacturer of the licensing processing system, and a hardware asset to incorporate, by interpreting a set of values with at least one processor, the business rules into a business logic hardware of the hardware asset.

Example 51 includes the license processing system of example 50, wherein the agent includes an information parser to parse information received from a manufacturer of a silicon structure, the information to include a set of business rules, a business level requirements determiner to determine, based on the set of business rules, a set of business level requirements to be satisfied by the silicon structure when operating, and a business level requirements converter to convert the business level requirements to the set of values to be used to hardcode the hardware asset with the business level requirements.

Example 52 includes the license processing system of any one or more of examples 50-51, wherein the hardware asset further includes a business level values verifier to verify that information supplied by the agent includes business level values.

Example 53 includes the license processing system of example 52, wherein the hardware asset includes a configuration change verifier to verify that a hardware configuration change associated with hardcoding business logic hardware with the business level values will not violate any configuration constraints.

Example 54 includes the license processing system of any one or more of examples 52-53, wherein the hardware asset further includes a script remover to remove a script from the hardware asset after the script has been executed, the script configured to use the business level values to hardcode business logic rules into the hardware asset.

Example 55 is a non-transitory computer readable medium comprising instructions that, when executed, cause at least one processor to at least handle information associated with business rules specified by a manufacturer of a silicon structure, and cause a set of values associated with the business rules to be used to hardcode a business logic hardware of the silicon structure to operate in accordance with the business rules.

Example 56 includes the non-transitory computer readable medium of example 55, wherein the instructions further cause the at least one processor to parse information received from a manufacturer of a silicon structure, the information to include the business rules, determine, based on a set of the business rules, a set of business level requirements to be satisfied by the silicon structure when operating, and convert the business level requirements to the set of values to be used to hardcode the business logic hardware of the silicon structure to operate in accordance with the business rules.

Example 57 includes the non-transitory computer readable medium of any one or more of examples 55-56, wherein the instructions further cause the at least one processor to verify that information supplied by the agent includes business level values.

Example 58 includes the non-transitory computer readable medium of any one or more of examples 55-57, wherein the instructions further cause the at least one processor to verify that a hardware configuration change that will occur when the business logic hardware is hardcoded with the set of values will not violate configuration constraints.

Example 59 includes the non-transitory computer readable medium of any one or more of examples 57-58, wherein the instructions further cause the at least one processor to remove a script from a hardware asset after the script has been executed, the script configured to use the business level values to hardcode the business logic hardware to operate in accordance with the business rules.

Example 60 is a method to hardcode a business logic hardware with business rules, the method comprising handling information associated with business rules specified by a manufacturer of a silicon structure, and causing a set of values associated with the business rules to be used to hardcode a business logic hardware of the silicon structure to operate in accordance with the business rules.

Example 61 includes the method of example 60, further including parsing information received from a manufacturer of a silicon structure, the information to include the business rules, determining, based on a set of the business rules, a set of business level requirements to be satisfied by the silicon structure when operating, and converting the business level requirements to the set of values to be used to hardcode the business logic hardware of the silicon structure to operate in accordance with the business rules.

Example 62 includes the method of examples 60-61, further including verifying that a hardware configuration change that will occur when the business logic hardware is hardcoded with the set of values will not violate configuration constraints.

Example 63 includes the method of examples 60-62, further including removing a script from the hardware asset after the script has been executed, the script configured to use business level values to hardcode the business logic hardware to operate in accordance with the business rules.

Example 64 includes a license processing system, the system comprising means for handling information, the handling means to handle, by executing an instruction with at least one processor, information associated with business rules specified by a manufacturer of the licensing processing system, and a hardware asset to incorporate, by interpreting a set of values with at least one processor, the business rules into a business logic hardware of the hardware asset.

Example 65 includes the license processing system of example 64, wherein the handling means includes means for parsing information, the parsing means to parse information received from a manufacturer of a silicon structure, the information to include a set of business rules, means for determining business level requirements, determining means to determine, based on the set of business rules, a set of business level requirements to be satisfied by the silicon structure when operating, and means for converting business level requirements, the converting means to convert the business level requirements to the set of values to be used to hardcode the hardware asset with the business level requirements.

Example 66 includes the license processing system of examples 64-65, wherein the hardware asset further includes means for verifying business levels, the verifying means to verify that information supplied by the handling means includes business level values.

Example 67 includes the license processing system of example 66, wherein the hardware asset includes means for verifying configuration changes, the configuration change verifying means to verify that a hardware configuration change associated with hardcoding business logic hardware with the business level values will not violate any configuration constraints.

Example 68 includes the license processing system of examples 66-67, wherein the hardware asset further includes a means for removing scripts, the removing means to remove script from the hardware asset after the script has been executed, the script configured to use the business level values to hardcode business logic rules into the hardware asset.

Example 69 is a computer-readable medium comprising instructions to perform the method of any of examples 11-15.

Example 70 is an apparatus comprising processing circuitry to perform the method of any of examples 11-15.

Example 71 is a computer-readable medium comprising instructions to perform the method of any of examples 36-42.

Example 72 is an apparatus comprising processing circuitry to perform the method of any of examples 36-42.

Example 73 is a computer-readable medium comprising instructions to perform the method of any of examples 60-63.

Example 74 is an apparatus comprising processing circuitry to perform the method of any of examples 60-63.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system comprising:
   interface circuitry;
   machine readable instructions; and
   at least one processor circuit to be programmed by the machine readable instructions to at least:
      detect loss of a network connection with a processor platform associated with a manufacturer of a silicon product, the silicon product configurable to activate a feature based on a license to be generated by the system; and
      after the network connection is lost, limit activation of the feature of the silicon product to be under a condition that the activation of the feature is to maintain a quality of service to be provided by the silicon product.

2. The system of claim 1, wherein one or more of the at least one processor circuit is to:
   obtain a signature from the manufacturer of the silicon product; and
   sign the license based on the signature.

3. The system of claim 1, wherein one or more of the at least one processor circuit is to, after the network connection is restored, cause transmission of a certificate to the processor platform associated with the manufacturer of the silicon product, the certificate to indicate the feature has been licensed to the silicon product.

4. The system of claim 3, wherein one or more of the at least one processor circuit is to:
   generate a sequence number to include in the license, the sequence number based on a time of generation of the license; and
   include the sequence number in the certificate.

5. The system of claim 3, wherein one or more of the at least one processor circuit is to revoke the license based on an instruction from the manufacturer of the silicon product after transmission of the certificate.

6. At least one non-transitory computer readable medium comprising instructions to cause at least one processor circuit to at least:
   detect loss of a network connection with a processor platform associated with a manufacturer of a silicon product, the silicon product configurable to activate a feature based on a license; and
   after the network connection is lost, limit activation of the feature of the silicon product to be under a condition that the activation of the feature is to maintain a quality of service to be provided by the silicon product.

7. The at least one non-transitory computer readable medium of claim 6, wherein the instructions are to cause one or more of the at least one processor circuit to:
   obtain a signature from the manufacturer of the silicon product; and
   sign the license based on the signature.

8. The at least one non-transitory computer readable medium of claim 6, wherein the instructions are to cause one or more of the at least one processor circuit to, after the network connection is restored, cause transmission of a certificate to the processor platform associated with the manufacturer of the silicon product, the certificate to indicate that the feature has been licensed to the silicon product.

9. The at least one non-transitory computer readable medium of claim 8, wherein the instructions are to cause one or more of the at least one processor circuit to:
   generate a sequence number to include in the license, the sequence number based on a time of generation of the license; and
   include the sequence number in the certificate.

10. The at least one non-transitory computer readable medium of claim 8, wherein the instructions are to cause one or more of the at least one processor circuit to revoke the license based on an instruction from the manufacturer of the silicon product after transmission of the certificate.

11. A method comprising:
    detecting loss of a network connection with a processor platform associated with a manufacturer of a silicon product, the silicon product having a feature that is activatable based on a license; and
    after the network connection is lost, limiting, by at least one processor circuit programmed by at least one instruction, activation of the feature to be under a condition that the activation of the feature maintains a quality of service provided by the silicon product.

12. The method of claim 11, further including:
    obtaining a signature from the manufacturer of the silicon product; and
    signing the license based on the signature.

13. The method of claim 11, further including, after the network connection is restored, transmitting a certificate to the processor platform associated with the manufacturer of the silicon product, the certificate to indicate that the feature has been licensed to the silicon product.

14. The method of claim 13, further including:
generating a sequence number to include in the license, the sequence number based on a time of generation of the license; and
including the sequence number in the certificate.

15. The method of claim 13, further including revoking the license based on an instruction from the manufacturer of the silicon product after transmission of the certificate.

16. The system of claim 1, wherein the activation of the feature is associated with failure recovery to maintain the quality of service.

17. The system of claim 1, wherein the activation of the feature is to compensate for a component failure to maintain the quality of service.

18. The at least one non-transitory computer readable medium of claim 6, wherein activation of the feature is associated with perform failure recovery to maintain the quality of service.

19. The at least one non-transitory computer readable medium of claim 6, wherein activation of the feature is to compensate for a component failure to maintain the quality of service.

20. The method of claim 11, wherein the activation of the feature compensates for a component failure to maintain the quality of service.

\* \* \* \* \*

UNITED STATES PATENT AND TRADEMARK OFFICE
CERTIFICATE OF CORRECTION

| | | |
|---|---|---|
| PATENT NO. | : 12,061,930 B2 | Page 1 of 1 |
| APPLICATION NO. | : 17/033200 | |
| DATED | : August 13, 2024 | |
| INVENTOR(S) | : Bartfai-Walcott et al. | |

It is certified that error appears in the above-identified patent and that said Letters Patent is hereby corrected as shown below:

In the Drawings

Sheet 24, FIG. 23, below reference numeral 2314, replace "MANFUACTURER" with --MANUFACTURER--

Signed and Sealed this
Twenty-fourth Day of September, 2024

Katherine Kelly Vidal
*Director of the United States Patent and Trademark Office*